(12) United States Patent
Lu et al.

(10) Patent No.: US 10,899,020 B2
(45) Date of Patent: Jan. 26, 2021

(54) ROBOTIC DEVICES AND METHODS FOR FABRICATION, USE AND CONTROL OF SAME

(71) Applicant: Planar Motor Incorporated, Richmond (CA)

(72) Inventors: Xiaodong Lu, Vancouver (CA); Peter Tang, Hamilton (CA); Alexander H. Slocum, Bow, NH (US); Rui Chen, Vancouver (CA)

(73) Assignee: Planar Motor Incorporated

( * ) Notice: Subject to any disclaimer, the term of this patent is extended or adjusted under 35 U.S.C. 154(b) by 0 days.

(21) Appl. No.: 16/498,197

(22) PCT Filed: Mar. 27, 2018

(86) PCT No.: PCT/CA2018/050375
§ 371 (c)(1),
(2) Date: Sep. 26, 2019

(87) PCT Pub. No.: WO2018/176137
PCT Pub. Date: Oct. 4, 2018

(65) Prior Publication Data
US 2020/0030995 A1  Jan. 30, 2020

Related U.S. Application Data

(60) Provisional application No. 62/626,082, filed on Feb. 4, 2018, provisional application No. 62/590,323, filed
(Continued)

(51) Int. Cl.
*H02K 1/26* (2006.01)
*B25J 15/06* (2006.01)
(Continued)

(52) U.S. Cl.
CPC .......... *B25J 15/065* (2013.01); *B25J 9/0036* (2013.01); *B25J 15/0246* (2013.01);
(Continued)

(58) Field of Classification Search
CPC .... B25J 15/065; H02P 25/064; H02K 41/031; H02K 1/26
(Continued)

(56) References Cited

U.S. PATENT DOCUMENTS 3,376,578 A  4/1968  Sawyer
4,535,278 A  8/1985  Asakawa
(Continued)

FOREIGN PATENT DOCUMENTS

WO  2013059934 A1  5/2013
WO  2015017933 A1  2/2015
(Continued)

OTHER PUBLICATIONS

W.J. Kim and D.L. Trumper, High-precision magnetic levitation stage for photolithography. Precision Eng. 22.2 (1998), pp. 66-77.
(Continued)

*Primary Examiner* — Cortez M Cook

(57) ABSTRACT

Various embodiments relate to magnetically moveable displacement devices or robotic devices. Particular embodiments provide systems and corresponding methods for magnetically moving multiple movable robots relative to one or more working surfaces of respective one or more work bodies, and for moving robots between the one or more work bodies via transfer devices. Robots can carry one or more objects among different locations, manipulate carried objects, and/or interact with their surroundings for particular functionality including but not limited to assembly, packag-
(Continued)

ing, inspection, 3D printing, test, laboratory automation, etc. A mechanical link may be mounted on planar motion units such as said robots.

31 Claims, 84 Drawing Sheets

Related U.S. Application Data on Nov. 23, 2017, provisional application No. 62/513,975, filed on Jun. 1, 2017, provisional application No. 62/490,270, filed on Apr. 26, 2017, provisional application No. 62/485,402, filed on Apr. 14, 2017, provisional application No. 62/476,871, filed on Mar. 27, 2017.

(51) Int. Cl.
| | |
|---|---|
| H02P 25/064 | (2016.01) |
| B25J 9/00 | (2006.01) |
| B25J 15/02 | (2006.01) |
| B65G 1/04 | (2006.01) |
| H02K 41/03 | (2006.01) |

(52) U.S. Cl.
CPC ......... *B65G 1/0435* (2013.01); *H02K 41/031* (2013.01); *H02P 25/064* (2016.02); *H02K 1/26* (2013.01); *H02K 2201/18* (2013.01)

(58) Field of Classification Search
USPC ........................................................ 318/560
See application file for complete search history.

(56) References Cited

U.S. PATENT DOCUMENTS

| | | | |
|---|---|---|---|
| 4,654,571 | A | 3/1987 | Hinds |
| 5,334,892 | A | 8/1994 | Chitayat |
| 6,003,230 | A | 12/1999 | Trumper |
| 6,005,309 | A | 12/1999 | Chitayat |
| 6,069,418 | A | 5/2000 | Tanaka |
| 6,097,114 | A | 8/2000 | Hazelton |
| 6,208,045 | B1 | 3/2001 | Hazelton et al. |
| 6,252,234 | B1 | 6/2001 | Hazelton et al. |
| 6,304,320 | B1 | 10/2001 | Tanaka et al. |
| 6,339,266 | B1 | 1/2002 | Tanaka |
| 6,441,514 | B1 | 8/2002 | Markle |
| 6,445,093 | B1 | 9/2002 | Binnard |
| 6,452,292 | B1 | 9/2002 | Binnard |
| 6,495,934 | B1 | 12/2002 | Hayashi |
| 6,720,680 | B1 | 4/2004 | Tanaka |
| 6,777,896 | B2 | 8/2004 | Teng |
| 6,835,941 | B1 | 12/2004 | Tanaka |
| 6,847,134 | B2 | 1/2005 | Frissen et al. |
| 6,885,430 | B2 | 4/2005 | Tanaka et al. |
| 6,987,335 | B2 | 1/2006 | Korenaga |
| 7,075,198 | B2 | 7/2006 | Korenaga |
| 7,224,252 | B2 | 5/2007 | Meadow, Jr. et al. |
| 7,227,284 | B2 | 6/2007 | Korenaga |
| 7,436,135 | B2 | 10/2008 | Miyakawa |
| 7,696,653 | B2 | 4/2010 | Tanaka |
| 7,808,133 | B1 | 10/2010 | Widdowson |
| 7,948,122 | B2 | 5/2011 | Compter et al. |
| 8,031,328 | B2 | 10/2011 | Asano et al. |
| 9,202,719 | B2 | 12/2015 | Lu |
| 2004/0140780 | A1 | 7/2004 | Cahill |
| 2008/0203828 | A1 | 8/2008 | Compter et al. |
| 2014/0285122 | A1* | 9/2014 | Lu ............................ H02K 1/26 318/135 |
| 2017/0179806 | A1 | 6/2017 | Lu |

FOREIGN PATENT DOCUMENTS

| | | |
|---|---|---|
| WO | 2015179962 A1 | 12/2015 |
| WO | 2015184553 A1 | 12/2015 |
| WO | 2015188281 A1 | 12/2015 |
| WO | 2017121127 A1 | 7/2017 |
| WO | 2017142481 A1 | 8/2017 |

OTHER PUBLICATIONS

D.L. Trumper, et al, "Magnet arrays for synchronous machines", IEEE Industry Applications Society Annual Meeting, vol. 1, pp. 9-18, 1993.

J.W. Jansen, C.M.M. van Lierop, E.A. Lomonova, A.J.A. Vandenput, "Magnetically Levitated Planar Actuator with Moving Magnets", IEEE Tran. Ind. App.,vol. 44, No. 4, 2008.

Cho, H.S., Im, C.H., Jung, H.K., 2001, Magnetic Field Analysis of 2-D Permanent Magnet Array for Planar Motor, IEEE Tran. on Magnetics, vol. 37 No. 5, pp. 3762-3766.

Filho, A.F.F., 2001, Investigation of the Forces Produced by a New Electromagnetic Planar Actuator, Electric Machines and Drives Conference, 2001. IEMDC 2001. IEEE International, pp. 8-13.

Filho, A.F., 2010, Analysis of a DC XY-Actuator, XIX International Conference on Electrical Machines—ICEM 2010, Rome.

Filho, A.F., 1999, Development of a novel planar actuator, Ninth International Conference on Electrical Machines and Drives, Conference Publication No. 468.

Fujii, N., Okinaga, K., 2002, X-Y Linear Synchronous Motors Without Force Ripple and Core Loss for Precision Two-Dimensional Drives, IEEE Transactions on Magnetics, vol. 38, No. 5, Sep. 2002.

Buckley, J.D., Galburt, D.N., Karatzas, C., 1989, Step-and-scan lithography using reduction optics, J. Vae. Sci. Techno!. B 7 (6), Nov./Dec. 1989.

Hesse, S., Schaeffel, C., Katzschmann, M., 2011, Interferometric Controlled Planar Nanopositioning System With 100 MM Circular Travel Range, ASPE 2011 Annual Meeting, Denver, Co.

Tomita, Y., Koyanagawa, Y., 1995, Study on a surface-motor driven precise positioning system, Journal of Dynamic Systems, Measurement, and Control Sep. 1995, vol. 117/311-319.

Ueda, Y., Ohsaki, H., 2008, A planar actuator with a small mover traveling over large yaw and translational dispalcements, IEEE Transactions on Magnetics, vol. 44, No. 5, May 2008.

Kajiyama, H., Suzuki, K., Dohmeki, H., 2010, Development of ironless type surface motor, XIX International Conference on Electrical Machines—ICEM 2010, Rome.

Shinno, H., Yoshioka, H., Taniguchi, K., 2007, A Newly Developed Linear Motor-Driven Aerostatic X-Y Planar Motion Table System for Nano-Machining, Annals of the CIRP, 56/1:369-372.

Gao, W., Dejima, S., Yanai, H., Katakura, K., Kiyono, S., Tomita, Y., 2004, A surface motor-driven planar motion stage integrated with an XYθZ surface encoder for precision positioning, Precision Engineering, 28/3:329-337.

In, W., Lee, S., Jeong, J., Kim, J., 2008, Design of a planar-type high speed parallel mechanism positioning platform with the capability of 180 degrees orientation, Annals of the CIRP 57/1:421-424.

Lee, K., Roth, R., Zhou, J., 1996, Dynamic Modeling and Control of a Ball-Joint-Like Variable-Reluctance Spherical Motor, Journal of Dynamic Systems, Measurement, and Control, 118/1:29-40.

Weck, M., Reinartz, T., Henneberger, G., Doncker, R., 2000, Design of a Spherical Motor with Three Degrees of Freedom, Annals of the CIRP, 49/1:289-294.

Hollis, R., Salcudean, S., Allan, A., 1991, A six-degree-of-freedom magnetically levitated variable compliance fine-motion wrist: Design, modeling, control, IEEE Trans. Robot. Automat, 7/3:320-332.

Verma, S., Kim, W., Gu, J., 2004, Six-axis nanopositioning device with precision magnetic levitation technology, IEEE Tran. on Mechatronics 9/2 384-391.

Holmes, M., Hocken, R., Trumper, D., 2000, The Long-Range Scanning Stage: a Novel Platform for Scanned-Probe Microscopy, Precision Engineering, 24/3:191-209.

(56) References Cited

OTHER PUBLICATIONS

Etxaniz, I., Izpizua, A., SanMartin, M., Arana, J., 2006, Magnetic Levitated 2D Fast Drive, IEEJ Transactions on Industry Applications, 126/12:1678-1681.
Compter, J., 2003, Electro-dynamic planar motor, Precision Engineering, 28/2: 171-180.
Jansen, J., van Lierop, C., Lomonova, E., Vandenput, A., 2007, Modeling of magnetically levitated planar actuators with moving magnets, IEEE Tran. Magnetic, 43/1:15-25.

\* cited by examiner

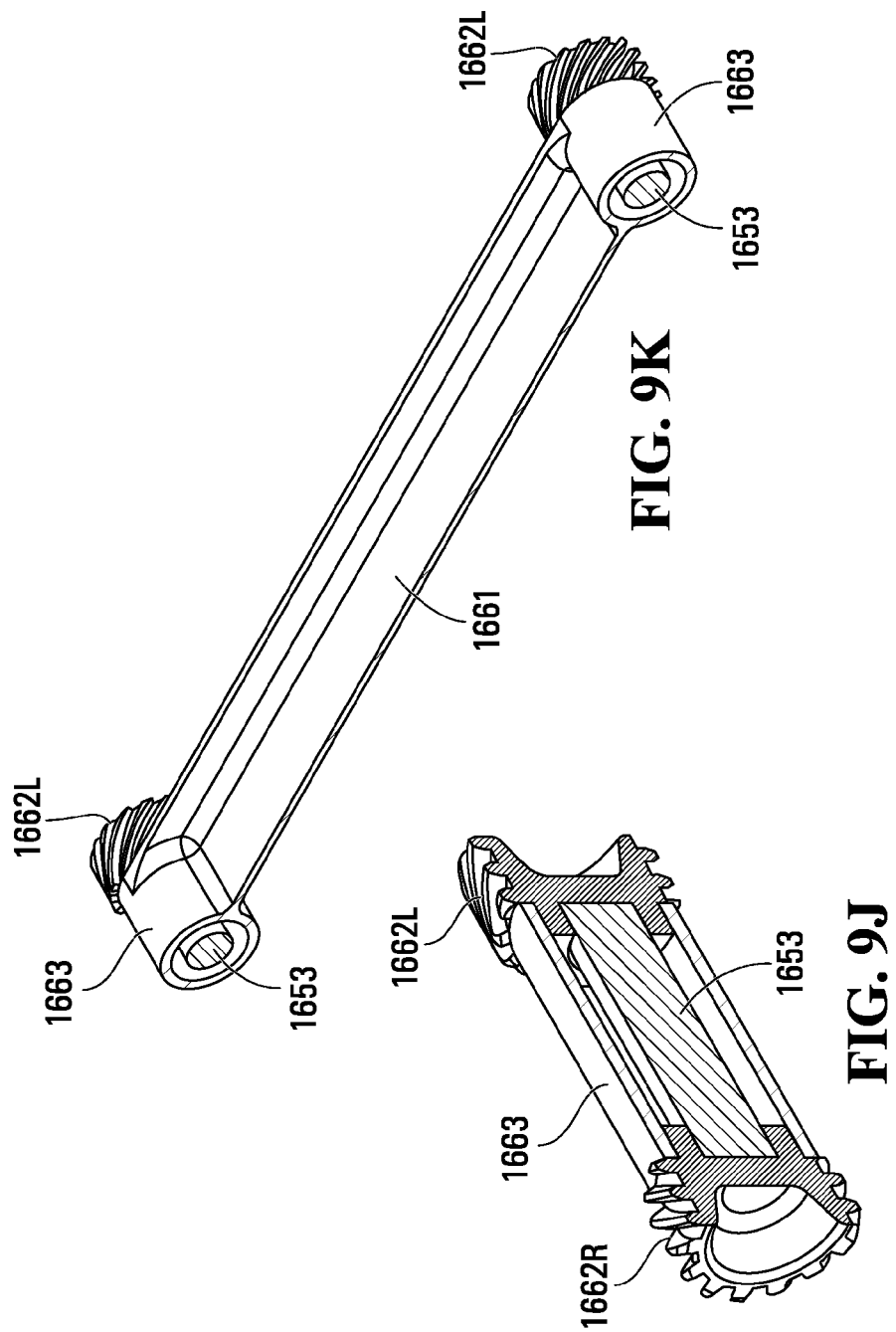

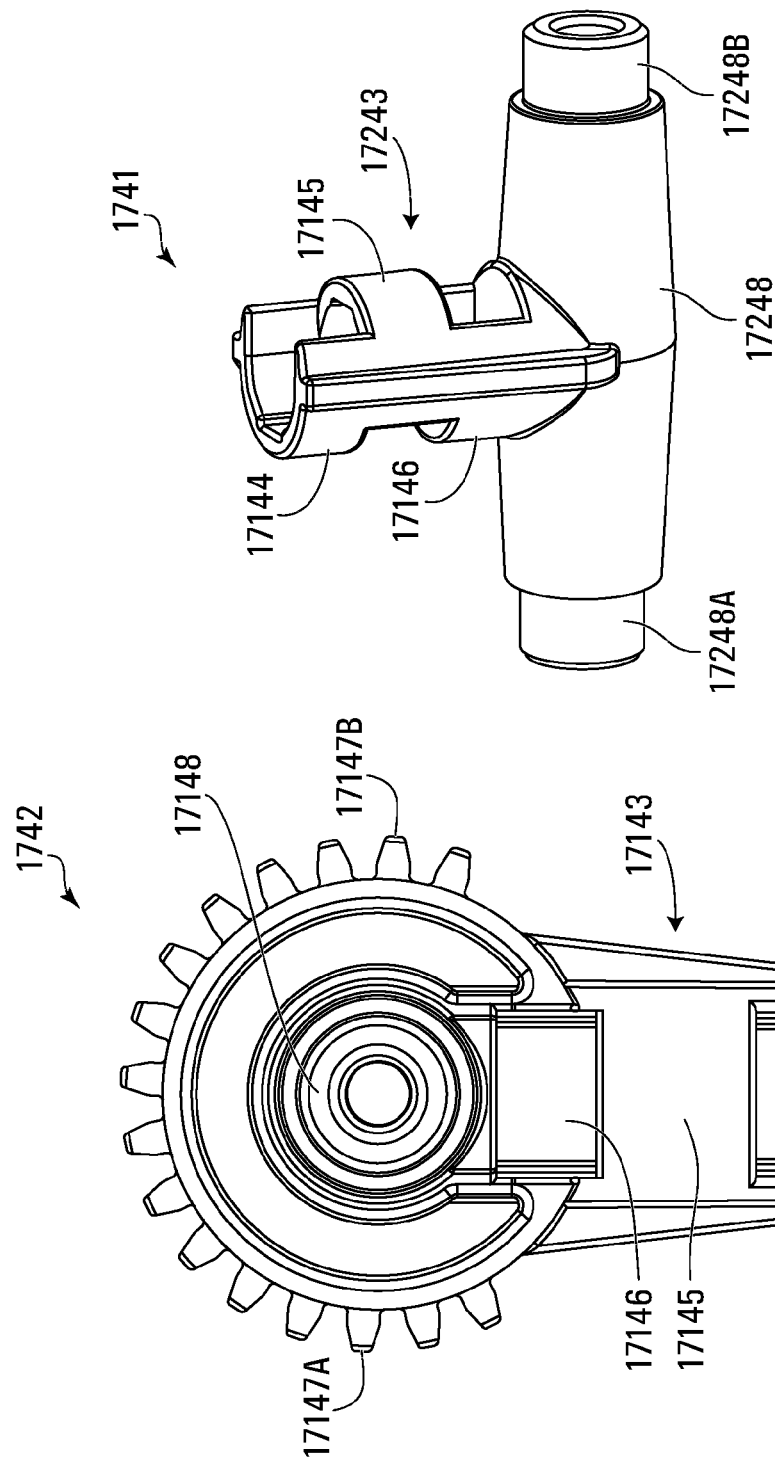

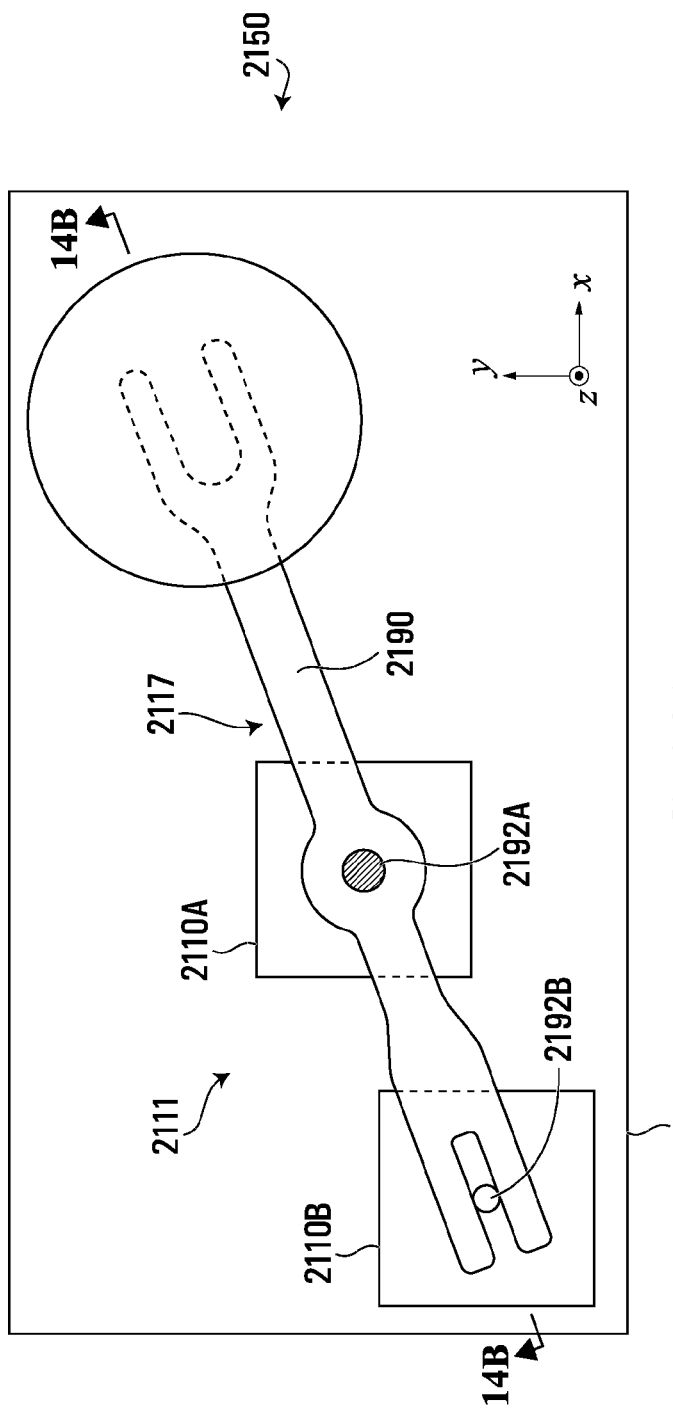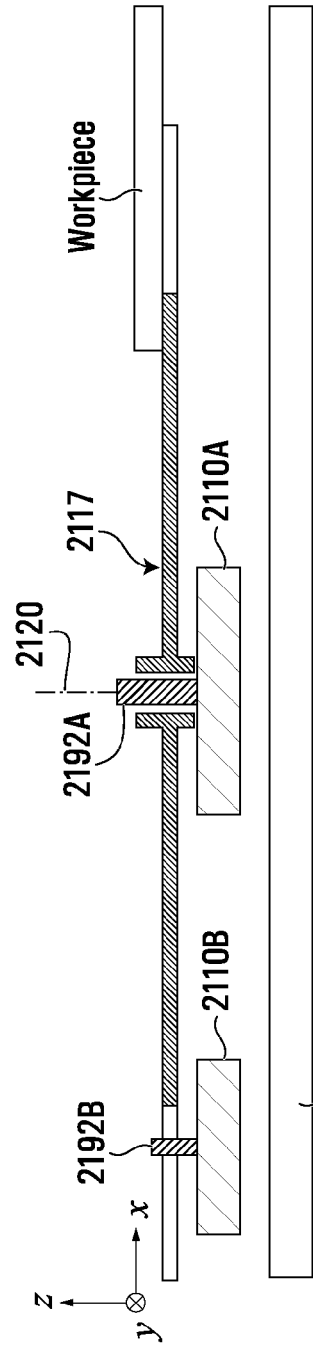
FIG. 14A
FIG. 14B

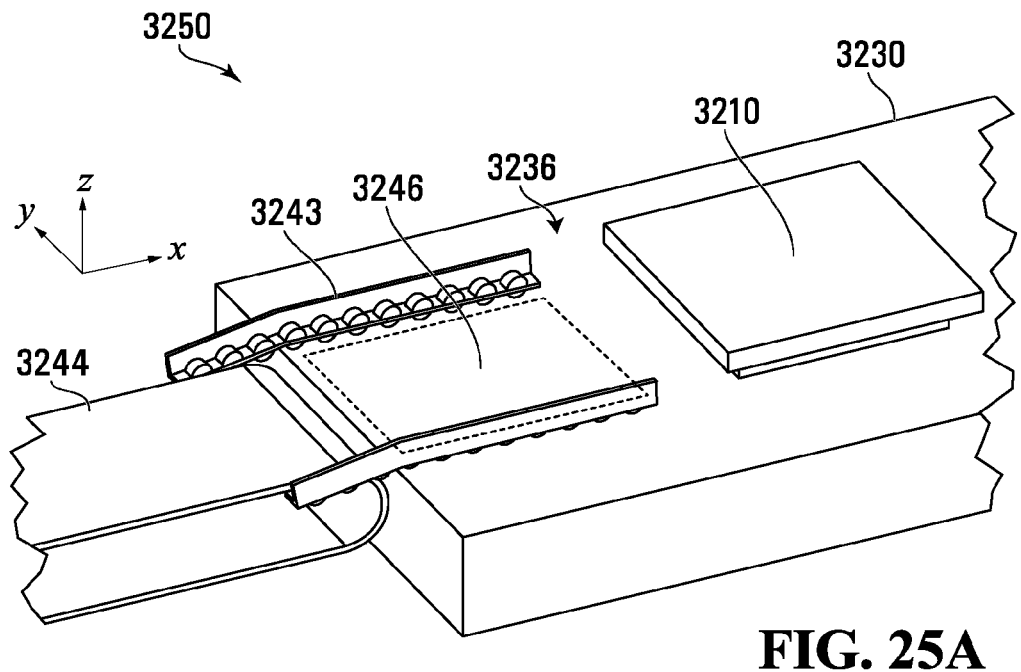
FIG. 25A
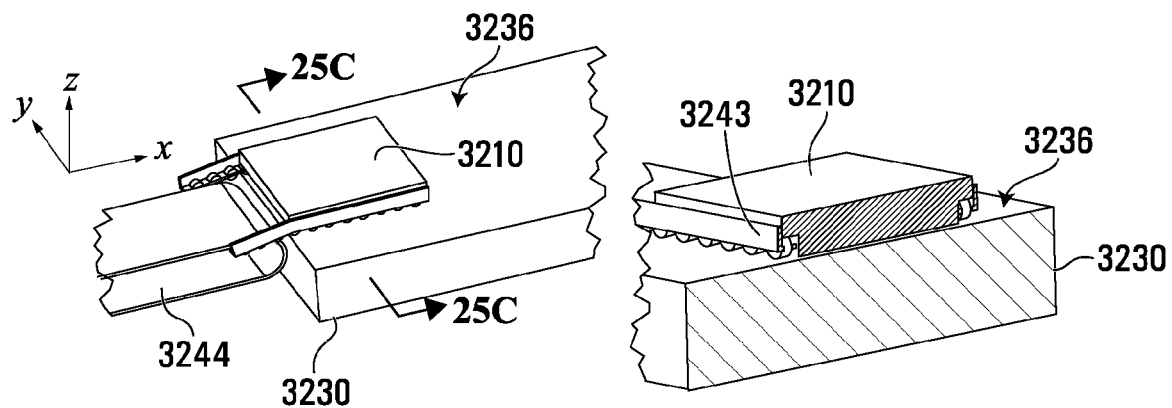
FIG. 25B  FIG. 25C

ROBOTIC DEVICES AND METHODS FOR FABRICATION, USE AND CONTROL OF SAME

RELATED APPLICATIONS

This application claims priority to U.S. provisional patent application Nos. 62/476,871 filed Mar. 27, 2017, 62/485,402 filed Apr. 14, 2017, 62/490,270 filed Apr. 26, 2017, 62/513,975 filed Jun. 1, 2017, 62/590,323 filed Nov. 23, 2017, and 62/626,082 filed Feb. 4, 2018, the entire contents of which are incorporated by reference herein.

TECHNICAL FIELD

As discussed herein, various embodiments relate to magnetically moveable displacement devices or robotic devices. Particular embodiments provide systems and corresponding methods for magnetically moving multiple movable robots relative to one or more working surfaces of respective one or more work bodies, and for moving robots between the one or more work bodies via transfer devices. Robots can carry one or more objects among different locations, manipulate carried objects, and/or interact with their surroundings for particular functionality including but not limited to assembly, packaging, inspection, 3D printing, test, laboratory automation, etc. A mechanical link may be mounted on planar motion units such as said robots. The mechanical link may comprise revolute joints comprised of pairs of left and right helical gears preloaded against each other with magnets. The linkage system may be mounted on planar motion units where the linkage elements are comprised of plastic.

BACKGROUND

The following is meant to assist the reader by providing context to the description and is in no way meant as an admission of prior art.

Motion stages (XY tables and rotary tables) are widely used in various manufacturing, inspection and assembling processes. A common solution currently in use achieves XY motion by stacking two linear stages (i.e. a X-stage and a Y-stage) together via connecting hearings. A more desirable solution may involve having a single moving stage capable of motion two or more different linear directions relative to the working surface, which may eliminate the need for additional bearings. It might also be desirable for such a moving stage to be able to move in a direction orthogonal to the working surface. Attempts have been made to design such displacement devices using the interaction between current flowing through electrically conductive elements and permanent magnets. Examples of efforts in this regard include the following: U.S. Pat. Nos. 6,003,230; 6,097,114; 6,208.045; 6,441,514; 6,847.134; 6,987,335; 7,436,135; 7,948,122; US patent publication No. 2008/0203828; W. J. Kim and D. L. Trumper, High-precision magnetic levitation stage for photolithography. *Precision Eng.* 22 2 (1998), pp. 66-77; D. L. Trumper, et al, "Magnet arrays for synchronous machines", IEEE Industry Applications Society Annual Meeting, vol. 1, pp. 9-18, 1993; and J. W. Jansen, C. M. M. van Lierop, E. A. Lomonova, A. J. A. Vandenput, "Magnetically Levitated Planar Actuator with Moving Magnets", IEEE Tran. Ind. App., Vol 44, No 4, 2008.

More recent techniques for implementing displacement devices having a moveable stage are described in:

PCT application No. PCT/CA2012/050751 (published under WO/2013/059934) entitled DISPLACEMENT DEVICES AND METHODS FOR FABRICATION, USE AND CONTROL OF SAME; and PCT application No. PCT/CA2014/050739 (published under WO/2015/017933) entitled DISPLACEMENT DEVICES AND METHODS AND APPARATUS FOR DETECTING AND ESTIMATING MOTION ASSOCIATED WITH SAME; and PCT application No. PCT/CA2015/050549 (published under WO/2015/188281) entitled DISPLACEMENT DEVICES. MOVEABLE STAGES FOR DISPLACEMENT DEVICES AND METHODS FOR FABRICATION, USE AND CONTROL OF SAME; and PCT application No. PCT/CA2015/050523 (published under WO/2015/184553) entitled METHODS AND SYSTEMS FOR CONTROLLABLY MOVING MULTIPLE MOVEABLE STAGES IN A DISPLACEMENT DEVICE; and PCT application No. PCT/CA2015/050157 (published under WO/2015/179962) entitled DISPLACEMENT DEVICES AND METHODS FOR FABRICATION, USE AND CONTROL OF SAME.

Some other devices can achieve in-plane movement (e.g. in one or both the X and Y directions on an X-Y plane), but the motion ranges in other directions (e.g. the Z direction when the Z-axis is orthogonal to the X and Y axes, or rotational directions Rx, Ry, Rz about the X, Y, and Z axes) are limited. For example, moveable stages using permanent magnets have a range of motion in the Z direction (i.e. orthogonal to a working surface) which is typically limited to a few millimeters because the interaction between current in a work body and the permanent magnets in the moveable stages decays exponentially as a moveable stage moves away from the work body in the Z direction, and accordingly power efficiency may become very low when the gap between the moveable stage and the work body in the Z-direction grows larger. Thus, one area where there may be room for improvement over existing displacement devices is in extending the range of motion of a moveable stage in one or more directions substantially orthogonal to a working surface (i.e. in one or more out-of-plane linear directions), as well as in one or more rotational directions (e.g. Rx, Ry, and Rz).

Furthermore, other devices may be limited to movement in one plane on one working surface. Another area where there may be room for improvement over existing displacement devices is in providing robotic devices with multiple working surfaces on multiple levels, so that 3D space can be fully utilized and production footprint can be reduced. Yet another area for improvement may be to integrate magnetically moveable robots with one or more low-cost mechanical transfer devices such as conveyor belts or conveyance systems, as magnetic systems may be significantly more expensive than traditional mechanical transfer devices. It will be appreciated that there may be multiple applications where it may be desirable (e.g. for efficiency or any other reasons) why it might be advantageous to be able to move a magnetically moveable robot between working surfaces on multiple levels and/or between a working surface and a mechanical transfer device.

Some other devices are capable of long range linear motion over a planar working region even without any mechanical contact, and a workpiece can be passively dropped on these devices to be further transported from one location to another. However, these devices cannot actively hold a workpiece or actively manipulate a workpiece relative to the moveable stage. Thus, it may be desirable to have a gripper or an end effector installed on the moveable stage that can be actively controlled to hold and/or manipulate one or more parts with controllable force or displacement. Another area where there is room for improvement over existing displacement devices is to have on-mover actuation capability (additional degrees of freedom motion in addition to the 6 degrees of freedom of rigid body motion) or power generation/transmission capability without any cable attached to movers.

It will be appreciated that there are multiple applications where it may be desirable (e.g. for efficiency or any other reasons) to be able to move a workpiece an extended distance in two or more in-plane directions, and/or to manipulate a workpiece with an on-mover actuator, tool, or other device.

Some of these moveable stages are capable of being outfitted with mechanical means for allowing or enhancing on-mover or intra-mover motion. Furthermore, for biologically clean applications, linkages such as revolute joints may be employed in an effort to reduce contamination, given that every part may be required to be able to be washed down because of potential contaminants or pathogens. However, such high speed automation mechanisms rapidly accumulate vast numbers of cycles of motion and may often be subject to failure of cables, seals, or mechanical bearings that connect moving members to a fixed base. Even sealed revolute joints at the moving interfaces between the seals and solid members will have tiny features, e.g., line-like features of small but finite width and depth, that can harbor pathogens. A new and improved automation system having no physical connection to the ground with respect to which it moves is therefore desirable. In order to minimize cost, simple injection molded plastic parts are also desirable.

The foregoing examples of the related art and limitations related thereto are intended to be illustrative and not exclusive. Other limitations of the related art will become apparent to those of skill in the art upon a reading of the specification and a study of the drawings.

SUMMARY

In one embodiment, a magnetic movement apparatus comprises at least one mover comprising a plurality of magnetic bodies comprising at least a first and a second magnetic body, each magnetic body in the plurality of magnetic bodies comprising at least one magnet array comprising a plurality of magnetization elements configured to cause the at least one mover to experience one or more forces when at least one of the plurality of magnetization elements interacts with one or more magnetic fields such that at least the first and second magnetic bodies move relative to each other.

According to another embodiment, a method of controlling movement of a mobile apparatus comprising a plurality of magnetic bodies each comprising a plurality of magnets comprises causing a first one of the plurality of magnetic bodies mechanically linked to a second one of the plurality of magnetic bodies to move relative to the second magnetic body in response to modulating at least one magnetic field within a range of the first magnetic body.

According to another embodiment, a linkage apparatus comprises a first at least one gear associated with a first magnetic field, and a second at least one gear, wherein the first and second at least one gears are configured to be detachably coupled to one another in response to magnetic interaction between the first and second magnetic fields.

According to another embodiment, a method of detachably coupling a first at least one gear to a second at least one gear comprises causing a first at least one gear associated with a first magnetic field to detachably couple to a second at least one gear in response to magnetic interaction between the first magnetic field and the second at least one gear.

According to another embodiment, an apparatus for moving at least one magnetically moveable device comprises a plurality of work bodies, each comprising a work surface upon which the at least one magnetically moveable device is configured to move, wherein each work surface is associated with at least one work magnetic field, and at least one transfer device comprising a transfer surface upon which the at least one magnetically movable device is configured to move. The magnetically movable device is movable between the transfer surface and a work surface of a work body in response to modulating the at least one work magnetic field.

According to another embodiment, a method of moving at least one magnetically moveable device comprises, in response to modulating at least one work magnetic field associated with a first work surface of a first work body, causing the at least one magnetically movable device to move from the first work surface to a transfer surface of a transfer device positioned adjacent the work body, after moving the at least one magnetically movable device onto the transfer surface, positioning the transfer device adjacent to a second body having a second work surface associated with a second at least one work magnetic field, and after positioning the transfer device adjacent to the second body, modulating the second at least one work magnetic field to cause the at least one magnetically movable device to move from the transfer surface to the second work surface.

According to another embodiment, an apparatus for controlling movement of at least one magnetically-movable device comprises a work body having a work surface upon which the at least one magnetically-moveable device may move, at least one magnetic field modulator, at least one sensor configured to detect a current position of the at least one magnetically-movable device relative to the work surface and generate at least one position feedback signal representing the current position of the magnetically-movable device relative to the work surface, and at least one controller. The controller is configured to receive the at least one position feedback signal from the at least one sensor, calculate at least one magnetic field command based on the at least one position feedback signal and a desired position of the magnetically-movable device, and transmit at least one movement signal to the at least one magnetic field modulator to cause the at least one magnetic field modulator to modulate one or more magnetic fields to move the magnetically-movable device from the current position to the desired position.

According to another embodiment, a method of controlling at least one magnetically-movable device to a desired position relative to a work surface comprises determining an actual position of the at least one magnetically-movable device relative to the work surface, calculating a difference between the desired position and the actual position, and using the difference to modulate at least one magnetic field associated with the work surface to cause the magnetically-movable device to move toward the desired position.

Other aspects and features will become apparent to those ordinarily skilled in the art upon review of the following description of illustrative embodiments in conjunction with the accompanying figures.

BRIEF DESCRIPTION OF THE DRAWINGS

FIG. 9J is an isometric close up view of the portion of the mechanical link shown in FIG. 9I.

FIG. 9K is an isometric cross section view of the portion of the mechanical link shown in FIG. 9I.

FIG. 10F is a side view of a portion of the mechanical link according to the embodiment shown in FIG. 10A.

FIG. 10G is an isometric view of a portion of the mechanical link according to the embodiment shown in FIG. 10A.

FIG. 14A is a top cross-sectional view of an apparatus according to one embodiment.

FIG. 14B is a side cross-sectional view of the apparatus shown in FIG. 14A.

FIG. 25A is a partial isometric top view of an apparatus according to one embodiment.

FIG. 25B is a partial isometric top view of the apparatus shown in FIG. 25A.

FIG. 25C is a partial isometric cutaway view of the apparatus shown in FIG. 25A.

FIG. 48 is a top view of an apparatus according to one embodiment.

FIG. 49A is a cross-sectional top view of an apparatus according to one embodiment.

FIG. 49B is a cross-sectional side view of the apparatus shown in FIG. 49A.

FIG. 50A is a cross-sectional schematic top view of a mover according to one embodiment.

FIG. 50B is a schematic side view of a magnetic gear on the mover as shown in FIG. 51A.

FIG. 51A is a cross-sectional schematic top view of a mover according to one embodiment.

FIG. 51B is a schematic side view of a magnetic gear on the mover as shown in FIG. 51A.

FIG. 52 is an isometric top view of an apparatus according to one embodiment.

Figure 1A:
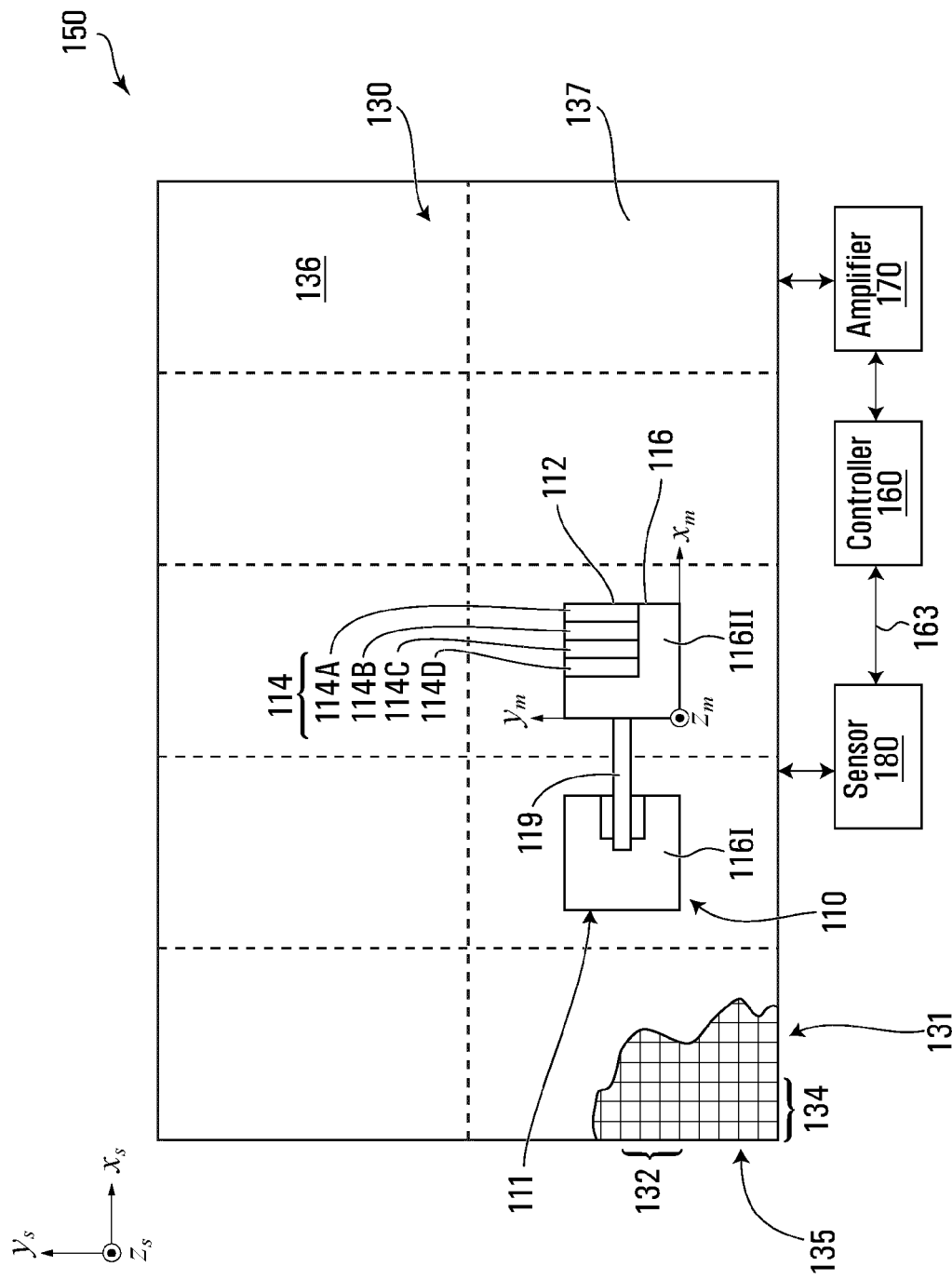
FIG. 1A is a partially cut-away top view of an apparatus according to one embodiment

In the drawings, embodiments of the invention are illustrated by way of example, it being expressly understood that the description and drawings are only for the purpose of illustration and preferred designs, and are not intended to define the limits of the invention.

DESCRIPTION

Overview

Throughout the following description specific details are set forth in order to provide a more thorough understanding to persons skilled in the art. However, elements well known in the prior art may not be shown or described in detail to avoid unnecessarily obscuring the disclosure. Accordingly, the description and drawings are to be regarded in an illustrative, rather than in a restrictive, sense.

According to some aspects of the invention, a magnetic movement apparatus (also referred to herein as a "moveable robot system" or just a "system") may comprise one or more work bodies and one or more moveable robotic devices (also referred to herein as "robots").

Herein, and in reference to various embodiments, work bodies may comprise or may be referred to as stators. Each moveable robot may be configured to carry one or more objects such as workpieces or parts ("workpieces" and "parts" are interchangeably used in this document, and are general terms, a non-limiting example of which may include components, samples, or assemblies). In some applications, a plurality of moveable robots may carry one part holder, which may hold one or more parts. Generally, a work body and one or more moveable robots may interact with each other via one or more magnetic fields which may be configured to impart one or more forces and/or torques to the moveable robots to controllably move the moveable robots. In various embodiments, a work body may comprise one or more electrically conductive elements which may be distributed in one or more planar layers within a work body. In various embodiments, the one or more electrically conductive elements may comprise a plurality of iron teeth, or a plurality of electrically conductive elements, for example.

Generally, a work body comprises a working surface (which may be flat, curved, cylindrical, spherical, or any other planar or curved shape) upon which one or more of the moveable robots can move. Each moveable robot is able to move along the working surface either in by physical contact (via contact media such as sliding and/or rolling bearings, for example) or without any physical contact by causing interaction between the moveable robots and one or more magnetic to maintain a controllable gap between the moveable robot and the work body in a direction normal to the working surface. Such a controllable gap may be maintained while simultaneously controlling the moveable robot's movement in one or more directions/degrees of freedom (also referred to herein as "DOF") (i.e. operating in an "active levitation mode"), or by maintaining a gap between a moveable robot and a work body by passive levitation means (passive levitation mode).

Each moveable robot comprises one or more moveable bodies (also referred to herein as "movers", "moveable motion stages", "moveable stages", and/or "motion stages"). In various embodiments, one moveable robot may comprise one mover. In various embodiments, one moveable robot may comprise two movers. In various embodiments, one moveable robot may comprise three or more movers. In various embodiments, one or more moveable robots may be substantially similar or nearly identical; however, this is not necessary in all situations, and a system may comprise moveable robots of multiple different sizes and/or configurations according to various embodiments as discussed below.

Each mover may comprise one or more magnetic bodies (also referred to interchangeably referred to herein as "magnet assemblies"). Each magnetic body comprises one or more magnet arrays which may be rigidly connected together. Each magnet array comprises one or more magnetization elements (such as magnets, for example). Each magnetization element has a magnetization direction.

In various embodiments, magnets on a mover may interact with current flowing in electrically conductive elements in a work body across a distance that is much smaller than the dimensions of the mover. In other words, a mover may operate in close proximity of a work body's electrically conductive elements. Generally, magnets on a mover may interact with current flowing in a work body's electrically conductive elements via a working gap that is much smaller than the mover's width or length, i.e. the mover's dimension in a direction parallel with a working surface of the work body.

In various embodiments, one or more magnetic field modulators (also interchangeably referred to herein as "magnetic field generators" or "amplifiers" or "current generators") may be configured to modulate one or more magnetic fields in the work bodies. In one embodiment, for example, a magnetic field modulator may comprise one or more amplifiers connected to drive a plurality of currents in a plurality of electrically conductive elements in one or more work bodies. One or more controllers may be connected to deliver control signals (also referred to herein as "current reference commands") to the one or more amplifiers. The control signals may be used to control currents driven by the one or more amplifiers into one or more of the plurality of electrically conductive elements so that the currents follows the current reference commands. The currents controllably driven into the at least one of the plurality of electrically conductive elements create one or more magnetic fields which cause corresponding magnetic forces on the one or more magnet array assemblies of a mover, thereby controllably moving the mover relative to the work body (e.g. within a working region of a working surface of the work body) in at least 2 in-plane directions/DOF, including but not being limited to controllable motion 3 in-plane directions/DOF and 6 directions/DOF.

In various embodiments, magnetic forces associated with the interaction between magnetic fields created by currents in at least one electrically conductive element and magnetic fields associated with a magnet array of a mover may attract the mover toward the work body at all times when the controller is controlling the currents driven by the one or more amplifiers. In various embodiments, the magnetic forces associated with the interaction between the magnetic fields created by the currents in the at least some of the electrically conductive elements and the magnetic fields associated with the magnet arrays may force the mover away from the work body to balance gravitational forces with an air gap at all times when the controller is controlling the currents driven by the one or more amplifiers. In various embodiments, the gap between movers and the work body may be maintained by air bearings, compressed-fluid bearings or sliding bearings, or rolling-elements bearings, for example.

In various embodiments, one mover may comprise a plurality of magnetic bodies and a mechanical link. In various embodiments, the mechanical link may comprise a single component or an assembly of multiple components, such as bearings, connectors, hinges, and the like. As used herein, "mechanical link" may describe any mechanical linkage system, assembly, device, or body connecting, linking, or coupling, detachably or not, two or more magnetic bodies.

In various embodiments, The mechanical link may constrain relative movement between two or more of a plurality of magnetic bodies of a mover in a first set of one or more directions/degrees of freedom, and may allow relative movement between two or more of the plurality of magnetic bodies in a second set of one or more directions/degrees of freedom. In various embodiments, the meaning of "constraining relative motion between two or more magnetic bodies in a first set of one or more degrees of freedom" in relation to the mechanical link may be interpreted as:

(1) when the mechanical link is removed from the mover, the two or more magnetic bodies can move relative to each other in the first set of one or more directions/DOF by driving suitable currents into suitably selected electrically conductive elements;

(2) when the mechanical link is implemented, the two or more magnetic bodies cannot move relative to each other in the first set of one or more directions/DOF.

In various embodiments, the mechanical link is "floating" with respect to the work body; i.e. the mechanical link is not fixed with the work body and instead moves with the mover.

In various embodiments, controllably moving a mover comprising first and second magnetic bodies in one direction of the first set of constrained directions/DOF comprises (1) calculating coordinated position/rotation feedback of the mover in the one direction based on position/rotation feedback of the first magnetic body and the second magnetic body in the one direction; (2) using the coordinated position/rotation feedback and a suitable control algorithm to calculate coordinated forces/torques command in the one direction to be applied on each of the first magnetic body and the second magnetic body; (3) using the coordinated forces/torques and a an algorithm (such as a commutation algorithm, for example) to calculate current reference commands and sending these current reference commands to amplifiers driving currents into some electrically conductive elements of the work body. Although the relative motion between the first magnetic body and the second magnetic body is constrained in the first set of directions/DOF, the mover as a whole may still be capable of controllable motion in one or more directions/DOF in the first set of directions/DOFs.

In various embodiments, a mover may further comprise a brake (also interchangeably referred to herein as a "braking assembly", "locking assembly", "braking mechanism", or "locking mechanism"). When the brake is deactivated, the mechanical link may constrain the relative motion between two or more magnetic bodies of the mover in a first set of one or more directions/degrees of freedom and allow the relative motion between the two or more magnetic bodies in a second set of one or more directions/degrees of freedom. When the brake is activated, the mechanical link may constrain the relative motion between the two or more magnetic bodies in a first extended set of directions/DOF. In one embodiment, the first extended set of directions/DOF may comprise the first set of directions/DOF plus at least one direction/DOF in a second set of directions/DOF.

In various embodiments, one moveable robot may comprise two or more independently controllable movers and a mechanical link. The mechanical link is configured to link at least a first mover and a second mover of the two or more movers together in a non-restrictive way in the sense that whether the mechanical link is installed or not, the DOF of controllable motion of each mover remains unchanged. The mechanical link may convert the motion of the two or more movers into a desired motion of a workpiece holder (or a carrier or an end effector) installed on the moveable robot. In one embodiment, the position and orientation of the workpiece holder may be fully determined by the positions and orientations of the two or more movers.

In various embodiments, one moveable robot may comprise two or more independently controllable movers and a mechanical link and a brake (or lock) mechanism. When the brake mechanism is not activated, the mechanical link links the two or more movers together in a non-restrictive way, in that whether the mechanical link is installed or not, the DOF of controllable motion of each mover remains unchanged. When the brake mechanism is activated, at least one DOF of relative motion between two movers of the two or more movers is constrained by the mechanical link. In various embodiments, the mechanical link may convert the motions of the two or more movers into a desired motion of a workpiece holder (or a carrier or an end effector) installed on the robot, and the position and orientation of the workpiece holder may be fully determined by the positions and orientations of the two (or more) movers.

In various embodiments, movers may work in levitation mode, i.e. be levitated near or above a working surface of a work body without contact with the work body either in a passive way or in an active way, and be moved relative to the working surface extending in X and Y directions (for example), where the X and Y directions are non-parallel with each other and both are parallel with the working surface. It should be understood that although movement of movers according to various embodiments herein is described in reference to a typical X, Y, Z Cartesian coordinate system, this is for illustrative purposes only, and such movement may be described in relation to any other coordinate system. For the purposes of this disclosure, unless otherwise noted, a working surface of a work body is substantially parallel to the X-Y plane, wherein the Z-direction is substantially orthogonal to the working surface.

The separation gap between working surface and a bottom surface of a mover may be much smaller than the mover's dimension in the X and Y directions. Although movers in many embodiments are capable of 6 DOF controllable motion, this is not necessary in all situations. In certain applications where the levitation feature (i.e. wherein a moveable robot is able to completely separate itself away from the work body without any contact with the work body) may not be needed and heavy load carrying capability is more important, it should be understood throughout this description by those skilled in the art that movers can sit on the working surface of a work body with a proper mechanical support (for example, one or more bearings, including but not being limited to planar sliding bearings and ball transfer units, for example) and are capable of three in-plane DOF controllable motion, i.e. translation in the X and Y directions ("X" and "Y") and rotation around an axis of rotation parallel to the Z direction ("Rz"), where the X and Y directions are substantially parallel to the working surface but are not parallel with each other, and the Z direction is substantially orthogonal to the working surface. For greater clarity, as used herein, "rotation around the X/Y/Z direction" or "rotation around the X/Y/Z axis" should be understood by a person of skill in the art to mean rotation around an axis of rotation parallel to the X/Y/Z axis, or in other words, movement in the Rx/Ry/Rz directions respectively.

When a mover relies on one or more sliding and/or rolling bearings to sit on the working surface, it may be considered to be working in the sitting mode. When a mover relies on one or more sliding and/or rolling bearings to sit on the working surface and the mover is capable of 3 in-plane DOF controllable motion (e.g. in the X, Y, and Rz directions), it may be considered to be working in the 3-DOF controlled sitting mode. In various embodiments, a mover is capable of 3-DOF controllable motion (e.g. in the X, Y, and Rz directions) while working in levitation mode without contact with the work body. In levitation mode, the mover may move translate in the Z direction (i.e. substantially orthogonal with the working surface), and rotational movement may occur around axes of rotation in the X and Y directions ("Rx" and "Ry" respectively). This rotational movement, and the associated DOF, may be open-loop controlled without feedback, using suitable passive levitation technology known to a person skilled in the art. When a mover is capable of 3-DOF controllable motion without contact with a work body, it may be considered to be working in the 3-DOF controlled levitation mode.

In various embodiments, a working surface of a work body according to any embodiment herein may separate a mover, along with the magnetic bodies therein, from the work body. The magnetic fields generated by electrically conductive elements in the work body are thus propagated through the working surface, and the magnetic bodies of the mover are thus affected by forces through the working surface. In various embodiments, the working surface may be flat, planar, or curved.

Generally, a working region of a work body such as a work body is a two-dimensional ("2D") area provided by the work body working surface, and movers can be controllably moved with at least two in-plane DOF motion inside the work body working region, with suitable feedback control algorithms and suitable position feedback sensors.

In various embodiments, a mover may be transferred between a first work body and a second work body, or to and from a single work body, via a transfer device. The first work body may be located at a first Z location or in a first Z plane, and the second work body may be located at a second Z location or in a second Z plane, and the two work bodies may overlap in the Z direction. In various embodiments, a mover may be transferred from a work body to a transfer device, such as a moveable transfer stage or a conveyor device, or vice versa.

Figure 1B:
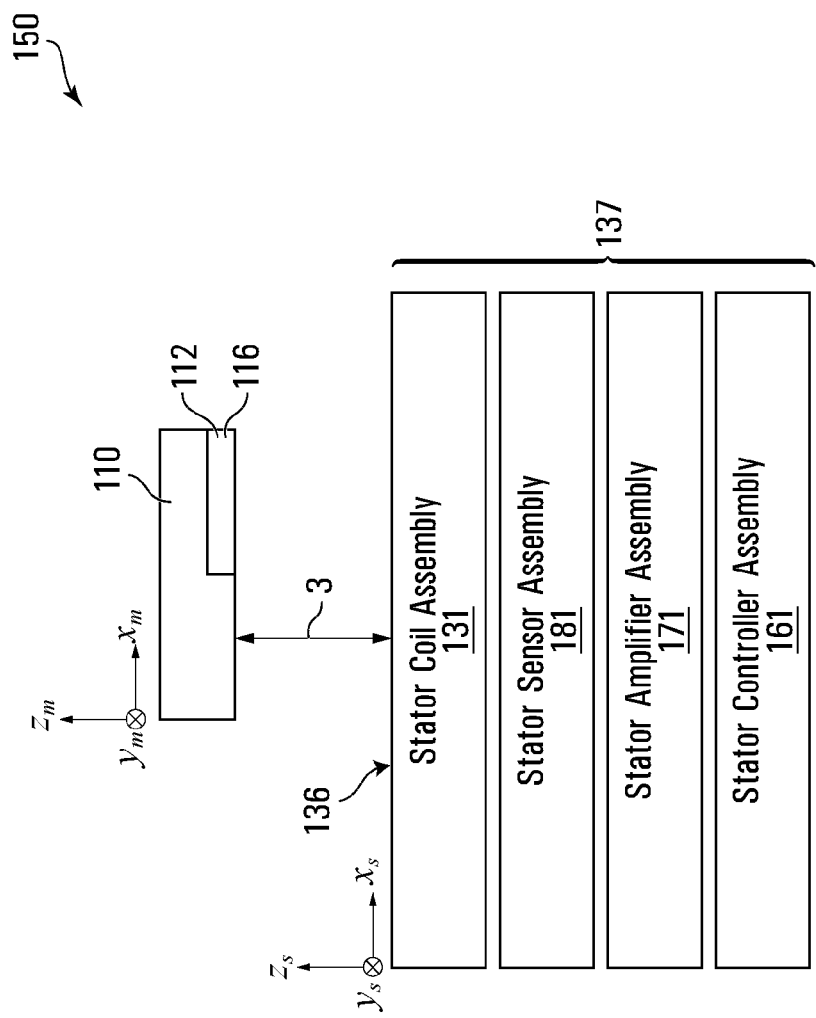
FIG. 1B is a cross-sectional side view of the apparatus shown in FIG. 1A.

Referring generally to FIGS. 1A and 1B, a magnetic movement apparatus 150 is shown according to one embodiment. FIGS. 1A and 1B respectively depict a partially cut-away top view and a side cross-sectional view of a non-limiting embodiment of the magnetic movement apparatus 150. The magnetic movement apparatus 150 comprises a work body 130, a moveable robot 111 comprising at least one mover 110, one or more controllers 160, one or more amplifiers 170 for driving current through a selected set of electrically conductive elements in the work body 130, and one or more sensors 180 for providing position feedback signals representing positions of the one or more moveable robots. The at least one mover 110 may be controllably moved relative to work body 130 in a working region 136 on the working surface in at least two in-plane directions/DOF (e.g. X and Y). In various embodiments, the working region 136 may include substantially all or part of the working surface of a work body. In other embodiments, the working region may only comprise a portion of the working surface. For the purposes of this description, unless stated otherwise, the working region is always said to sit in the same plane as the working surface (e.g. the X-Y plane). The working region 136 of a work body 130 is generally a planar working region. Therefore, although the word "planar" is occasionally omitted throughout this document in reference to the working region 136, it should be understood that the working region 136 may be either planar or a 2D surface with curvature. For example, the non-limiting embodiment of the magnetic movement apparatus 150 shown in FIGS. 1A and 1B comprises a working region 136 whose area, in the illustrated embodiment, is the entire working surface of the work body 130.

In various embodiments, the at least one mover 110 is capable of 6-DOF controllable motion (e.g. in the X, Y, Z, Rx, Ry, and Rz directions); in various embodiments, the at least one mover 110 is capable of three in-plane DOF controllable motion (X, Y, Rz) in passive levitation mode or in sitting mode. In various embodiments, mover 110 is capable of 1-DOF controllable motion while motion in the other five DOF is mechanically constrained and/or guided, for example by mechanical link 119 as will be described in greater detail below.

Although only one moveable robot 111 comprising one mover 110 is shown in FIGS. 1A and 1B, it should be understood to those skilled in the art that two or more moveable robots can work simultaneously on working surfaces of one or more work bodies such as work body 130, and that each moveable robot 111 may comprise one or more movers 110, which will become apparent later in the description. Movers such as mover 110 comprise one or more magnet arrays 112, each comprising a plurality of magnetization elements such as magnets 114.

For purposes of describing the moveable robots and movers disclosed herein, it can be useful to define a pair of coordinate systems: (1) a work body coordinate system which is relative to the work body (e.g. to work body 130 of FIGS. 1A and 1B); and a mover coordinate system which is relative to the mover (e.g. the at least one mover 110 of FIGS. 1A and 1B) and which moves with the mover 110 relative to the work body 130 and the work body coordinate system. This description may use conventional Cartesian coordinates (X, Y, Z) to describe these coordinate systems, although it will be appreciated that other coordinate systems may be used. For convenience and brevity, in this description and the associated drawings, the X, Y, and Z directions in the work body coordinate system and the X, Y, and Z directions in the mover coordinate system may be shown and described as being coincident with one another; i.e. the work body-X direction ("Xs"), work body-Y direction ("Ys") and the work body-Z direction ("Zs") may be shown as coincident with the mover-X direction ("Xm"), mover-Y direction ("Ym") and mover-Z direction ("Zm"), respectively. Accordingly, this description and the associated drawings may refer to directions (e.g. X, Y, and/or Z) to refer to directions in both or either of the work body and mover coordinate systems. However, it will be appreciated from the context of the description herein that in various embodiments and/or circumstances, one or more movers (e.g. the at least one mover 110) may move relative to a work body (e.g. work body 130) such that these work body and mover directions are no longer coincident with one another. In such cases, this disclosure may adopt the convention of using the terms work body-X, work body-Y and work body-Z to refer to directions and/or coordinates in the work body coordinate system and the terms mover-X, mover-Y and mover-Z to refer to directions and/or coordinates in the mover coordinate system. In this description and the associated drawings, the symbols Xm, Ym, and Zm may be used to refer respectively to the mover-X, mover-Y and mover-Z directions, the symbols Xs, Ys, and Zs may be used to refer respectively to the work body-X, work body-Y and work body-Z directions, and the symbols X, Y, and Z may be used to refer respectively to either or both of the mover-X, mover-Y and mover-Z and/or work body-X, work body-Y and work body-Z directions. In various embodiments, during normal operation, the mover-Z and work body-Z directions may be approximately in the same direction (e.g. within ±30° in various embodiments; within ±10° in various embodiments; or within ±2° in various embodiments).

Although in various embodiments a working surface of a work body may be essentially flat and planar, it will be understood to those skilled in the art that this is not necessary, and that the working surface of a work body (i.e. the surface facing the one or more movers) can be a curved surface including but not being limited to cylindrical surface or a spherical surface with suitable modification of a control algorithm and the layout of the work body's electrically conductive elements disclosed herein and elsewhere.

In various embodiments, the work body-X and work body-Y directions are non-parallel. In particular embodiments, the work body-X and work body-Y directions are generally orthogonal. In various embodiments, the mover-X and mover-Y directions are non-parallel. In particular embodiments, the mover-X and mover-Y directions are generally orthogonal. In various embodiments, the work body-X and work body-Y directions are parallel with the working surface, and the work body-Z is in the normal direction of the working surface.

In various embodiments, the one or more controllers 160, one or more amplifiers 170, and one or more sensors 180 may be in electrical communication with one another and configured to controllably move the at least one mover 110 relative to the work body 130 in the working region 136. For example, the one or more controllers 160 may be configured to receive signals from the one or more sensors 180 representing positions of the one or more movers 110, generate control signals using a suitable algorithm based on the positions (also referred to herein "current reference commands"), and provide such control signals to the one or more amplifiers 170. In response to the receiving the control signals from the one or more controllers 160, the one or more amplifiers 170 may be configured to drive currents in the electrically conductive elements in the work body 130 such as electrically conductive element traces 132 and 134 to effect movement of the at least one mover 110 relative to the work body 130. In various embodiments, the combination of the one or more amplifiers 170 and the work body electrically conductive elements 132 and 134 may constitute a magnetic field modulator. In other embodiments, a magnetic field modulator may comprise one or both of an amplifier (such as amplifier 170) and electrically conductive elements (such as 132 and 134), or may comprise other means of modulating one or more magnetic fields, for example.

In various embodiments, the work body 130 may comprise one or more modular work body tiles such as work body tile 137. Each work body tile 137 may comprise a work body electrically conductive element assembly 131, which may comprise a plurality of work body electrically conductive elements such as work body electrically conductive elements 132 and 134. Work body electrically conductive elements are generally distributed in one or more (flat or curved) layers with normal direction in the Z direction. Although in FIG. 1A work body electrically conductive elements 132 and 134 are linearly elongated, are distributed in layers at different Z locations, and overlap with each other in the work body Z direction, this is not necessary, and other suitable shapes/layouts of work body electrically conductive elements disclosed here or elsewhere may also be used, including but not limited to circular, hexagonal, or race-track shaped work body electrically conductive elements which can be used in the work body 130 with correspondingly suitable magnet arrays 112 installed on the movers 110.

In various embodiments, the one or more controllers 160 are configured to move the at least one mover 110 to a desired position, $(x_r, y_r)$, within the working region 136, where $x_r$ is a desired position of the at least one mover 110 in the work body-X direction and $y_r$ is a desired position of the mover in the work body-Y direction. Unless context dictates otherwise, throughout this disclosure, when referring to a position of a mover, a location of a mover, movement of a moveable stage generally within a working region and/or the like, such position, location, movement and/or the like should be understood to refer to the position, location, movement and/or the like of a reference point on the mover. Such reference point may be, but is not limited to, a point at the center of one magnet array assembly of the moveable stage. Such reference point could be some other location on the mover. Generally, the desired position $(x_r, y_r)$ may be a function of time t, and may represent where a mover should be ideally located at each time t. In various embodiments, the desired position $(x_r, y_r)$ may be a function of another master axis (desired) position that may vary with time. Although $x_r$, $y_r$ are mentioned here in reference to the work body-X and work body-Y directions, it should be understood to those skilled in the art that the desired position may be specified in one or more directions. In particular embodiments, a desired position could be specified in 6 degrees of freedom: $x_r, y_r, z_r, Rx_r, Ry_r, Rz_r$, where $z_r$ is a desired position of the mover in the work body-Z direction, $Rx_r$ is a desired rotary position of the mover around the work body-X direction, $Ry_r$ is a desired rotary position of the mover around the work body-Y direction, and $Rz_r$ is a desired rotary position of the mover around the work body-Z direction.

Figure 38A:
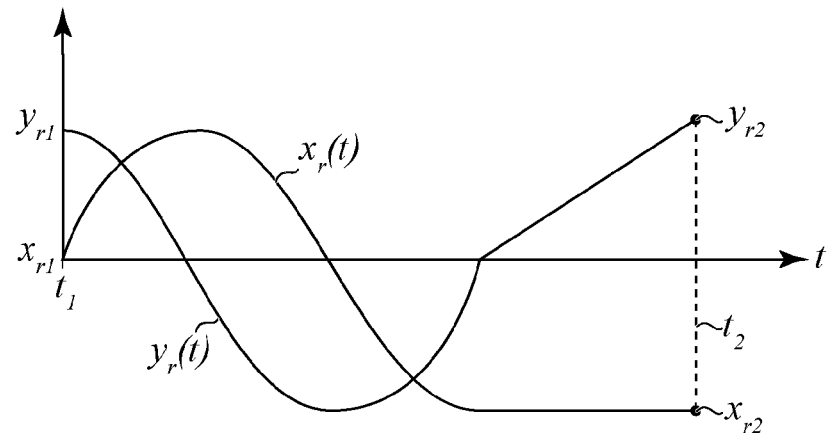
FIG. 38A is a 2D trajectory of a mover in the time domain according to one embodiment.
Figure 38B:
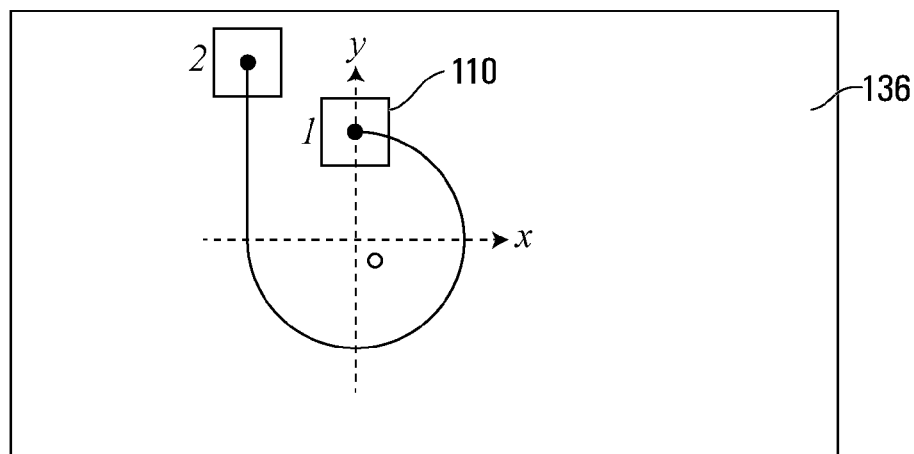
FIG. 38B is a 2D trajectory of a mover on a working surface according to the 2d trajectory shown in FIG. 38A.

Generally, the desired position of a mover $(x_r, y_r)$ over a span of time t forms a two-dimensional (2D) configuration trajectory in the work body working region, and the mover is ideally expected to follow the 2D trajectory via suitable control means (as described in greater detail below in reference to FIGS. 38A and 38B). Such 2D trajectory may have configurable shape and length defined via software rather than limited by hardware like guide rails, to meet the needs of automation tasks. As each mover is capable of at least controllable motion in X and Y directions, one or more movers can be controllably moved in the work body working region to follow one or more corresponding 2D trajectories, for example.

FIG. 1B shows a side view of the non-limiting embodiment of FIG. 1A. As shown in FIG. 1B, a work body tile 137 may optionally comprise one or more of the following elements:

a work body electrically conductive element assembly 131 comprising a plurality of electrically conductive elements, such as work body electrically conductive elements 132 and 134 for example, that can be selectively driven with suitable currents to interact with magnet elements of movers 110 to propel and/or levitate movers 110.

work body sensor assembly 181 comprising one or more sensors such as the one or more sensors 180 that can be used to calculate the position of movers 110 relative to one or more directions or to the working surface.

a work body controller assembly 161 comprising one or more controllers such as the one or more controllers 160 that may receive signals from the work body sensor assembly 181, receive information representing application requirements, and/or determine the desired currents to drive through a specified set of electrically conductive elements inside the work body 130 based on a suitable algorithm. In various embodiments, the one or more controllers 160 may comprise a plurality of work body controller assemblies 161.

a magnetic field modulator such as work body amplifier assembly 171 comprising one or more amplifiers such as the one or more amplifiers 170 that can receive current reference command signals from the work body controller assembly 161 to drive electrical current flowing through electrically conductive elements inside the work body electrically conductive element assembly 131.

The Z direction stack-up arrangement in FIG. 1B should be interpreted as illustrative rather than restrictive, and the Z location of each assembly may be adjusted based on application requirements. In various embodiments, a work body tile such as work body tile 137 may include one or more suitable cooling devices, including but not being limited to fluid (such as water or air) cooling devices, air cooling with fans, and/or passive cooling devices relying on convection. In various embodiments, the one or more cooling devices may be attached to the work body electrically conductive element assembly 131. In various embodiments, cooling fluid channels may be installed between the work body electrically conductive element assembly 131 and the work body amplifier assembly 171 to carry heat away from work body tiles such as work body tile 137. In yet other various embodiments, one or more cooling devices may be attached to the amplifier assembly 171, or may be sandwiched between the work body electrically conductive element assembly 131 and the amplifier assembly 171. It should be understood to those skilled in the art that a suitable mounting device (not shown) may be included in magnetic movement apparatus 150, including but not being limited to a mechanical mounting plate to which one or more work body tiles such as work body tile 137 may be attached.

Referring to FIG. 1A, to control the position of the one or more movers 110 relative to work body 130 in magnetic movement apparatus 150, it may be desirable to obtain mover position feedback data 163 which may comprise, for example, measured characteristics of the one or more movers 110 such as position, velocity, acceleration and/or orientation of the one or more movers 110 relative to the work body 130 or to some other reference. Feedback data 163 may be obtained from suitable sensors, measurement systems measurement methods and/or the like, such as the one or more sensors 180, for example. Any suitable sensors, measurement systems measurement methods and/or the like may be used to determine feedback data 163. Non-limiting examples of suitable sensors which may be used to provide some or all of feedback data 163 include: laser displacement interferometers, two-dimensional optical encoders, laser triangulation sensors, capacitive displacement sensors, eddy current displacement sensors, reflective surfaces suitable for interferometry, accelerometers, Hall-effect sensors and/or the like.

In particular embodiments such as the embodiment shown in FIG. 1B, the sensor assembly 181 may comprise a plurality of sensing elements, such as the one or more sensors 180, which may be organized in a matrix (not shown) along a plane generally parallel to working surface (the outer surface with Z as normal direction and closer to the one or more movers 110). Each sensing element may interact with a patterned target installed on the one or more movers 110 according to physics principles, including but not being limited to magnetic, electromagnetic, eddy current, capacitive, resistive, optical, etc., such that the output of each sensing element is sensitive to a mover's position in one or more (linear or rotary) directions. The outputs of sensing elements can be used directly or indirectly by the one or more controllers 160 to determine mover positions based on a suitable algorithm. Different position sensing techniques can be combined to provide an overall position-sensing system. Various suitable feedback sensor systems and methods are described elsewhere, such as Patent Cooperation Treaty application Nos. PCT/CA2012/050751 and PCT/CA2014/050739, for example.

The one or more amplifiers 170 may be centralized in one location, or be distributed and integrated into work body tiles (such as work body tile 137) as work body amplifier assemblies such as the work body amplifier assembly 171. The one or more controllers 160 may be centralized in one location, or may be distributed and integrated into work body tiles as work body controller assemblies such as work body controller assembly 161. In various embodiments, the magnetic movement apparatus 150 may comprise a combination of a centralized system controller 160 and a plurality of work body controller assemblies 161. The one or more sensors 180 may be centralized in one location, or be distributed and integrated into work body tiles as work body sensor assemblies such as work body sensor assembly 181.

The one or more movers 110 in FIGS. 1A and 1B each comprise two magnetic bodies, which in the illustrated embodiment comprise magnetic bodies 116I and 116II, each of which comprises a magnet array 112 (illustrated in FIG. 1A with respect to magnetic body 116). The magnet array 112 comprises a plurality of magnetization elements 114 (illustrated individually as 114A, 114B, 114C, and 114D), and each magnetization element has a magnetization direction. Although the magnetization elements 114 in FIG. 1A are linearly elongated, it will be understood to those skilled in the art that any suitable magnet array arrangement described elsewhere can be used including but not being limited to a checker board magnet array, two-dimensional Halbach arrays, or various one-dimensional Halbach arrays, for example. Some non-limiting examples of mover magnet arrays and their corresponding work body electrically conductive element design are shown in U.S. Pat. No. 9,202,719 B2.

In various embodiments, the working distance between a bottom surface of the magnet array 112 (with a normal direction in the Z direction) and working surface 136 the work body 130 (with a normal direction in the Z direction) may be limited in comparison to the lateral size of the one or more movers 110 (in X and Y directions) and/or to the lateral working stroke of the one or more movers 110. As used herein, a "stroke" or "working stroke" of any object, such as the one or more movers 110, for example, means the range of movement of that object. For example, a mover may have a working stroke of 300 mm, meaning that it can travel 300 mm maximum.

Movers with Relatively Moveable Magnetic Bodies

In various embodiments such as the embodiment illustrated in FIGS. 1A and 1B, one or more movers such as the one or more movers 110 may comprise one or more magnetic bodies, each of which may interact with one or more magnetic fields such as those which may be generated by current driven through the electrically conductive elements 132 and 134 of the work body 130 according to suitable current command signals generated according to a suitable control algorithm by the one or more controllers 160 to produce a desired relative motion among these magnetic bodies. Such relative movement between magnetic bodies may, in various embodiments, produce a desired actuation effect. As shown in FIG. 1A, one or more movers such as the one or more movers 110 may comprise a first magnet array assembly 116I (also referred to herein "a first magnetic body") and a second magnet array assembly 116II (also referred to herein "a second magnetic body"). In the illustrated embodiment, a magnetic body is a rigid body comprising one or more magnet arrays. In various embodiments, a magnetic body may be any suitable body comprising one or more magnets.

As shown in FIG. 1A, a mechanical link 119 may be installed between magnet array assembly 116I and magnet array assembly 116II. The mechanical link 119 may be configured to constrain relative motion between magnet array assemblies 116I and 116II in a first set of one or more directions or degrees of freedom, and may also be configured to allow relative motion between the magnet array assemblies 116I and 116II in a second set of one or more directions or degrees of freedom. In various embodiments, the first set of constrained directions/degrees of freedom may comprise one or more linear directions, one or more rotational directions, or a combination of both. Magnet array assembly 116I may be configured to controllably move in the allowed second set of directions/degrees of freedom relative to magnet array assembly 116II in response to current driven in selected work body electrically conductive element traces. As a result of the mechanical link 119 constraining movement in a first set of directions/degrees of freedom, the one or more movers 110 may not only move within at least two in-plane DOF, but magnet array assembly 116I may also move relative to magnet array assembly 116II in the allowed second set of directions/DOF. As will be described in detail below, in various embodiments, such relative motion between the magnet array assemblies 116I and 116II may be controlled, manually or automatically, for use in order to facilitate motion and/or control of an actuator or an end effector (including but not being limited to a tool such as a gripper with opposing jaws, or a vacuum pump, for example).

Generally, the axis or direction relative to which such controllable relative motion is effected between magnet array assemblies of a mover may be referred to interchangeably as an on-mover axis or as a live axis. A mover may comprise multiple magnet array assemblies, and may thus comprise one or more live axes. In various embodiments, the presence of a live axis due to a magnetic movement apparatus having a mechanical link which mechanically links one or more magnetic bodies may provide controllable relative motion and/or controllable actuation force or torque between said one or more magnetic bodies.

Figure 2:
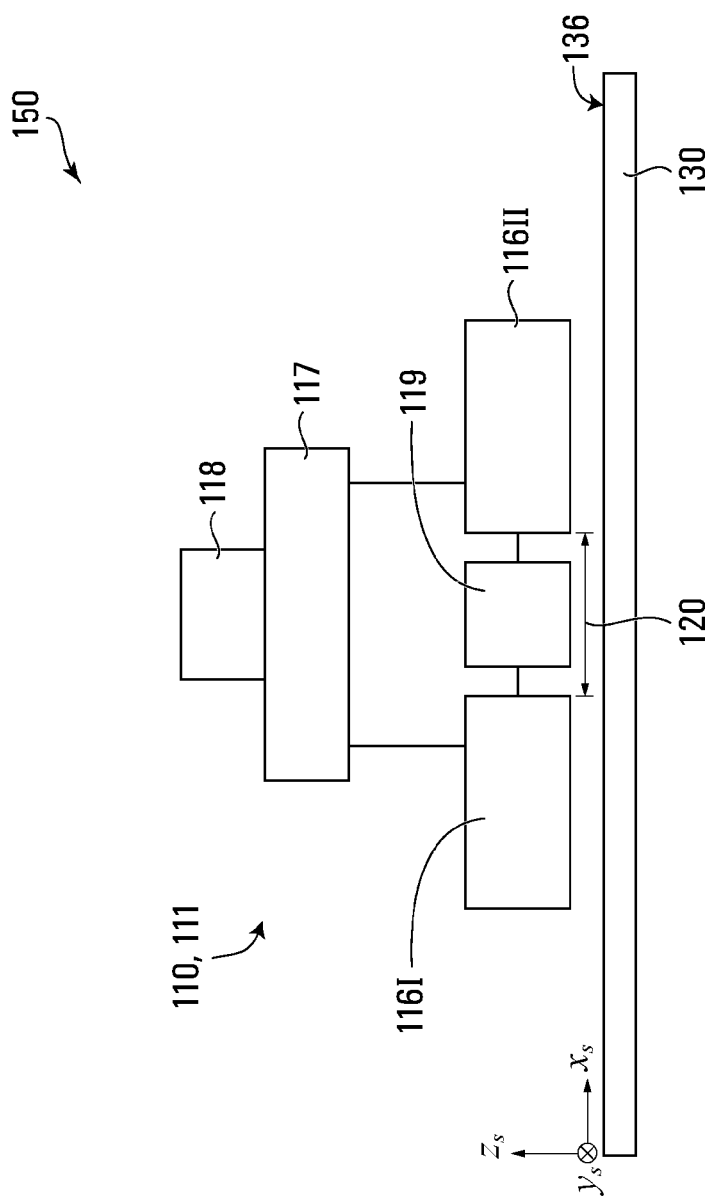
FIG. 2 is a schematic side view of the apparatus shown in FIG. 1.

FIG. 2 shows a schematic side view of the non-limiting embodiment as shown in FIGS. 1A and 1B. As shown in FIG. 2, the magnetic movement apparatus (150) comprises a mover (110) comprising two or more magnetic bodies (116) and a work body (130) comprising a plurality of electrically conductive elements (not shown); each magnetic body (116) comprising one or more magnet arrays (not shown), the one or more magnet arrays rigidly connected together as a motion body (not shown), each magnet array comprising one or more magnetization elements (not shown), each magnetization element having a magnetization (not shown); the two or more magnetic bodies comprising a first magnetic body (116I) and a second magnetic body (116II); the first magnetic body and the second magnetic body connected together by a mechanical link (119), the mechanical link 119 constraining the relative motion between the first and second magnetic bodies in a first set of one or more directions/degrees of freedom and allowing relative motion in a second set of one or more directions/degrees of freedom. As shown in FIGS. 1A and 1B, one or more controllers 160 and one or more amplifiers 170 may be connected to selectively and/or controllably drive currents in the plurality of electrically conductive elements to cause magnetic interaction between the driven currents and each of the magnetic bodies to thereby effect relative movement between the magnetic bodies and the work body. The mover may be controllably moved by the one or more controllers 160 in at least 2 DOF within a working region 136, including, in the illustrated embodiment, independently controllable motion in the X-direction and independently controllable motion in the Y-direction. In various embodiments, the mover may be configured to be controllably moved in any number of alternative directions/degrees of freedom.

Generally, mechanical link 119 is installed on mover 110 and moves with mover 110. In other words, the mechanical link 119 is "floating" relative to work body 130 (and its associated electrically conductive elements). In various embodiments, mechanical link 119 may be a slider and a guide rail: both the slider and the guide rail are installed on the mover, and they both move relative to the work body 130. In various embodiments, the mechanical link 119 may include one or more resiliently deformable components, such as spring elements for example, for purposes including but not being limited to reducing the potential energy variation during relative position change or keeping the relative position at certain ranges in power off. In various embodiments, the slider may be rigidly attached to the first magnetic body and the guide rail may be rigidly attached to the second magnetic body, or vice versa so that the first magnetic body and the second magnetic body are configured to be coupled together with a linear rolling or sliding bearing to constrain their relative motion in 5 degrees of freedom and allow relative motion at only single degree of freedom. For greater clarity, as used herein, "attached" should be understood by a person of skill in the art to mean, in various embodiments, "rigidly attached", "non-rigidly attached", "coupled", "detachably coupled", "connected", "linked", or any of the like.

As shown in FIG. 2, an end-effector 117 may be connected between the first magnetic body 116I and the second magnetic body 116II, and may be configured to carry a workpiece 118. In various embodiments, the mechanical link 119 may comprise the end effector 117. In various embodiments, the mechanical link 119 may be comprise any suitable bearing, including but not being limited to a sliding bearing, a rotatable or rolling-element bearing, a flexural bearing, a mechanical linkage, etc. In various embodiments, the slider and guide rail may both comprise one or more corresponding retaining surfaces which, when positioned against one another, may be configured to mechanically link the first and second magnetic bodies together. As shown in FIG. 2, the relative motion allowed between the first magnetic body 116I and the second magnetic body 116II when mechanically linked by the mechanical link 119 is represented by a live axis 120. In various embodiments, the mover 110 may be capable of 6 DOF controllable motion relative to the work body 130 without any mechanical contact with the work body 130. The 6 DOF controllable motion of a mover may comprise three translation directions of the mover in the X, Y, and Z directions, and three rotational directions around the X, Y and Z directions or axes.

In one embodiment, one of magnetic bodies 116I and 116II alone is capable of 6-DOF controllable motion; in other embodiments, neither of magnetic bodies 116I and 116II are capable of 6-DOF controllable motion. In various embodiments, the mover, comprising the magnetic bodies 116I and 116II, is capable of 6-DOF controllable motion, plus one or more additional directions/DOF of controllable relative motion between magnetic bodies 116I and 116II.

As the mechanical link 119 constrains the relative motion between magnetic bodies 116I and 116II in the first set of one or more directions/degrees of freedom, in general the magnetic bodies 116I and 116II may not be controlled independently from one another in said directions/DOF. However, in the one or more directions in the first set of directions/DOF, magnetic bodies 116I and 116II may be configured to be controllably moved together in a coordinated way by calculated coordinated position feedback and coordinated forces.

Figure 3A:
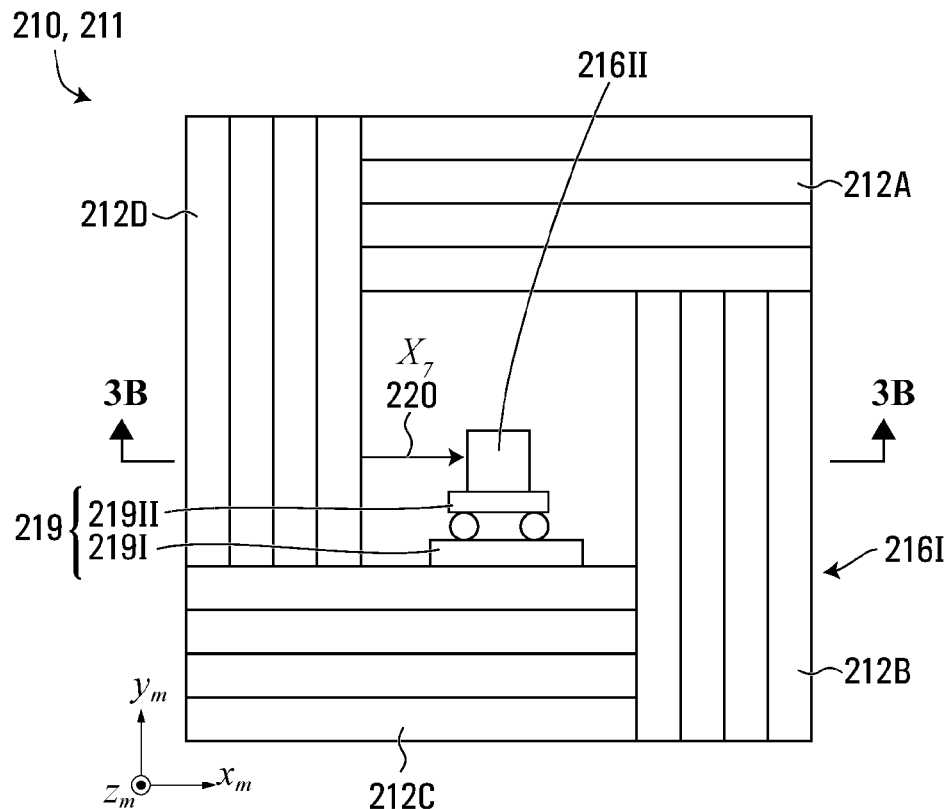
FIG. 3A is a cross-sectional top view of a mover according to one embodiment.
Figure 3B:
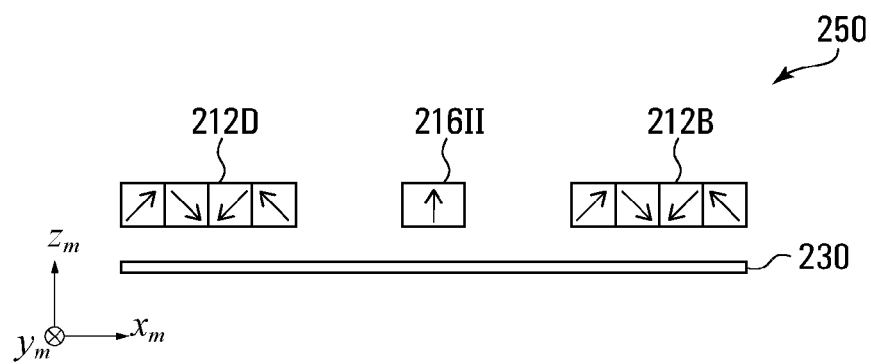
FIG. 3B is a schematic side view of an apparatus comprising the mover shown in FIG. 3A.

Referring to FIGS. 3A and 3B, another exemplary embodiment of a magnetic movement apparatus is disclosed. FIGS. 3A and 3B respectively show a top view and a side view of a magnetic movement apparatus 250 according to a particular embodiment of the invention: a mover 210 comprises a first magnetic body 216I and a second magnetic body 16II, wherein the first magnetic body 216I comprises magnet arrays 212A, 212B, 212C, and 212D. Each magnet array in the first magnetic body 216I comprises a plurality of magnetization elements, which in the present embodiment comprise magnets. In FIG. 3A, four magnets are shown in each magnet array, however, other numbers of magnets may be used. The second magnetic body 216II may comprise one or more magnet arrays (one magnet array is illustrated in FIG. 3A) comprising one or more magnets (one in the case of FIG. 3). A mechanical link 219 is installed between the first magnetic body 216I and the second magnetic body 216II. In the illustrated embodiment, the mechanical link 219 constrains the relative motion between magnetic bodies 216I and 216II in a first set of 5 degrees of freedom (Ym, Zm, RXm representing rotation around Xm, RZm representing rotation around Zm, and RYm representing rotation around Ym) and allows the relative motion in a second set of one degree of freedom (Xm direction). In various embodiments, the mechanical link 219 may comprise a linear sliding bearing, a rolling-element bearing, and/or a flexural bearing for allowing relative motion between magnetic bodies 216I and 216II. For example, the mechanical link 219 in FIG. 3 may comprise a linear guide rail installed on the magnetic bodies 216I, and a slider installed on the other magnet array assembly 216II. In one embodiment, the linear guide rail and the slider may each comprise one or more corresponding retaining surfaces configured to be positioned against one another to mechanically link the first and second magnetic bodies 216I and 216I; in other embodiments, the mechanical link 219 may comprise alternative or further linkage mechanisms or bodies which may be positioned alongside or in-between the slider and the guide rail to effect a mechanical link, such as one or more rotatable bearings, for example. In various embodiments, the mechanical link 219 may also comprise a flexural bearing made of plate leaf spring and elastic hinges such that magnetic bodies 216I and 216II can move relative to each other in the Xm direction without friction while the relative motion in other degrees of freedom is constrained by said flexural bearing. work body In the illustrated embodiment, suitably driven currents in the electrically conductive elements of the work body 230 (as shown in FIG. 3B) may interact with the first magnetic body 216I to generate eight independent forces on the magnetic body 216I: a Y-force and a Z-force on the magnets of magnet array 12A, an X force and a Z force on the magnets of magnet array 12B, a Y force and a Z force on the magnets of magnet array 12C, and an X force and a Z force on the magnets of magnet array 12D.

The combination of eight independent forces enables that the motion of the first magnetic body 216I is capable being controlled in up to 6 directions/DOF while operating in levitation mode (or in up to 3 in-plane directions/DOF while operating in sitting mode). In addition, the second magnetic body 216II may be independently driven by currents in the work body 130 in the Xm direction. For example, a current driving method may be:

- a selected set of Y-electrically conductive elements (i.e. electrically conductive elements elongated in the Y-direction) underneath magnetic body 216II may create a force in the Xm-direction on the magnetic body 216II, while creating negligible coupling forces on magnet arrays 12A and 12C by properly selecting the magnetization directions of each magnet element dimension and magnetization direction;
- if the selected set of Y electrically conductive elements is far enough away from magnet arrays 12D and 12B (for example, if the selected set of Y electrically conductive elements is half a spatial wavelength of the magnetization spatial periods of magnet arrays 12D and 12B away from magnet arrays 12D and 12B), then current flowing through the selected set of Y electrically conductive elements may also produce negligible force coupling on magnet arrays 12D and 12B;
- Each of magnet arrays 12D and 12B may be associated with their own corresponding active electrically conductive elements. By selecting one of said active electrically conductive elements which is far enough from magnetic body 216II (such as half or one-third of a spatial period of a magnetization pattern of magnet array 12B and 12D), the interaction force between magnetic body 216II and currents driven through said active electrically conductive elements corresponding to magnet arrays 12B and 12D may also be made negligible.

As a result, the Xm-direction force may be generated independently of the actuation forces applied on magnetic body 216I, and correspondingly the Xm-motion of magnetic body 216II may be controlled independently from the controllable motion of magnetic body 216I in 6 directions/DOF. In various embodiments, sensing elements (including but not being limited to magnetic field sensors) in work body 130 may be used to provide position information (also referred to herein "feedback") for both magnetic bodies 216I and 216II. In further embodiments, a suitable control algorithm may be implemented which uses the relative position information 220 (X7, shown in FIG. 3A) to controllably generate signals for certain application needs, such as for controlling a gripper. In the particular embodiment shown in FIGS. 3A and 3B, the first magnetic body 216I alone may be capable of controllable motion in 6 directions/DOF when working in the levitating mode. The mover 210 may also work in the sitting mode, in which case magnetic body 216I alone may be capable of motion in only three in-plane directions/DOF.

Figure 4A:
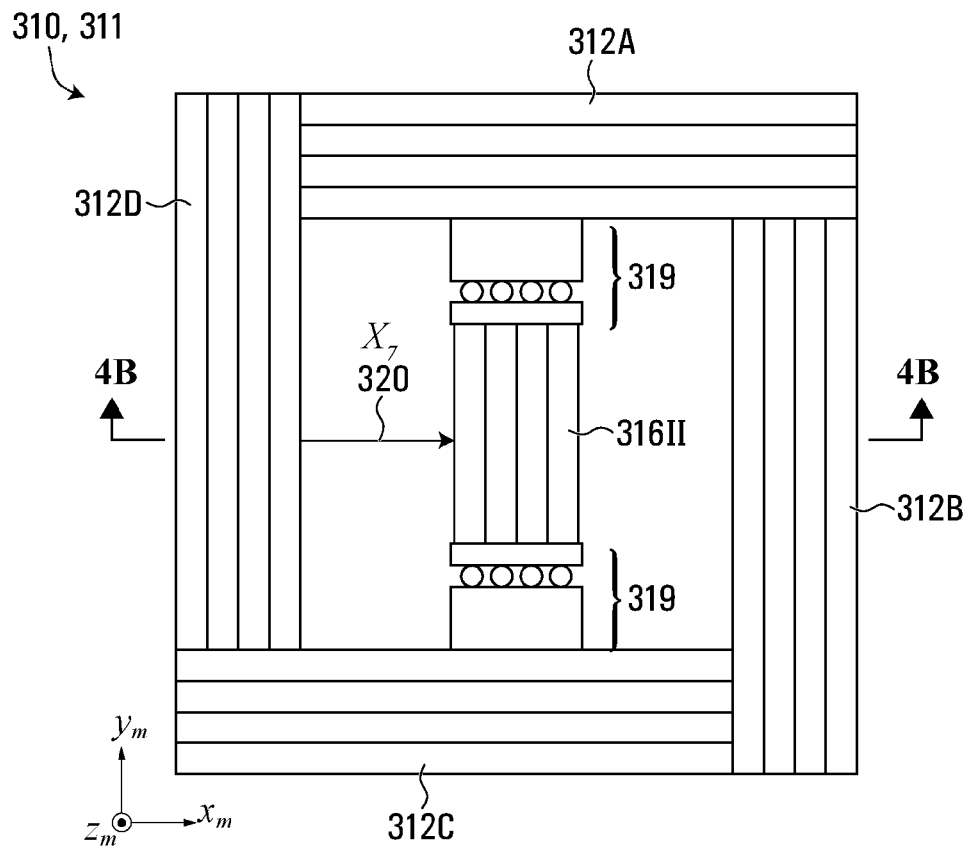
FIG. 4A is a cross-sectional top view of a mover according to one embodiment.
Figure 4B:
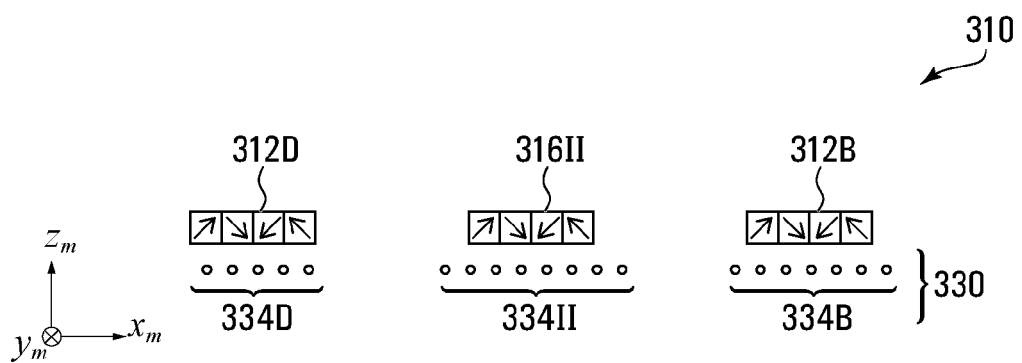
FIG. 4B is a schematic partial side view of the mover shown in FIG. 4A.

FIGS. 4A and 4B show another non-limiting example of a magnetic movement apparatus comprising a mover 310; FIG. 4B shows a cross-sectional view of the mover 310 and its Y-elongated active electrically conductive element traces 334 along line B-B in FIG. 4A. Although X-direction elongated electrically conductive element traces (X traces) are not shown in FIG. 4A or 4B for the sake of brevity, it should be understood to those skilled in the art that X-traces can be distributed in the work body 330 as well. According to the illustrated embodiment, the mover 310 comprises a first magnetic body 316I and a second magnetic body 316II. A mechanical link 319 is installed between the first magnetic body 316I and the second magnetic body 316II, to constrain the relative motion between magnetic bodes 316I and 316II in a first set of 5 degrees of freedom (Ym, Zm, RXm, RZm, RYm) while allowing the relative motion between magnetic bodies 316I and 316II in the Xm direction. In various embodiments, the mechanical link 319 may be a planar mechanical link (including but not being limited to two linear guides orthogonally stacked together with one oriented in the Xm direction and the other one oriented in the Ym direction), that may be configured to constrain the relative motion between magnetic bodies 316I and 316II in a first set of 4 degrees of freedom (Ym, RXm, RYm, RZm) while allowing relative motion between magnetic bodies 316I and 316II in a second set of 2 degrees of freedom (Xm and Zm).

In the illustrated embodiment, the first magnetic body 316I comprises magnet arrays 312A, 312B, 312C, and 312D, each of which comprises a plurality of magnets (such as, but not necessarily, four linearly elongated magnets). The detailed magnetization direction of each magnet of magnet arrays 12D and 12B is shown in FIG. 4B. To those skilled in the art, it should be understood that the magnetization direction of magnetization segments in magnet arrays 12A and 12C may exhibit similar pattern to those in magnet arrays 12B and 12D with proper permutation. The second magnetic body 316II comprises four magnets linearly elongated in the Ym direction, and each magnet has a magnetization direction orthogonal to the Ym direction as shown in FIG. 4B. The magnetization directions of magnetization elements in magnetic body 316II may exhibit a single spatial period pattern: going clockwise, the magnetization direction rotates by 90 degrees around the Ym axis from one element to the next.

As known to a person skilled in the art, the first magnetic body 316I can interact with currents flowing in the work body 330 to product controllable motion of magnetic body 316I in up to 6 degrees of freedom. For example, magnet array 312D may interact with currents in its corresponding active electrically conductive elements 334D to produce two independently controllable forces in the Xm and Zm directions, magnet array 312B may interact with currents in its corresponding active electrically conductive elements 334B to produce two independently controllable forces in the Xm and Zm directions, magnet array 312A may interact with currents in its corresponding X-oriented active electrically conductive elements 332A (not shown in FIG. 4B) to produce controllable forces in the Ym and Zm directions, and magnet array 312C may interact with currents in its corresponding X-oriented active electrically conductive elements 332C (not shown in FIG. 4B) to produce controllable forces in the Ym and Zm directions. It should be understood by those skilled in the art that the corresponding active electrically conductive elements for each magnet array can change with the displacement of the magnet array. Similar to the magnetic body 316I in FIGS. 3A and 3B, the motion of magnetic body 316I in FIGS. 4A and 4B is capable of being controlled in 6-DOF while operating in levitation mode, or of being controlled in three in-plane DOF while operating in sitting mode.

The second magnetic body 316II may interact with properly commanded currents flowing in its corresponding active electrically conductive element traces 334II to generate two independently controllable forces in the Zm and Xm directions; these two controllable forces may be used to control relative motion between the first magnetic body 316I and the second magnetic body 316II in the Xm and/or Zm directions independently. The relative motion between magnetic bodies 316I and 316II may be controlled by selectively driving current into the electrically conductive elements in the work body 330, and may be controlled independent of the controllable motion of the first magnetic body magnetic body 316I. The resulting controllable relative motion between magnetic bodies 316I and 316II is referred to as a live axis, along which relative motion is controllable independent of motion of the mover 310 in the mover 310's 6 degrees of freedom. It should be understood to those skilled in the art that any suitable magnet array layout and dimensions known to a person skilled in the art and/or any suitable electrically conductive element geometry and its corresponding current commutation method can be applicable here to construct magnetic bodies 316I and 316II. In FIGS. 4A and 4B, motion of the first magnetic body magnetic body 316I alone is capable of being controlled in 6-DOF when operating in levitation mode, or of being controlled in three in-plane DOF when operating in sitting mode.

Figure 5A:
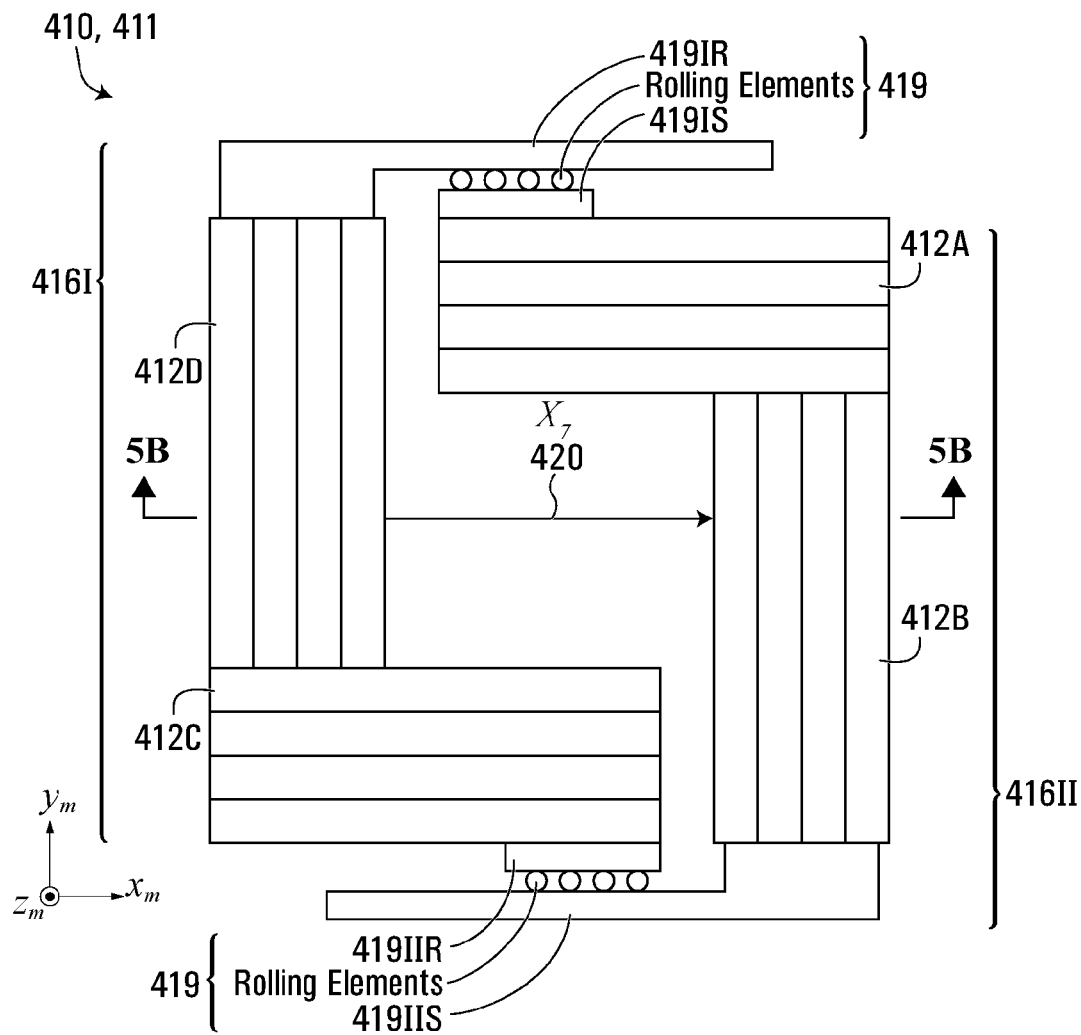
FIG. 5A is a cross-sectional top view of a mover according to one embodiment.
Figure 5B:
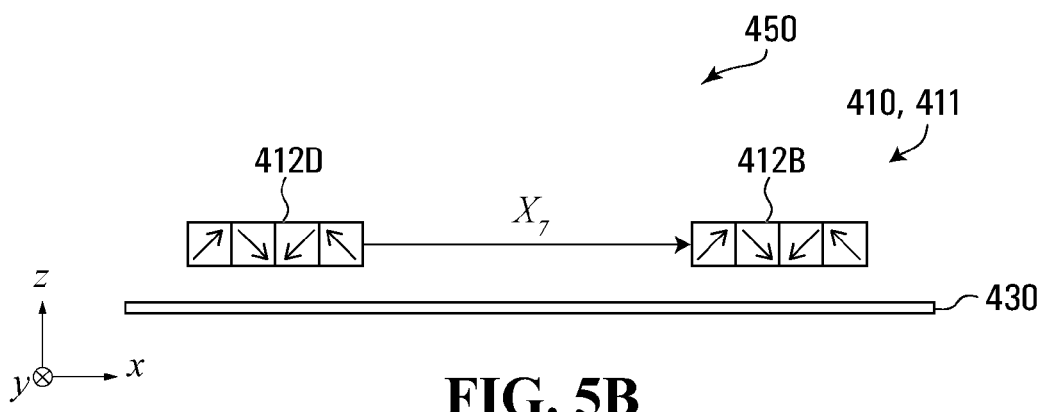
FIG. 5B is a schematic side view of an apparatus having the mover shown in FIG. 5A.

FIG. 5A and FIG. 5B shows a magnetic movement apparatus according to another embodiment of the invention. FIG. 5A shows a top view of a mover 410 comprising a first magnetic body 416I and a second magnetic body 416II. FIG. 5B is a cross-sectional view along B-B indicated in FIG. 5A. The first magnetic body 416I comprises a first magnet array 412C and a second magnet array 412D connected rigidly together; the second magnetic body 416II comprises a third magnet array 412A and a fourth magnet array 412B connected rigidly together. A non-limiting example of these magnet arrays is a magnet array comprising a plurality of linearly elongated magnetization elements (segments) such as magnets, for example, wherein each magnetization element has a magnetization direction orthogonal to its elongation direction. FIG. 5B shows the magnetization directions of the magnetization elements in magnet arrays 412D and 412B. The magnetization directions of magnetization elements in 412A and 412C can be substantially similar to those in 412B and 412D with proper spatial permutation and modification. In the illustrated embodiment, a mechanical link 419 is installed between the first magnet array assembly 416I and the second magnet array assembly 416II. As shown in FIG. 5A, the mechanical link 419 comprises two linear guide rails and two sliders: guide rail 419IR is installed on magnetic body 416I, with its corresponding slider 419IIS installed on (in other words, rigidly attached to) magnetic body 416II; guide rail 419IIR is installed on (in other words, rigidly attached to) magnetic body 416II, with its corresponding slider 419IS installed on magnetic body 416I. In various embodiments, the mechanical link 419 may comprise any number of corresponding sets of guide rails and sliders, and may further comprise additional elements such as rotational bearings, for example. In the embodiment shown in FIGS. 5A and 5B, the mechanical link comprises a slider and a guide rail; the slider can be considered as a linkage body.

It should be noticed that, in the illustrated embodiment, all these components of the mechanical link 419 are floating, i.e. can move relative to work body 430. With proper adjustment and alignment, these two parallel guides (collectively the mechanical link 419) can constrain the relative motion between magnetic bodies 416I and 416II in a first set of 5 degrees of freedom (Ym, Zm, RXm, RYm, and RZm), and allow relative motion between them in a second set of one degree of freedom (Xm). The allowed direction of relative motion (allowed degree of freedom) is labeled as 420, X7 in FIG. 5A. Overall, the whole mover 410 in FIGS. 5A and 5B can be said to have up to 7 degrees of freedom: the conventional 6 degrees of freedom of the mover 410 plus the relative motion X7 (along a live axis) between magnetic bodies 416I and 416II. Here the mover 410's motion can be understood as the first magnetic body 416I's motion. As mentioned previously and/or elsewhere, each magnet array in FIGS. 5A and 5B can interact with properly driven currents flowing in corresponding active electrically conductive element traces in the work body 430 such that each magnet array experiences up to two independent forces urging the mover 410 to move. For example, a force Fya in the Ym direction and a force Fza in the Zm direction experienced by magnet array 12A; a force Fxb in the Xm direction and a force Fzb in the Zm direction experienced by magnet array 12B; a force Fyc in the Ym direction and a force Fzc in the Zm direction experienced by magnet array 12C; and a force Fxd in the Xm direction and a force Fzd in the Zm direction experienced by magnet array 12D. Since up to 8 independently controllable forces may be exerted upon the magnet arrays of mover 410, there are a sufficient number of forces available in order to fully control the motion of the mover 410 in the 6 DOF (degrees of freedom) plus the relative motion along the live axis 420 (X7).

In various embodiments, forces Fxd and Fxb may be used to control the Xm-direction displacement of magnetic body 416I ("XmI") and the Xm-direction displacement of magnetic body 416II ("XmII"), respectively, which is equivalent to controlling the Xm-direction displacement (XmI+XmII)/2 and the live axis displacement X7 (XmII−XmI) of the mover's center of gravity independently. Similarly, forces Fya and Fyc may be used to control the Ym direction motion and the rotational motion around Z, and forces Fza, Fzb, Fzc, Fzd may be used to control the Zm direction motion and rotational motion around Xm and Ym. As a result, the mover 410 may be controllably moved in seven directions/DOF. In the directions associated with the first set of DOF, the relative motion between magnetic bodies 416I and 416II is constrained by the mechanical link 419, and therefore the motion of the mover 410 must be controlled in a coordinated way in these directions.

For example, the relative motion between 416I and 416II may be constrained in the Ym direction, and therefore the Ym-direction motion of the mover 410 should be controlled in a coordinated way, such as by: (1) calculating a Ym-direction coordinated feedback (such as the average value of a Ym-direction position of the magnet array 12A and a Ym-direction position of the magnet array 12C); (2) using the Ym-direction coordinated feedback and a feedback control algorithm to calculate Ym-direction coordinated forces to be applied on each of the first magnetic body 416I and the second magnetic body 416II; (3) using the coordinated forces/torques and a commutation algorithm to calculate current commands and sending these commands to amplifiers driving currents into some electrically conductive elements of the work body. In this way, although the Ym-direction relative motion between the magnetic bodies 416I and 416II is constrained, the mover 410 as a whole may still be capable of controllable motion in the Ym direction.

In another example, relative motion between 416I and 416II may be constrained in the Ym direction, and therefore the rotational motion of the slider 419IIR (or any other portion of the mechanical link 419) around an axis of rotation in the Zm direction should be controlled in a coordinated way, such as by: (1) calculating a coordinated rotation feedback around Zm from the difference between the Ym positions of magnet array 412C and 412A divided by the Xm direction distance between the magnet arrays 412C and 412A; (2) using the coordinated feedback and a suitable feedback control algorithm to calculate one or more coordinated forces to be applied in the Ym direction on the magnet arrays 412A and 412C oppositely; (3) using the coordinated forces/torques and a commutation algorithm to calculate current commands and sending these commands to amplifiers driving currents into some electrically conductive elements of the work body.

For the particular embodiment in FIGS. 5A and 5B, movement of each of the magnetic bodies 416I and 416II may be controlled by up to four independent controllable forces generated by controllable currents in the electrically conductive elements of work body 430. In various embodiments, each of the first magnetic body 416I and the second magnetic body 416II in a mover may experience up to six independent controllable forces, and the relative motion between magnetic bodies 416I and 416II can be controlled by driving properly commutated currents through selected electrically conductive elements in work body 430. In the particular embodiment in FIGS. 5A and 5B, although neither of the magnetic bodies 416I nor 416II alone is capable of 6-DOF controllable motion, the mover 410 (i.e. the combination of magnetic bodies 416I and 416II and the mechanical link 419) is configured to be controllably moved in 6-directions/DOF, and the magnetic bodies 416I and 416II are configured to be controllably moved relative to each other in 1-directions/DOF (along live axis X7) while operating in levitation mode. Further, the mover 410 is capable of controllable motion in three in-plane directions/DOF, and the magnetic bodies 416I and 416II are capable of controllable relative motion in 1-direction/DOF (along live axis X7) while in sitting mode.

In the embodiment shown in FIG. 5A, the first and third magnet arrays (412C and 412A) overlap in the Y direction; the second and fourth magnet arrays (412D and 412B) overlap in the X direction. The configuration that the first and second magnetic bodies overlap in both the first elongation direction (X direction) and the second elongation direction (Y direction) may make the mover very compact to significantly reduce machine footprint. At the same time, the attached mechanical link may allow relative motion between the first and second magnetic bodies.

Figure 5C:
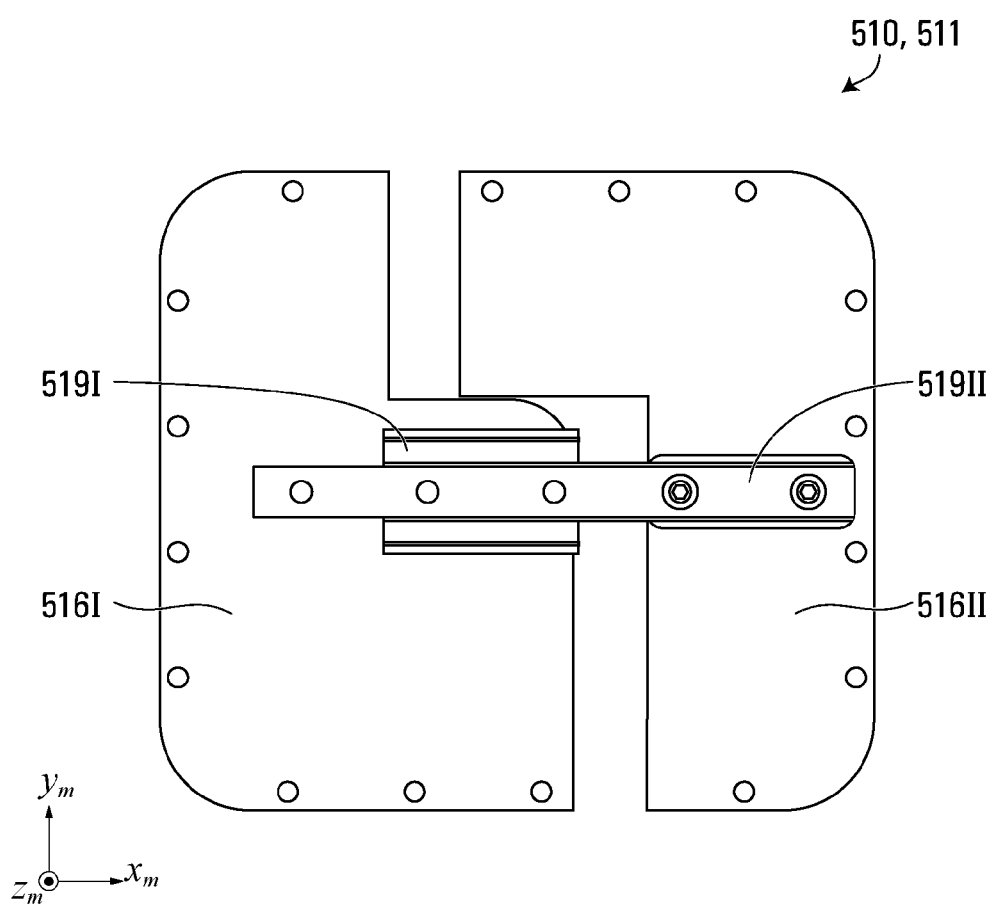
FIG. 5C is a top view of a mover according to one embodiment.

FIG. 5C shows yet another non-limiting example of an alternative embodiment of mechanical link 519, with the rest of details (such as the magnetic bodies and magnet arrays, for example) being substantially similar to those described in reference to FIGS. 5A and 5B. In FIG. 5C, mechanical link 519 comprises only one guide rail and one slider, which may save cost and weight and may also ease their installation/alignment. The slider and guide rail operate in a manner similar to sliders and guide rails described above. In the illustrated embodiment, slider 519I is installed on (in another word, is rigidly attached to) magnetic body 516I, and guide rail 519II is fixed with (in another word, is rigidly attached to) magnetic body 516II. In the illustrated embodiment, both the slider 519I and the guide rail 519II are floating and can move relative to a work body, such as work body 430 in FIG. 5B, for example. Although in the illustrated embodiment the guide rail 519II is oriented in the X direction, in other embodiments the guide rail may be oriented in the Y direction or in another direction orthogonal to the Z direction for purposes such as, but not limited to, reducing a bending moment on the guide rail 519II. It should be noted that when the guide rail 519II and the slider 519I are coupled together, the relative motion between them is constrained relative to five directions/degrees of freedom, and they can move relative to each other relative to one direction/degree of freedom.

Figure 5D:
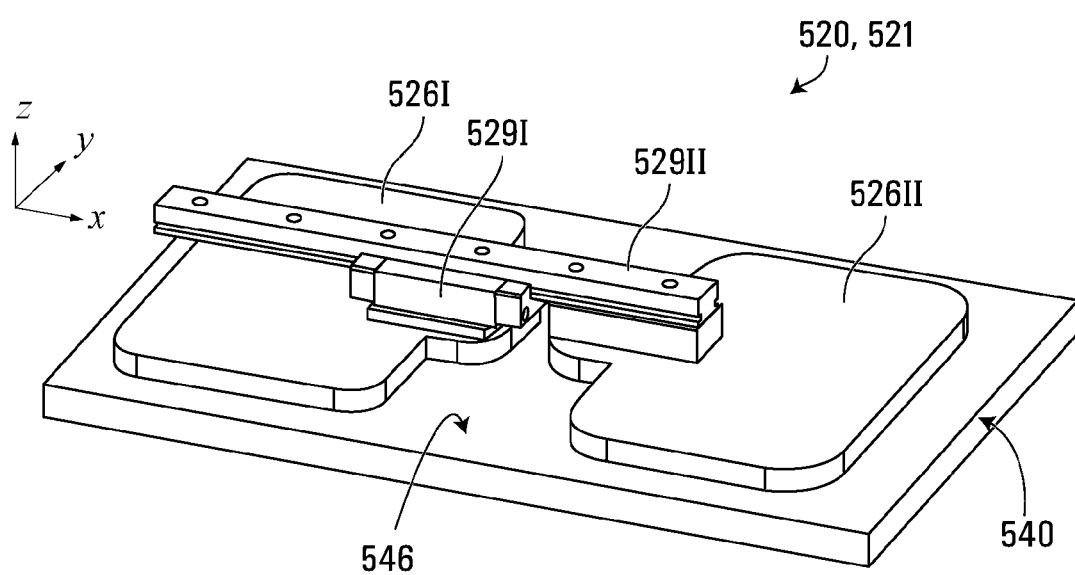
FIG. 5D is an isometric top view of an apparatus according to one embodiment.
Figure 5E:
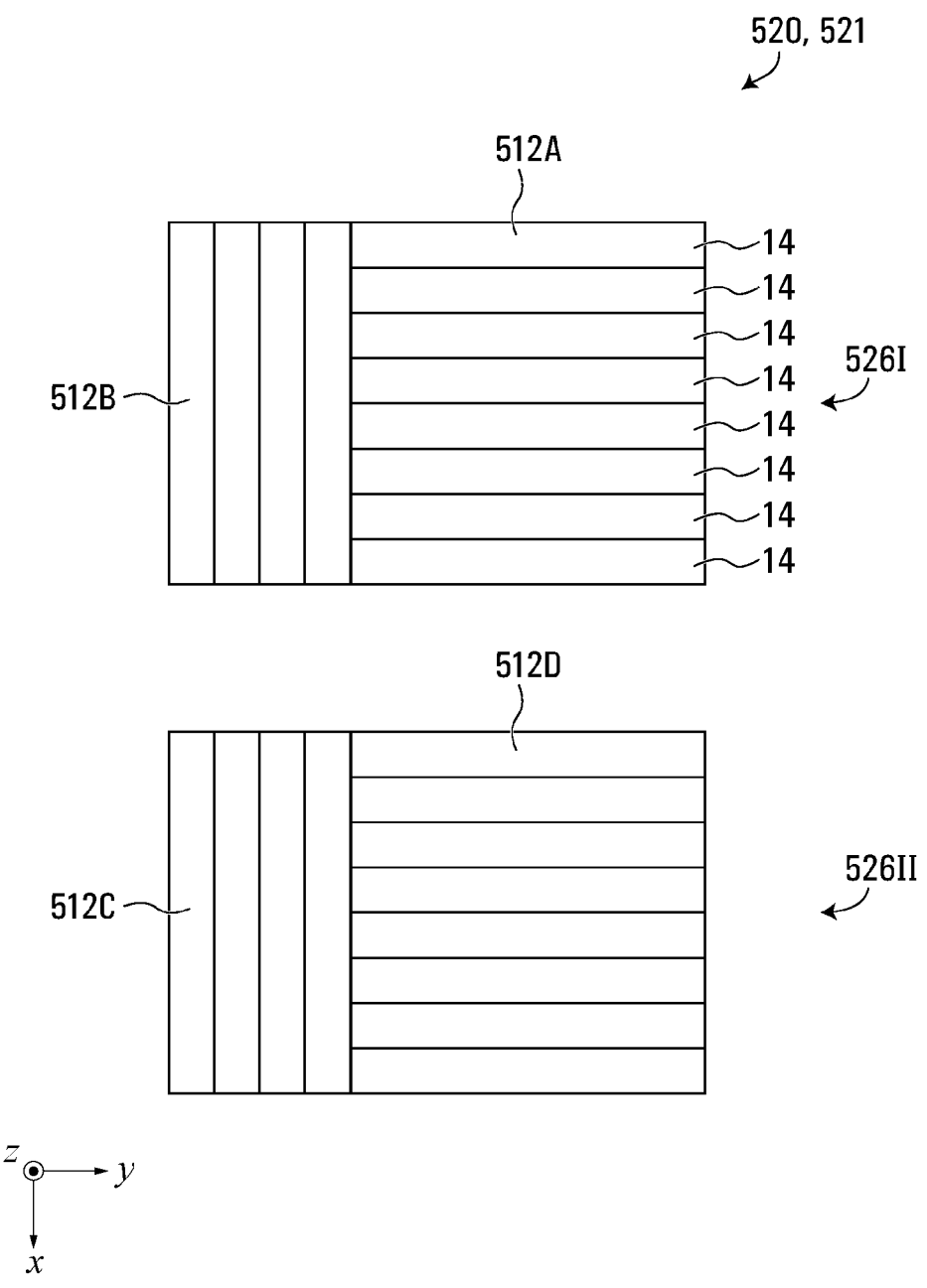
FIG. 5E is a top view of magnet arrays according to the embodiment shown in FIG. 5D.
Figure 5F:
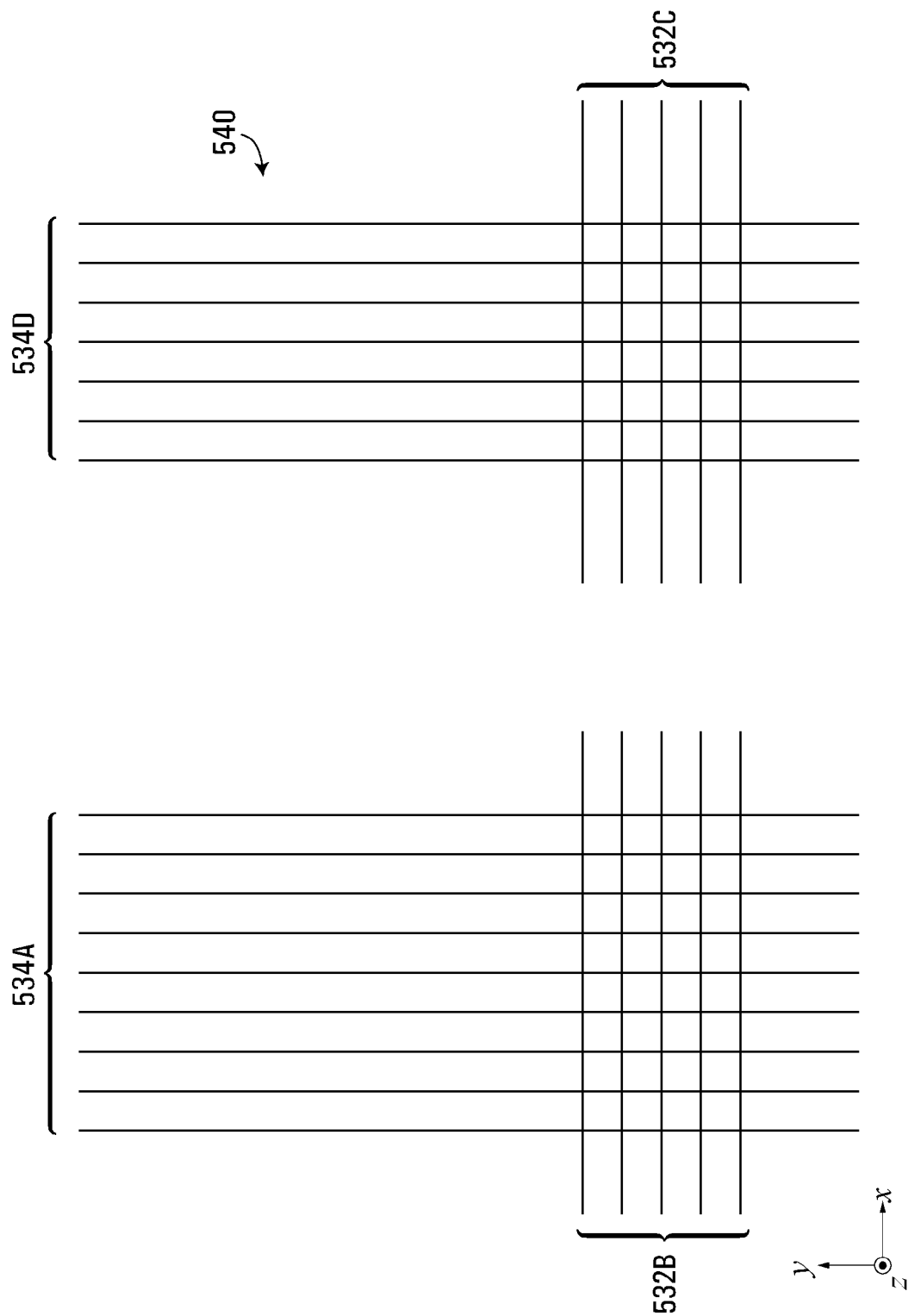
FIG. 5F is a schematic cross-sectional top view of electrically conductive elements of a work body according to the embodiment shown in FIG. 5D.

Referring to FIGS. 5D, 5E, and 5F, another embodiment of a magnetic movement apparatus is disclosed. A mover 520 comprises a first magnetic body 526I and a second magnetic body 526II. A mechanical link 529 comprises a first bearing element 529I attached to the first magnetic body 526I and a second bearing element 529II attached to the second magnetic body 526II. In the illustrated embodiment, the first bearing element 529I is a slider and the second bearing element 529II is a linear guide rail. In various embodiments, the first and second bearing elements may comprise any other type of mechanical bearing mechanisms, such as rotational or flexural bearings, for example. In the illustrated embodiment, the mechanical link 429 is connected between magnetic bodies 526I and 526II such that the mechanical link 529 constrains the relative motion between magnetic bodies 526I and 526II in 5 directions/degrees of freedom (Y, Z, Rx, Ry, and Rz) and allows relative motion between the magnetic bodies 526I and 526II in one degree of freedom (the X direction).

Referring to FIG. 5E, an exemplary detailed layout of magnet arrays inside the magnetic bodies 526I and 526II is disclosed. In the illustrated embodiment, the first magnetic body 526I comprises a first magnet array 512B and a second magnet array 512A. Magnet array 512A comprises a plurality of magnetization segments 14 (e.g. magnets) linearly elongated in the Y direction, with each segment having a magnetization direction perpendicular to the Y direction. In one non-limiting embodiment, the magnetization elements 14 may have magnetization directions as shown with respect to magnet array 412B in FIG. 5B, with suitable permutation. Similarly, magnet array 512B comprises a plurality of magnetization segments linearly elongated in the X direction with each segment having a magnetization direction perpendicular to the X direction. In the embodiment illustrated in FIG. 5E, each magnet array comprises eight magnetization elements. In various embodiments, any suitable number of magnetization elements may be used, such as 4 or 12, for example. The second magnetic body 526II comprises a third magnet array 512C and a fourth magnet arrays 512D. 512C and 512D are substantially similar to magnet arrays 512B and 512A, respectively.

Referring to FIG. 5F, an internal view of a work body 540 according to an exemplary embodiment is shown, wherein the work body 540 comprises independently driven electrically conductive element traces 532 and 534, oriented in the work body X-direction and the work body Y-direction, respectively. For clarity, the work body electrically conductive elements are shown in FIG. 5F, and the magnet arrays of the mover 520 are shown in FIG. 5E; to those skilled in the art, it will be understood that in operation, the magnet arrays of mover 520 in FIG. 5E will overlap with the electrically conductive elements traces 532 and 534 in FIG. 5F. Furthermore, only active electrically conductive element traces (i.e. the electrically conductive elements driven with non-zero currents) are shown in FIG. 5F; in various embodiments, the work body may comprise other electrically conductive elements 532 elongated in the X-direction and other electrically conductive elements 534 elongated in the Y-direction according to any suitable layout in order to allow a larger working region when the mover 520 travels in the XY work body plane. Furthermore, the active electrically conductive elements for each magnet array can also be correspondingly changed according to the position of mover 520 as it moves.

In operation, the magnet array 512A interacts with currents in its corresponding Y-oriented work body electrically conductive elements (534A in FIG. 5F), such that two independently controllable forces FAx and FAz are exerted on the magnet array 512A in the X (lateral) and Z (vertical) directions respectively, by driving suitable currents into suitable electrically conductive elements according to a suitable control algorithm as known to a person skilled in the art. Similarly, the magnet array 512B interacts with currents in its corresponding X-oriented work body electrically conductive elements (532B in FIG. 5F), such that two independently controllable forces FBy and FBz are exerted on the magnet array 512B in the Y(lateral) and Z(vertical) directions respectively, by driving suitable currents into suitable electrically conductive elements according to a suitable control algorithm known to a person skilled in the art. The magnet array 512C interacts with currents in its corresponding X-oriented work body electrically conductive elements (32C in FIG. 5C), such that two independently controllable forces FCy and FCz are exerted on the magnet array 512C in the Y(lateral) and Z(vertical) directions respectively, by driving suitable currents into suitable electrically conductive elements according to a suitable control algorithm known to a person skilled in the art. The magnet array 512D interacts with currents in its corresponding Y-oriented work body electrically conductive elements (electrically conductive element 534D in FIG. 5F), such that two independently controllable forces FDx and FDz are exerted on the magnet array 512D in the X(lateral) and Z(vertical) directions respectively, by driving suitable currents into suitable electrically conductive elements according to a suitable control algorithm known to a person skilled in the art.

In various embodiments, the produced eight independently controllable forces (FAx, FAz, FBy, FBz, FCy, FCz, FDx, FDz) can be used to control motion of the mover 520 in 6 directions/DOF, as well as to control the relative motion between magnetic bodies 526I and 526II in the X direction, with a suitable feedback measurement and control algorithm. The FBy+FCy forces can be used to control the Y direction motion of the mover 520, and the FBy−FCy forces can be used to control the rotational motion Rz of the mover 520 around Z axis. The forces FAz, FBz, FCz, FDz can be used to control the motion in the Z direction, and the rotation around the X axis and rotation around the Y axis. The force FAx can be used to control the motion of the magnetic body 526I in the X direction, and the force FDx can be used to control the motion of magnetic body 526II in the Y direction.

In the illustrated embodiment, when a pair of "clamping" forces is exerted on magnetic bodies 526I and 526II, for example force Fc on magnetic body 526I in the positive X direction and an equal amplitude force Fc on magnetic body 526II in the negative X direction, there may be no net torque on the mover 520 because the clamping force pair is colinear due to the fact that the two Y-elongated magnet arrays 512A and 512D are aligned in the X direction. Particularly, the second and fourth magnet arrays (512A and 512D) overlap in the X direction with overlapping width the same as the Y-direction dimension of magnet arrays 512A and 512D. In various embodiments, the Y-direction overlapping width may be greater than 85% of the Y-direction dimension of 512A and 512D, which may minimize the caused torque around the Z axis. In contrast, referring to FIG. 5A, a clamping force on the magnet array 412D cannot be colinear with a clamping force on the magnet array 412B in the X-direction; as a result, when a clamping force is required between magnet arrays 412B and 412D, a net rotational torque may be generated around the Z-axis by the magnet arrays 412B and 412D. In order to balance such net rotational torque and maintain positional control of the mover 410 in the Rz direction, an equal torque may be required to be generated on the magnet arrays 412A and 412C, which may result in higher energy consumption than the embodiment disclosed in FIGS. 5D-5F.

It should be noted that although motion of the mover 520 may be controlled in 6-directions/DOF, and relative motion between magnetic bodies 526I and 526II may be controlled, in various embodiments it may not be desirable to control motion in 6-directions/DOF. In certain applications, it may be advantageous to control motion of the mover 520 in three directions/DOF (e.g. X, Y and Rz, for example), in addition to the relative motion between magnetic bodies 526I and 526II. In such embodiments, it may be desirable to support the mover 520 with additional rolling or sliding bearing elements supported by a surface of a work body having a normal direction in the Z direction.

Figure 6A:
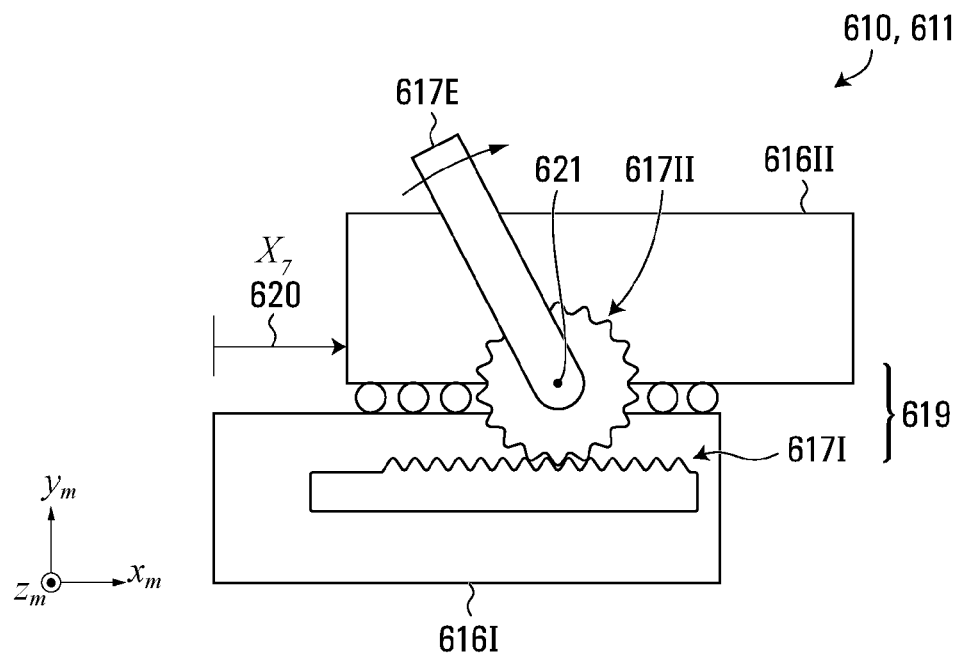
FIG. 6A is a top view of a mover according to one embodiment.
Figure 6B:
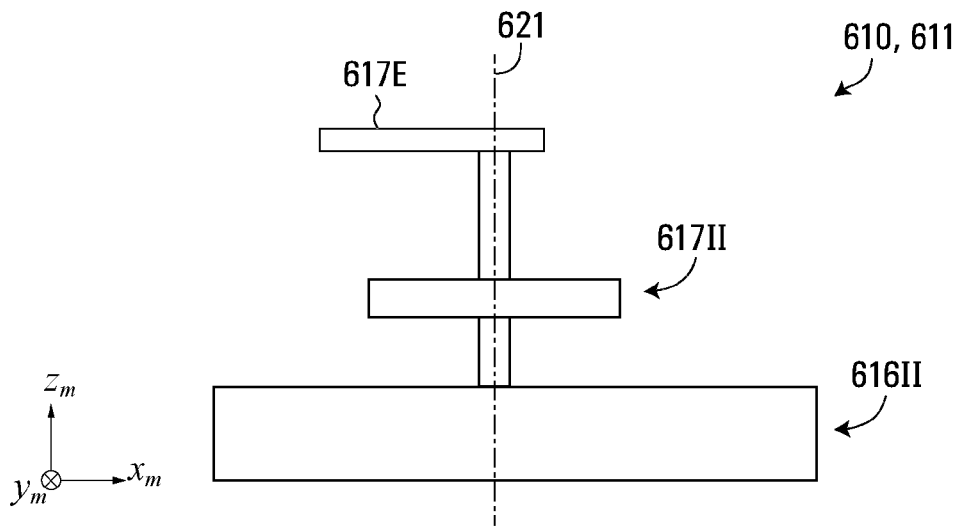
FIG. 6B is a side view of the mover shown in FIG. 6A.

Referring to FIGS. 6A and 6B, relative motion between first and second magnetic bodies 616I and 616II along a live-axis X7 may be generated or controlled according to another embodiment. Such relative linear motion may be useful in many automation applications, for example. FIG. 6A and FIG. 6B show a top view and a side view of a non-limiting example of an embodiment configured to transform linear relative motion between magnetic bodies 616I and 616II along the live axis X7 into rotational motion of at least one rotatable body 617 around an axis of rotation parallel to the Zm axis. In various embodiments, rotatable body 617 may comprises a gear assembly, a hinge assembly, or any other suitable rotatable assembly. In various embodiments, the mechanical link 619 comprises the at least one rotatable body 617. In other embodiments, the at least one rotatable body 617 may operate independently of the mechanical link 619.

As shown in FIG. 6A, magnetic bodies 616I and 616II are guided with mechanical link 619 to achieve independently controllable relative motion along live axis X7, using a suitable bearing solution 619. In the illustrated embodiment, the at least one rotatable body 617 comprises a rack 617-I fixed on the first magnetic body 16I, and a pinion 617-II operable to rotate around axis 621. In the illustrated embodiment, axis 621 is the Zm-axis fixed on magnetic body 616II. In various embodiments, the axis 621 may be disposed elsewhere on the mover. In the illustrated embodiment, linear relative motion along the live axis X7 between magnetic bodies 616II and 616I will be transformed into rotary motion of pinion 617-II around the axis 621 (fixed with the magnetic body 616II) by the rack-pinion mechanism. In the illustrated embodiment, an end effector 617-E is installed coaxially on pinion 617-II and configured to rotate around axis 621, and may be used for any suitable purpose, such as for the purpose of extending motion range. In various embodiments, any other suitable tool, mechanism, assembly, part, or body may be attached to pinion 617-II in order to effect any other purpose, for example. Although FIG. 6B shows a non-limiting example of an arrangement of the end effector 17-E and magnetic bodies 617II and 616II, which are located in different locations in the Xm-Ym plane, other arrangements are possible. It will be obvious to a person of skill in the art that rotational motion around axis 621 resulting from linear motion along live axis X7 may be significantly larger than any rigid body rotary motion of the mover 610.

More generally, rotatable body 617 may be considered to be a conversion mechanism operable to convert linear motion into rotational motion. In various embodiments, any other suitable conversion mechanism may be installed between the first and second magnetic bodies 616I and magnetic body 616II. Such a conversion mechanism may convert one or more types of relative motion between magnetic bodies 616I and 616II into one or more different types of extended motion of any other suitable tool, mechanism, assembly, part, or body. The range of extended motion of such an attached tool, mechanism, assembly, part, or body may be significantly larger than the motion range of magnetic bodies 616I and 616II in the direction of said extended motion. For the particular embodiment in FIGS. 6A and 6B, the conversion mechanism comprises a rotatable body 617 comprising a rack 617-I and a pinion 617-II, which converts the relative linear motion in the Xm direction relative motion (along live axis X7) into extended rotational motion of end effector 17-E around the Z axis, which may have a significantly larger motion stroke than each of magnetic bodies 616I and 616II's motion strokes in the direction of rotational motion around the Z axis.

Figure 7A:
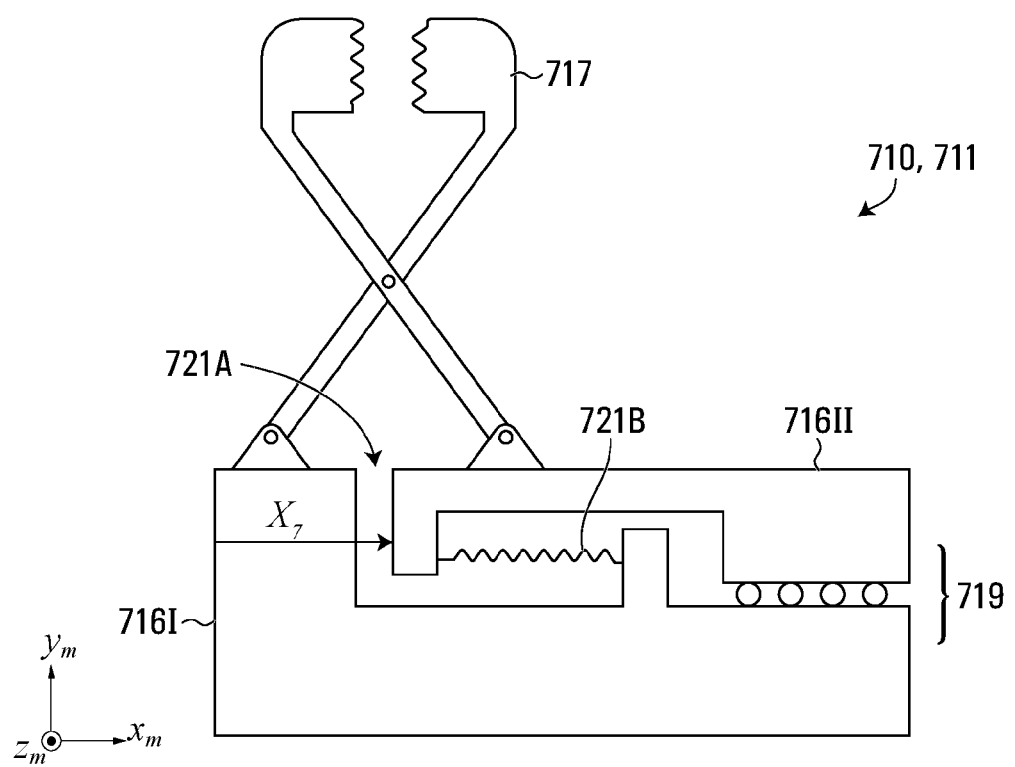
FIG. 7A is a top view of a mover according to one embodiment.

FIG. 7A shows another non-limiting embodiment utilizing relative motion between two magnetic bodies 716I and 16II of mover 710 along a live axis X7 magnetic bodies: the mover 710 comprises a first magnetic body 716I and a second magnetic body 716II, and a mechanical link 719 installed in between to constrain a first set of one or more DOF (Ym, Zm, RXm, RYm, RZm) relative motion and allow a second set of one or more DOF (Xm) relative motion. Although a corresponding work body such as a work body for mover 710 and the details of the magnetic bodies are not shown in FIG. 7A, it will be understood to those skilled in the art that these details can be designed in a suitable way, similar to what has been descripted previously in this document or elsewhere. In FIG. 7A, two ends of a tool 717 comprising opposing jaws are attached to magnetic bodies 716I and 716II respectively so that the Xm-direction relative linear motion can be converted into open, clamping, and close operation of the opposing jaws. In one embodiment, the tool 717 may comprise a plier-like end effector. In other embodiments, any suitable tool having one or more opposing jaws may be used. In various embodiments, a resiliently deformable component 721B may be optionally used to hold the tool 717 at an open (or alternatively closed) position in certain circumstances, such as power failure, for example. The resiliently deformable component 721B may be any suitable component, such as a spring, flexural component, or other resiliently deformable component.

Figure 7B:
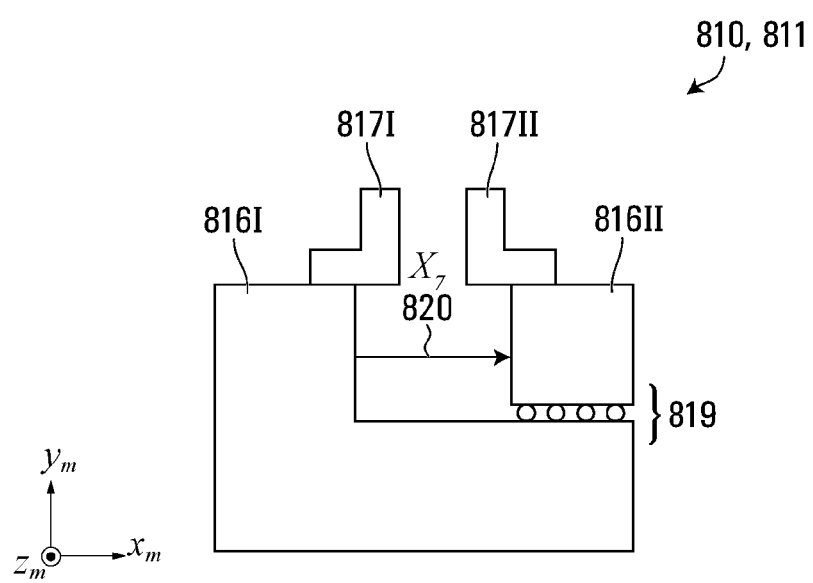
FIG. 7B is a top view of a mover according to one embodiment.

FIG. 7B shows another non-limiting embodiment utilizing the relative linear motion (along live axis X7) between two magnetic bodies 816I and 816II of mover 810. In the illustrated embodiment, most details in FIG. 7B are substantially similar to the embodiment in FIG. 7A, except that the tool 817 in FIG. 7B is a gripper comprising two (rigid or elastic) fingers (in another word, prongs), each comprising one of a set of opposable jaws. The first finger 817I installed on the first magnetic body 816I and the second finger 817II is installed on the second magnetic body 816II. According to the illustrated embodiment, relative motion in the Xm direction between magnetic bodies 816I and 816II along the live-axis X7 can result in motion between the first and second fingers 817I and 817II, which can be transformed into one or more opening, gripping, releasing, closing, or other such operations of the gripper 817. In various embodiments, the gripper 817 can be operated in a gap controlled mode (i.e. the opening gap between 817I and 817II may be controlled with suitable feedback to follow a reference command based on application requirements), in a force controlled mode (i.e. the gripping force may be maintained by following a reference command based on application requirements), in a hybrid mode by switching between force-controlled mode and gap-controlled mode from time to time, or in any other suitable operational mode. When the one or more fingers (or prongs) 817 are made of elastic or resiliently deformable materials, controlling the relative motion between the first and second magnetic bodies may help control the gripping force applied on a workpiece (not shown) clamped by the fingers 817I and 817II. In various embodiments, changing the relative positions between the first and second magnetic bodies may proportionally change the gripping force applied on the gripped workpiece. It should be noted that the link assembly in FIG. 7B may comprise a resiliently deformable component in a way similar to 721B installed in the embodiment in FIG. 7A to attain gripping force between the two fingers 817I and 817II.

Figure 7C:
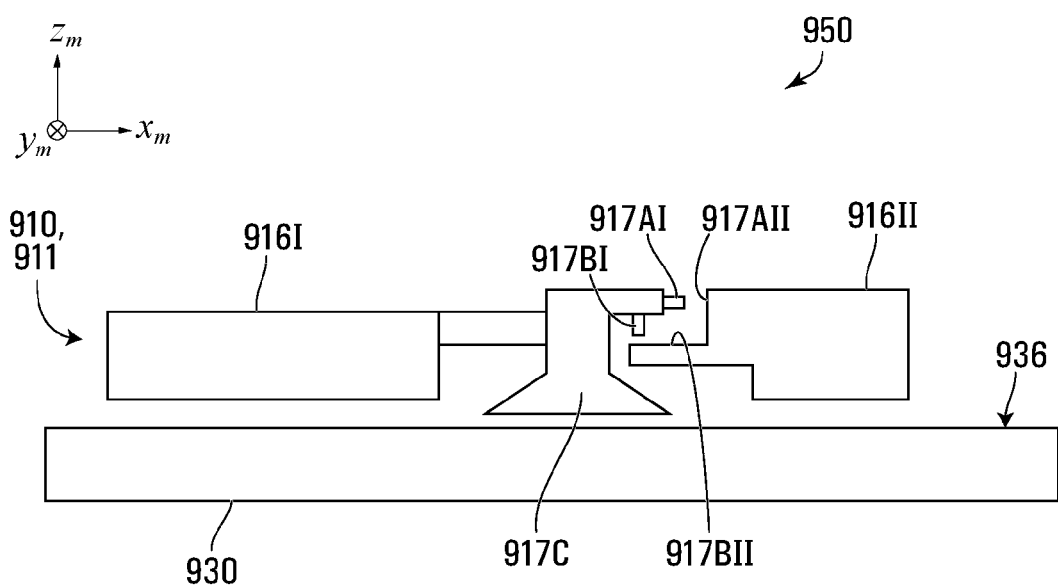
FIG. 7C is a side view of an apparatus according to one embodiment.

FIG. 7C shows another non-limiting embodiment which utilizes the relative motion between two magnetic bodies 916I and 916II of a mover 910. The system in FIG. 7C comprises a mover 910, and a work body 930. In various embodiments, the work body may comprise a work body. The mover 910 comprises a first magnetic body 16I and a second magnetic body 16II. The magnetic bodies contain suitable magnetization elements, such as magnets, that may interact with suitable currents driven into suitable electrically conductive elements in the work body 930 so that the mover 910 can be controllably moved in at least 2 degrees of freedom (e.g. translation in the X and Y directions), while the first magnetic body 16I and the second magnetic body 16II may be controllably moved relative to each other in at least one degree of freedom (including but not being limited to linear motion between the first magnetic body 916I and the second magnetic body 916II in the X direction). Examples of suitable magnetic bodies and suitable work body electrically conductive element layouts and suitable currents to be driven into work body electrically conductive elements have been discussed previously and may be applied with respect to this illustrated embodiment.

In various embodiments, the mover 910 can achieve up to 6 degrees of freedom with respect to its rigid body motion in addition to at least one degree of freedom of relative motion between magnetic bodies 916I and 916II. In various embodiments, a mechanical link (not shown) may be configured to be installed between magnetic bodies 916I and 916II configured to guide their relative motion in the X direction.

Referring to FIG. 7C, an actuator assembly 917 is installed on the first magnetic body 916I. In the illustrated embodiment, the actuator assembly comprises a resiliently deformable chamber 917C, such as a vacuum cup, for example, and a first actuator 917AI. A first activator 917AII is installed on the second magnetic body 916II and can be used to actuate the first actuator 917AI upon relative motion between first and second magnetic bodies 916II and 916I. In various embodiments, the resiliently deformable chamber may be similar to a "thumb pump"; by actuating the first actuator 917AI, a vacuum can be generated inside the resiliently deformable chamber when pushed against a working surface (such as working surface 926 of the work body 930). The controllable linear relative motion between magnetic bodies 916I and 916II can be utilized to activate the vacuum. For example, the whole mover 910 in FIG. 7C may be operated to push against working surface 926; magnetic body 916I can be controllably held stationary while the magnetic body 916II is commanded to move relative to the magnetic body 916I in the X direction so that the first activator 917AII (including but not being limited to a surface) comes into contact with the first actuator 917AI to actuate the first actuator 917AI.

In various embodiments, the actuator assembly 917 may comprise a second actuator 917BI installed on the first magnetic body 916I and a corresponding second activator 917BII on the second magnetic body 916II. The second actuator 917AI may be operable to release a vacuum built up in the resiliently deformable chamber 917C, for example; i.e. when the second activator 917BII pushes against the second actuator 917BI in response to controllable relative motion in the Z direction between magnetic bodies 916I and 916II, the resiliently deformable chamber 917C may be caused to release from the work surface and be exposed to the atmosphere. In various embodiments, such a means for vacuum generation may be used in an emergency landing context: for example, when the mover 910 is operated in a vertical orientation (e.g. when gravity is in the Y direction), the on-mover actuatable vacuum system may help hold the mover 910 on the work body 930 to survive the situation of power failure, for example; when power is restored, the mover 910 may be released from the working surface 926 by releasing the vacuum generated within the resiliently deformable chamber. In another exemplary embodiment, the resiliently deformable chamber may open upward in the Z direction instead of downward in the −Z direction toward the work body. In such an embodiment, any vacuum generated in response to linear motion in the X-direction may be used to hold a part, tool, or other body when said part, tool, or other body is dropped on the upward-facing resiliently deformable chamber. A second actuator such as second actuator 917BI may be configured to release any vacuum generated within the resiliently deformable chamber in this embodiment, thereby releasing the part, too, or other body.

Figure 8A:
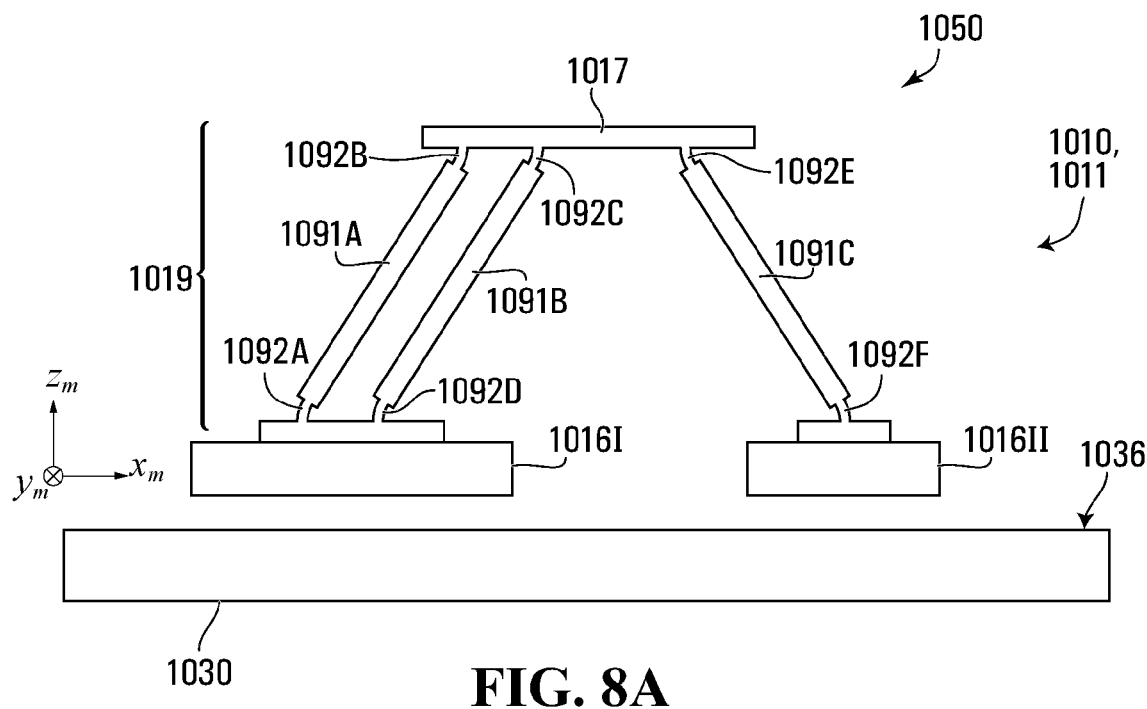
FIG. 8A is a side view of an apparatus according to one embodiment.

Referring to FIG. 8A, a magnetic movement apparatus 1050 according to another embodiment is shown. The magnetic movement apparatus 1050 comprises a mover 1010 and a work body 1030. The work body 1030 comprises a plurality of suitable electrically conductive elements that may conduct current to create magnetic fields which may then interact with magnet arrays on the mover 1010 to produce actuation forces and/or torques to cause the mover 1010 to controllable move in at least two degrees of freedom (e.g. in the X and Y directions). Such controllable motion may be effected in a similar manner as that which has already been described above. In various embodiments, the mover 1010 may be levitated near the work body 1030 without any mechanical contact. In various embodiments, the mover 1010 may be able to controllably move in at least 6 degrees of freedom.

In the illustrated embodiment, the mover 1010 comprises a first magnetic body 1016I and a second magnetic body 1016II, each comprising one or more magnet arrays that can interact with currents flowing in the electrically conductive element traces of work body 1030 to cause forces and/or torques to be applied to the magnet arrays. A mechanical link 1019 connects first and second magnetic bodies 1016I and 1016II together to constrain relative motion between the first and second magnetic bodies 1016I and 1016II in a first set of one or more directions/DOF (in the current embodiment, the Ym, RXm, and RZm directions) and to allow relative motion between the first and second magnetic bodies 1016I and 1016II in a second set of one or more directions/DOF (in the illustrated embodiment, the Xm, Zm, and RYm directions). The mechanical link 1019 according to the current embodiment comprises a plurality of hinges (1092A through 1092F) and a plurality of connectors (1091A through 1091C) extending substantially in the Zs direction. Generally, a hinge connecting two connectors allows relation motion between said connectors in only single rotational degree of freedom around the hinge axis; i.e. if a first connector is fixed to be stationary, then the other connector connected to the first connector via a hinge may move only in single degree of freedom.

Figure 8B:
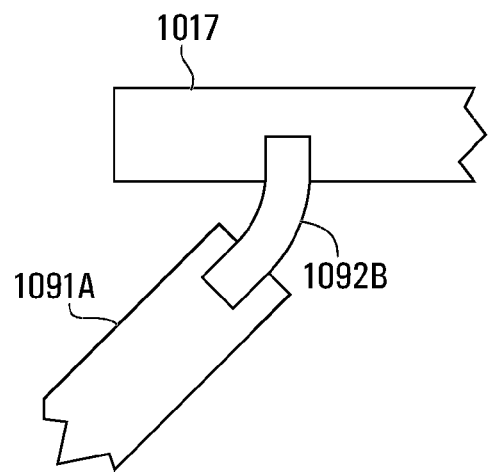
FIG. 8B is a side view of a hinge according to the embodiment shown in FIG. 8A.

Generally, any hinge contemplated herein, unless otherwise specified, can be implemented in any number of ways known in the art, such as with monolithic flexural bearings or composite flexural bearings, as shown in FIG. 8B for example, or by rolling element/sliding bearings or revolute joints or any other type of hinge known in the art, for example. In various embodiments, cylindrical joints may be used to replace hinges shown in FIG. 8B.

Referring to FIG. 8A, a linkage body 1017 (such as a part carrier, for example) is connected to three connectors (1091A to 1091C) via hinges 1092A, 1092C, and 1092E. In such an arrangement, by transforming the relative motion in the Xm-direction between magnetic bodies 1016I and 1016II into motion of the linkage body 1017 in the Z-direction, the linkage body 1017 may be able to achieve a significantly higher range of motion in the Z-direction than a comparable range of controllable motion of the magnetic bodies 1016I or 1016II.

In the illustrated embodiment, the mechanical link 1019 comprises a "four bar linkage" (magnetic body 1016I, connector 1091A, connector 1091B, and linkage body 1017) in combination with a "single link" (magnetic body 1016II, connector 1091C, linkage body 1017); in this arrangement, the four bar linkage connects to the first magnetic body 1016I; the single link is attached at one end to the second magnetic body 1016II with a hinge such as a revolute joint, and is attached at the second end by a hinge such as a revolute joint to the linkage body 1017. In this exemplary embodiment, the mechanical link 1019 itself comprises a conversion mechanism, which converts relative motion between the magnetic bodies 1016I and 1016II in the Xm-direction into Z-direction motion of the linkage body 1017. In various embodiments, the Z-motion stroke of 1017 may be significantly larger than the Z-motion stroke of magnetic bodies 1016I and 1016II. It should be noted that when driving the first and second magnetic bodies (1016I and 1016II) with the same displacement in the Xm direction, the linkage body 1017 will be driven with the same displacement in the Xm direction as well. In order to drive the linkage body in the Xm direction, each of the first and second magnetic bodies may be driven with a force in the Xm direction.

Each of magnetic bodies 1016I and 1016II may comprise a plurality of magnet arrays. In various embodiments, each of magnetic bodies 1016I and 1016II may comprise four magnet arrays 1012A, 1012B, 1012C, and 1012D in a pattern shown generally in FIG. 8C; as result, each magnetic body 1016I and 1016II may have 8 directions/DOF of controllable movement, i.e. work body 1030 may be able to generate up to 8 independent forces on each magnetic body 1016I and 1016II. By using suitable position feedback methods, each magnetic body 1016I and 1016II alone may be capable 6-DOF controllable motion in levitation mode and, three in-plane controllable motion in sitting mode. However, due to the constraint imposed by the mechanical link 1019, in various embodiments some of the controllable motion of 1016I and some of the controllable motion of 1016II may not be able to be independently achieved, and the whole mover 1010 may not be capable of controllable motion in 12 independent directions/DOF. When the mechanical link 1019 constrains relative motion between magnetic bodies 1016I and 1016II in three directions/DOF (for example, the Ym, Rzm, and Rxm directions), the Ym/Rzm/Rxm motion of magnetic body 16I cannot be controlled independently from the Ym/Rzm/Rxm motion of the magnetic body 1016II. In other words, control of the Ym/Rzm/Rxm motion of both magnetic bodies 1016I and 1016II needs to be coordinated. For example, in order to control the Ym motion of the linkage body, position feedback describing the position of the linkage body in the Ym direction (i.e. "Ym-direction coordinated position feedback" of the linkage body) can be calculated based on the Ym position of the magnetic body 1016I and the Ym position of the magnetic body 1016II (for example, by calculating the average of the Ym position of 1016I and the Ym position of 1016II). In various embodiments, the Ym-direction coordinated feedback may be a weighted sum of the Ym positions of the first and second magnetic bodies and weighing factors may be determined by the geometric length of the linkage bars in the mechanical link Based on this Ym-direction coordinated position feedback signal, a controller such as those described in reference to FIGS. 1A and 1B, for example, can use a suitable algorithm to calculate the required coordinated forces to apply to the magnetic bodies 1016I and 1016II in the Ym-direction, and then accordingly cause suitable current command signals to an amplifier such as those described in reference to FIGS. 1A and 1B, for example, in order to drive corresponding currents into selected electrically conductive elements in the work body 1030. One way to apply forces on each of the magnetic body may be to drive each of the first and second magnetic bodies with half of the calculated coordinated force in the Ym direction so that both the first and second magnetic bodies experience some of the required coordinated force calculated above in the Ym direction.

Control of motion in the Rzm and Rxm and Rym directions can be implemented in a similar way with suitable modification. In order to control the linkage body's rotational motion around an axis of rotation in the Zm direction independently of the translation motion in the Xm, Ym, and Zm directions, a coordinated feedback (the linkage body's rotational motion around Zm axis) can be calculated by the average of a rotary position around Zm of the first and second magnetic bodies or alternatively by using the difference of the first and second magnetic bodies' Ym direction motion divided by the Xm-direction spacing between the first and second magnetic bodies. Based on the calculated coordinated feedback, a coordinated force can be calculated by a controller, such as any controller contemplated herein, based on a suitable feedback control algorithm. Accordingly, suitably calculated current commands sent to the magnetic field modulator to drive appropriate currents in selected electrically conductive elements of the work body to generate the calculated coordinated force to be applied on the first and second magnetic bodies oppositely in the Ym direction.

In order to control the linkage body's rotational motion around the Xm direction independently of the translation motion in the Xm, Ym, and Zm directions and the rotational motion around the Zm direction, a coordinated feedback (the linkage body's rotational motion around the Xm axis) can be calculated by averaging the rotational positions of the first and second magnetic bodies around the Xm axis, or more generally, a weighted sum of the rotational positions of the first and second magnetic bodies around the Xm axis. Based on the calculated coordinated feedback, a coordinated torque around the Xm direction can be calculated using a suitable feedback control algorithm. The calculated coordinated torque can be applied on the first and second magnetic bodies simultaneously around the Xm direction through suitably calculated current commands sent to the magnetic field modulator.

In order to control the linkage body's rotational motion around Ym direction independently of the translation motion in the Xm, Ym, and Zm directions and the rotational motion around Zm and Xm directions, a coordinated feedback (the linkage body's rotational motion around Ym axis) can be calculated by the difference between the positions of the first and second magnetic bodies in the Zm direction divided by the spacing between the first and second magnetic bodies in the Xm direction, or alternatively, by using the first magnetic bodies rotational position around Ym. Based on the above calculated coordinated feedback, a coordinated force around the Ym direction can be calculated using a suitable feedback control algorithm. The calculated coordinated force can be applied on the first and second magnetic bodies simultaneously around the Zm direction but oppositely through suitably calculated current commands sent to the magnetic field modulator.

In various embodiments, the mechanical link 1019 may allow relative motion between magnetic bodies 1016I and 1016II to be controlled in 3 of the second set of directions/DOF (Zm, Xm, Rym); therefore the Zm/Xm/Rym motion of magnetic body 1016I can be independently controlled from that of magnetic body 1016II, and Zm/Xm/Rym motion of 1016II can be independently controlled from that of magnetic body 1016I. As a result, relative motion between magnetic bodies 1016I and 1016II (in the Xm, Zm, and RYm directions) may be able to be controlled independently.

Figure 8C:
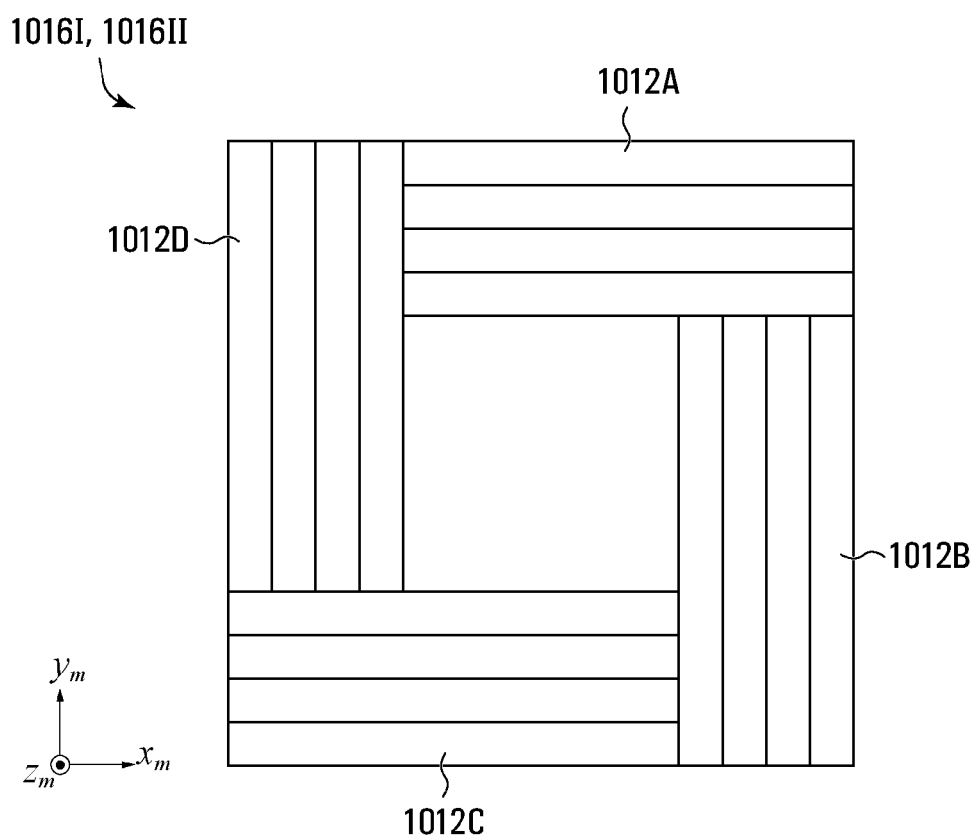
FIG. 8C is a cross-sectional top view of a mover according to the embodiment shown in FIG. 8A.
Figure 8D:
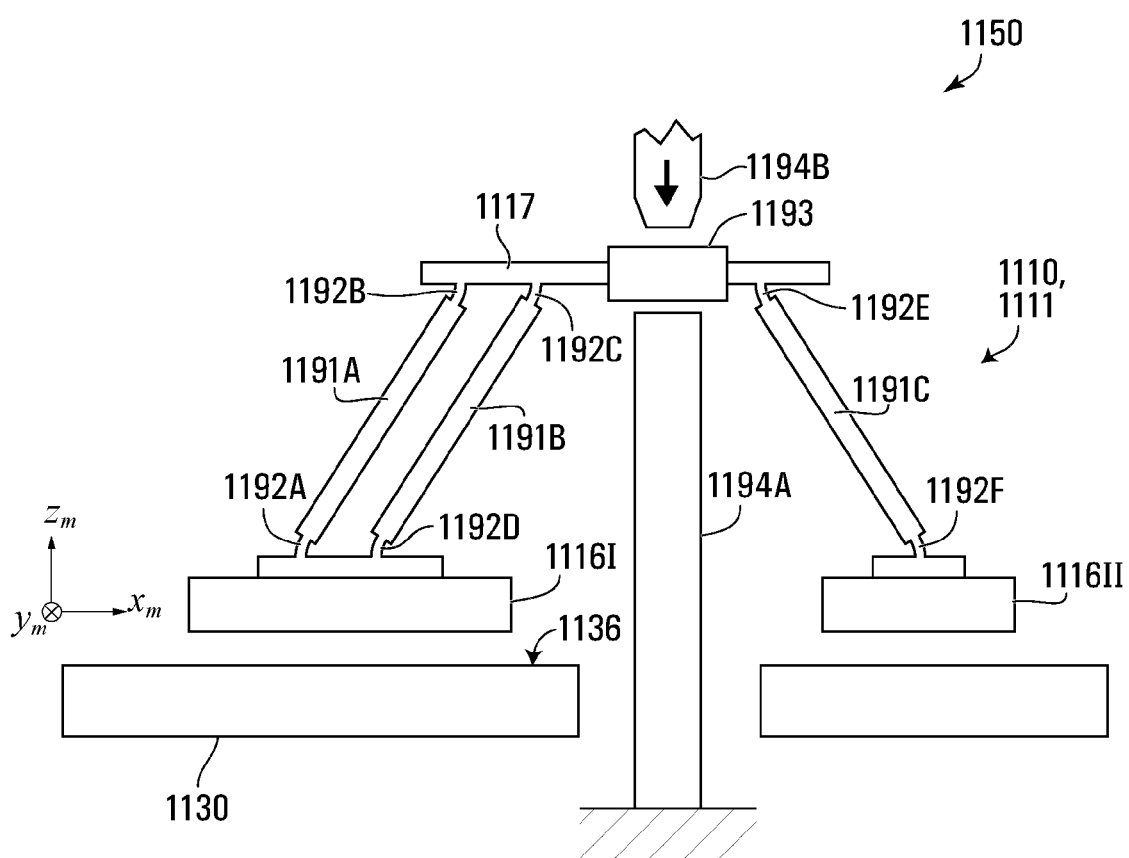
FIG. 8D is a side view of an apparatus according to one embodiment.

FIG. 8D shows a non-limiting embodiment utilizing a magnetic movement apparatus 1150 similar to that shown in FIGS. 8A-8C capable of extended motion in the Z direction. The magnetic movement apparatus 1150 comprises a linkage body 1117 (such as a workpiece holder, for example) which in the illustrated embodiment is configured to carry a workpiece 1193. The robot device 1111 may position the workpiece 1193 between a pair of members 1194A and 1194B having opposing surfaces and configure to move up and down in the Z-direction (e.g. stamping tools) for a high force stamping operation, for example, and to then carry the work piece 1193 away afterwards. In the illustrated embodiment, there is a space in the XY plane of a work body 1130 to accommodate the bottom member 1194A (which may comprise a supporting pillar, for example). In various embodiments, the space may be sized such that forces generated by the stamping process cannot transfer to the work body 1130, given that repeated high-magnitude forces may destroy or otherwise impede the operation of the electrically conductive elements inside work body 1130. The robot device 1111 may be configured to carry the workpiece 1193 in the X and Y directions using the its capability to move in 6 directions/DOF, as well as to drop down or lift up the workpiece 1193 in Z-direction by controllably moving the linkage body 1117 holding the workpiece 1193 in the Xm-direction in response to relative motion between magnetic bodies 1116I and 1116II.

Figure 8E:
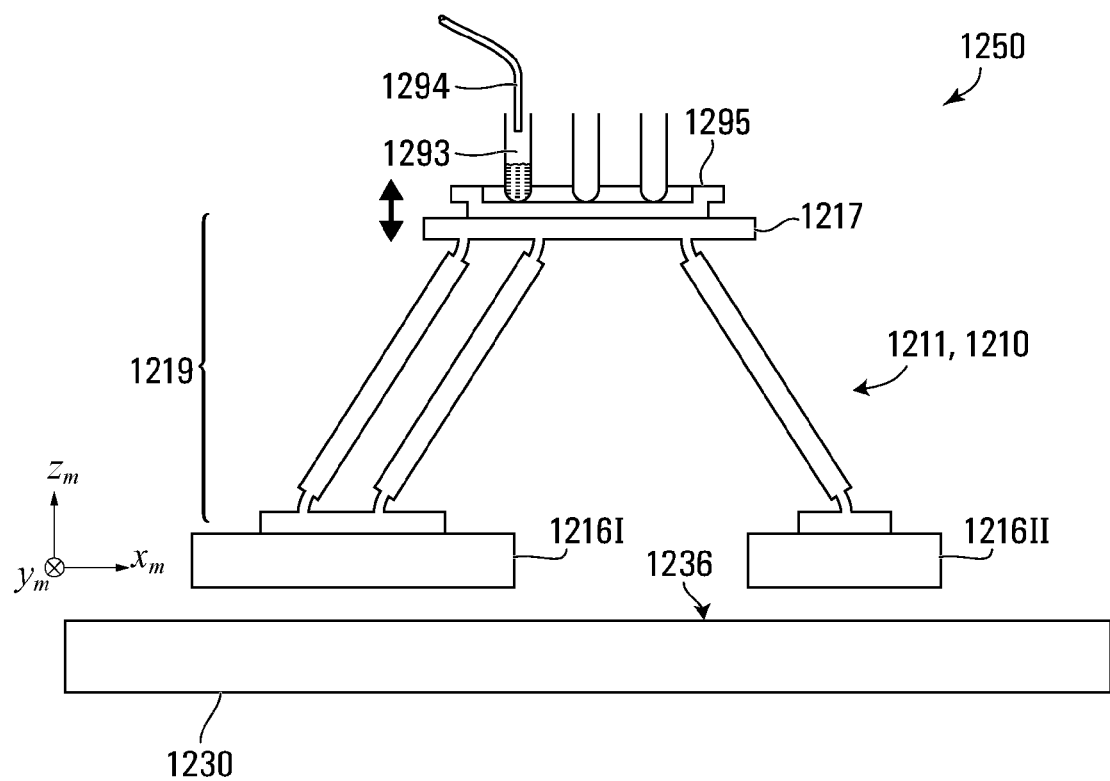
FIG. 8E is a side view of an apparatus according to one embodiment.

FIG. 8E shows another non-limiting embodiment of a magnetic movement apparatus 1250 comprising a linkage body 1217 and utilizing a robotic device 1211 capable of extended Z motion. In the illustrated embodiment, a holding body 1295 may be optionally installed on the linkage body 1217. Generally, the holding body 1295 may be any body or structure configured to hold one or more of an object; in the illustrated embodiment, the holding body 1295 comprises a vial holder configured to hold one or more vials. In other embodiments, the holding body 1295 may be configured to hold any other type of object.

In the illustrated embodiment, the robotic device 1211 is configured to position one or more vials with one or more stationary liquid filling lines in the X and Y direction by moving in at least 2 directions/DOF during a filling process for the vials. In various embodiments, the vials may be lowered gradually by the robotic device 1211 as the liquid fills up to maintain nearly constant distance between the filling line bottom opening and the liquid top surface inside said vials, by causing the linkage body 1217 to move in the Z-direction in response to controlling relative motion in the Xm-direction between magnetic bodies 1216I and 1216II. In this embodiment, the filling line may be held stationary during the whole process. The liquid may be filled into vials one by one, taking advantage of the long-stroke 3D (X, Y, and Z) positioning capability of the robot device 1211, or alternatively the vials may be filled simultaneously when the linkage body 1217 is held stationary.

Figure 8F:
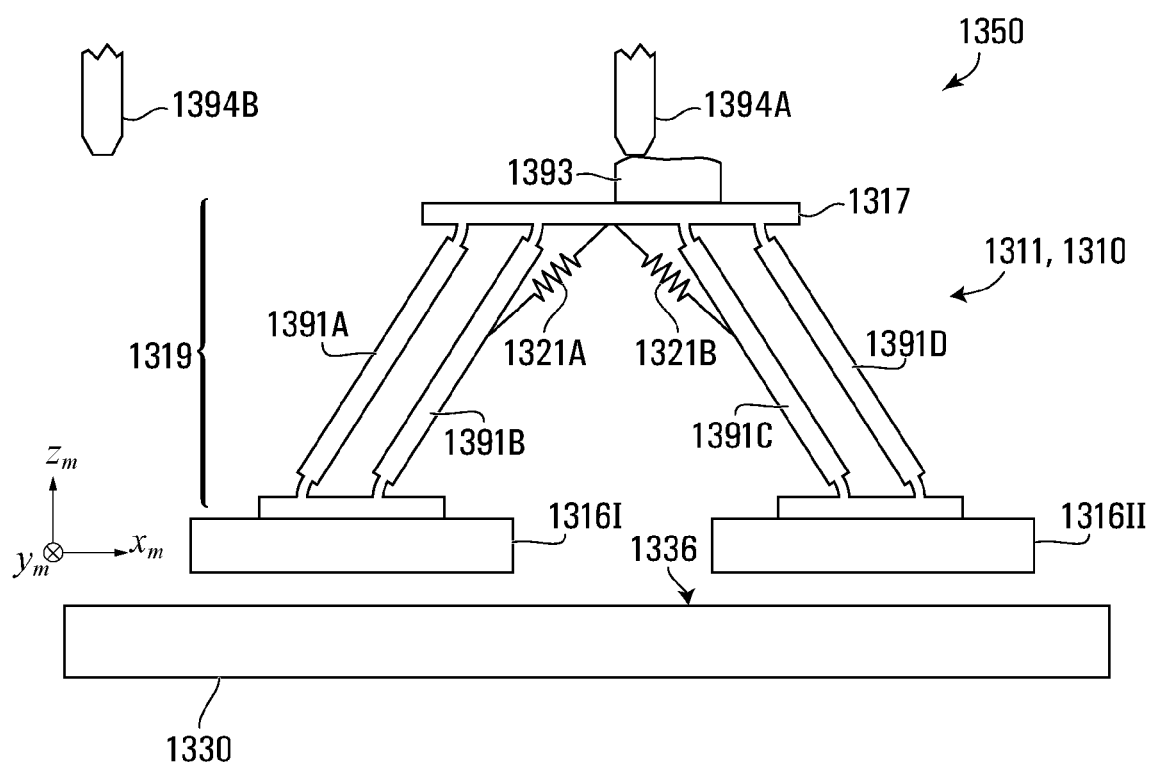
FIG. 8F is a side view of an apparatus according to one embodiment.

FIG. 8F shows another non-limiting embodiment of a magnetic movement apparatus 1350 comprising a linkage body 1317 capable of extended motion in the Z-direction. The robotic device 1311 comprises a mover 1310 comprising two magnetic bodies 1316I and 1316II capable of interacting with currents flowing through electrically conductive elements inside work body 1330 as previously described to control the motion of the mover 1310 in 6 directions/DOF in addition to controlling relative motion between magnetic bodies 1316I and 1316II in one or more directions. A mechanical link 1319 comprising the linkage body 1317, connectors 1391A, 1391B, 1391C, 1391D, and hinges (e.g. hinge joints or cylindrical joints) connecting them together constrains the relative motion between magnetic bodies 1316I and 1316II in a first set of 4 directions/DOF (Ym, RXm, RYm, RZm) and allows the relative motion between magnetic bodies 1316I and 1316II in a second set of 2 directions/DOF (Xm, Zm). The difference between the embodiments illustrated in FIGS. 8F and 8E is that there is an extra fourth connector 1391D in the embodiment shown in FIG. 8F, which further constrains relative motion between the magnetic bodies 1316I and 1316II in the RYm-direction. The linkage body 1317 may be configured to carry a part 1393, which may be positioned below a tool configured to work on the part, such as a 3D printing head (or nozzle) 1394A for example, that may be held stationary or be operated with additional actuators (not shown). The robotic device 1311 may be configured to position the part using relatively long strokes in up to 3 linear directions/DOF (X, Y, Z) for a 3D printing operation, for example. Such a long stroke in Z-direction may be significantly larger than the gap distance in the Z-direction between a working surface of the work body 1330 and bottom surfaces of the magnetic bodies 161 and 16II, where the Z-direction may be the normal direction of the working surface. Such a long stroke in Z-direction may be a few centimeters or larger. In this way, a 3D printing operation may be implemented in a potentially clean way without any lubricant, which is usually required in conventional bearings. Furthermore, all required motion may be able to be provided by such a robotic device without any mechanical friction or contact, which may be highly desirable in 3D bioprinting used to produce live organs in a sterile environment. In various embodiments, a plurality of tools such as printing head 1394B may be implemented, and the robotic device 1311 may be configured to carry the part 1393 among different printing heads for different purposes (such as to print using different materials, for example). Usually in Bioprinting, different cells are needed to produce a functional organ; with multiple parallel working printing heads, each head may be configured to deposit one or more dedicated material(s). Multiheads may also be able to be used to pipeline the printing process, which may improve productivity.

In various embodiments, resiliently deformable components 1321A and 1321B can be optionally installed linking one or more connectors to the linkage body 1317 in order to balance gravity-induced potential energy variation during motion of the linkage body 1317 in the Z direction. Resiliently deformable components 1321A and 1321B may be springs, for example. When the carrier plate moves in the −Z direction and gravity is in the −Z direction, then gravity induced potential energy will decrease, and the potential energy stored in one or both of resiliently deformable components 1321A and 1321B may increase, and as a result the overall system potential energy variation can be reduced, which helps reduce the required X-direction lateral force required to be applied on magnetic bodies 1316I and 1316II, which may help reduce power consumption. Other purposes for installing resiliently deformable components may be to maintain certain relative positions among the components of the magnetic movement apparatus 1350 during power off. Non-limiting examples of appropriate resiliently deformable components include linear springs and rotational springs, for example.

Figure 8G:
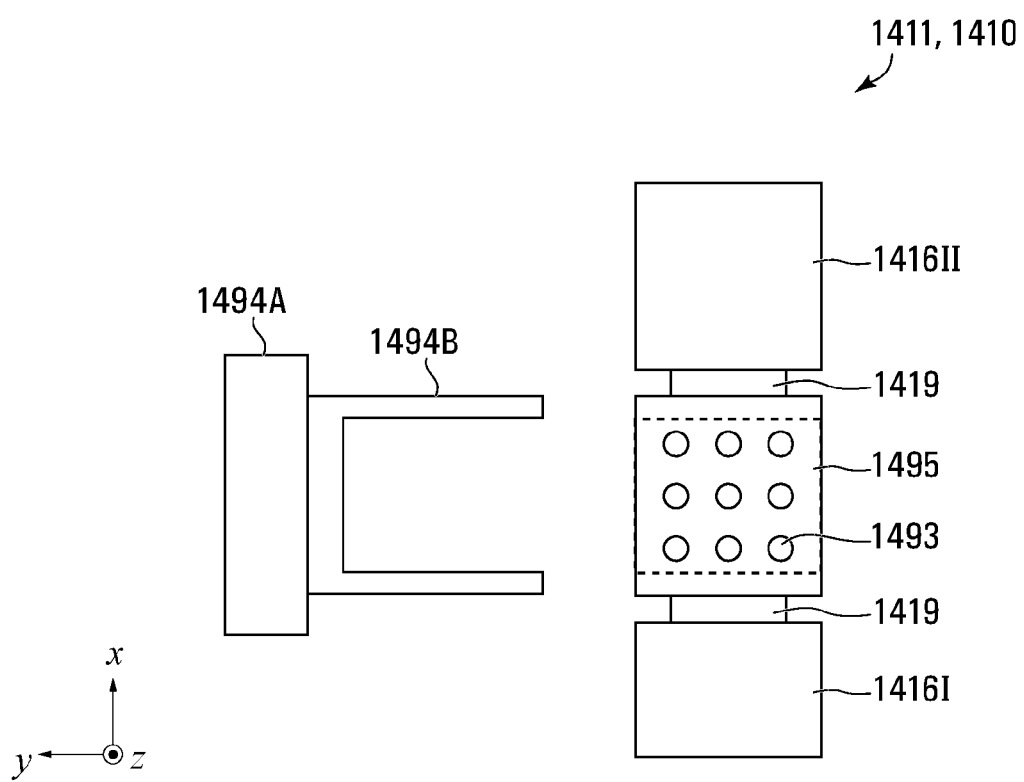
FIG. 8G is a top view of an apparatus according to one embodiment.

FIG. 8G shows a non-limiting embodiment of a robotic device 1411 capable of extended motion in the Z direction. A robotic device 1411 (comprising a mover 1410) may be designed substantially similar to those described in reference to FIGS. 8A through 8F. The robotic device 1411 may carry a holding body such as vial holder 1495 which may be configured to carry one or more vials 1493. During a vial filling process, it may be important to accurately control the filled amount for economic and/or medical reasons, for example. As such, the illustrated embodiment includes a weighing station 1494A comprising a carrying fork 1494B, configured such that any part loaded onto the carrying fork 1494B may be weighed accurately. The robotic device 1411 may carry one or more vials 1493 through the following process, using relative motion between magnetic bodies 1416I and 1416II and corresponding resultant vertical motion of the vial holder 1495 as described in relation to previous embodiments: a) raising up the vials in the Z direction and move in the +Y direction toward the carrying fork 1494B without contacting the carrying fork 1494B; b) lowering down the vial holder 1495 to lower the vials 1493 (and the vial holder 1495) on to the carrying fork 1494B in order to further disengage from the vials for a weighing operation; and c) raising up the vials 1493 in the +Z direction again to carry the vials 1493 away from the carrying fork 1494B and then moving in the −Y direction to move away from the carrying fork 1494B for a subsequent operation process (such as filling the vials again if they have not been filled enough, or for a capping operation, for example).

Figure 8H:
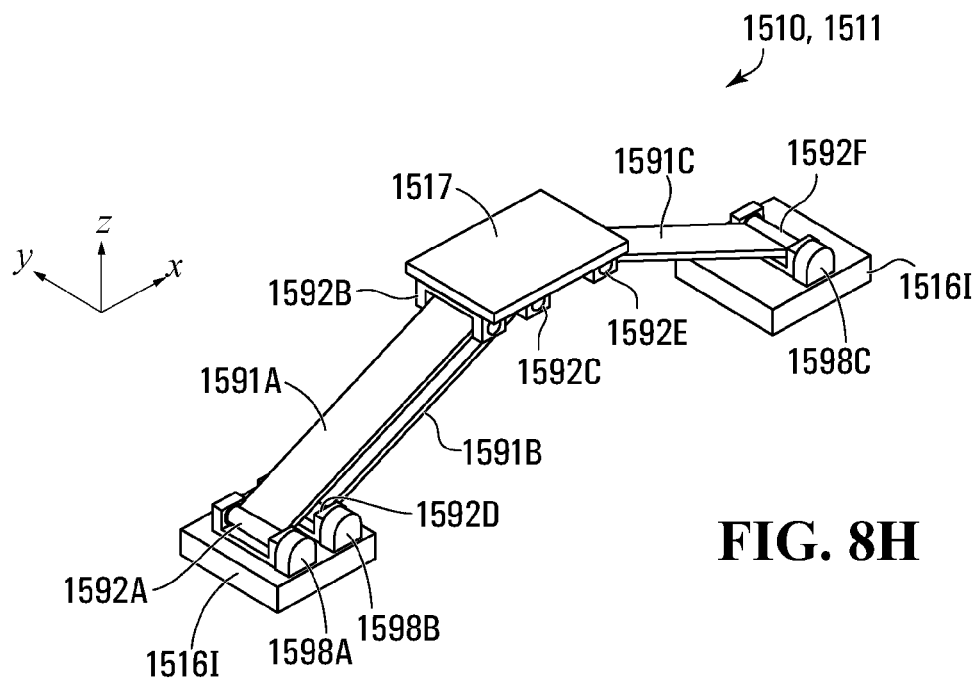
FIG. 8H is an isometric top view of a mover according to one embodiment.
Figure 8I:
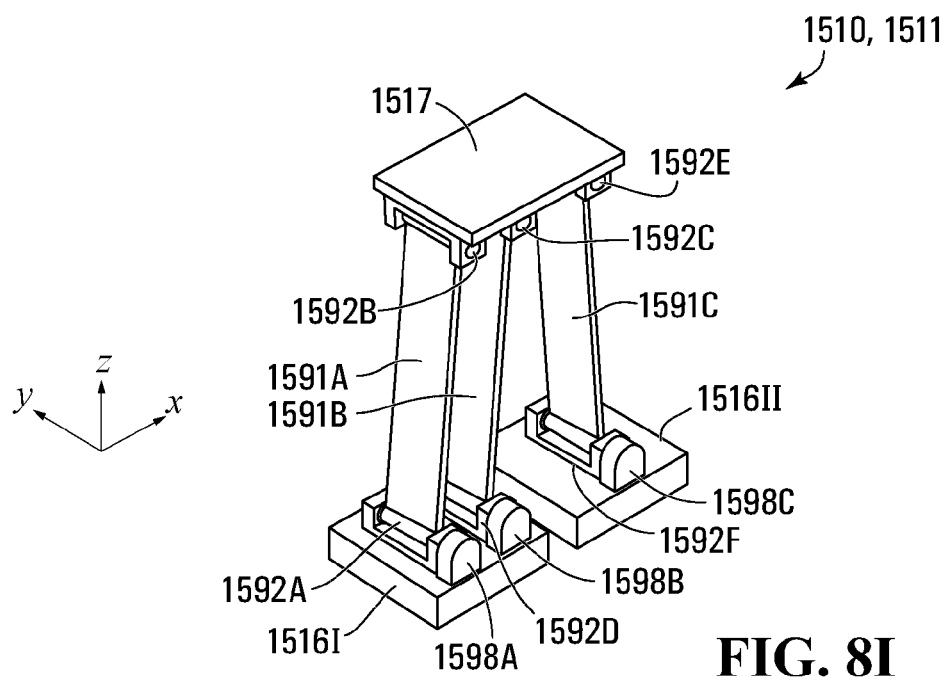
FIG. 8I is an isometric top view of the mover shown in FIG. 8H.

FIG. 8H and FIG. 8I together show a non-liming exemplary embodiment of a magnetic movement apparatus. The illustrated embodiment includes a robotic device 1511 which is substantially similar to the robotic device 1011 in FIG. 8A. However, in the illustrated embodiment, the hinges of robotic device 1511 in FIG. 8H/8I comprise cylindrical joints rather than hinge joints. Although a work body is not shown in FIG. 8H and FIG. 8I in order not to obscure the presentation of the embodiment, it should be understood to those skilled in the art that the magnetic movement apparatus in FIGS. 8H and 8I may further comprise one or more work bodies, as well as any components described in relation to any previous embodiment disclosed herein, such as any component described in relation to FIG. 8A, for example. The robotic device 1511 comprises a mover 1510. The mover 1510 comprises two magnetic bodies: a first magnetic body 1516I and a second magnetic body 1516II. Each of magnetic bodies 1516I and 1516II comprises one or more magnet arrays that can interact with currents flowing in the electrically conductive element trace of work body to produce forces and/or torques. A mechanical link 1519 connects magnetic bodies 1516I and 1516II together to constrain relative motion therebetween in a first set of one or more directions/DOF (Ym, RXm, RZm) to allow relative motion therebetween in a second set of one or more DOF (Xm, Zm, RYm).

In the illustrated embodiment, the mechanical link 1519 comprises a plurality of cylindrical joints (1592A to 1592F) and a plurality of connectors (1591A to 1591C) extending substantially in the Ym direction. In various embodiments, the connectors may be connecting plates or other rigid or substantially rigid bodies operable to connect the magnetic bodies 1516I and 1516II to the linkage body 1517. Generally, a cylindrical joint connecting two rigid bodies allows relation motion therebetween in only single rotational degree freedom around the joint axis. In the illustrated embodiment, connecting a linkage body 1517 (which may comprise a part carrier, for example) with three connectors (1591A to 1591C) via cylindrical joints, the linkage body 1517 may be able to achieve extended motion in the Z direction significantly larger than a range of motion in the Z direction achievable by one or both magnetic bodies 1516I and 1516II, by transforming the relative motion in the Xm-direction between magnetic bodies 1516I and 1516II into motion in the Z direction of the linkage body 1517. The mechanical link 1519 comprises a "four bar linkage" (magnetic body 1516I, connectors 1591A and 1591B, and linkage body 1517) and a single link (connector 1591C); the four bar linkage connects to the first magnetic body 1516I; the single link is attached at one end to the second magnetic body 1516II with a revolute joint, and attached at the second end by a revolute joint to the linkage body 1517.

FIG. 8H shows the linkage body 1517 operated at a low-Z position, for example by driving magnetic bodies 1516I and 1516II away from each other in the Xm direction. FIG. 8I shows the linkage body 1517 is operated at a high-Z position by for example driving magnetic bodies 1516I and 1516II towards each other in the Xm direction. Each of magnetic bodies 1516I and 1516II may comprise a plurality of magnet arrays. In particular embodiments, each of magnetic bodies 1516I and 1516II may comprise 4 magnet arrays such as magnetic arrays 1012A, 1012B, 1012C, 1012D shown in FIG. 8C and arranged in a similar pattern; as a result, each of magnetic bodies 1516I and 1516II may be capable of moving in up to 8 directions/DOF, i.e. a work body (not shown in FIG. 8H and FIG. 8I) may generate up to 8 independent forces on each of magnetic bodies 1516I and 1516II. Using suitable position feedback methods, magnetic body 1516I may be controllably moved in up to 6 directions/ DOF, and the relative motion between magnetic bodies 1516I and 1516II (in the Xm, Zm, and RYm directions) can also be controlled independently. In various embodiments, a suitable position feedback method may comprise the control method described in reference to FIGS. 8A-8C, which may be similarly applied to the embodiment illustrated in FIG. 8H and FIG. 8I.

In various embodiments, a robotic device such as robotic device 1511 may optionally comprise one or more brake (or lock) devices, shown in FIGS. 8H and 8I as 1598A, 1598B, 1598C. Each brake 1598 may be associated with a particular cylindrical joint, and may be activated in one of a number of different ways, such as wirelessly by receiving a wireless signal and/or by using an on-mover installed battery and actuators, or may be activated in a collaborative way or in a automatic/self-activating way as described in further detail below in reference to FIGS. 18 and 19. In various embodiments when the gravity is in the −Z direction, such brakes may help reduce system power consumption: for example, lateral X-direction actuating forces from a work body (not shown) may be required in FIG. 8H to carry a load on the linkage body 1517 without any brakes; when one or more such brakes are activated, such lateral forces may not be necessary, and power consumption may thus be reduced. When one or more such brakes is deactivated, a corresponding cylindrical joint may allow rotational relative motion between two connected parts, for example; when the brake is activated, the corresponding cylindrical joint may constrain all relative motion between two connected parts, and the two parts may be caused to move together as a rigid body. When the brakes (1598A, 1598B, 1598C) are deactivated, the mechanical link 1519 may constrain relative motion between the magnetic bodies 1516I and 1516II in the first set of 3 directions/DOF (Ym, RXm, RZm), and may allow relative motion between the magnetic bodies 1516I and 1516II in the second set of 3 directions/DOF (Xm, Zm, RYm). When the brakes (98A, 98B, 98C) are activated, the mechanical link 1519 may constrain relative motion between the magnetic bodies 1516I and 1516II in an extended first set of 6 directions/DOF (Ym, RXm, RZm, Xm, Zm, RYm). The first extended set of relative motions comprises the first set of relative motions plus at least one of the second set of relative motions. In this particular case, the first extended set of relative motions comprises the first set of relative motions plus three of the second set of relative motions. Although a four bar linkage is shown in FIGS. 8H and 8I, it should be understood to those skilled in the art that other embodiments may comprise any other suitable linkage configured to convert relative motion between the magnetic bodies 1516I and 1516II in the Xm direction into relative motion of the linkage body 1517 in the Z direction.

Magnetically Coupled Linkage Systems

Referring to FIGS. 9A through 9K, an embodiment of a magnetic movement apparatus having a mechanical link comprising two independently moving members connected by a revolute joint based linkage system is disclosed, whereby relative motion of the members actuates the linkage system. Generally, the following illustrated embodiment discloses an automation system having no physical connection to ground with respect to which it moves and including at least one pair of independently moving members connected by a revolute joint based linkage system, whereby relative motion of the members actuates the linkage system, and the revolute joints are formed from magnet preloaded members such that all surfaces and interfaces between moving components can be completely washed down to remove contaminants or pathogens. In various embodiments the revolute joints may be formed from pairs of left hand (LH) and right hand (RH) helical gears in contact, whereby a LH-RH pair with a N-S oriented magnet respectively connecting each of the gears mates with a RH-LH pair with a S-N oriented magnet respectively connecting each of the gears, such that the helical gear based revolute joint is fully preloaded by the magnetic field lines that flow through the gear teeth in contact. As one helical gear pair rolls on the other, previously in-contact surfaces may be exposed for washing to remove contaminants and pathogens. In various embodiments, such a helical gear pair may be typically used in automating various processes where a tool to operate on a part needs to be moved, or a part or assembly needs to be moved to different stations to be operated on. The revolute joints may thus be formed from magnet preloaded members such that all surfaces and interfaces between moving components can be completely washed down to remove contaminants or pathogens. The revolute joints may be formed from pairs of left hand (LH) and right hand (RH) helical gears in contact, whereby a revolute joint may be formed by a LH-RH pair with a N-S oriented magnet respectively connecting each of the gears mating with a RH-LH pair with a S-N oriented magnet respectively connecting each of the gears. The helical gear based revolute joint may be fully preloaded by the magnetic field lines that flow through the gear teeth in contact. As one helical gear pair rolls on the other, previously in-contact surfaces may be exposed for washing to remove contaminants and pathogens.

Figure 9A:
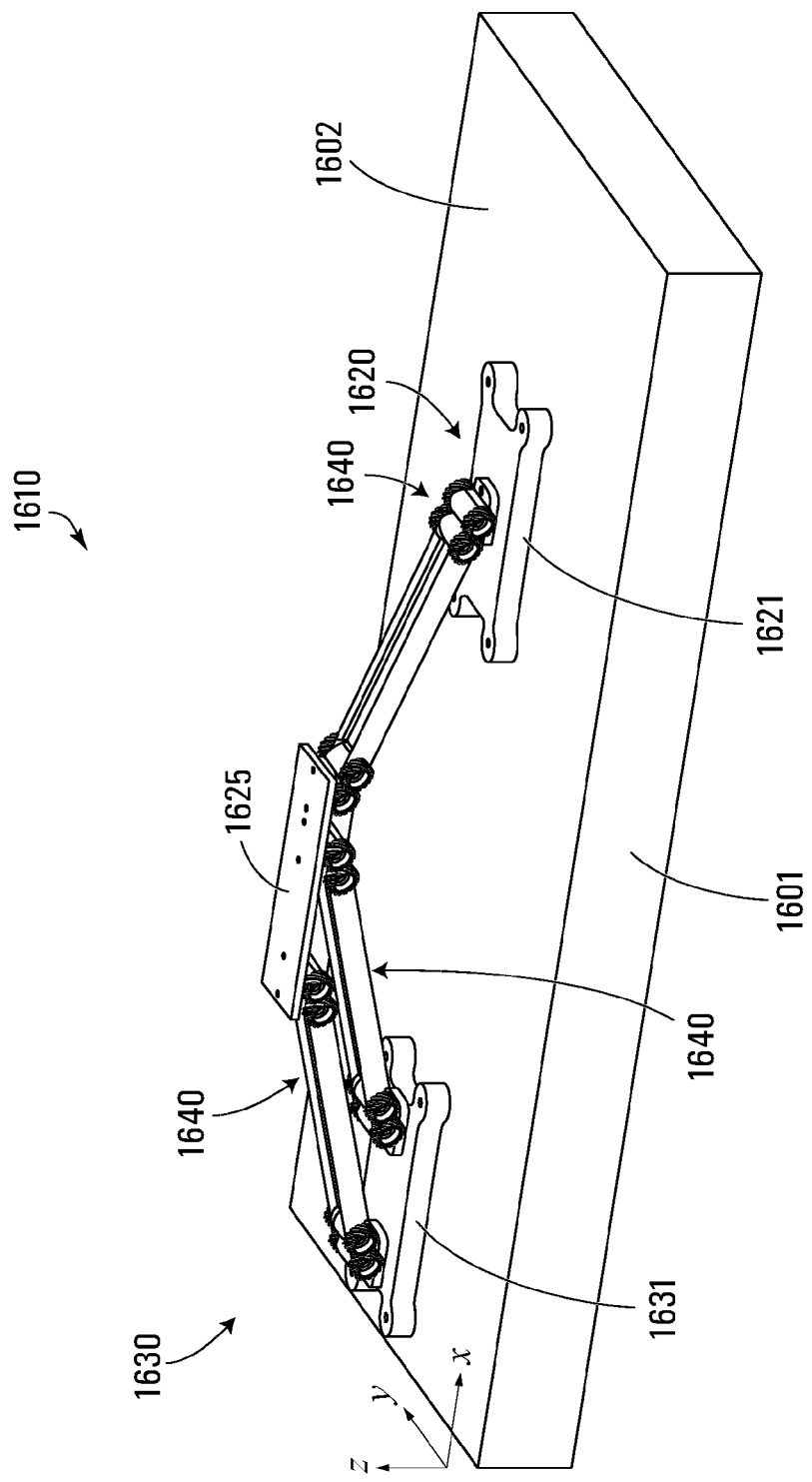
FIG. 9A is an isometric top view of a mover according to one embodiment.

Referring to FIG. 9A, an exemplary embodiment shows a work body 1601, which has an array of electrically conductive elements such as wires or coils (not shown) through which electric current may be caused to flow, thereby electromagnetically levitating and moving magnetic bodies 1620 and 1630 above the surface 1602 of the work body 1601. Magnetic body 1620 comprises a base 1621 to which is attached a first connector 1640. In various embodiments, the mechanical link 1640 may comprise a link-and-joints (LAJ) module. Magnetic body 1630 has a base 1631 to which is attached two additional connectors 1640. In various embodiments, more or fewer connectors may be attached to one or both of magnetic body 1620 and magnetic body 1630. A linkage body 1625 connects one end of each of the connectors. In various embodiments, the linkage body 1625 may be a coupler plate. Magnetic bodies 1620 and 1630 can be controlled to move anywhere just above the surface 1602, and as long as their relative distance in the plane of the connectors 1640 remains fixed, the position of the linkage body 1625 with respect to the pucks will be uniquely defined. Although the magnetic bodies 1620 and 1630 may be levitated above a working surface of the work body 1601 in a non-contact way, in various embodiments the magnetic bodies 1620 and 1630 may be in contact with the work body via sliding and/or rolling-elements bearings.

Figure 9B:
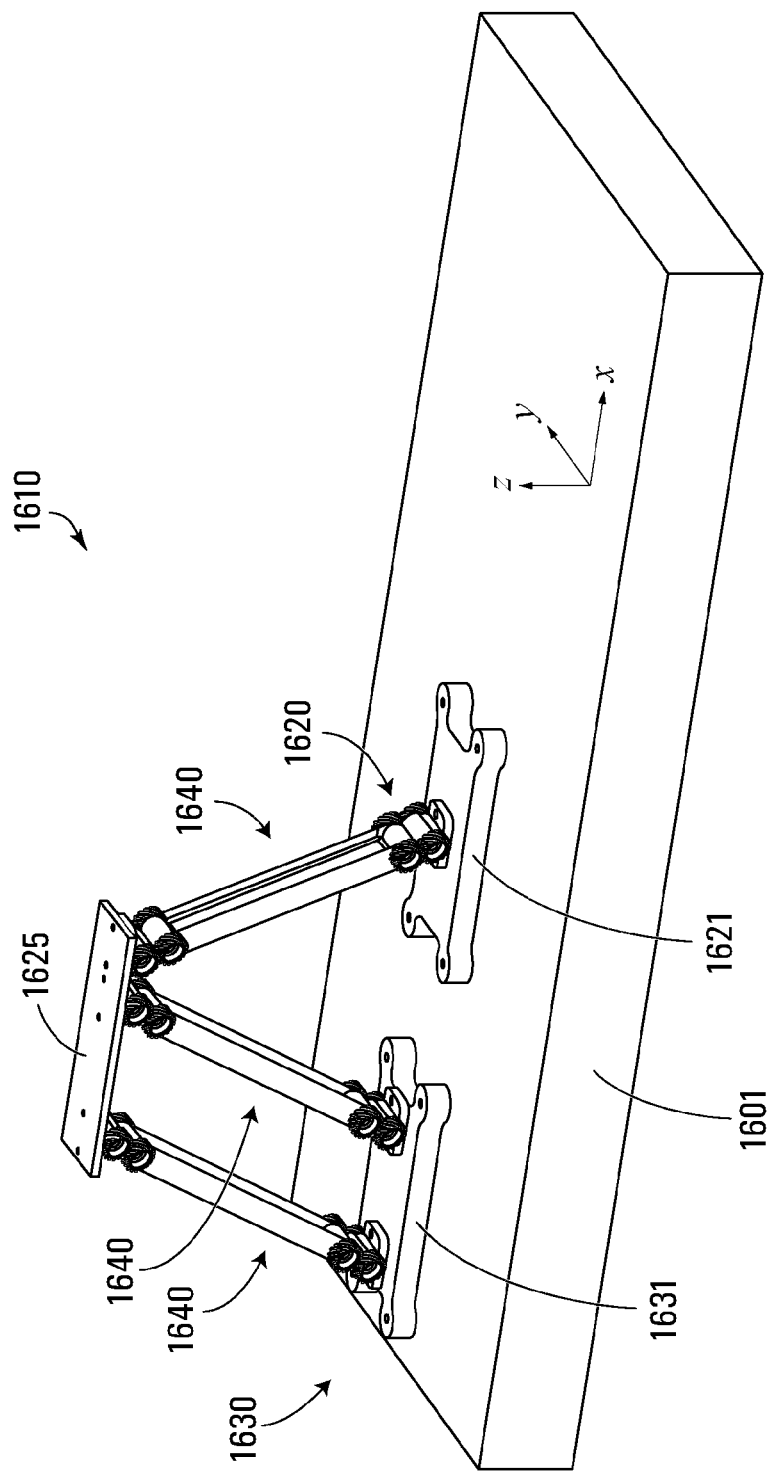
FIG. 9B is an isometric top view of the mover shown in FIG. 9A.

Referring to FIGS. 9A and 9B, if the magnetic body 1620 moves towards magnetic body 1630, the linkage body 1625 will move vertically up while remaining parallel to the base 1631 of magnetic body 1630. If the magnetic body 1620 moves away from magnetic body 1630, the linkage body 1625 will move vertically down while remaining parallel to the base 1631 of magnetic body 1630. If the connectors 1640 have different link lengths, the angle of inclination of linkage body 1625 with respect to the base 1631 will not be parallel, which may be desirable in some conditions. In the illustrated embodiment, the connectors 1640 together with relative motion between the magnetic bodies constitutes a six-bar linkage.

Figure 9C:
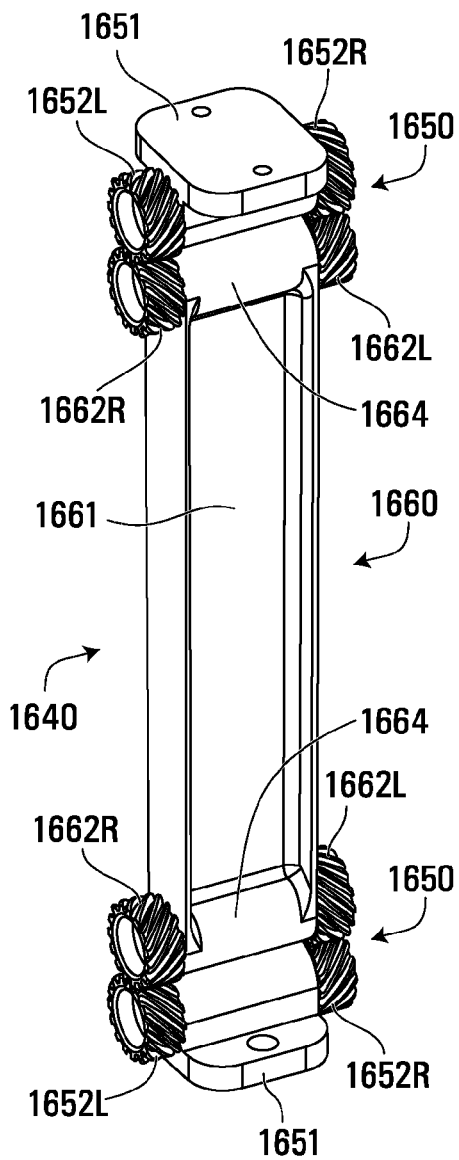
FIG. 9C is an isometric top view of a portion of a mechanical link according to the embodiment shown in FIG. 9A.
Figure 9D:
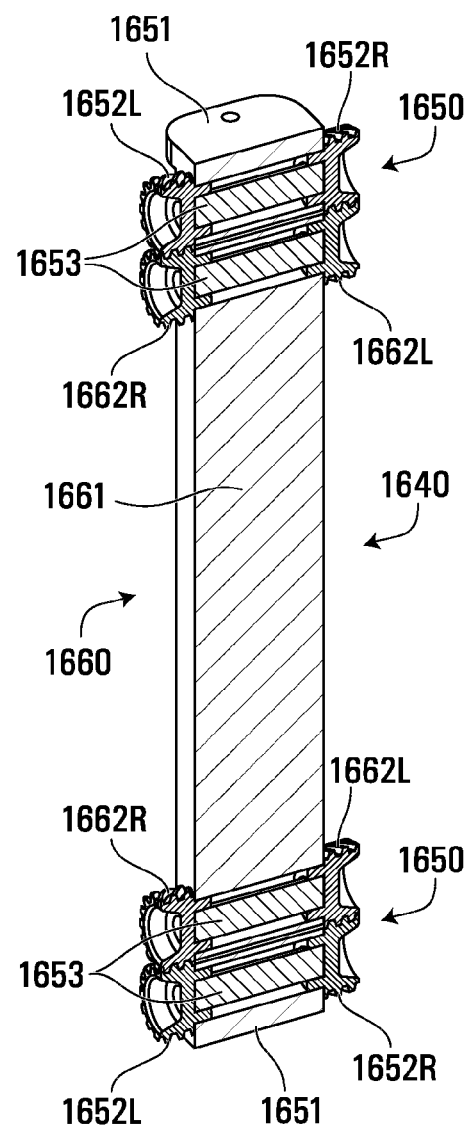
FIG. 9D is a cross section isometric view of the portion of the mechanical link shown in FIG. 9C.

Referring to FIGS. 9C and 9D, an exemplary connector 1640 is shown in more detail. Connector 1640 comprises connection modules 1650, one on each end of link module 1660. As can be seen, helical gears create the interface between the connection modules and the link modules. A Left Hand Helical Gear (LHHG) 1652L mated to a Right Hand Helical Gear (RHHG) 1662R, where their axes of rotation are parallel, produce a thrust force when torque is transmitted from one to the other. If a LHHG (1652L) that is coaxial and rigid with a RHHG (1652R) and attached to connection model base 51 is mated with a RHHG (1662R) that is coaxial and rigid with a LHHG (1662L) that is attached to link 1661 as shown in FIG. 9C, then the thrust forces cancel each other as torque is transmitted between them; where the torque would come from moving one of the connection modules 1650 with respect to the other connection module 1650 while keeping the bases 1651 parallel. Although helical gears are contemplated herein, it should be understood by a person of skill in the art that any type of gears may be used in other various embodiments.

Figure 9F:
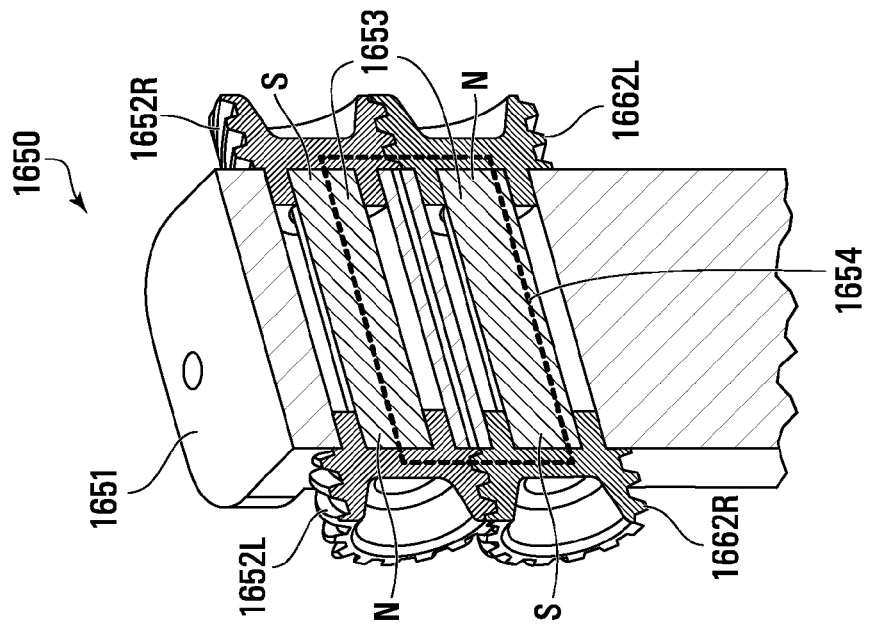
FIG. 9F is an isometric cross-sectional view of the portion of the mechanical link shown in FIG. 9C.
Figure 9E:
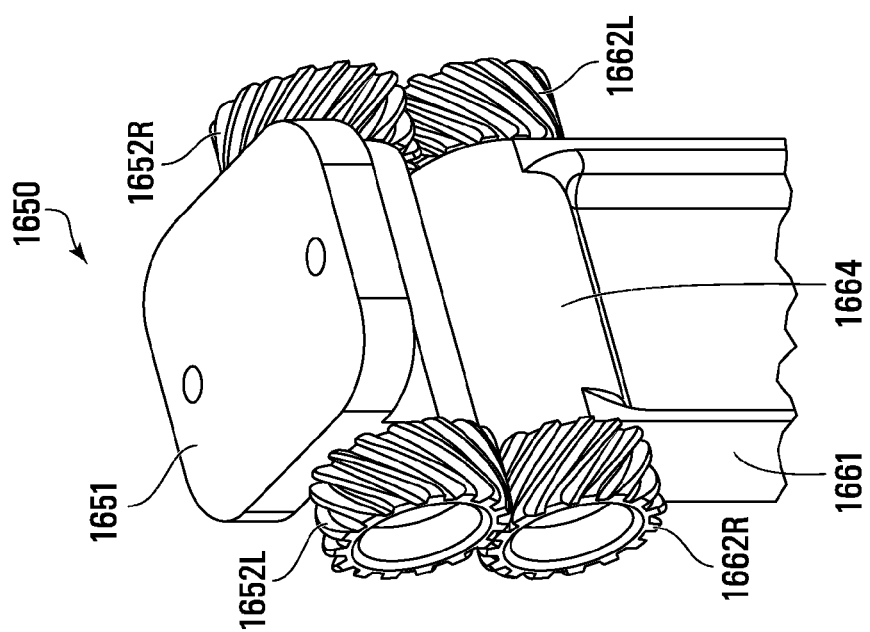
FIG. 9E is an isometric view of the portion of the mechanical link shown in FIG. 9C.
Figure 9H:
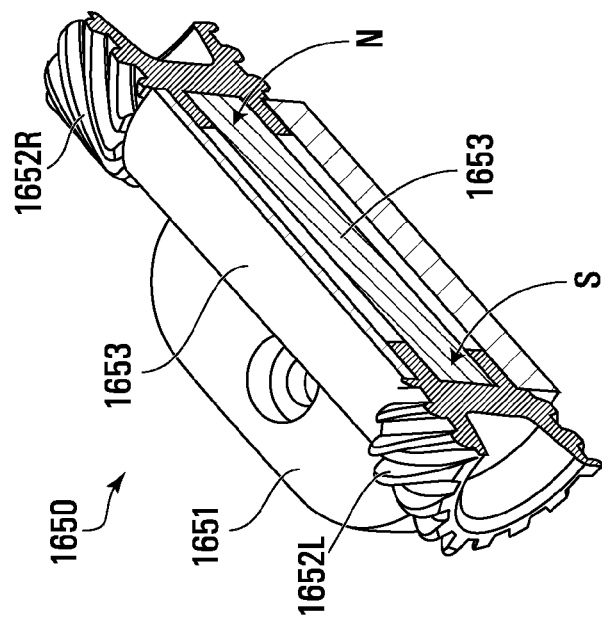
FIG. 9H is an isometric cross-sectional view of the portion of the mechanical link shown in FIG. 9G.
Figure 9G:
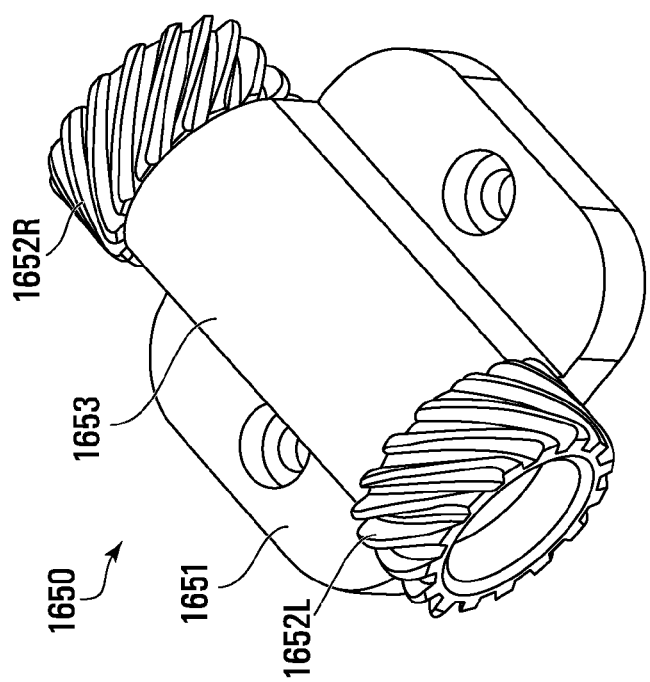
FIG. 9G is an isometric close up view of a portion of the mechanical link according to the embodiment shown in FIG. 9A.
Figure 9I:
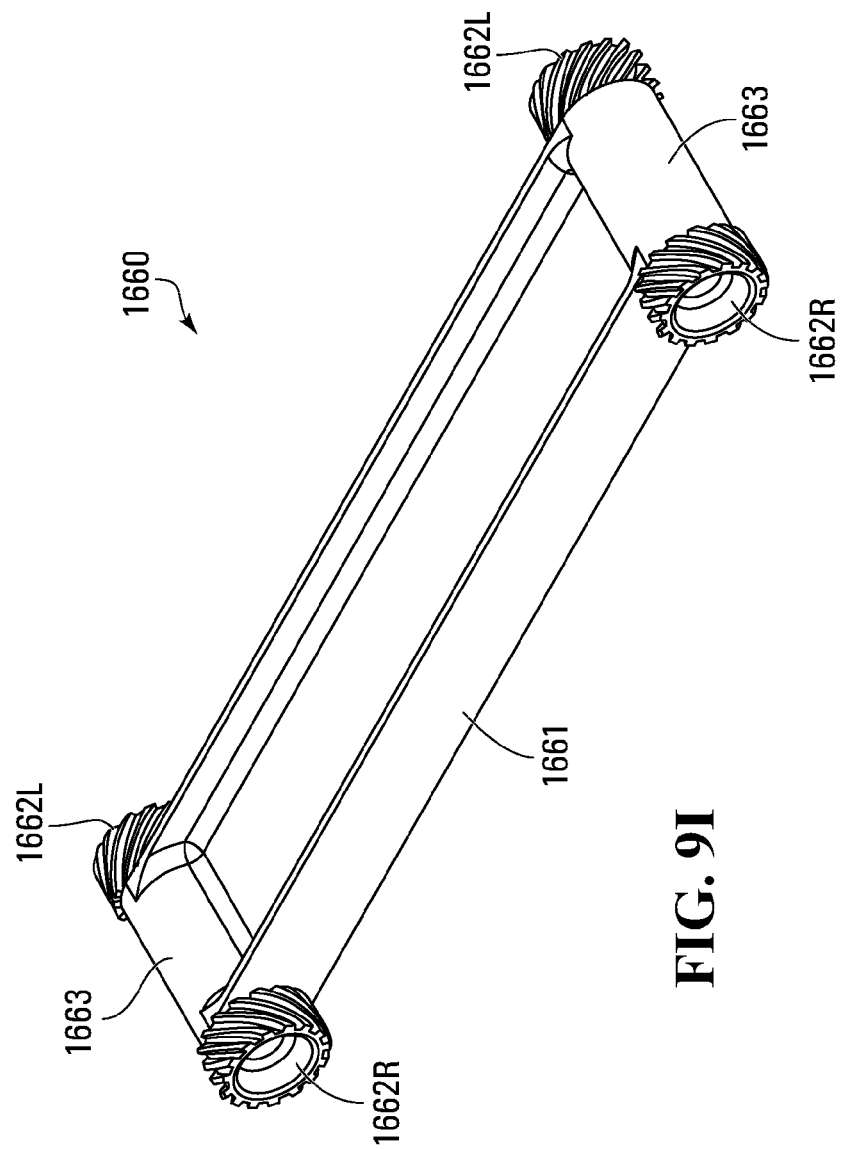
FIG. 9I is an isometric view of a portion of the mechanical link according to the embodiment show in FIG. 9A.

FIG. 9D shows a cross section through the connector 1640 where it can be seen that magnets 1653 connect the helical gear sets together. Referring to FIGS. 9E and 9F, the connection module 1650 is shown in greater detail and in cross section detail respectively. The revolute joints in the connection modules 1640 are formed from pairs of left hand (LH) 1652L and right hand (RH) 1662R helical gears, and right hand 1652R and 1662L helical gears in contact, whereby a LH-RH pair are held in a housing 1651 and connected with a N-S oriented magnet respectively connecting each of the LH-RH gears mates with a RH-LH pair held in the end 1664 of link 1661 with a S-N oriented magnet respectively connecting each of the RH-LH gears, such that the helical gear based revolute joint is fully preloaded by the magnetic field lines 1654 that flow through the gear teeth in contact. As one helical gear pair rolls on the other, previously in-contact surfaces are exposed for washing to remove contaminants and pathogens. Although in FIG. 9 two magnets 1653 are used, in other various embodiments, one of the magnets 1653 may be replace with a ferromagnetic part with similar shape of 1653.

In various embodiments, the gears may be ferromagnetic, and the tubular structures may not be ferromagnetic, such that the magnet flux will flow only through the magnets and the gears. In one embodiment, a rare earth magnet having a diameter of approximately ⅜" and a length of approximately 1.5", and steel gears having 15 teeth and a pitch diameter of approximately 21.2 mm will produce an attractive force between the connection modules 1650 and the link ends 1651 of approximately 50N.

Referring back to FIGS. 9A and 9B, when magnetic body 1620 moves away from magnetic body 1630, because the links 1640 are all the same length, linkage body 1625 must remain in the middle, so links 1640 must move down. Because of the magnetic circuit, the mating helical gears are preloaded together and in rolling contact, so coupler 1625 must also remain horizontal and as a result the mating helical gears roll on each other and the axes of the gears on a link 1640 all remain coplanar due to the rolling constraint imposed by the engaging gear teeth. Furthermore, because the gear teeth are helical and LH and RH gears are paired together, the rolling contacts will remain planar thereby giving out of the plane stability to the linkage without the need for separate thrust bearings.

According to another embodiment, plastic helical gears may be attached to round ferromagnetic metal disks of diameter equal to the pitch diameter of the gears, where the round ferromagnetic metal disks are in rolling contact, and the plastic helical gears, being plastic, need no lubrication and will last a very long time, and their engagement ensures the axes of the round metal disks all remain coplanar as the linkage moves. In this way, smoother motion may be achieved, but at the expense of some preload force. In both embodiments, because there is rolling contact as the linkage moves, surfaces are exposed which may then be washed down at a wash down station without having to take the linkage apart, and thus the wash down may be automated.

Furthermore, because the preload is magnetic, the linkage may be easily assembled (or dissembled), potentially robotically, so that in a fully automated system, repair may be done robotically, or taken apart for a more thorough automated cleaning such as by dipping or high pressure washing, for example.

In various embodiments, lightweight elements may be used. For example, a typical configuration using gears having approximately 21.2 mm pitch diameter and links of approximately 200 mm length may weigh approximately 1 kg:

| 6 Bar Linkage Mass (grams) | |
|---|---|
| Al link (200 mm long) with steel gears, magnets, and Al end connections | 290.6 |
| number of links per system | 3 |
| linkage body 1625 (75 × 200 × 4.75 Al) | 192 |
| Total mass of 6 bar linkage | 1063.8 |

Generally, in various embodiments, a six bar linkage for moving a linkage body up and down and left and right may comprise two motion bodies, one motion body having attached to it two connectors and the other puck having attached to it a connector, and a linkage body connecting the ends of the connectors not connected to the motion bodies. The connectors may comprise a connection module on each end, wherein said connection modules may have a tubular structure with a ferromagnetic LH helical gear and a ferromagnetic RH helical gear at each end of the tubular structure and a magnet in the bore of the tubular structure connecting the LH helical gear and a RH helical gears, and a link between the connection modules, said link having at its ends a tubular structure with a ferromagnetic LH helical gear and a ferromagnetic RH helical gear at each end of the tubular structure and a magnet in the bore of the tubular structure connecting the ferromagnetic LH helical gear and a ferromagnetic RH helical gears, where said magnet's N pole is connected to the same handed gear as the magnet in the connection module, wherein one said connection module connected to each end of said link where LH ferromagnetic helical gears are mated with RH ferromagnetic helical gears, and where said magnets complete a magnetic circuit through the meshing of the gear teeth to preload said gear teeth together.

According to other various embodiments, a six bar linkage for moving a coupler link up and down and left and right may comprise two motion bodies, one motion body having attached to it two connectors and the other motion body having attached to it a connector, and a coupler link connecting the ends of the connectors not connected to the motion bodies. Said connectors may comprise a connection module on each end, said connection modules having a tubular structure with a LH helical gear and a RH helical gear at each end of the tubular structure, said LF and RH helical gears each attached to a ferromagnetic cylindrical member attached to said tubular structure and a magnet in the bore of the tubular structure connecting the ferromagnetic cylindrical members, said ferromagnetic cylindrical members having diameters similar to the pitch diameter of said helical gears, and a link between the connection modules, said link having at its ends a tubular structure with a LH helical gear and a RH helical gear at each end of the tubular structure, said LF and RH helical gears each attached to a ferromagnetic cylindrical member attached to said tubular structure and a magnet in the bore of the tubular structure connecting the ferromagnetic cylindrical members, said ferromagnetic cylindrical members having diameters similar to the pitch diameter of said helical gears, wherein one said connection module connected to each end of said link where LH helical gears are mated with RH helical gears, and said ferromagnetic cylindrical members are in contact where said magnets complete a magnetic circuit through the ferromagnetic cylindrical members.

Rotatable Linkage Systems

Figure 10A:
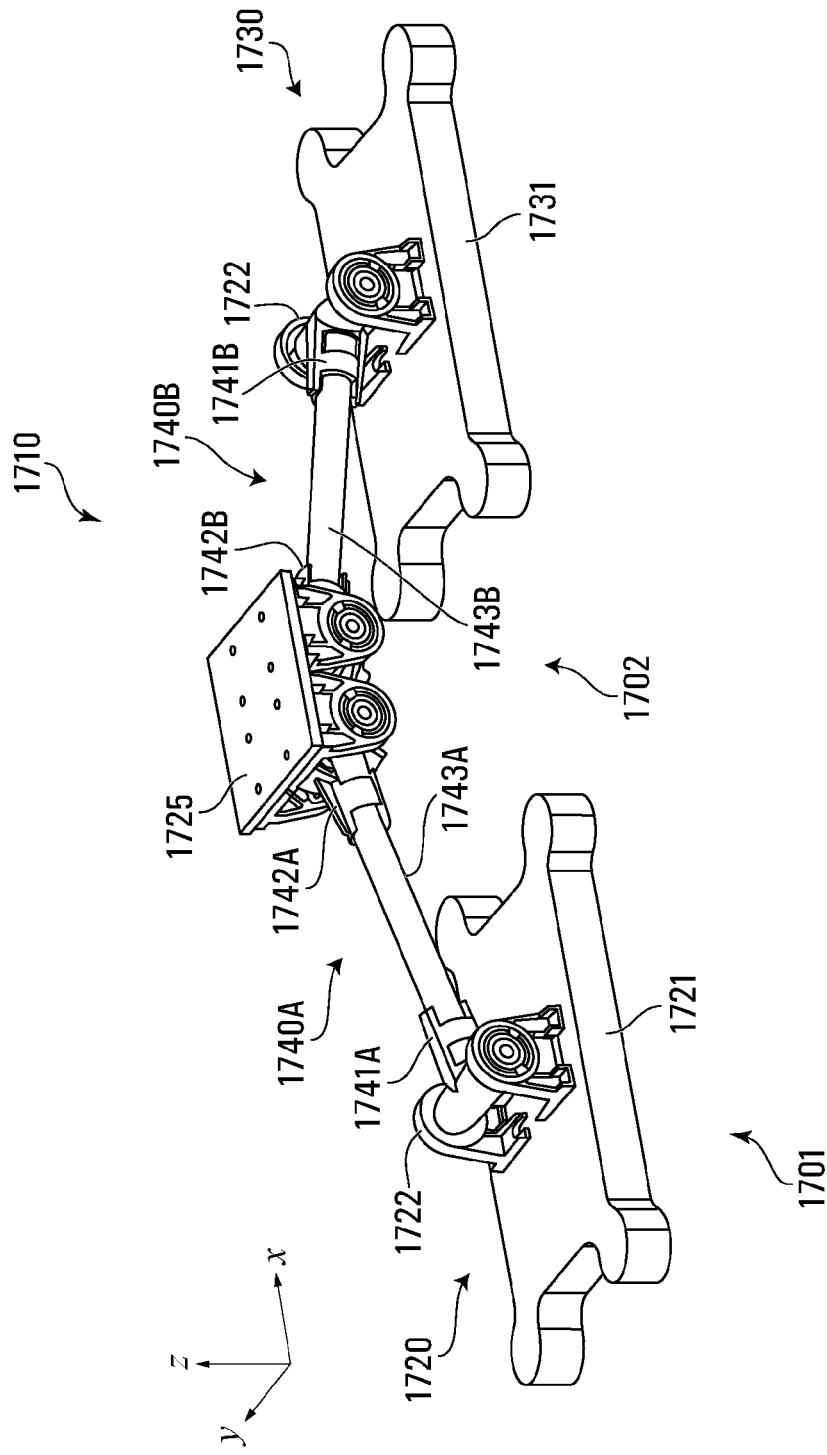
FIG. 10A is an isometric top view of a mover according to one embodiment.

Referring to FIG. 10A, magnetic movement apparatus 1710 having no physical connection to the ground with respect to which it moves is disclosed. The magnetic movement apparatus 1710 comprises at least one pair of independently moving-on-plane (MOP) Units connected by a revolute joint based planar linkage system, whereby relative motion of the MOP Units towards or away from each other actuates the planar linkage system's coupler element to move up or down, and the revolute joints and links are formed from modular injection molded plastic elements and simple beam members, and each of revolute joints at the coupler have a collocated gear (a non-liming example is a spur gear), whereby the gears engage thus causing the coupler to remain parallel to the plane on which the MOP Units move; furthermore optionally mounted on the MOP Units are base revolute joints (turntables) whose axes of motion are perpendicular to the plane on which the MOP Units move, and two of the planar linkage system's are mounted on the turntables such that one MOP unit circling the other causes the linkage system's coupler link to revolve around the base units axes of revolution. In various embodiments, the joints are made of plastic materials; however this is not necessary. Other suitable materials having low friction coefficients can also be used as linkage materials in one or more components. Such embodiments may typically be used in automating various processes where a tool to operate on a part needs to be moved, or a part or assembly needs to be moved to different stations to be operated on.

Figure 10B:
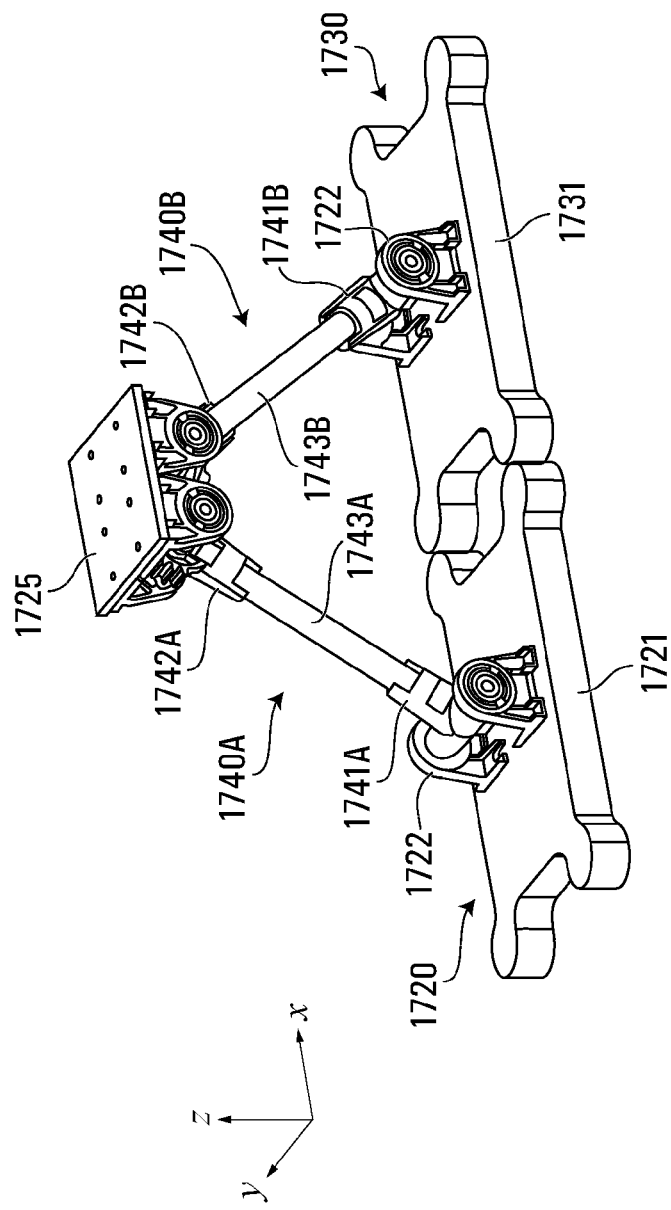
FIG. 10B is an isometric view of the mover shown in FIG. 10A.
Figure 10C:
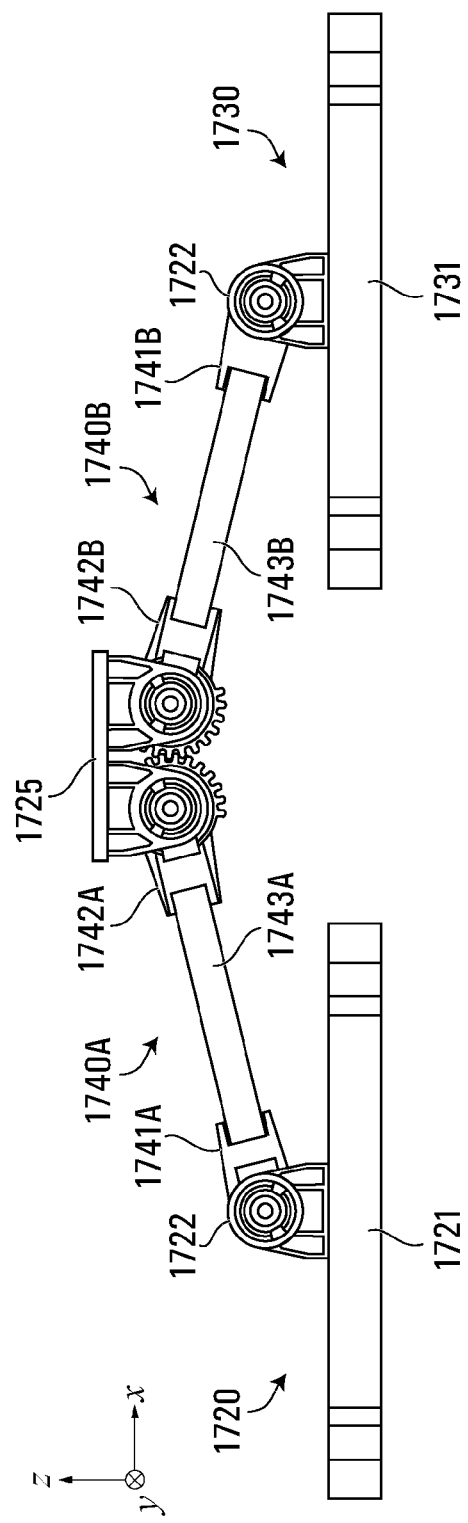
FIG. 10C is a side view of the mover shown in FIG. 10A.

Referring to FIGS. 10A, 10B, and 10C, a work body (not shown) may comprise an array of electrically conductive elements in which electric current is controlled to electromagnetically levitate and move magnetic bodies 1720 and 1730 above the surface of the work body according to any of the embodiments previously described herein. The ability of the system to move the magnetic bodies above the surface of the work body is the subject of patents such as PCT/CA2012/050751, PCT/CA2014/050739, PCT/CA2015/050549, PCT/CA2015/050523, PCT/CA2015/050157, which are incorporated herein by reference. In the illustrated embodiment, magnetic bodies 1720 and 1730 each have a top surface 1721 and 1731 respectively, to which hinges 1722 are attached. Connectors 1740a and 1740b are each connected to a hinge 1722 on each of magnetic bodies 1720 and 1730. Connector 1740b may be identical to 1740a but for being mounted to be a mirror image of 1740a. Linkage body 1725 connects to one end of each of the connectors 1740a and 1740b. In various embodiments, connectors 1740a and 1740b may be link-and-joint (LAJ) modules, for example, and hinges 1722 may be revolute joint brackets, for example. In various embodiments, the linkage body 1725 may comprise a coupling plate.

Magnetic bodies 1720 and 1730 can be controlled to move anywhere above the surface of the work body, and as long as their relative distance in the plane of the connectors remains fixed, the position of the linkage body 1725 with respect to the magnetic bodies will be uniquely defined. If the magnetic body 1720 moves towards magnetic body 1730, the linkage body 1725 will move vertically up while remaining parallel to the base 1731 of magnetic body 1730.

If the magnetic body 1720 moves away from magnetic body 1730, the linkage body 1725 will move vertically down while remaining parallel to the base 1731 of magnetic body 1730. Together the connectors 1740 and relative motion between the magnetic bodies constitutes a mechanical link: the "ground link" is comprised of the two magnetic bodies, and its length can change upon relative motion between the magnetic bodies. When the magnetic bodies' positions are fixed the system may appear like a four bar linkage in the form of a trapezoid. A trapezoid, however, is not stable unless the top and base are constrained to be parallel. This can be accomplished in the present embodiment if the angles between the connectors and the magnetic bodies are defined (i.e. the relative motion between the magnetic bodies is constrained). In the case of the four bar linkage of the present embodiment, spur gears on the connector 1740s may be used to constrain the angle between the connectors.

In the present embodiment, the connectors 1740a and 40b are identical (which is not necessary), but mounted as mirror images of each other. Connector 1740a has on a first end a T-coupling 1741a into which a structural tube 1743 is inserted and bonded. The bar of the T-coupling acts as an axle and forms a pin joint with joint brackets 1722 on the magnetic body 1721. The second end has a T-gear-coupling 1742a into which the other end of a structural tube 1743 is configured to be inserted and bonded. As will be explained further in the context of FIG. 10F, the gear teeth are phased with respect to the longitudinal axis of the connector 1740 such that, as can be seen in FIG. 10C, when the gear teeth engage, the linkage body 1725 remains horizontal. The use of engaging gears on the end of links to make the coupling link remain in a fixed orientation as the links move is found for example in compasses. In various embodiments, connectors 1740a and 1740b may not be identical. In various embodiments, the T-gear-coupling 1742a may be designed in such a way that the axis of the hinge connecting 1740A to the linkage body 1725 may be concentric with the axis of rotation of the gear. Similarly, the T-gear-coupling 1742b may have the same concentric property between the gear axis and the hinge axis.

Figure 10E:
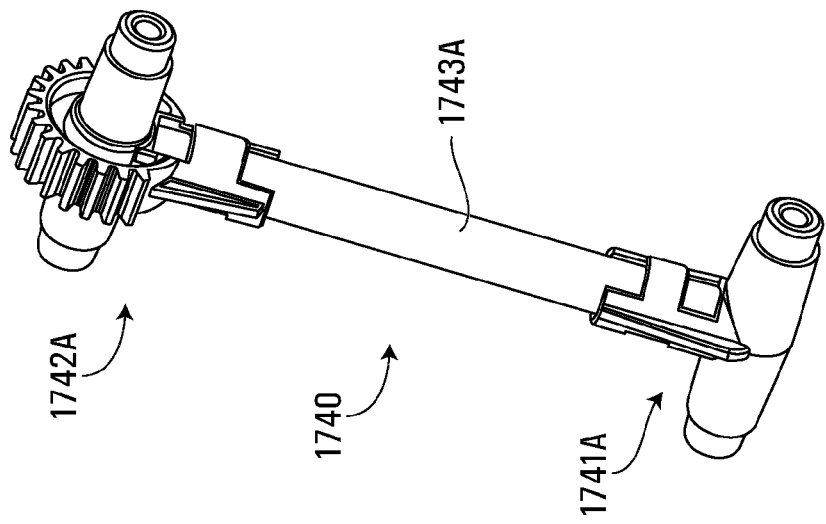
FIG. 10E is an isometric view of a portion of a mechanical link according to the embodiment shown in FIG. 10A.
Figure 10D:
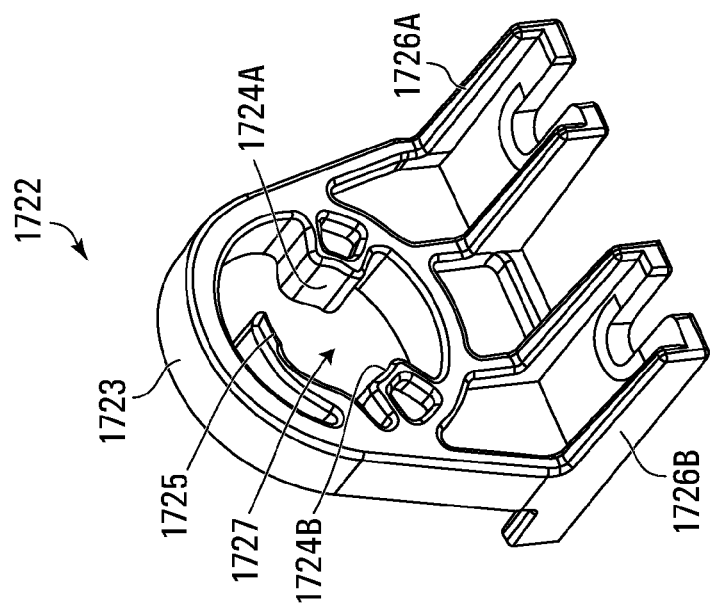
FIG. 10D is an isometric view of a joint bracket according to the embodiment shown in FIG. 10A.

FIG. 10D shows the joint bracket 1722 which is designed to be injection molded. The joint bracket has a vertical member 1723 with rounded top and legs 1726a and 1726b for bolting to the magnetic bodies or top linkage body 1725. A key feature is its design takes advantage that under normal use, the linkage mechanism's T-coupling axles' ends' fit into the bearing journal space 1727 and predominantly loads the brackets 1722 such that, for example, bearing surfaces 1724a and 1724b take the load and bearing preload arm 1725 just preloads the axle in place. In various embodiments, should there be a crash between movers such as mover 1710, the preload arm may flex open and damage may be reduced or avoided.

FIG. 10E shows the connector 1740, which in the current embodiment is comprised of T-coupling 1741a, structural tube 1743, and a T-gear-coupling 1742a. The structural tube may be carbon fiber for weight savings and high stiffness or an easy to machine metal such as aluminum for example or other type high strength materials such as Titanium or stainless steel.

FIG. 10F shows a side view of a T-gear-coupling 1742 where the bar of the T forms the axle 17148, which is connected to a stem 17143. In the illustrated embodiment, the gear is designed such that the teeth 17147a and 17147b straddle the centerline that is perpendicular to the stem so the right flank of one will mate with the left flank such that when two T-gear-couplings' gear teeth mate their stems will be forced to move symmetric about a centerline as they rotate about their axles. On the stem 17143 are half-loops 17146, 17145, and 17144 for receiving a structural tube.

FIG. 10G shows an isometric view of the T-coupling 1741. In the illustrated embodiment, the T-gear-coupling may be able to be molded from a simple mold without the need for side pulls. In FIG. 10G, the stem 17243 has half-loops 17246, 17245, and 17244 for receiving a structural tube. In this isometric view it can be seen clearly how the part may be injection molded using a simple two part mold that pulls along the axle length. The stem 17248 may act as the axle, where ends 17248a and 17248b would be received by the hinge 1722's journal space 1727. The shoulders of the ends act as thrust bearing surfaces to define the horizontal axial position of the T-coupling 1741, and hence the corresponding connector 1740.

As seen from FIGS. 10A to 10F, a hinge connecting a connector to the linkage body is called a linkage hinge; a hinge connecting one of the first and second magnetic bodies to the linkage body is called a body hinge. In the illustrated embodiments, each of the body or linkage hinges comprises a T-shaped axle and a bracket.

As seen in FIG. 10E, the axes of rotation of the two hinges (one body hinge and one linkage hinge) connected to the same connector are parallel.

Figure 11A:
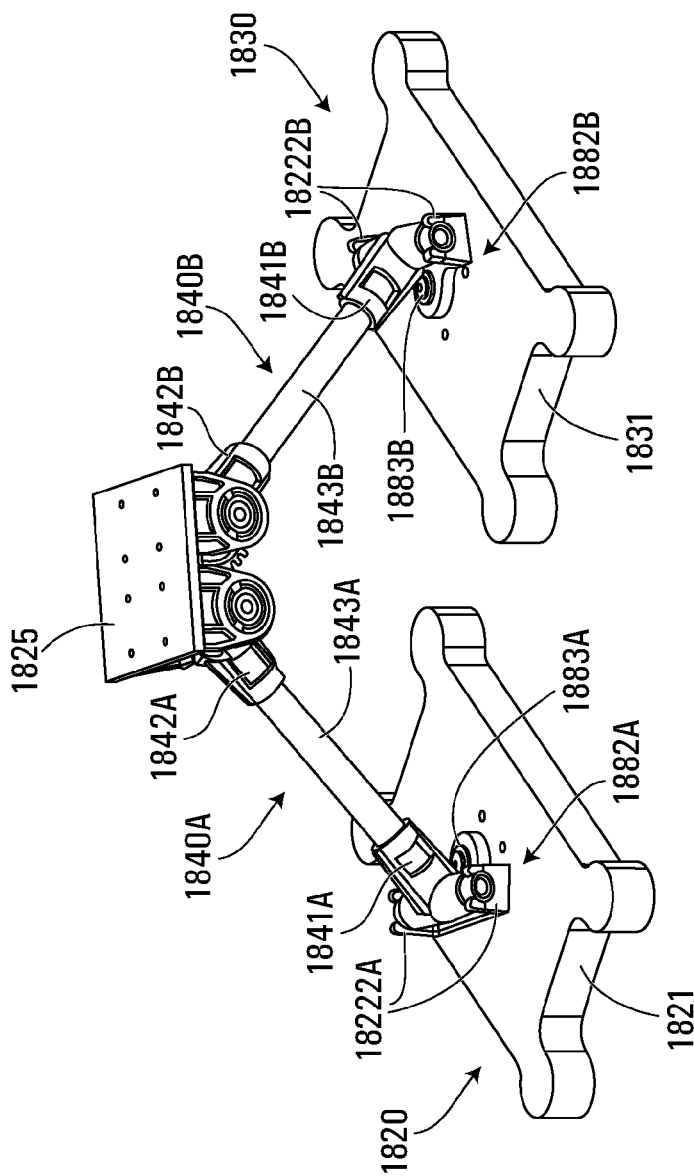
FIG. 11A is an isometric view of a mover according to one embodiment.

Another exemplary embodiment is shown in FIG. 11A, in which the linkage body 1825 is configured to rotate. In the illustrated embodiment, two-axis (i.e. rotatable about two axes) hinges 1882a and 1882b are mounted onto magnetic bodies 1820 and 1830 with their rotation axes through rotary bearings 1883a and 1883b perpendicular to the plane of motion upon which the magnetic bodies are configured to move. The key difference between FIG. 11 and FIG. 10 is that each connector is connected to one of the first and second magnetic bodies by a two-axis hinge in FIG. 11 rather than a cylindrical hinge as shown in FIG. 10. In the present embodiment the rotary bearings 1883b are revolute joints, however, in various embodiments, rotary bearings 1883b may be spherical joints or any other suitable type of joints, for example. Furthermore, although the magnetic bodies 1820 and 1830 are rectangular shape, in other embodiments, the magnetic bodies may have a square footprint or any other suitable footprint, for example. Each two-axis hinge comprise a parallel hinge made, a vertical hinge, and a hinge body. A parallel hinge is made of integral joint brackets 18222 mounted on a hinge body and a T-coupling axles. The joint brackets allow the T-coupling axles to snap into place. The vertical hinge connects the hinge body to one of the two magnetic bodies by rotary bearings (revolute joints) so that the hinge body can rotate relative to the connected magnetic body around an axis of rotation in the vertical direction. In various embodiments, the axis of rotation of the perpendicular hinge is perpendicular to the working surface. In various embodiments, the axis of rotation of the parallel hinge is parallel to the working surface. If a first magnetic body such as magnetic body 1820 is then held stationary, and a second magnetic body such as magnetic body 1830 revolves in a circle around the first magnetic body 1820 but with no rotation of the magnetic body 1830 in the X-Y plane, the two-axis hinges will rotate about a point equidistant between the two magnetic bodies 1820 and 1830. Such an embodiment may allow the system to have up to three controlled motion translational degrees of freedom and one controlled motion rotational degree of freedom.

Figure 11B:
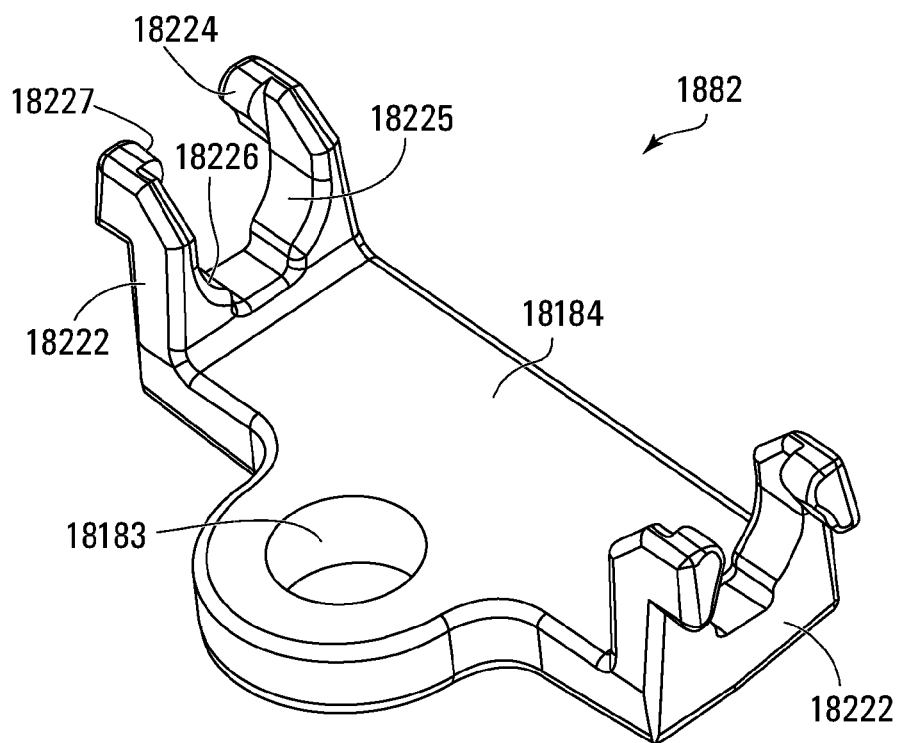
FIG. 11B is an isometric view of a portion of a mechanical link according to the embodiment shown in FIG. 11A.

FIG. 11B shows a two-axis hinge 1882 with a base structure 18184 and bore 18183 for receiving bearings (not shown) to support radial, axial, and moment loads. The joint brackets 18222 are mirror images and are snap fit structures and may enable a simpler two part mold to be used. The captive preloading bearings 18227 and 18224, which must be pried apart to enable a shaft to be pressed in, are overhung from the main structure. Once the axle 18248 with its ends 18248a and 18248b is pressed in, 18248a for example will rest on main bearing journals 18225 and 18226, and be constrained (i.e. preloaded) in place by preloading bearings 18227 and 18224. The two-axis hinge structure in the present embodiment, when the bearings are inserted, may held to a magnetic body such as magnetic body 1820 using a low profile shoulder screw, for example.

With respect to materials, the joint brackets and the two-axes hinges may be injection-molded from any suitable materials such as nylon, for example, and the T-coupling and the T-gear-coupling can be injection molded from any suitable material such as delrin, for example. By making these components from different precision molded plastics, the coefficient of friction may be reduced, for example on the order of 0.05.

The embodiments described in reference to FIGS. 11A and 11B may facilitate an automation system with two independently moving-on-plane (MOP) Units connected by a symmetrical revolute joint based planar linkage system, whereby relative motion of the MOP Units towards or away from each other may actuate the linkage system to move up or down. The linkage elements may be made from modular simple injection molded plastic joint elements and simple beam members connecting the joint elements. Each of the revolute joints at the coupler may have a collocated spur gear, whereby the spur gears engage thus causing the coupler to remain parallel to the plane on which the MOP Units. Each of the revolute joints may be comprised of sets of modular molded plastic joint elements, one type containing bearing bores and one type contains shafts. The length of the links between revolute joints may be set by cutting beam members to length and bonding them to modular molded plastic joint elements. Furthermore, said embodiments may facilitate an automation system with two independently moving-on-plane (MOP) Units connected by a symmetrical revolute joint based planar linkage system, whereby the revolute joints may be mounted on base revolute joints whose axes of motion are perpendicular to the plane on which the MOP Units move, such that one MOP unit circling the other may cause the linkage system's coupler link to revolve around the base units axes of revolution.

Generally, in various embodiments, a four bar linkage for moving a coupler link up and down and left and right may comprise two planar motion bodies, such as magnetic bodies, the spacing between them defining a variable length ground link, each motion body having a revolute joint bracket and mirror image connectors each connected to a respective revolute joint bracket on a motion body, a linkage body connected via a pair of revolute joint structures connecting the ends of the connectors not connected to the motion bodies to the linkage body. Said connectors may comprise a first T shaped axle on a first end of a connector, the top of the T shape acting as an axle to mate with the revolute joint bracket on a motion body, a beam element extending from the stem of the T towards the second end of the connector, a second T shaped axle on a second end of a connector, the top of the T shape acting as an axle to mate with a revolute joint structure on the coupler link, a beam extending from the stem of the T towards the first end of the connector, and a section of a spur gear at the cross of the T. Said revolute joint structures on said linkage body may be spaced at the pitch diameter of the spur gear so said spur gears mesh and keep coupler link parallel to said ground link. The four bar linkage may further comprise a two-axis hinge on each motion body, wherein upon each two-axis hinge is mounted one of said revolute joint brackets and mirror image connectors each connected to the linkage body.

Figure 12A:
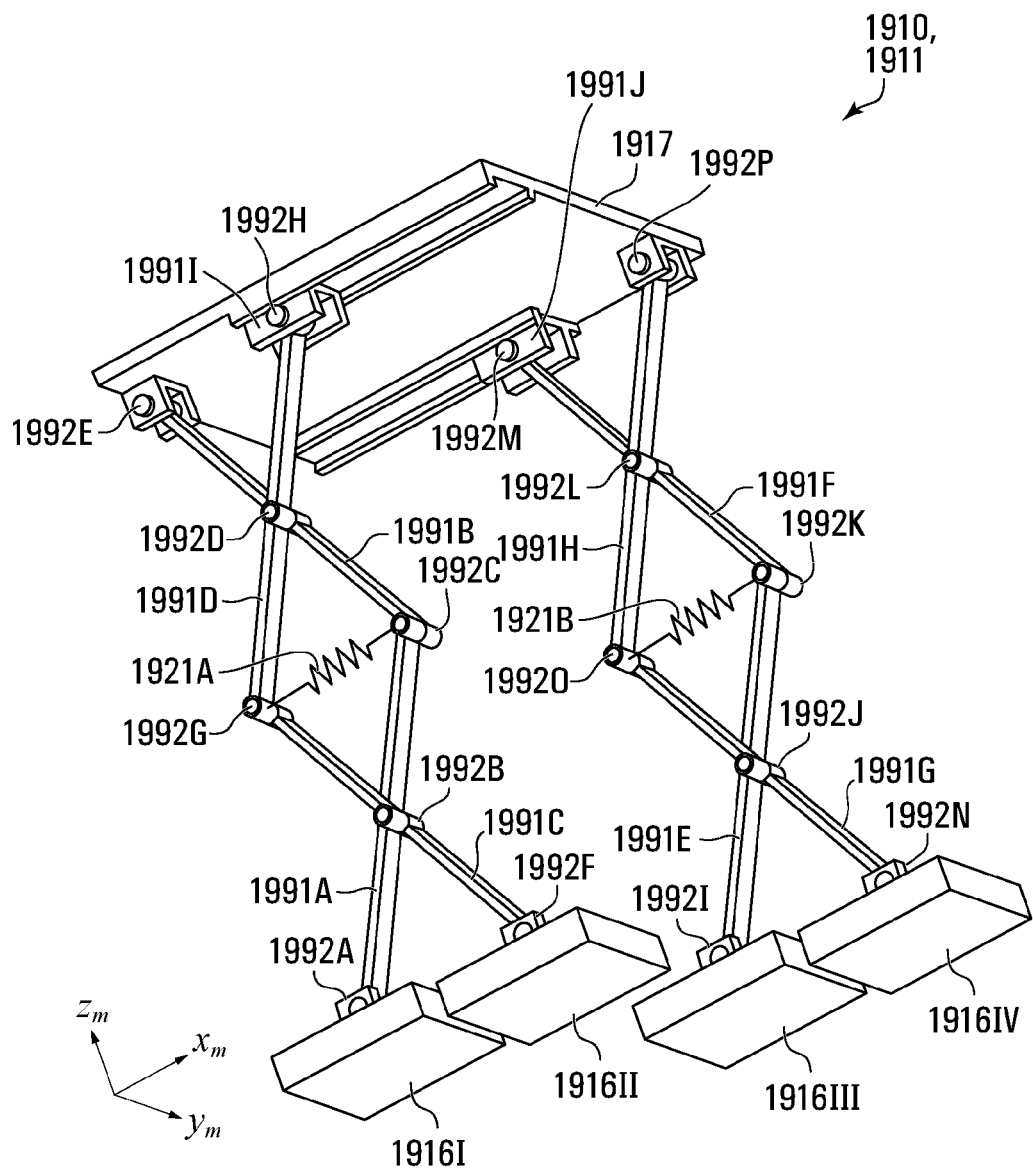
FIG. 12A is an isometric view of a mover according to one embodiment.
Figure 12B:
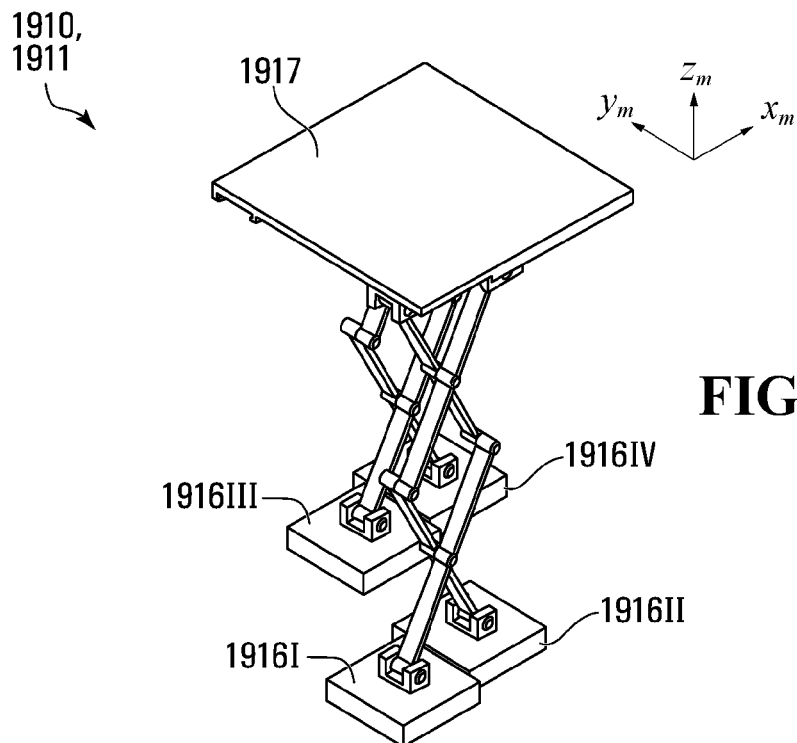
FIG. 12B is an isometric view of the mover shown in FIG. 12A.
Figure 12C:
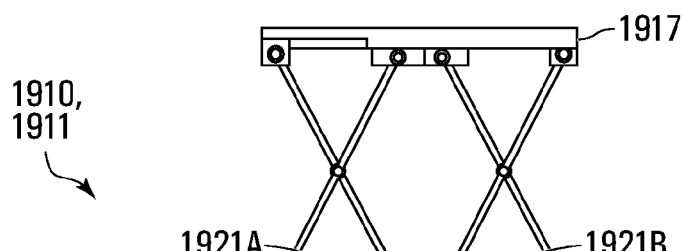
FIG. 12C is a side view of an apparatus comprising the mover shown in FIG. 12A.
Figure 12C:
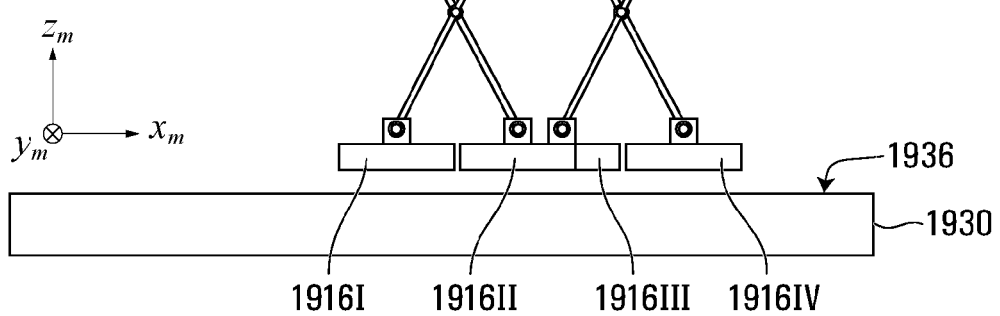

FIG. 12A, FIG. 12B, and FIG. 12C together show a non-liming example of a robotic device 1911 for use in association with a work body 1930 according to another embodiment. The robotic device 1911 comprises a mover 1910. The mover 1910 comprises a first magnetic body 1916I, a second magnetic body 1916II, a third magnetic body 1916III, and a fourth magnetic body 1916IV. Each magnetic body includes a magnetic array, each of which being substantially similar to the magnet array in FIG. 8C or in another suitable magnet layout described herein. The work body 1930 comprises a work body comprising a plurality of electrically conductive elements. Currents driven into suitably selected electrically conductive elements in work body 1930 may interact with magnet array assemblies in the magnetic bodies to generate forces to controllably move the robotic device 1911, by connecting the work body 1930 with suitable amplifiers 1970, suitable controllers 1960, and suitable sensors 1980 (such as those shown in FIGS. 1A and 1B, for example), and operating the system according to previously discussed suitable algorithms.

The robotic device 1911 comprises a mechanical link 1919 comprising a plurality of connectors forming at least two scissor lift linkages connecting each magnetic body with a linkage body 1979, and includes connectors 91A to 91H, hinges 92A to 92P, and linear sliders 91I and 91J. Each linear slider can slide along a guide rail installed on the linkage body 1917. The mechanical link 1919 constrains the relative motion among magnetic bodies (1916I, 1916II, 1916III, 1916IV) in one or more directions/DOF and allows the relative motion among said magnetic bodies in one or more directions/DOF. For example, the mechanical link 1919 may constrain the relative motion between magnetic bodies 1916I and 1916II in 3 directions/DOF (Ym, RZm, RXm), and may allow the relative motion between the magnetic bodies 1916I and 1916II in 3 directions/DOF (Xm, Zm, RYm); the mechanical link 1919 then also constrains the relative motion between magnetic bodies 1916I and 1916III in 3 directions/DOF (Ym, RZm, RXm), and allows the relative motion between magnetic bodies 1916I and 1916III in 3 directions/DOF (Xm, Zm, RYm). The four magnetic bodies help increase the load capacity in comparison to only two magnetic bodies. In the illustrated embodiment, the mechanical link 1919 may help convert relative lateral motion in the Xm-direction into motion of the linkage body 1917 in the Zm direction, and the Zm-direction motion range may be significantly larger than that of each magnetic body. Furthermore, in the present embodiment the two fixed supporting points on the linkage body 1917 are placed diagonally, which may cause the supporting structure to be more stable in comparison to the case of using magnetic bodies 1916I and 1916I without magnetic bodies 1916III and 1916IV. In various embodiments, when the gravity direction is in the −Z direction, the mover 1910 may optionally comprise on or more brakes (not shown) similarly to the embodiment shown in FIG. 8H and FIG. 16A (discussed below), which may save power consumption when holding a part such as a carrier part, for example. When the gravity direction is in the −Z direction, the mover 1910 may optionally comprise one or more resiliently deformable components 1921A and 1921B which may help reduce power consumption on the work body 1930 by reducing the required Xm-direction lateral forces on the magnetic bodies. In various embodiments, the resiliently deformable elements may comprise springs or other spring elements, for example.

Figure 13A:
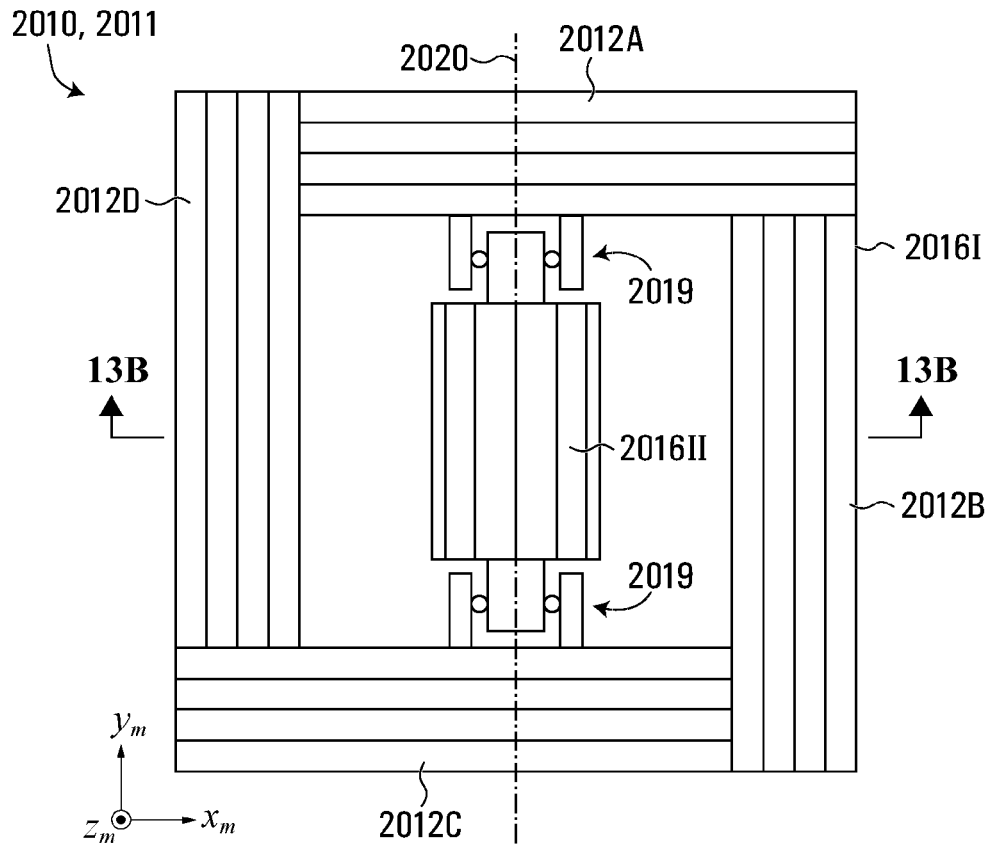
FIG. 13A is a top cross-sectional view of a mover according to one embodiment.
Figure 13B:
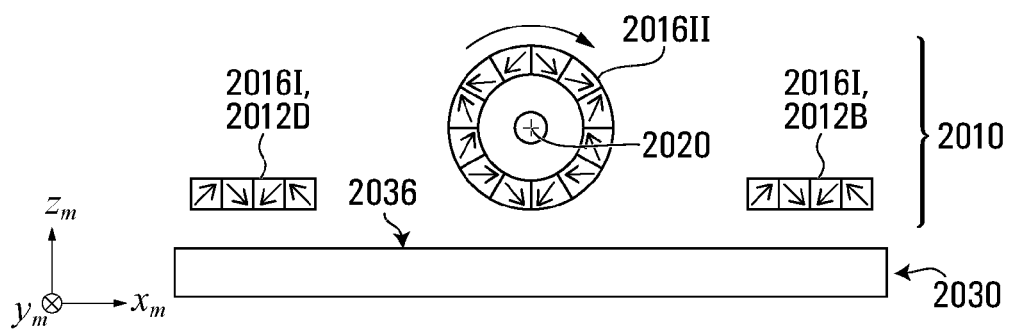
FIG. 13B is a side schematic cross-sectional view of an apparatus comprising the mover shown in FIG. 13A.

FIGS. 13A and 13B show another embodiment of a magnetic movement apparatus comprising a mover 2010 and a work body 2030. The work body 2030 may comprise a plurality of electrically conductive elements, including but not being limited to X oriented electrically conductive elements and Y oriented electrically conductive elements in overlapping layers and having a normal direction in the Z direction. The mover 2010 comprises a first magnetic body 2016I and a second magnetic body 2016II. The first magnetic body 2016I comprises four magnet arrays 2012A to 2012D, which may be substantially similar to the magnetic arrays of magnetic body 216I in FIGS. 3A and 3B. In the illustrated embodiment, the second magnetic body 2016II is a rotatable cylindrical magnetic body comprising a plurality of linearly elongated magnetization elements surrounding a rotatable rotor frame as shown in more detail in FIG. 9B. In various embodiments, the magnetic body 2016II may be a different rotatable shape. Each magnetization element in 2016II is linearly elongated in a direction parallel to an axis of rotation 2020 that is oriented in Ym direction, and has a magnetization direction orthogonal to its elongation direction. A mechanical link 2019 (including but not being limited to a pair of angular contact radial bearings, for example) is installed between magnetic bodies 2016I and 2016II, allowing the second magnetic body 2016II to rotate around the axis of rotation 2020 that is fixed to the first magnetic body 2016I. The mechanical link 2019 is configured to constrain the relative motion between magnetic bodies 2016I and 2016II in a first set of 5 directions/DOF (Xm, Zm, Ym, RZm, RXm) and to allow relative motion between magnetic bodies 2016I and 2016II in a second set of 1 direction/DOF (RYm). In the illustrated embodiment, the second magnetic body 2016II may be configured to interact with properly commutated currents flowing in Ys-oriented electrically conductive element traces in the work body 2030 near magnetic body 2016II resulting in two independently controllable forces: one force in the Z direction to levitate the mover 2010, and a second force in the X direction. The X-oriented second force is applied on the second magnetic body 2016II with an offset (i.e. the distance in the Z-direction between the work body electrically conductive element top surface 2036 and the axis of rotation 2020). Consequently, a torque around the Ym-oriented axis of rotation 2020 is produced. This toque may be used to control the relative rotary motion in RYm direction between the first magnetic body 2016I and the second magnetic body 2016II. The sensor system installed on the work body can be used to measure the rotational position of the magnetic body 2016II. In various embodiments, the mechanical link between the first magnetic body 2016I and the second magnetic body 2016II may comprise at least a first axle and a first brace. The first axle (e.g a shaft or the like) may be rigidly attached to one of the first and second magnetic bodies, and the first brace may be rigidly attached to the other of the first and second magnetic bodies.

Figure 13C:
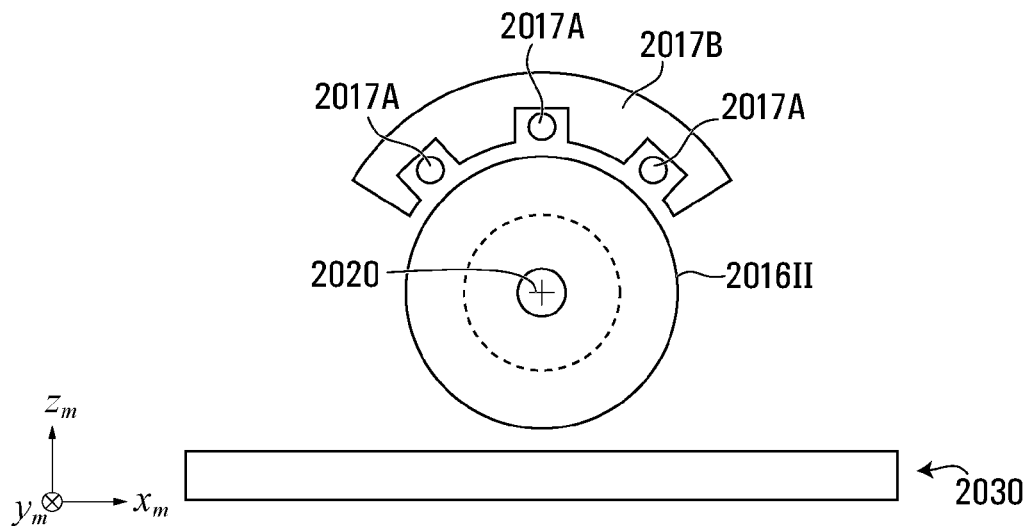
FIG. 13C is a side schematic cross-sectional view of a magnetic body and a work body according to the apparatus shown in FIG. 13B.

There are several possible applications that can utilize controllable rotational motion of the second magnetic body 2016II relative to the first magnetic body 2016I. As shown in FIG. 13C, in various embodiments a set of secondary electrically conductive elements 2017A configured in one or more phases may be installed on a body or structure positioned near a top side of the second magnetic body (opposite to the work body side of the second magnetic body) in order to generate back EMF voltage. Such an induction effect might be enhanced by a back iron unit 2017B made of highly permeable materials such as soft magnetic steel, for example. As a result, rotational motion of the second magnetic body 2016II may be used as an electricity generator to provide power to on-mover devices (including but not being limited to sensors, actuators, computing units, and communication units, for example).

Figure 13D:
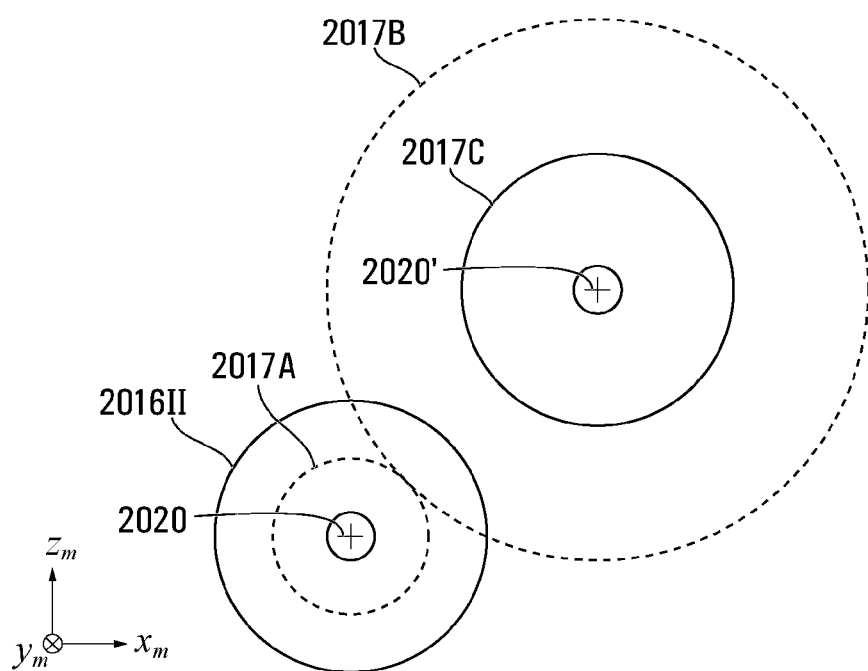
FIG. 13D is a side cross-sectional view of a magnetic body according to the mover shown in FIG. 13C.

As shown in FIG. 13D, rotational motion of the second magnetic body 2016II may also be used with a sets of gears (2017A and 2017B) to achieve corresponding rotational motion of the gears (including but not being limited to reduced speed and increased torque, for example) around another rotation axis 2020' fixed with the first magnetic body 2016I, for example.

In various embodiments, the two magnetic bodies may be arranged in a way similar to the one in FIG. 5, and electricity may be generated from the relative linear motion (including but not being limited to reciprocating linear motion) between magnetic bodies 2016I and 2016II by installing suitable components such as an electrically conductive element on magnetic body 2016I and one or more magnets on magnetic body 2016II.

Movers with Kinematic Mechanical Links

Referring to FIGS. 14A and 14B, a magnetic movement apparatus 2150 according to yet another embodiment comprises a work body 2130, a robotic device 2111, one or more controllers 2160, one or more amplifiers 2170 for driving current flowing through a selective set of electrically conductive elements in the work body 2130, and one or more sensors 2180 for providing position feedback signals. Robotic device 2111 comprises a plurality of magnetic bodies 2110. The plurality of magnetic bodies 2110 comprises a first magnetic body 2110A and a second magnetic body 2110B. Each magnetic body 2110 may be controllably moved relative to work body 2130 about a working region 2136 of the magnetic movement apparatus 2150. Each magnetic body 2110 comprises one or more magnet arrays comprising one or more magnetization elements (such as magnets, for example), each magnetization element having a magnetization direction. The one or more controller(s) 2160 and the one or more amplifier(s) 2170 are in electrical communication with each other and with the work body 2130 in order to selectively and controllably drive currents in the plurality of electrically conductive element traces and to thereby effect relative movement between the magnetic bodies 2110 and the work body 2130 as described elsewhere in this description. A mechanical link 2117, comprising a rotatable arm 2190, a first pole 2192A, and a second pole 2192B, connects the first magnetic body 2110A and the second magnetic body 2110B. In various embodiments, the rotatable arm may comprise a tool holder, and end effector, or any other part, mechanism, or device suitable for a particular operation, such as carrying or loading a workpiece, for example.

In the illustrated embodiment, the first magnetic body 2110A is controllably moved by the one or more controllers 2160 in at least 2 in-plane directions/DOF (X and Y) within its working stroke, independent of the motion of the second magnetic body 2110B. The second magnetic body 2110B is likewise controllably moved by the one or more controllers 2160 in at least 2 in-plane directions/DOF (X and Y) within its working stroke, independent of the motion of the first magnetic body 2110A. The rotatable arm (which in various embodiments may comprise any other rotatable or rotary body) 2190 of the mechanical link 2117 is coupled to the first and second magnetic bodies 2110 at pole 2192A and 2192B, and the rotatable arm's spatial position and orientation are thus fully determined by the spatial positions and orientations of the first and second magnetic bodies 2110A and 2110B. In various embodiments, the rotatable arm's motion range in at least one of Z, Rx, Ry, and Rz directions may be significantly larger than each of the first and second magnetic bodies' motion range in the at least one of Z, Rx, Ry, and Rz directions. In various embodiments, each of the first magnetic body 2110A and the second magnetic body 2110B is capable controlled motion in 6-directions/DOF independent of the other magnetic body. In various embodiments, each of the first magnetic body 2110A and the second magnetic body 2110B may be capable of controlled motion in three in-plane directions/DOF independent of the other magnetic body.

In one embodiment, each of the first magnetic body 2110A and the second magnetic body 2110B may be controllably and independently driven by the work body 2130 in 6 directions/DOF (X, Y, Z, Rx, Ry, Rz). For example, each of the two magnetic bodies may contain a magnetic body substantially similar to the one shown in FIG. 8C or another suitable design, which may be operable to interact with the magnetic fields generated by currents flowing through the work body 2130 to cause the magnetic bodies to move in one or more of the 6 directions/DOF.

As shown in FIGS. 14A and 14B, each of magnetic body 2110A and magnetic body 2110B may be independently controlled within their working ranges without being constrained by the mechanical link 2117. The rotatable arm 2190's position and orientation are fully determined by the position/orientation of magnetic body 2110A and magnetic body 2110B. As shown in FIG. 14A, the first and second poles 2192A and 2192B are oriented in the Z-direction. In the illustrated embodiment, the rotatable arm 2190 (a "first rotatable body", which, in other various embodiments, may be any suitable rotatable body) is configured to rotate about the first pole 2192A, and to slidably engage with the second pin 2192B (a "second engagement body", which, in other various embodiments, may be any other suitable engagement body) via a slot on the rotatable arm 2190, for example. In the illustrated embodiment, the rotatable arm comprises a fork (i.e. a first engagement body) at one of its ends. The first engagement body (fork) may be configured to be detachably engaged with the second engagement body (pin). When the first and second movers move in way such that the pin slides out of the fork, the first and second engagement bodies may be said to be detached. Thus, when magnetic body 2110B moves around magnetic body 2110A, the rotatable arm 2190 will be driven to rotate around a Z-oriented axis of rotation 2120 along the longitudinal axis of the first pole 2192A, which is fixed on magnetic body 2110A. Such rotation motion around the Z-oriented axis of rotation 2120 may be significantly larger than what each of magnetic bodies 2110A or 2110B may achieve (which in various embodiments may amount to about a few degrees, for example). In various embodiments, the rotatable arm 2190 may be able to rotate up to 360 degrees.

Figure 15:
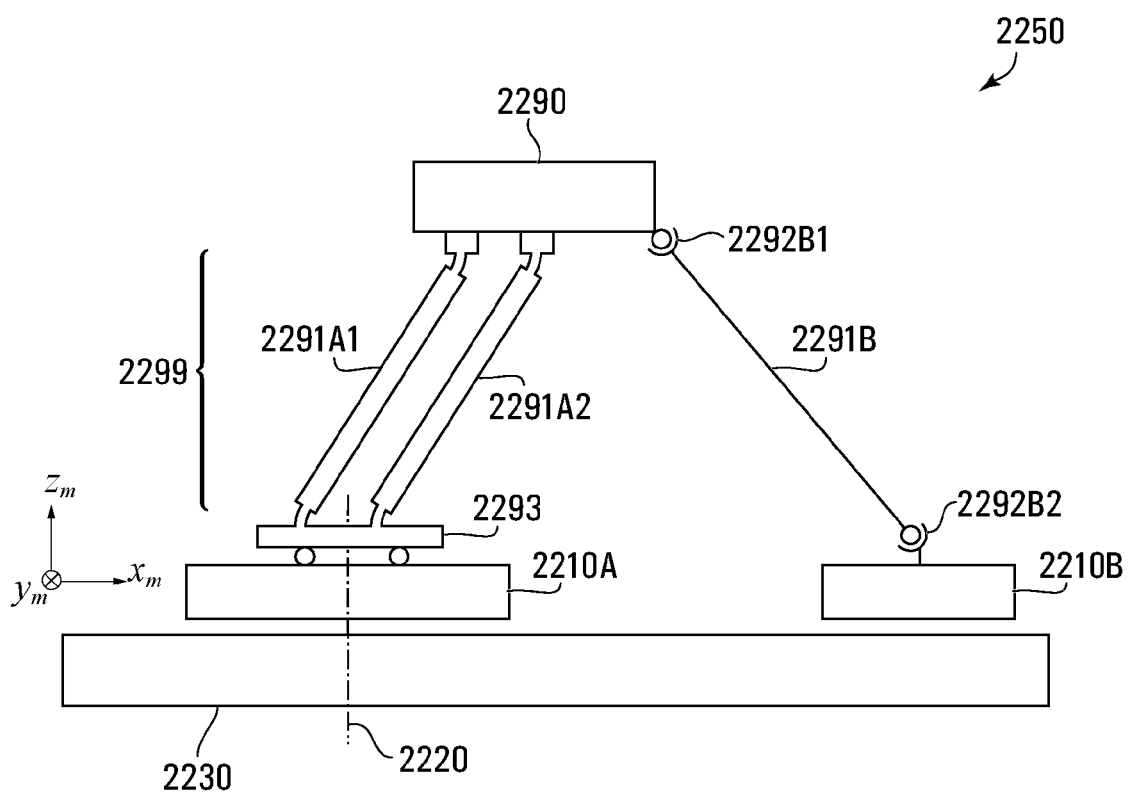
FIG. 15 is a side view of an apparatus according to one embodiment.

FIG. 15 shows a magnetic movement apparatus 2250 according to another embodiment, comprising a first magnetic body 2210A and a second magnetic body 2210B both configured to interact with currents flowing through electrically conductive element traces of work body 2230 in order to be controllably moved relative to each other and to the work body 2230. Each of magnetic bodies 2210A and 2210B may be capable of motion in at least 2 directions/DOF (X, Y). In various embodiments, each of magnetic bodies 2210A and 2210B may be capable of controllable motion in at least 6 directions/DOF (X, Y, Z, Rx, Ry, Rz). A mechanical link 2299 is installed between movers 2210A and 2210B. The mechanical link 2299 comprises a rotatable body 2293 (configured to rotate around a Z-oriented axis 2220 that is fixed with magnetic body 2210A), a four-bar linkage (comprising connector 2291A1, connector 2291A2, the rotatable body 93, and a linkage body 2290, and the corresponding requisite hinges or cylindrical joints according to various other embodiments disclosed herein) linking the linkage body 2290 and the rotatable body 2293, and a connector 2291B connecting the linkage body 2290 with the second magnetic body 2210B via two two-axis hinges 2292B1 and 2292B2. In various embodiments, the connector 2291B may be a bar, and the hinges 2292B1 and 2292B22 may comprise spherical joints. If magnetic body 2210A is held stationary, then planar translation of the magnetic body 2210B (in the X and Y directions) can be converted to large stroke motion in the Rz and Z directions. It should be noted that, in the present embodiment, the mechanical link 2299 does not constrain the relative motion between magnetic bodies 2210A and 2210B: for example, when magnetic body 2210A is held stationary, magnetic body 2210B can still controllably move in 6 directions/DOF. When magnetic bodies 10A and 10B translate together in the X-Y plane, the linkage body 2290 also translates with long strokes that are only limited by the size of the work body 2230 in the X-Y plane. In various embodiments, the achieved Rz motion may be up to 360 degrees, significantly larger than the a few degrees of Rz motion that may be achieved by magnetic body 2210A and magnetic body 2210B individually. The motion in the Z direction of the linkage body 2290 may be a fraction of the connector length, and may reach a stroke of a few centimeters to dozens of centimeters, significantly greater than a z-movement stroke of a few millimeters that may be achievable by magnetic bodies 2210A and 2210B.

Self-Loading

According to yet another embodiment, a magnetic movement apparatus may be configured to load a part on itself with a first motion and then a second motion following the first motion; the second motion may be in a direction different from that of the first motion. During the first motion, the part to be loaded may be engaged or constrained in a storage system, and the magnetic movement apparatus may move a robot gripper move in the first direction to gradually engage with the part inside the storage system to grab the part. During the second motion, the magnetic movement apparatus may move the part out of the storage system in the second direction until the part becomes gradually disengaged from the storage system and the constraint imposed by the storage system on the part is completely removed. In various embodiments, the first motion direction may be non-parallel with the second motion direction. In various embodiments, the first motion direction may be opposite to the second motion direction. In various embodiments, the first motion direction may be orthogonal to the second motion direction.

Figure 16A:
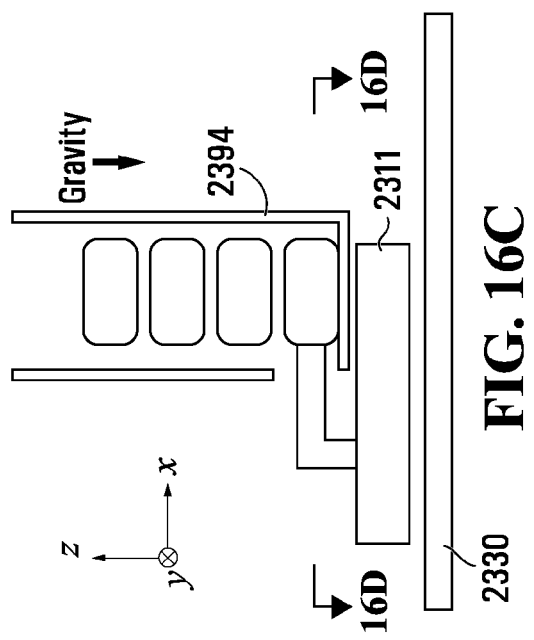
FIG. 16A is a side view of an apparatus according to one embodiment.

Referring specifically to FIG. 16A, a magnetic movement apparatus 2350 is shown according to an embodiment configured to load a part. The magnetic movement apparatus 2350 comprises a robotic device 2311, which may comprise one or more magnetic bodies substantially similar to those magnetic bodies 1016I and 1016II described in reference to FIG. 8C or any other suitable magnetic bodies discussed in this document or elsewhere, and a work body 2330 substantially similar to the work body 130 described in reference to FIG. 1. The robotic device 2311 comprises a tool 2317 having opposing jaws with an opening as shown in more detail in FIG. 16B. In various embodiments, the tool 2317 may be a gripper having an elastic or resiliently deformable opening, for example. One or more parts 2393 may be stored in a container 2394 having a side opening at the bottom. In one embodiment, the container 2394 may be tube-shaped, and the one or more parts may fit in the container similar to coins in a coin stack. In the illustrated embodiment, the robotic device 2311 is configured to move in a first direction, such as the X direction, to engage with a part at the opening at the bottom of the container 2394, as shown in FIG. 16C. During the first motion, the engaged part may still be inside the container 2394 and may be constrained or engaged with the container 2394, and the engagement between the robotic device 2311 and the part 2393 may thus gradually increase. Once the part 2393 is inside the tool 2317 as shown in FIG. 16D, the robotic device 2311 may then move in a second direction which is non-parallel with the first direction motion, such as the Y (or −Y) direction, to remove the engaged part 2393 from the container 2394. While being removed from the container 2394, the part 2393 is engaged with the robotic device 2311 at all times, but the engagement between the part 2393 and the container 2394 gradually decreases until the constraints imposed by the container 2394 on the gripped part are overcome. Alternatively, in various embodiments the second motion direction may also be parallel and opposite to the first motion direction, such as in the −X direction, for example, to cause the tool 2317 to slide the gripped part out of the container 2394.

Figure 17B:
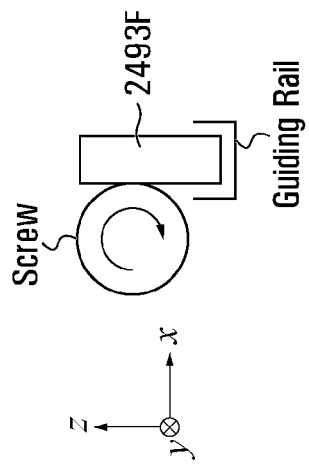
FIG. 17B is a partial side view of the apparatus shown in FIG. 17A.
Figure 17C:
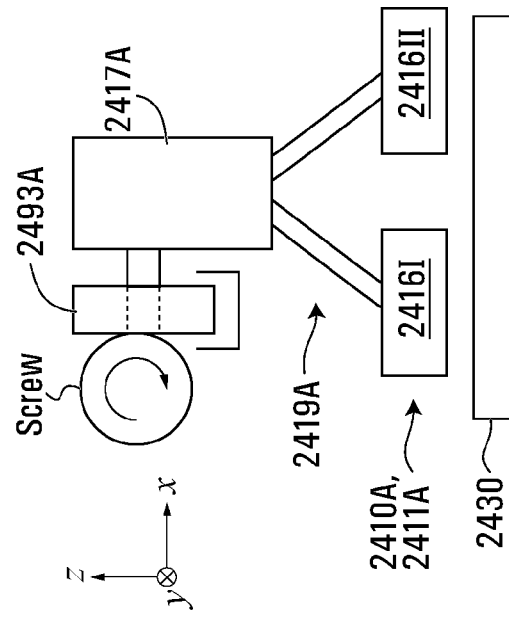
FIG. 17C is a side view of the apparatus shown in FIG. 17A.
Figure 17A:
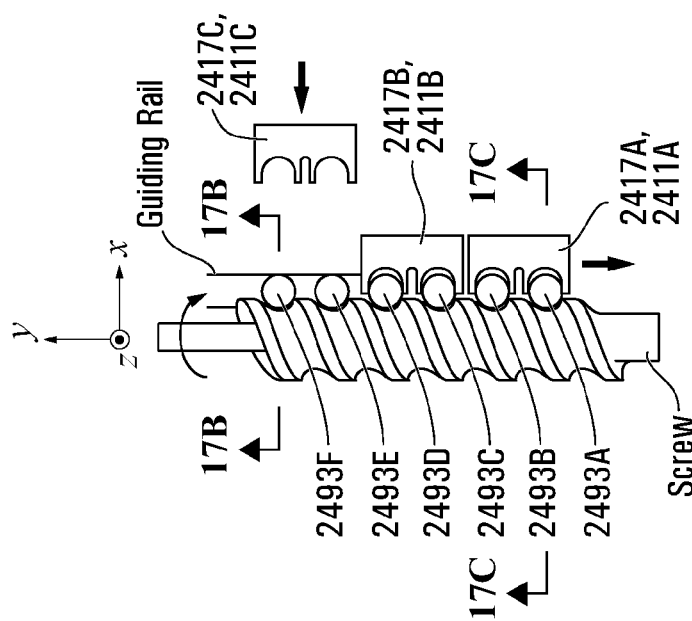
FIG. 17A is a side view of an apparatus according to one embodiment.

FIGS. 17A, 17B, and 17C show another embodiment of a magnetic movement apparatus comprising one or more robotic devices (2411A, 2411B, 2411C, 2411D), each of which is configured to grab one or more objects (such as vials, for example) from a movable storage system, such as a moveable screw storage system, for example. Each robotic device has one or more magnetic bodies which are configured to interact with electrically conductive element current in a work body below the robotic devices as described previously in order to controllably move each robotic device in at least 2 directions/DOF (e.g. the X and Y directions). The movable storage system may cause a row of objects to move along a guide rail in a first direction, such as the −Y direction.

Figure 16B:
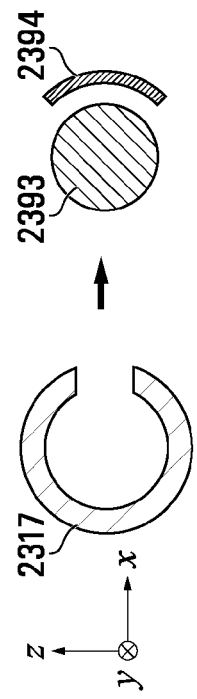
FIG. 16B is a partial top cross-sectional view of the apparatus shown in FIG. 16A.
Figure 16C:
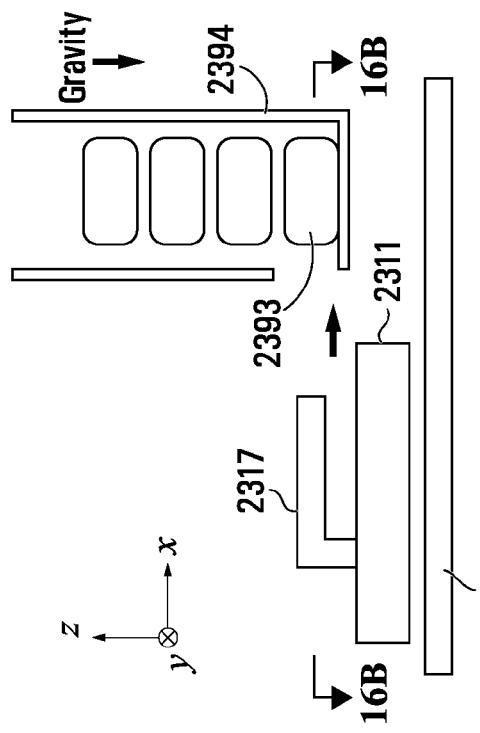
FIG. 16C is a side view of the apparatus shown in FIG. 16A.
Figure 16D:
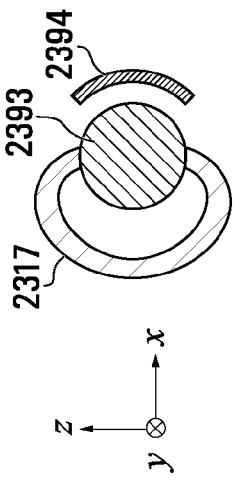
FIG. 16D is a partial top cross-sectional view of the apparatus shown in FIG. 16A.

A robotic device (such as 2411C) comprises a tool 2417C having opposing jaws, such as an elastic gripper as described in relation to FIGS. 16A-16C. Robotic device 2411C may approach one or more objects in the screw storage system using a first motion. The first motion may have a velocity component in the first direction which is synchronized with the moving speed of the objects in the movable storage system, as well as a velocity component in the −X direction to gradually engage one or more objects with the opposing jaws of the tool 2417C. At the end of the first motion, the −X velocity component may be reduced to zero when the tool of a robotic device is fully engaged with the one or more objects, as shown by tool 2417B on robotic device 2411B. The robotic device may then use a second motion in the first direction to move synchronously with the movable storage system until the one or more objects are fully removed from the movable storage system, as shown by tool 2417D on robotic device 2411D. In various embodiments, the one or more objects may then be transferred to another location for further processing or operations, including but not being limited to filling, weighing, capping, etc. The second motion is only in the first direction, unlike the first motion which is in both the X direction and the Y direction. During the first motion, the gripped objects may be constrained by the moveable storage system. During the second motion, the gripped objects are engaged with a robotic device but may also be constrained by the movable storage system. FIGS. 17B and 17C show cross-sectional views of the robotic device along lines B-B and C-C, respectively. For example, each robotic device (e.g. robotic device 2411A in FIG. 17C) may comprise two magnetic bodies 2416I and 2416II, which are substantially similar to the magnetic bodies 1316I and 1316II shown in FIG. 8F, thereby allowing significantly increased motion range in the Z direction, that may be used for filling and/or weighing and/or capping and/or checking operations with respect to the one or more objects.

Collaborative Robots

Figure 18:
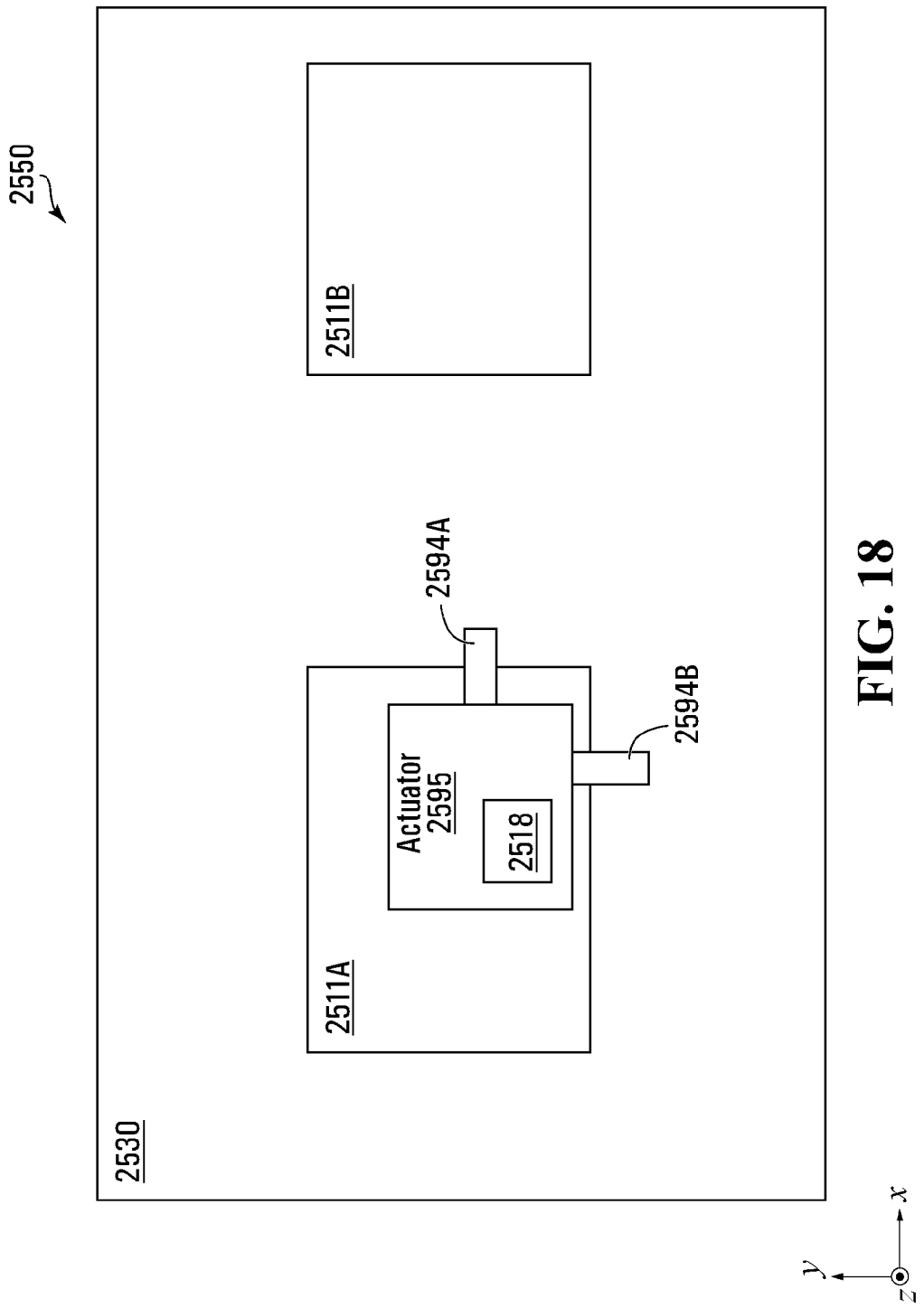
FIG. 18 is a top view of an apparatus according to one embodiment.

FIG. 18 shows a magnetic movement apparatus 2550 according to another embodiment of the invention. The magnetic movement apparatus 2550 comprises a first robotic device 2511A and a second robotic device 2511B. In various embodiments, first and second robotic devices 2511A and 2511B may comprise first and second movers respectively (not shown). The robotic device 2511A comprises an actuator assembly 2595, comprising a first actuator 2594A and in the illustrated embodiment, a second actuator 2594B. In various embodiments, the actuator assembly 2595 may comprise more or fewer actuators. When robotic device 2511B moves towards robotic device 2511A, it may be configured to come into contact with and thereby actuate one of the first and second actuators 2594a and/or 2594b. For example, in various embodiments the actuator assembly 2595 may comprise a thumb pump, and the robotic device 2511B may be configured to push and then release the actuator 2594a by moving toward and then away from robotic device 2511A. In various embodiments, this type of actuation may be utilized to create a vacuum in a vacuum cup (not shown, but in various embodiments as described in reference to FIG. 7C, for example); such a generated vacuum may be used to hold a part 2518 loaded on the vacuum cup or may be used to position the first robotic device 2511A stationary against a top surface of a working surface to survive power failure. In such an embodiment, the second actuator 2595b may be used to release the vacuum by allowing the vacuum cup to be exposed to the atmosphere. First actuator 2594a may be activated by robotic device 2511B approaching robotic device 2511A in the −X direction; likewise, second actuator 2594b may be activated by robotic device 2511B approaching robotic device 2511A in the +Y direction. In various embodiments, the one or more actuators may be positioned such that movement by the robotic devices or movers in any suitable direction may actuate the actuators upon contact between the robotic devices or movers.

In another exemplary embodiment, the actuator assembly 2595 may comprise a multi-stable mechanism (including but not being limited to a bi-stable mechanism) (not shown). As used herein, a "multi-stable mechanism" is a mechanical device having multiple minimum energy states or stable states, wherein the device is configured to stay in any of the stable states. With the aid of an external force, the multi-stable mechanism is configured to be switched from one stable state to another. One such example of a bi-stable mechanism is a plate under compression. However, any form of multi-stable mechanisms may be implemented in various embodiments as contemplated herein. In such an embodiment, actuating an actuator such as first actuator 2594a, such as by causing the robotic devices to come into contact with one another so as to push on the actuator 2594a, may trigger the actuator assembly 2595 to cause the multi-stable mechanism to switch from one stable state to another. For example, one stable state may be used to hold the part 2518 and the other stable state may be used to release the part 2518.

Self-Actuating Robot

Figure 19:
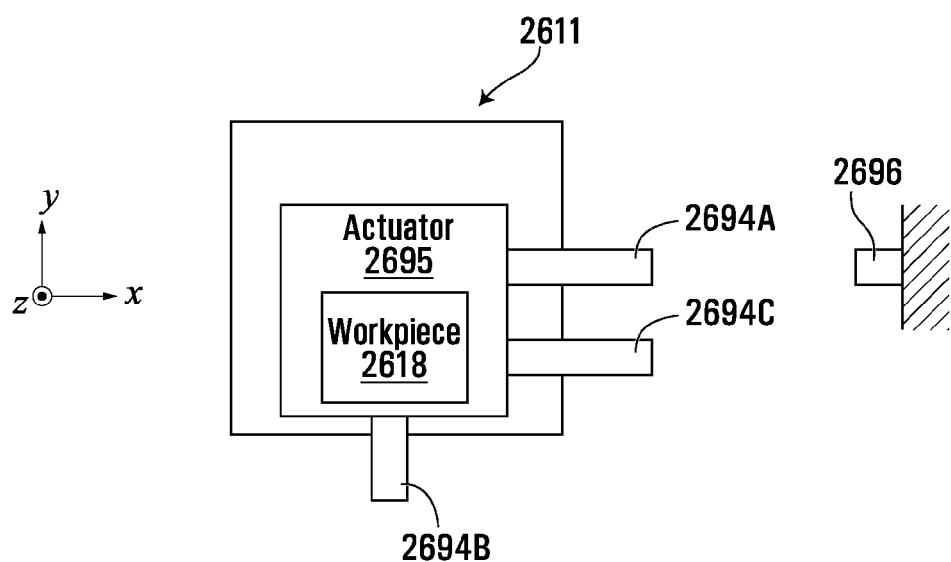
FIG. 19 is a top view of an apparatus according to one embodiment.

Referring to FIG. 19, a magnetic movement apparatus according to another embodiment comprises one robotic device 2611 comprising one or more magnetic bodies configured to interact with currents driven into electrically conductive elements in a work to control motion of the robotic device 2611 in at least two directions/DOF, such as the X and Y directions. In the illustrated embodiment, the robotic device 2611 comprises an actuator assembly 2695 and first, second, and third actuators 2694a, 2694b, and 2694c. In various embodiments, the robotic device 2611 may comprise more or fewer actuators. The magnetic movement apparatus further comprises an activator 2696. In the illustrated embodiment, the activator 2696 is installed on a work body frame such that it is stationary with respect to the robotic device 2611. In various embodiments, the activator 2696 may be installed on another robotic device or on another suitable movable structure or body, for example. In various embodiments, the apparatus may comprise more than one activator. The robotic device 2611 may be configured to move toward the activator 2696 in order cause the activator 2696 to come into contact with and thereby actuate one or more of the actuators 2694a, 2694b, and 2694c.

For example, in various embodiments the actuation operation may be achieved by causing the robotic device 2611 to move such that the first actuator 2694a comes into contact with the activator 2696 to thereby actuate the actuator 2694a, and by subsequently causing the robotic device 2611 to move away from the activator 2696 such that the actuator 2694a can be released.

In various embodiments, actuation of an actuator such as actuator 2694a may be achieved in a contactless way. In such an embodiment, the activator 2696 may comprise one or more electrical electrically conductive elements (with or without an iron core, for example), and one or more of the actuators 2694 may comprise an armature (such as an iron or a permanent magnet, for example). The armature may be configured to be actuated when in a certain proximity to a current driven through the electrical electrically conductive element in the activator 2696 to generate mechanical motion. In various embodiments, the armature may comprise a resiliently deformable component such as a spring, which may cause the armature to move to a predefined location or position when the armature is not actuated by the current in the activator. In other embodiments, actuators 2694 may comprise actuation mechanisms such as electrostatic actuation mechanisms, for example.

In various embodiments, the actuator assembly 2695 may comprise a vacuum pump (not shown), and the actuators 2694 may be configured to be used to generate and/or release a vacuum inside the vacuum pump. In various embodiments, the actuator assembly 2695 may comprise a multi-stable mechanism (such as a hi-stable mechanical mechanism) that can be switched from one locally stable state to another by activating one of the actuation handles.

Although the actuators in some figures are shown to be outside the footprint of a robotic device, this is not necessary. For example, an actuator may fall inside of a robotic device footprint; when the robotic device is approaching an activator, the activator can fall inside the robotic device footprint to implement the actuation either by mechanical contact or in a contactless way.

Robots with Multiple Configurations

According generally to various embodiments, each robotic device in a magnetic movement apparatus may be individually configured to a first configuration and a second configuration. In the first configuration, for example, the mechanical link may not constrain relative motion among the plurality of movers, and the spatial position/orientation of the linkage body may be fully determined by the respective spatial positions/orientations of the plurality of movers. In the second configuration, the mechanical link may constrain the relative motion among the plurality of movers in one or more directions/DOF. In various embodiments, each of the one or more robotic devices may be individually switched from the first configuration to the second configuration by activating a switching mechanism. Non-limiting examples of switching mechanisms include a lock, a brake, or a pin activated to insert into a pin hole or a face gear, for example. In various embodiments, the mechanical link may comprise one or more resiliently deformable components such as springs, which may help generate preload among elements of the mechanical link, and/or reduce the required actuating forces required to move on one or more of the movers.

Figure 20A:
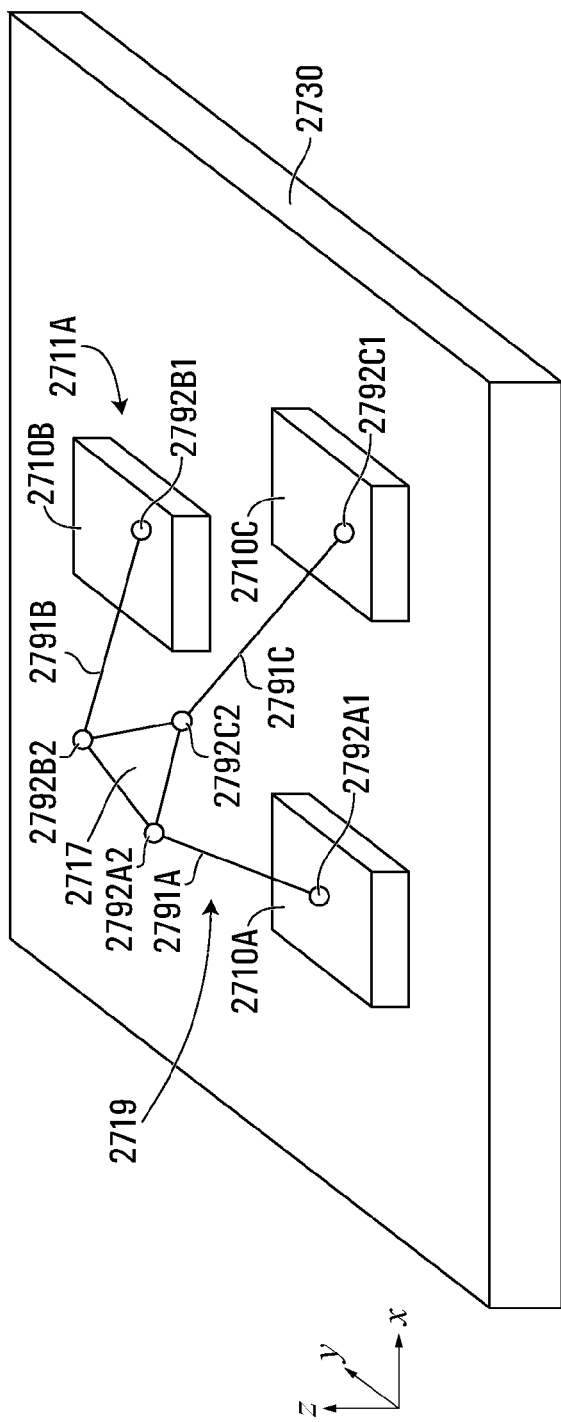
FIG. 20A is an isometric top view of an apparatus according to one embodiment.

Referring specifically to FIG. 20A, an exemplary embodiment of a magnetic movement apparatus comprising three movers is shown. Various embodiments may include more or fewer movers. The magnetic movement apparatus of FIG. 20A comprises a robotic device 11A and a work body 2730. Although only one robotic device 2711A is shown in FIG. 20A, it should be understood to those skilled in the art that other robotic devices (such as 2711B, 2711C, 2711D, each may be substantially similar to the robotic device 2711A) may also be included in the magnetic movement apparatus, and they together may share the work body 2730. The work body comprises a plurality of electrically conductive elements. The robotic device 2711A comprises a plurality of movers, 2710A, 2710B, and 2710C (collectively, the "movers 2710") and a mechanical link 2719 comprising a linkage body 2717, connectors 2791A, 2791B, and 2791C, and hinges 2792A1, 2792A2, 2792B1, 2792B2, 2792C1, 2792C2 (collectively, "hinges 2792"). In various embodiments, hinges 2792A1, 2792B1, and 2792C1 may be spherical joints, and hinges 2792A2, 2792B2, 2792C2 may be cylindrical joints or other linear hinge joints. In other embodiments, any of hinges 2792 may be any suitable type of two-axis hinge. Each of the plurality of movers comprises one or more magnetic bodies that can interact with suitably driven currents through a set of suitably selected electrically conductive elements of 30 to generate controllable motion for each mover.

The robotic device 2711A can be configured in at least two configurations comprising a first configuration and a second configuration. In the first configuration, each of movers 2710A, 2710B, 2710C can have at least two in-plane DOF motion (X and Y). As a result, the position/orientation is fully determined by the positions/orientations of movers 2710A, 2710B, 2710C. In this configuration, the mechanical link 2719 doesn't constrain the relative motion among the movers 2710: for example, the number of directions/DOF in which any of the three movers may move is not affected by whether the mechanical link 2719 is installed or not. In various embodiments, each of the plurality of movers 2710 is capable of movement in 6 directions/DOF; although movers 2710 are connected together by the mechanical link 2719, each mover may still be controllably moved in 6 directions/DOF.

In the second configuration, at least one of the joints is locked by activating a locking/braking mechanism (for example, two parts connected by a joint may be forced to be rigidly connected together). Consequently the mechanical link 2719 is caused to constrain the relative motion among the three movers 2710; in other words, the three movers' motions are coupled by the mechanical link 2719 due to the activation of the locking mechanism. For example, in the first configuration, hinge 2792A1 comprises a spherical joint, which allows 3 directions/DOF of relative motion between the connector 2791A and mover 2710A; in the second configuration, the spherical joint 2792A1 is locked at a particular position such that connector 2791A and mover 2710A are rigidly connected together. Due to the locking of spherical joint 2792A1, the relative motion between movers 2710A and 2710B and 2710C is constrained.

Non-limiting examples of locking mechanisms include a brake, or a pin driven into a face gear, for example. In various embodiments, the actuation of such a locking mechanism may be by self-actuation as described previously (e.g. by moving the robotic device to interact with an activator, for example) or may be actuated by another robotic device in a collaborative way as described previously, or may be actuated by relative motion between movers along a live axis as previously described, or may be actuated by an additional actuator installed on the mover according to a wirelessly received command, for example.

The advantage of the second configuration is to reduce power consumption in situations including but not being limited to maintaining a certain position of the carrier plate 17. The first configuration gives the overall robotic device flexible agile motion. Allowing the robotic device to switch from one configuration to another provides advantages from both.

Although in the previous discussion, hinges 2792A2, 2792B2, 2792C2 comprised cylindrical joints or linear hinge joints, and hinges 2792A1, 2792B1, 2792C1 comprised spherical joints, according to another exemplary embodiment, hinges 2792A2, 2792B2, and 2792C2 may be spherical joints, and hinges 2792A1, 2792B1, 2792C1 may be cylindrical joints. In another exemplary embodiment, hinges 2792A1, 2792A2, 2792B1, 2792B2, 2793C1, 2793C2 may all be U-joints (a combination of two cylindrical joints with their rotational axis non-parallel), for example.

Figure 20B:
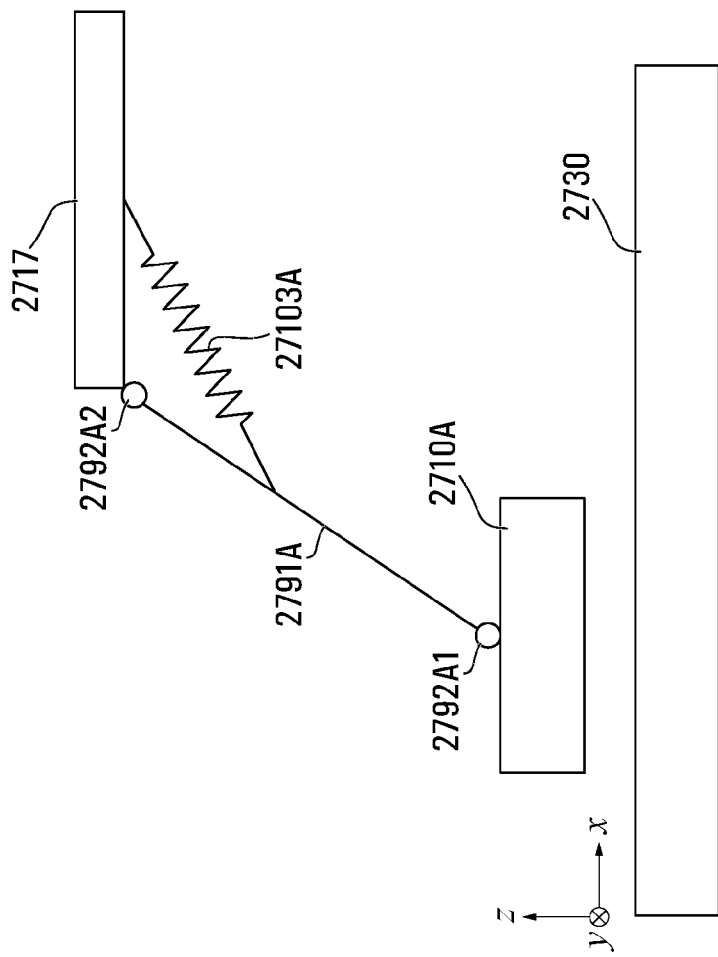
FIG. 20B is a partial side view of the apparatus shown in FIG. 20A.

In various embodiments, robotic device 2711 may comprise one or more resiliently deformable elements such as springs (for example, linear springs or rotational springs) installed in the mechanical link 2719. FIG. 20B shows a non-limiting example of a resiliently deformable spring 27103A added to the robotic device 2711A of FIG. 20A. When lowing the linkage body 2717 (which may moves in the −Z direction in response to coordinated motion of movers 2710A, 2710B, and/or 2710C) to a certain position, the required lateral actuation force (in X or Y direction) on mover 2710A may be bigger than the required vertical actuation force (in the Z direction), without the resiliently deformable element 27103A. As such, the inclusion of a resiliently deformable element 27103A with suitable parameters may help reduce the required lateral actuation force on mover 2710A. Such a resiliently deformable element may be a linear spring or a torsional spring, for example. Although only one resiliently deformable element is shown in FIG. 20B, it should be understood to those skilled in the art that similar resiliently deformable elements may be optionally added to connectors 2791B and 2791C respectively.

In various embodiments, each of the three movers (2710A, 2710B, 2710C) may be levitated away from the work body 2730 with a gap in between the work body and the movers in both configurations. In various embodiments, each of three movers (2710A, 2710B, 2710C) may sit on a top surface of the work body 2730 and may move in both the X and Y directions with proper sliding or rolling bearings in both configurations.

Although only three movers are shown in the particular embodiment in FIG. 20A, a robotic device may comprise four or more movers and a suitably designed mechanical link 2719 comprising a similar linkage body, and the robotic device can be configured in two configurations: in the first configuration, each of the four or more movers can be independently controlled, and the mechanical link 2719 doesn't constrain the relative motion among the four or more movers, and the linkage body's position/orientation is fully determined by the positions/orientations of the four or more movers; in the second configuration, the relative motion among the four or more movers are constrained due to one or more of the hinges being locked. Optionally, one or more resiliently deformable elements such as springs as previously described can be installed in the mechanical link which may reduce the required lateral actuation force on one or more movers for power saving.

In various embodiments, a magnetic movement apparatus may be always configured in the first configuration and there may be no locking mechanism; one or more resiliently deformable element(s) may be installed in the mechanical link which may help reduce power consumption in certain positions.

In various embodiments, a magnetic movement apparatus capable of moving a platform comprises:
  A work body;
  at least one mover comprising a first magnetic body and a second magnetic body moving in close vicinity of a working surface of the work body;
  wherein said at least one mover is capable of motion in at least two in-plane directions; and of relative controllable motion between the first magnetic body and the second magnetic body;
  a four bar linkage comprising two or more connectors attached to a respective two or more hinges at the first magnetic body, and by an additional two or more respective hinges at a linkage body;
  a single connector attached at one end to the second magnetic body with a hinge, and attached at the second end by another hinge to the linkage body.

In various embodiments, the four bar linkage may further comprise at least one locking mechanism on at least one hinge between one connector and the first magnetic body. In various embodiments, said one or more of said hinges may be revolute joints. In various embodiments, attaching said single connector to said second magnetic body may further comprise a locking mechanism on the respective hinge between the one connector and the second magnetic body. In various embodiments, said locking mechanism may comprise a toothed or slotted disk and a solenoid actuated locking pin, or an over center linkage actuated locking pin. In various embodiments, said locking mechanism may comprise a friction brake. In other embodiments, said work body may be planar. In various embodiments, the work body may be cylindrical.

Magnetic Movement Systems with Multiple Work Bodies

Figure 21A:
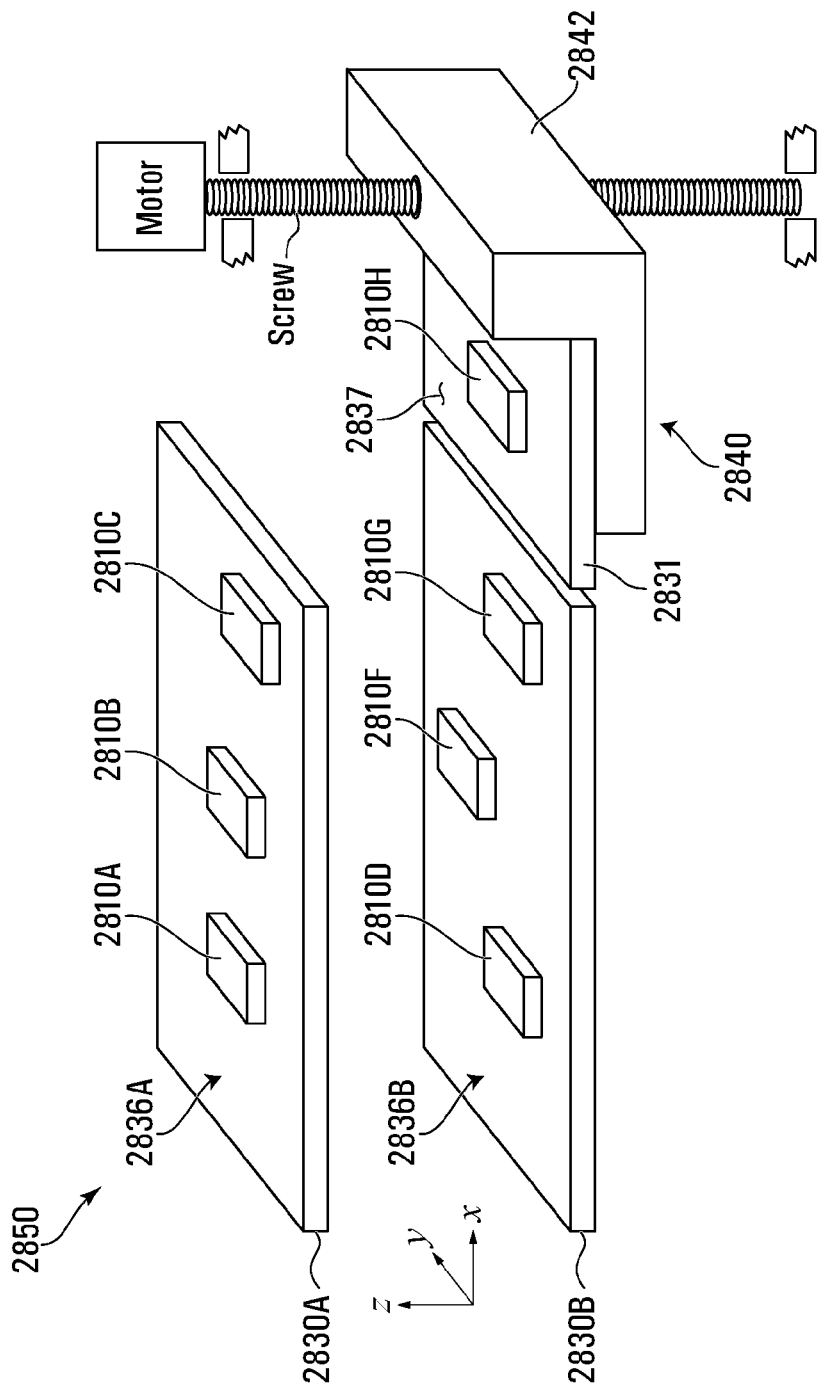
FIG. 21A is an isometric top view of an apparatus according to one embodiment.
Figure 21B:
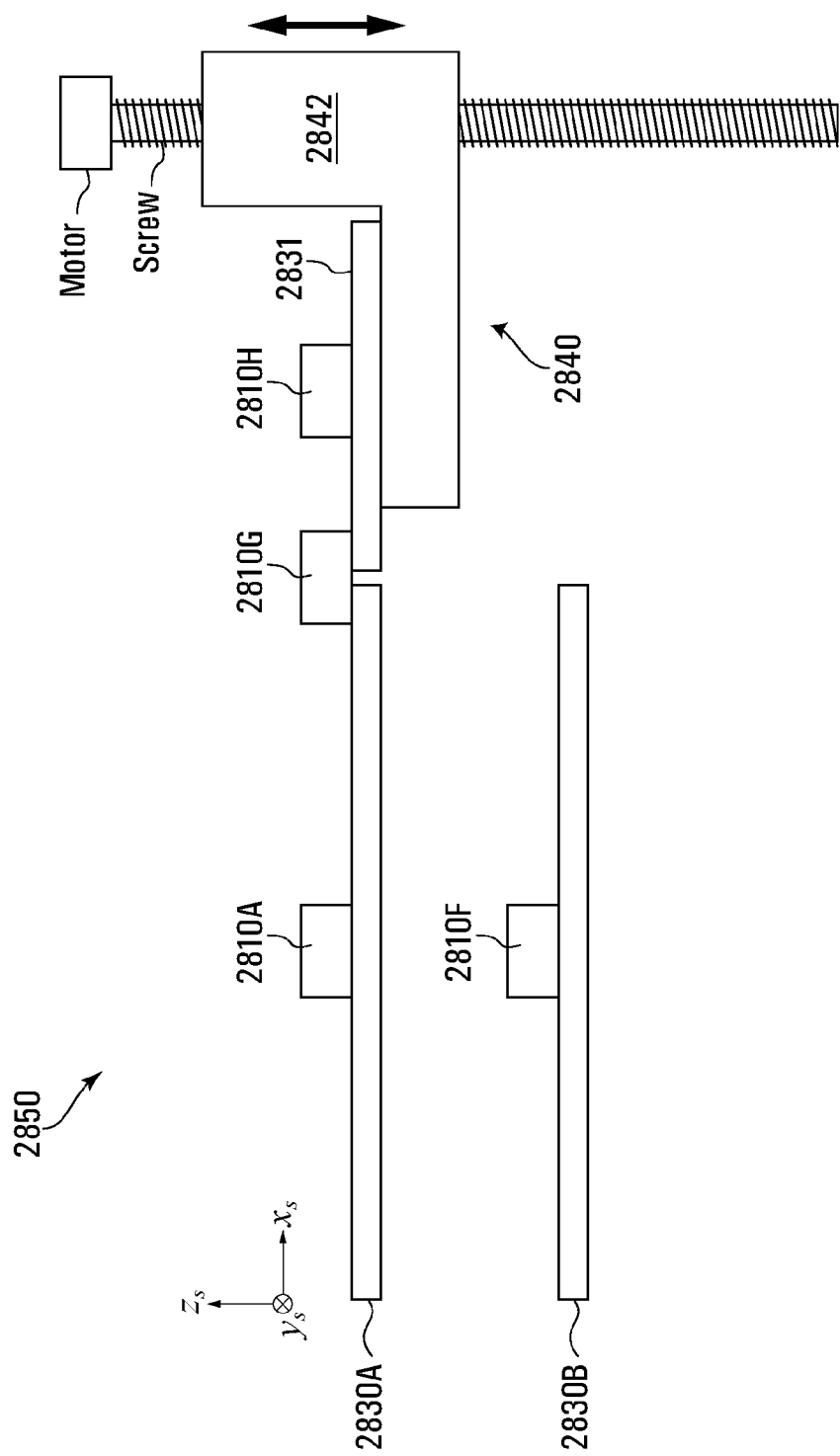
FIG. 21B is a side view of the apparatus shown in FIG. 21A.
Figure 21C:
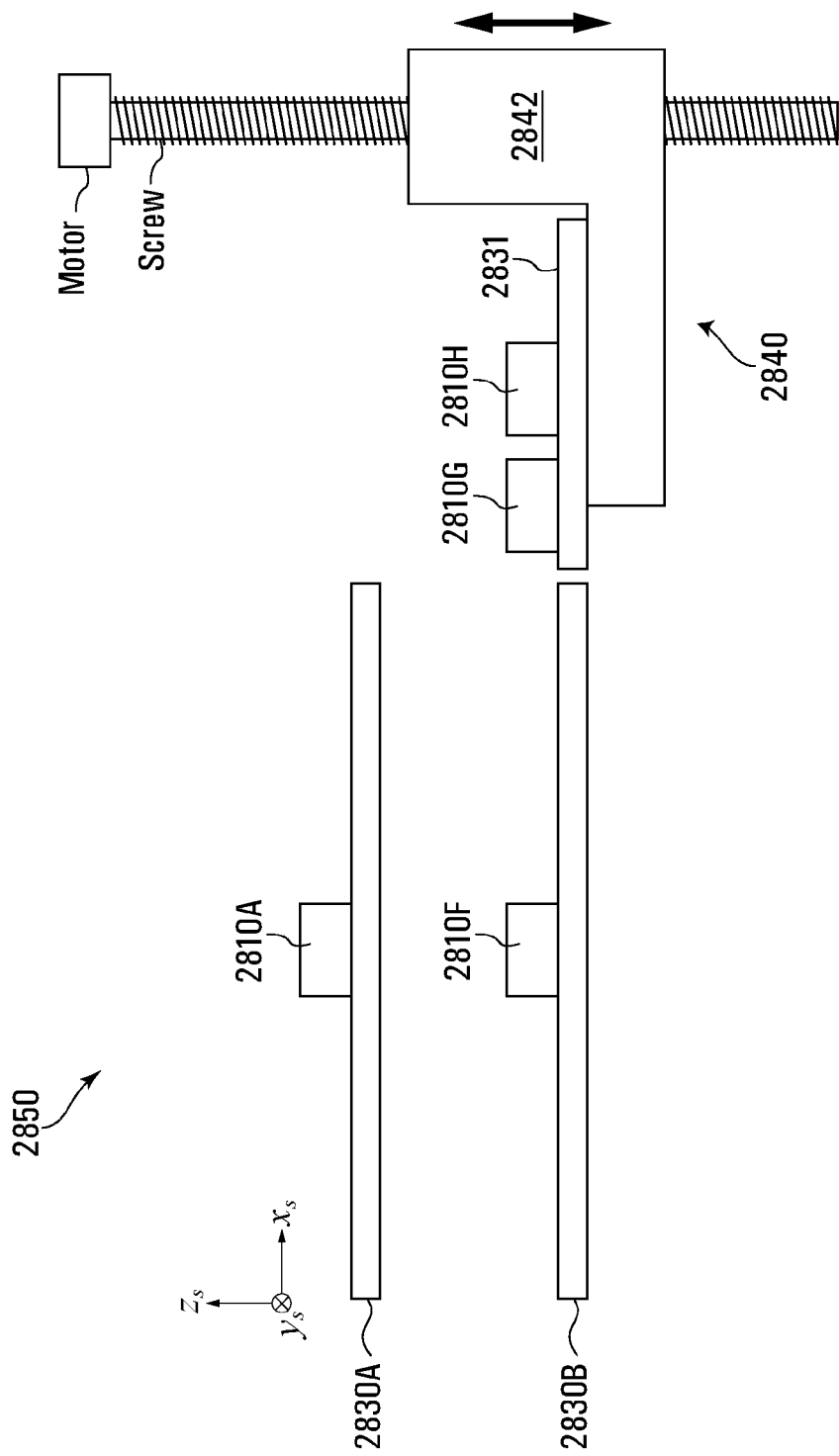
FIG. 21C is a side view of the apparatus shown in FIG. 21A.

According to another embodiment shown generally in FIGS. 21A, 21B, and 21C, a magnetic movement apparatus 2850 comprises a plurality of work bodies 2830, a plurality of movers 2810, and a transfer device 2840. Each work body comprises a plurality of electrically conductive elements and each is operable to receive controllable currents driven into said electrically conductive elements by amplifiers to interact with magnets on the movers to controllably move the movers in vicinity of working surfaces of each work body in at least two in-plane directions/DOF according to any method previously described. The plurality of work bodies comprises a first work body 2830A and a second work body 2830B. The first work body 2830A and the second work body 2830B overlap in the Z direction: the first work body is located in a first z location, and the second work body is located at a second z location. In various embodiments, there may be more than two work bodies which overlap, and there may be work bodies in the magnetic movement apparatus which do not overlap with other work bodies. The first work body 2830A has a first working region 2836A, and the second work body 2830B has a second working region 2836B. In the present embodiment, the working regions comprise planar surfaces, although in various embodiments the working regions may comprise non-planar surfaces. The transfer device 2840 may travel between the first work body and the second work body to carry one or more movers between the first work body working region 36A and the second work body working region 36B.

Generally, the first (planar) working region 2836A and the second (planar) working region 2836B are disconnected with each other due to the fact that they are associated with two work bodies located at different Z locations. In order to transfer one or more movers from one working region to the other, the system 2850 comprises the transfer device 2840. In the illustrated embodiment, the transfer device comprises a transfer body 2831, which provides a transfer working region 2837 comprising a surface which may be planar or non-planar in various embodiments. In the illustrated embodiment, the transfer body is configured to operate like any other work body described herein, wherein the transfer body comprises a plurality of electrically conductive elements operable to conduct current and thereby generate one or more magnetic fields which may exert corresponding forces and/or torques on the magnetization elements in the one or more movers. The transfer device 2840 may at first align the transfer body 2831 with the first work body 2830A in the Z direction, and one or more movers 2810 can be controllably moved from the first working region 2836A to the transfer working region 2837 of the transfer device 2840; afterwards the transfer device 2840 may travel along the Z direction to align the transfer body 2831 with the second work body 2830B in the Z direction and accordingly the one or more movers 2810 may be controllably moved from the transfer working region 2837 of the transfer device 2840 to the second working region 2836B of the second work body 2830B.

FIG. 21A shows an exemplary embodiment of a transfer device 2840, which comprises a transfer body 2831 and a Z motion transfer stage 2842. In various embodiments, the transfer stage 2842 may be operable to transfer one or more movers in other directions, such as the X and/or Y directions, for example. The transfer stage 2842 is guided by proper linear guiding mechanism (not shown) and is driven by with a suitable linear driving mechanism, including but not being limited to a lead screw and a rotary motor and suitable guiding mechanism. The transfer body 2831 may comprise a plurality of electrically conductive elements and has a structural substantially similar to work bodies 2830A or 2830B, except that the transfer body 2831 is mounted on the Z motion transfer stage 2842 instead of being held stationary. The transfer body 2831 provides a transfer working region 2837 to movers 2810. The transfer working region 2837 moves with the Z motion stage 2842 in the Z direction. In various embodiments, in each of the working regions (2836A, 2836B, 2837), the one or more movers 2810 can be controllably moved in at least two in-plane directions/DOF. In various embodiments, the one or more movers 2810 can be controllably moved in 6 directions/DOF without any contact with the work body in each of the working regions (2836A, 2836B, 2837).

In order to transfer the one or more movers from one work body working region (e.g. 2836A) to another work body working region (e.g. 2836B), the transfer stage 2842 may first move in the Z direction to align the transfer body 2836 with the first work body 2830A, i.e. align the working regions of the first work body 2830A and the transfer body 2836 relative to the Z direction. As a result, the first working region 2836A and the transfer working region 2837A may form a continuous first extended working region, i.e. the combination of the first working region 2836A and the transfer working region 2837 while the transfer body 2840 is aligned with the first work body 2830A. In the first extended working region, the one or more movers 2810 may controllably move in up to 6 directions/DOF from the first working region 2836A to the transfer working region 2837, as shown in FIG. 21B. Once the one or more movers 2810, enters into the transfer region 2837, the transfer device may be driven in the Z direction to carry the one or more movers along with the transfer body 2831, to align the transfer body 2831 with the second work body 2830B as shown in FIG. 21A, which accordingly causes the transfer working region 2837 and the second working region 2836B to form a continuous second extended working region, i.e. the combination of the second working region and the transfer working region. In the second extended working region, the one or more movers (as shown in FIG. 21A) may be controllably moved from the transfer working region 2837 into the second working region 2836B. In this way, movers may be controllably moved between two non-continuous working regions (2836A and 2936B).

Although the illustrated embodiment describes process of moving a mover from a high level work body 2830A to a low level work body 2830B, it will be appreciated by those skilled in the art that the one or more movers can be moved from a low level work body 2830B back to a high level work body 2830A in various embodiments. In various embodiments, movers may be moved to and from work bodies in substantially the same plane.

FIG. 21B shows a cross-sectional view of the magnetic movement apparatus 2850. Two movers 2810G and 2810H may be transferred from one work body to another in one batch. Although FIG. 21B shows two movers 2810G and 2810H being spaced apart in the X direction, in other embodiments the two movers may be spaced apart in a different direction, such as the Y direction, when moving onto the transfer device at the same time. As shown in FIG. 21B, mover 2810G is straddling both the first work body 2830A and the transfer body 2831 during movement between said work bodies. FIG. 21C shows the case that two movers are carried by the transfer device 2840 when the transfer body 2831 is aligned with the second work body 2830B.

Since the one or more movers may be capable of being controllably moved in 6-directions/DOF, when the transfer body 2831 is aligned with a work body (e.g. 2830A), it is unnecessary for the position of the transfer body 2831 in the −z direction to be identical to the position of the work body 2830A in the −z direction. Similarly, the position of the transfer body 2831 in the −Z direction does not need to be identical to the position of the work body 2830B in the −z direction. Generally, a position of a work body in the Z direction may deviate from a position of another work body in the Z direction by a few degrees; here the Z direction is the normal direction of the work body working surface.

Figure 22A:
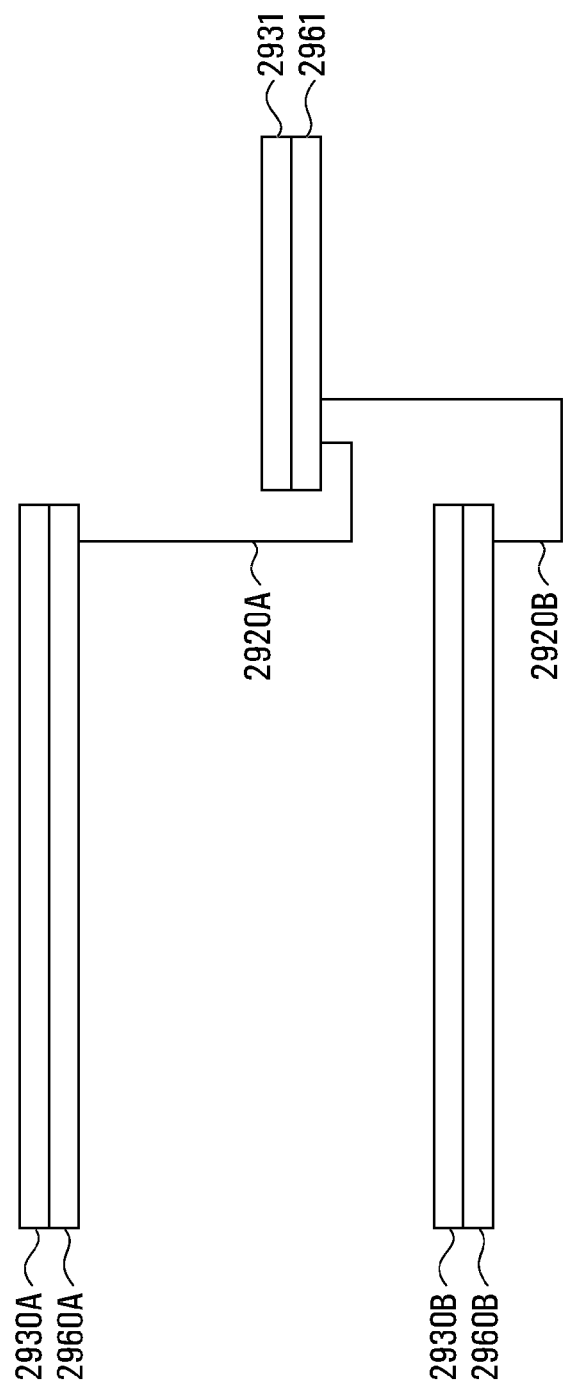
FIG. 22A is a schematic side view of a plurality of work bodies according to one embodiment.

In various embodiments, when the transfer body 2831 is aligned with a work body 2830, in addition to physically aligning their working plane and their associated working regions in the Z direction, it may be necessary to establish two-way communication between their corresponding work body controllers. FIG. 22A shows an exemplary embodiment wherein transfer body controller 2961 and one or more of work body controllers 2960A and 2960B of work bodies 2930A and 2930B respectively are in electrical communication, in order to transmit and receive signals and/or information which may facilitate a mover moving across the boundary between transfer body 2931 and either one of work bodies 2930A and 2930B. Such exchanged information may include but not be limited to current feedback, position sensing element outputs, mover control states, mover control parameters, and current commands, for example. Generally, due to the fact that a transfer body needs to be able to be aligned with at least two individual work bodies, in various embodiments the transfer body may contain a bi-directional communication channel for each work body which the transfer body is configured to be aligned with. As shown in FIG. 22A, the transfer body is connected to a transfer body controller 2961, work body 2930A is connected to a work body controller 2960A. When a work body is connected to its corresponding work body controller, e.g. 2930A is connected to 2960A, the work body controller may determine the currents in work body electrically conductive elements and/or may process the output signals from position sensing elements in work body. When transfer body 2931 is aligned with work body 2930A, a bidirectional communication channel 2920A is created between 2960A and 2961. When transfer body 2931 is aligned with work body 2930B, a bidirectional communication channel 2920B is created between 2960B and 2961. Such bidirectional communication channels 2920 may be implemented via industry standards or any other suitable electrical communication means, wired or wireless, for example.

Figure 22B:
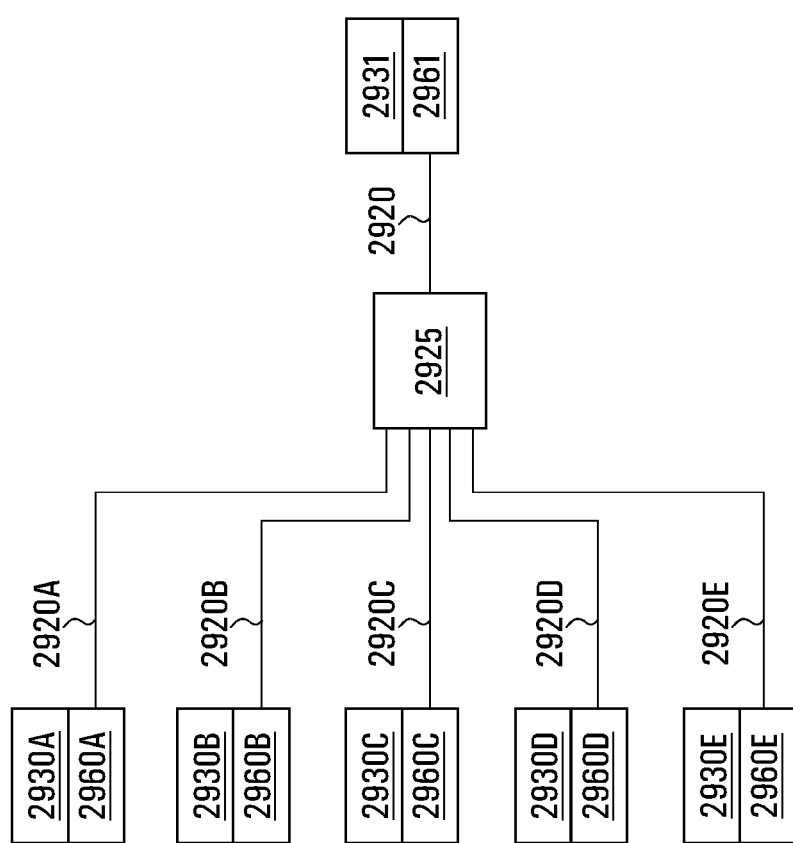
FIG. 22B is a schematic side view of a plurality of work bodies according to the embodiment shown in FIG. 22A.

In various embodiments, a transfer body controller 2961 may not be linked directly to each work body controller 2960. As shown in FIG. 22B, transfer body controller 2961 may be directly linked to a router 2925, which further bridges the work body controller to five work body controllers 2960A-2960E, where 2930A-2930E are five respective work bodies overlapped in the Z direction, each being located in a distinct Z location. Each work body controller 2960 may have a corresponding link 2920A-2920E to the router 2925, e.g. work body controller 2960A is connected to router 2925 via link 2920A, and the transfer body controller 2961 is connected to the router 2925 via communication channel 2920. When 2931 is physically aligned with a particular work body, e.g. 2930C, the router 2925 may be configured to enable data exchange between transfer body controller 2961 and work body controller 2960C through communication channels 2920C and 2920.

Figure 23A:
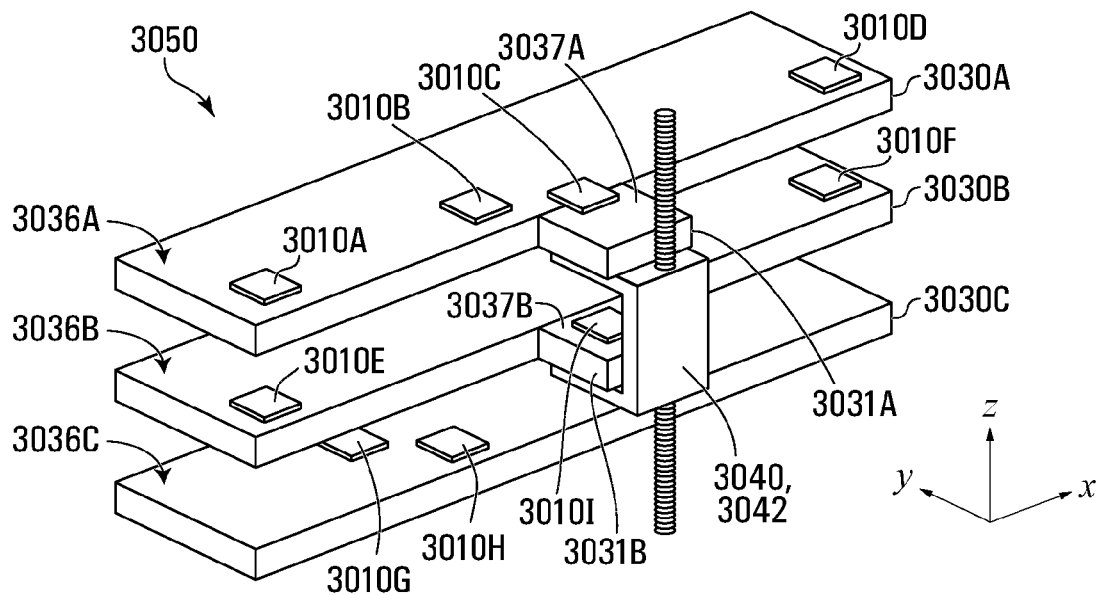
FIG. 23A is an isometric top view of an apparatus according to one embodiment.
Figure 23B:
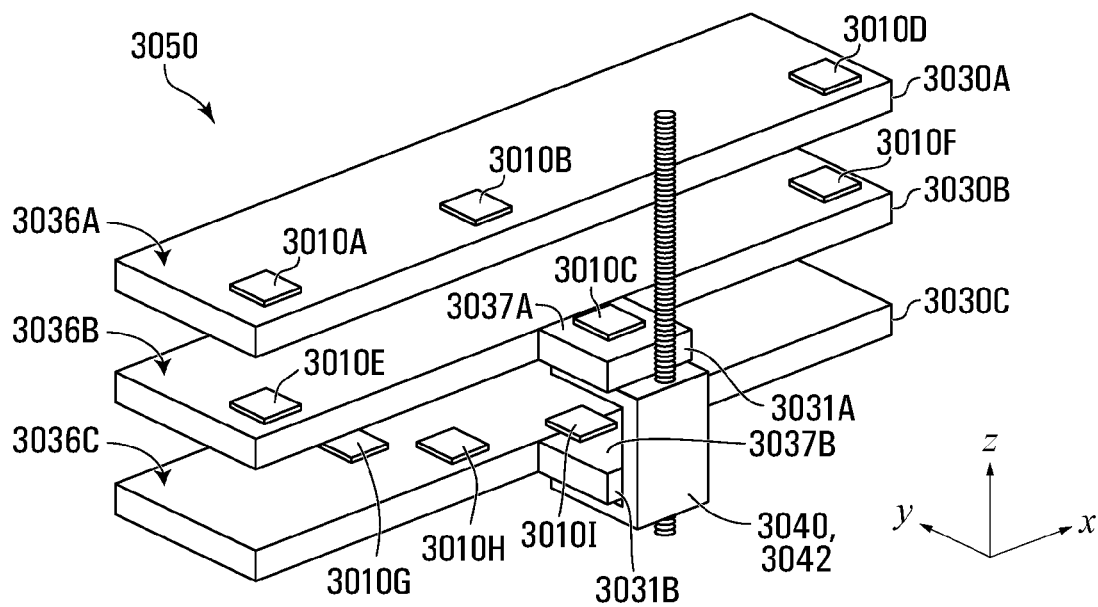
FIG. 23B is an isometric top view of the apparatus shown in FIG. 23A.

Although only one transfer body is shown in the embodiments in FIGS. 21 and 22, a transfer device may comprise a plurality of transfer work bodies. FIGS. 23A and 23B show a magnetic movement apparatus 3050 according to another embodiment of the invention. The magnetic movement apparatus 3050 comprises a plurality of work bodies 3030A, 3030B, 3030C, and a plurality of movers 3010A-3010I, each operating substantially the same as work bodies and movers as previously described. Each of work bodies 3030A-3030B provides a corresponding working region 3036A-3036C, each having a surface which may be planar or non-planar. Work bodies 3030A, 3030B, and 3030C overlap in the Z direction. A transfer device 3040 comprises a Z motion transfer stage 3042, which comprises a plurality of transfer work bodies (in the illustrated embodiment, two work bodies 3031A, and 3031B). The Z motion transfer stage 3042 is guided and driven with suitable mechanisms so that the Z motion transfer stage 3042 can carry the plurality of work bodies to move in the Z direction. The Z motion transfer stage 3042 can align one or more transfer work bodies with corresponding one or more work bodies at the same time. In FIG. 23A, transfer body 3031A is aligned with work body 3030A and transfer body 3031B is aligned with 3030B, such that working regions 3036A and 3037A form a continuous extending working region allowing a first set of one or more movers, e.g. 3010C to move from 3036A to 3037A or the other way. At the same time, working regions 3036B and 3037B form a continuous extending working region allowing a second set of one or more movers, e.g. 3010I, to move from working region 3036B to 3037B or the other way. After mover 3010C moves onto 3037A and mover 3010I moves onto 3037B, the Z motion transfer stage 3042 may carry movers 3010C and 3010I in the −Z direction until transfer body 3031A aligns with work body 3030B, and transfer body 3031B aligns with work body 3030C as shown in FIG. 23B. As a result, working regions 3036B and 3037A form a continuous extended region allowing mover 3010C to controllably move from 3037A to 3036B, and working regions 3036C and 3037B form a continuous extended region allowing mover 3010I to controllably move from 3037B to 3036C. In order to enable two work bodies to be aligned with two transfer work bodies simultaneously, the Z-direction offset between two work bodies, e.g. between 3030A and 3030B, should substantially equal the Z-direction offset between the two transfer work bodies, e.g. between 3031A and 3031B. The two transfer work bodies in this exemplary embodiment may help achieve mover transfer from one or more work bodies to another one or more work bodies at the same time, e.g. mover 3010C can be transferred from work body 3030A to 3030B at the same time when mover 3010I is transferred from work body 3030B to 3030C.

Figure 32:
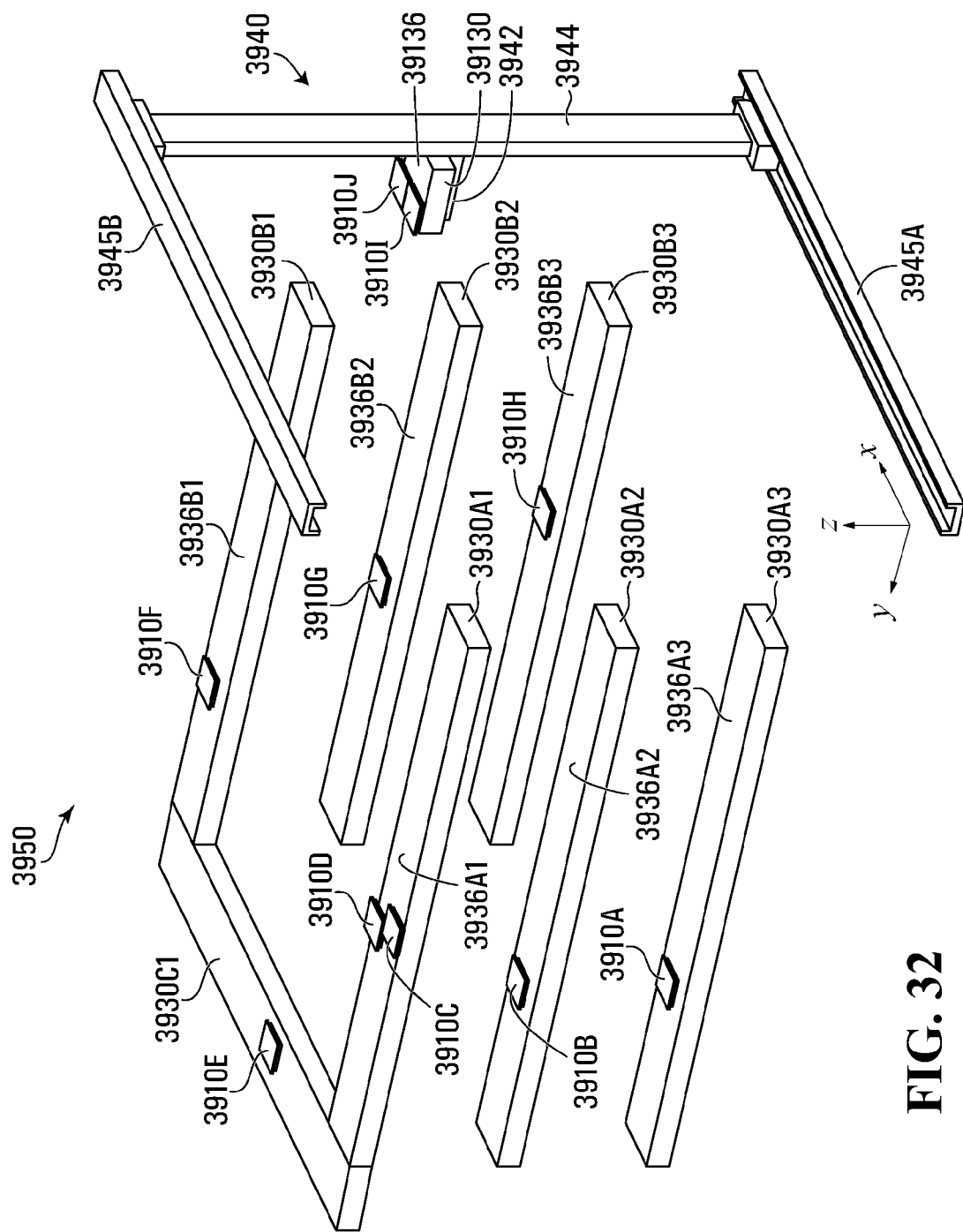
FIG. 32 is an isometric top view of an apparatus according to one embodiment.

Referring now to FIG. 32 a magnetic movement apparatus 3950 according to another exemplary embodiment comprises a plurality of work bodies (3930A1-3930A3, 3930B1-3930B3, 3930C), a transfer device 3940, and one or more movers 3910A-3910J. The transfer device 3940 comprises an X motion transfer stage 3944, a Z motion transfer stage 3942, and a transfer body 39130. The X motion transfer stage 3944 is guided by X-oriented guides 3945A and 3945B, and driven by any suitable mechanism (not shown, non-limiting examples of which may include a rotary motor plus lead screws, a linear motor, a cable driven system, or a pulley driven system, for example) so that the X motion transfer stage 3944 can travel in the X direction. Likewise, the Z motion transfer stage 3942 is mounted on the X motion transfer stage 3944 with suitable guiding and driving mechanisms (not shown) so that the Z motion transfer stage 3942 can travel in the Z direction relative to the X motion transfer stage 3942. The transfer body 39130 is mounted on the Z motion transfer stage 3944 so that the transfer body 39130 can move in both the X and Z directions independently. In various embodiments, the transfer body may be caused to move in any two or more directions, such as the Y and Z directions or the X, Y, and Z directions, for example.

Each work body (3930A1-3930A3, 3930B1-3930B3, 3930C, and transfer body 39130) provides a corresponding working region (3936A1-3936A3, 3936B1-3936B3, 3936C, 39136) comprising a suitable planar or non-planar surface for movers to controllably move in at least two in-plane directions/DOF by driving current through work body electrically conductive elements properly according to suitable control algorithms and feedback methods as described in reference to previous embodiments disclosed herein. Work bodies 3930A1-3930A3 overlap with each other in the Z direction, and Work bodies 3930B1-3930B3 overlap with each other in the Z direction. In the illustrated embodiment, Work body 3930C1 is a bridge work body which allows one or more movers to travel between working region 3936A1 and working region 3936B1. Various embodiments may not include a bridge work body such as work body 3930C1. The transfer body 39130 may be aligned with another work body (e.g. 3930A2) by driving the X motion stage 3944 and Z motion stage 3942 properly so that the working region 3936A2 and the transfer body working region 39136 form a continuous working region, which allows movers to move between 3936A2 and 39136, for example, mover 3910I and 3910J may controllably move from 3936A2 to 39136. Afterwards, the transfer body may carry the movers 3910I and 3910J away by the X and Z motion stages and be aligned with another work body (e.g. 3930B3) such that working regions 3936B3 and 39136 form a continuous working region and movers 3910I and/or 3910J may controllably move from transfer body working region 39136 to work body working region 3936B3.

Generally, a transfer body may transfer one or more movers from a first work body working region to a second work body working region when the first work body working region and the second work body working region are disconnected from each other and their corresponding work bodies are located at different locations in a particular direction such as the Z direction. Although work body 3930C1 is shown in the FIG. 32 may provide a fast transfer corridor for movers to shuttle between 3936A1 and 3936B1, it is not necessary in all embodiments. Although in the illustrated embodiment two movers are carried by the transfer body 39130, in various embodiments, any number of movers may be carried by the transfer body 39130 from one work body to another. Although in FIG. 32 only one transfer work body is shown, in various embodiments two or more transfer bodies may be mounted on the Z motion transfer stage 42, in a way similar to the embodiment shown in FIGS. 23A and 23B.

Figure 24A:
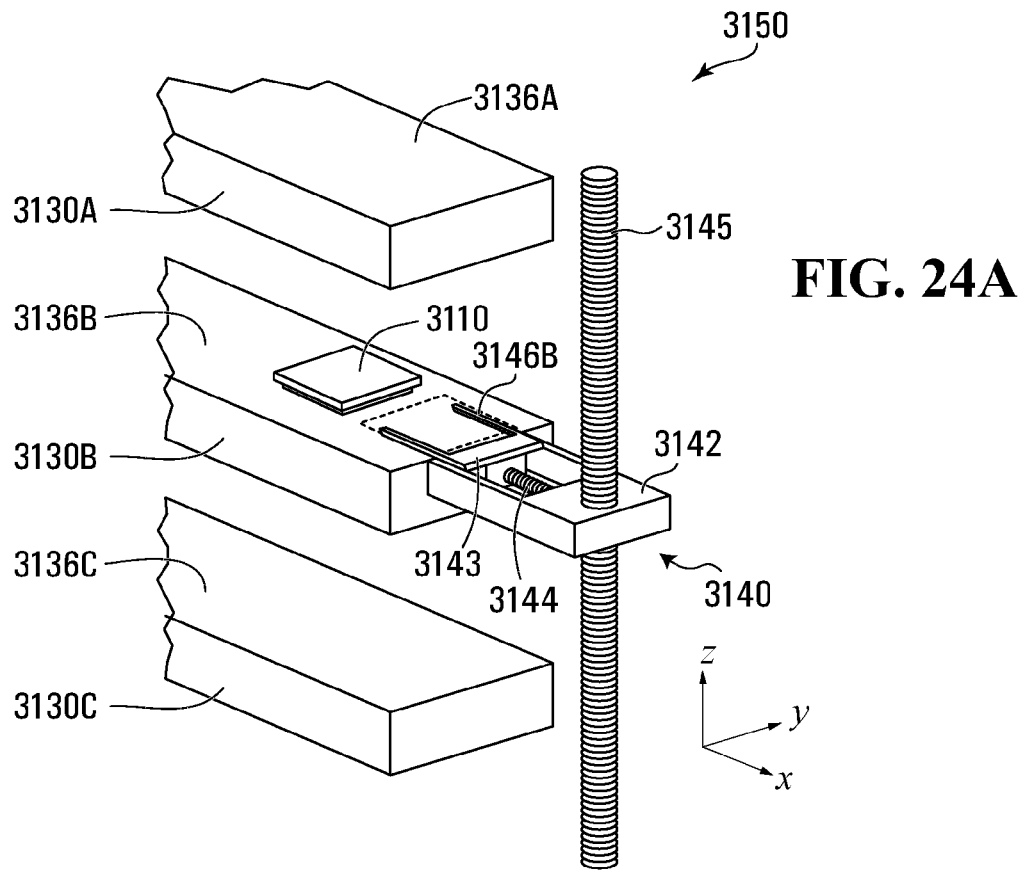
FIG. 24A is a partial isometric top view of an apparatus according to one embodiment.
Figure 24B:
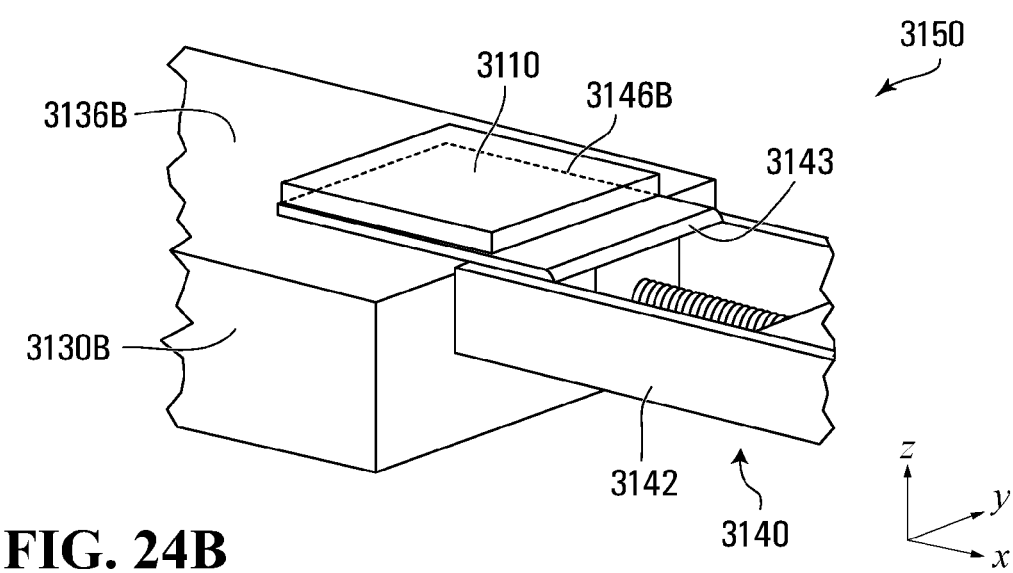
FIG. 24B is a partial isometric top view of the apparatus shown in FIG. 24A.

FIGS. 24A and 24B show another exemplary embodiment of a magnetic movement apparatus 3150 operable to transfer movers between two work bodies at different Z locations with a transfer device. As shown in FIGS. 24A and 24B, the magnetic movement apparatus 3150 comprises a plurality of work bodies (in the illustrated embodiment, three work bodies 3130A-3130C), one or more movers 3110, and a transfer device 3140. The work bodies 3130A-3130C overlap in the Z direction and each is located in a distinct Z location. The transfer device 3140 comprises a Z motion transfer stage 3142, and the Z motion transfer stage 3142 comprises a X-direction transfer stage 3143 that is operable to move in the X-direction. Z motion transfer stage 3142 is driven by a suitable mechanism 3145 such as a lead screw plus rotary motor with suitable guiding bearings, for example. X motion transfer stage 3143 is driven by a suitable mechanism 3144 with suitable guiding bearings or guide rails restricting the motion of the X-motion transfer stage 3143 to motion in the X-direction. When the transfer device 3142 is aligned with a work body e.g. 3130B, the X motion transfer stage 3143 extends in the negative X direction so that there is an overlapping region 3146B (indicated by the dashed lines in FIGS. 24A and 24B) between the work body working region 3136B and a working region of the X motion transfer stage 3143. Inside this overlapping region, a mover 3110 can be controllably moved by the work body 3130B and be magnetically or mechanically supported by the work body 3130B independently from the X motion transfer stage 3143; the mover 3110 can also be physically supported by the X motion transfer stage 3143 independently from the work body 3130B. The mover 3110 may be magnetically levitated by the work body 3130B and controllably moved into the overlapping region 3146B; once the mover 3110 is inside the overlapping region 3146B, the mover 3110 may be caused to land onto the X motion transfer stage 3143 by appropriately commanding the currents flowing into the electrically conductive elements of the work body 3136B, e.g. by turning off current in electrically conductive elements passing through the overlapping region 3146B or by a suitable landing method discussed later in the section on soft landing operations. Consequently, the X motion transfer stage 3143 carries the mover 3110 using features on the carrier (e.g. two protruding prongs on the X motion transfer stage 3143, shown at 3146B). Next, the X motion transfer stage 3143 may retract in the X direction to transfer the mover 3110 completely out of the overlapping region 3146B, and further the Z motion transfer stage 3142 may then carry the horizontal transfer stage 3143 along with the mover to a different Z location to align with another work body, e.g. 3130C. By reversing the above control sequence of transferring a mover from 3136B to the X transfer stage 3143, the mover 3110 can be transferred from the X motion transfer stage 3143 into the working region 3136C of work body 3130C.

Although in the illustrated embodiment the mover 3110 may be "landed" on the to switch from being supported by the work body to being supported and/or moved by the transfer stage, in various embodiments the mover may be capable of controllable motion in three in-plane directions/DOF in levitation mode when entering the overlapping region (3246 in FIG. 25A). The overlapping region may be flanked by guide rails as shown at 3243 in FIG. 25A with a slope so that the guide rail height (Z direction) increases with the –X direction. During the transfer process, the mover may be passively levitated at an initial position in the Z direction without feedback control in out of plane directions/DOF (i.e. Rx, Ry, and Z). As the mover gradually moves in the –X direction into the overlapping region, it comes into contact with the guide rails due to the guide rails' slope. Once the mover is fully supported by the guide rail in the Z direction, feedback control on the mover in Rz and Y may be switched off, and the mover may be driven onto the transfer stage in the negative X direction either using a X-direction driving force with open loop control or using controllable motion in X.

As used herein, an "overlapping region" is the overlapping area in the X-Y plane wherein between a work body working region and a working region of a transfer stage (wherein a working region is where the transfer stage can guide and transfer a mover). A mover may be controllably driven from outside of the overlapping region into the overlapping region by the work body; the transfer stage may then carry the mover from the overlapping region out of the work body working region. In various embodiments, after the mover is moved into the overlapping region, the mover may land onto the transfer stage in response to current flowing into the work body electrically conductive elements, or by a soft landing operation as described in detail below. After mover lands onto the transfer stage, the transfer stage may carry the mover out of the overlapping region. In various embodiments, a mover may be controllably driven from outside of the overlapping region into an overlapping region by the first work body and guided by the mechanical carrier: for example, a mover may be controlled in three in-plane directions/DOF in levitation mode and be moved to the overlapping region and onto one or more receiving bodies of the transfer stage (e.g. two protruding prongs attached to the X-motion transfer stage as shown at 3143 in FIG. 24A). In this case there is no landing process; after turning off the current in the work body electrically conductive elements passing through the overlapping region, the mover may then be latched on the transfer stage protruding prongs by a frictional force, and the transfer device may then carry the mover away from the work body working region.

In various embodiments, the transfer device may be a mechanical carrier that may further carry the mover into a working region of a second work body. In various embodiments, the second work body may overlap with the first work body in the Z direction; i.e. the first work body and the second work body may be located at different Z locations. The transfer stage may carry the mover into the second overlapping region according to the following exemplary method: the transfer stage aligns with the second work body in the Z direction in response to movement of the Z transfer stage in the Z direction; the lateral transfer stage then extends in the –X direction to bring the mover into a second overlapping region between the second work body working region and the lateral transfer stage working region; the mover is caused to magnetically levitate away from the lateral transfer stage in the Z direction in response to appropriate currents commanded to flow into electrically conductive elements in the second work body.

Magnetic Movement Systems Including Planar Motor and Conveyors

Generally, in various embodiments of magnetic movement apparatuses comprising a conveyor and an overlapping region according to any of the embodiments as previously described, a mover in the overlapping region may be first controllably driven onto a conveyor by commanding current flowing into the work body electrically conductive elements, and afterwards the conveyor may transfer the mover out of the work body working region. Non-limiting examples of such conveyors include conveyor belts, conveyor edge belts, powered roller, mechanical motion stages, robot arms, and gravity driven conveyors (conveyors having downwards slopes in their carrying surfaces and gravity driving movers downhill along conveyance path). In various embodiments, a mover may be controllably moved into the overlapping region by the work body, then the mover may directly land on the conveyor, and afterwards the conveyor carries the mover away. In various embodiments, a mover may be driven onto the conveyance device by the work body along a sliding or rolling guide on the conveyance device. In these embodiments, movers are transferred from work bodies directly to conveyors.

In various embodiments, magnetic movement apparatuses may comprise a mechanical guiding device and an overlapping region, and the overlapping region is both part of the work body working region and part of the working region of the mechanical guiding device. The mover may be controllably moved into the overlapping region in response to electrical currents in the work body as previously described, and inside the overlapping region a mover may be controllably moved towards the conveyor by switching from being controllably moved in at least 2-directions/DOF to being controllably moved in 1-direction/DOF. In various embodiments, the mover directly lands on the mechanical guiding device and the mover is controllably moved by the work body in 1-direction/DOF towards the conveyor. In various embodiments, the mover may be driven into the overlapping region with being guided by the mechanical guiding device. In these embodiments, movers are transferred from work body indirectly to conveyors via a mechanical guiding device.

Referring now to FIGS. 25A, 25B, 25C, 25D, 25E, 25F (together FIG. 25), a magnetic movement apparatus 3250 is disclosed according to another non-limiting embodiment and comprises a work body 3230, a mover 3210, a transfer device 3244, and a guidance device 3243. The mover may be configured to be moved by current flowing through the work body according to any of the previously described embodiments. In the illustrated embodiment, the transfer device 3244 comprises a conveyor belt, although in various embodiments, the transfer device may comprise any other mechanical device capable of supporting and moving an object such as mover 3210. In the illustrated embodiment the guidance device 3243 comprises a pair of linear guide rails, however in other embodiments the guidance device may comprise any other means of guiding an object such as the mover 3210 onto the transfer device.

In the illustrated embodiment, the work body 3230 provides a working region 3236. The system comprises an overlapping region 3246 (indicated by the dashed lines in FIG. 25A), which is both part of the work body working region and part of the working region of the guidance device 3243. The mover 3210 may be controllably moved in at least two in-plane directions/DOF, including but not being limited to three in-plane directions/DOF and/or 6 directions/DOF, into the overlapping region by the work body 3230, and. In various embodiments, the mover may land onto the guidance device in response to current driven through appropriate work body electrically conductive elements within the work body. Inside the overlapping region, the mover may be driven by the work body 3230 towards the transfer device 3244 by being controllably moved in at least 1-direction/DOF. In various embodiments, the mover 3210 may be limited to moving in one direction/DOF when it is inside the overlapping region, since during the process that the mover 3210 is driven out of the work body working area 3236, there may not be enough magnet arrays for the work body 3230 to provide the required forces and or torques to move the mover 3210 in more than 1-direction/DOF. For example in the case of FIG. 25F, only one magnet array 3212D out of four magnet arrays (3212A-3212D) is inside the work body working region, and this magnet array 3212D allows the work body to controllably drive the mover in X direction by properly commanding the currents flowing through Y oriented electrically conductive elements of work bodies; as a result, the mover may be guided and constrained in 5-directions/DOF by the guidance device, and the work body can cause a force in the X direction to be applied to the mover and get X direction position feedback as long as magnet array 3212D is inside the work body working region; when magnet array 3212D starts to leave the work body working region, the transfer device 3244 has already achieved enough contact area with the mover 3210 so that it can continue to move the mover along the transfer device 3244 (in the −X direction) via friction or other mechanical means.

Figure 25D:
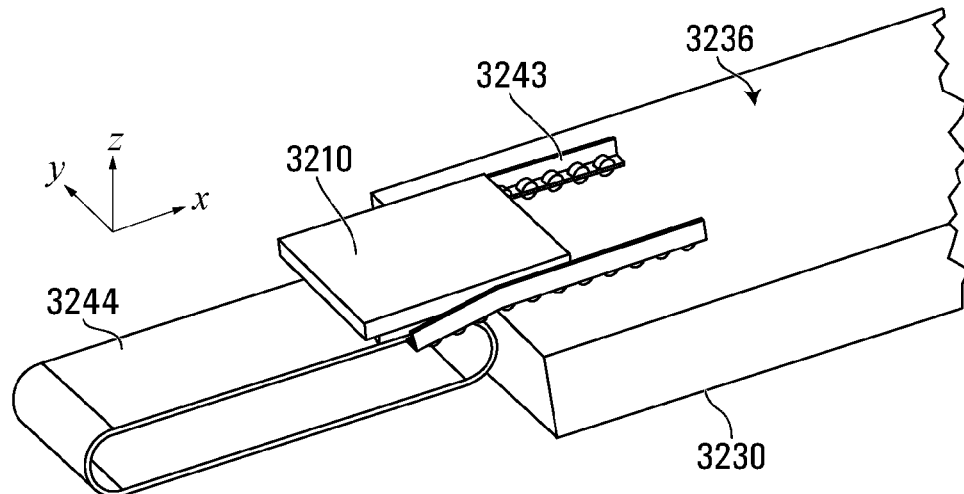
FIG. 25D is a partial isometric top view of the apparatus shown in FIG. 25A.
Figure 25E:
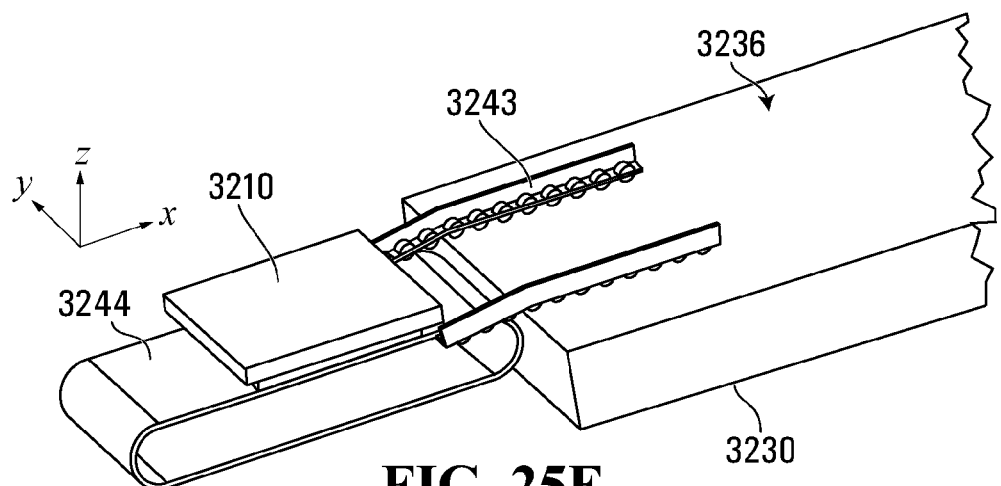
FIG. 25E is a partial isometric top view of the apparatus shown in FIG. 25A.
Figure 25F:
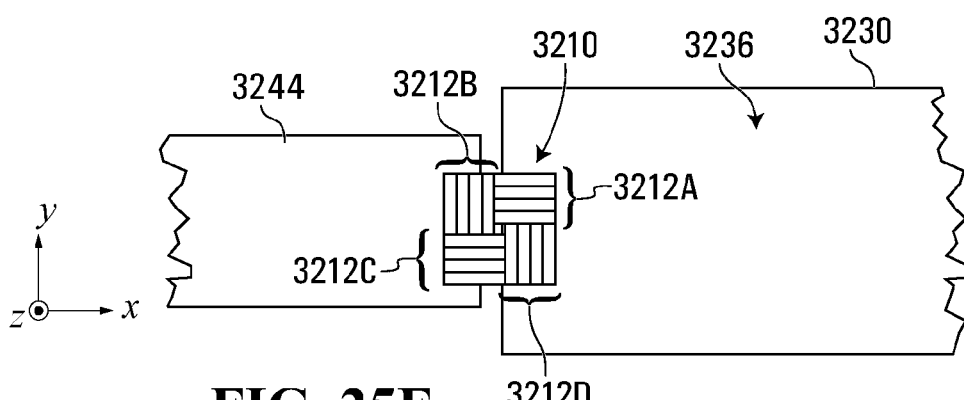
FIG. 25F is a partial top cross-sectional view of the apparatus shown in FIG. 25A.

A non-limiting sequential process moving the mover 3210 from the work body 3230 working region to the transfer device 3244 may be described as follows:

i) The mover 3210 is controllably driven by the work body in 6 directions/DOF from the outside to the inside of overlapping region 3246 by the work body in levitation mode, as shown in FIG. 25A.

ii) The mover 3210 lands onto the guidance device 3243 inside the overlapping region, in response to electrical current driven through appropriate work body electrically conductive elements (including but not being limited to turning currents off), as shown in FIG. 25B. FIG. 25C shows a cross-sectional view of the system along line C-C in FIG. 25B. FIG. 25C shows that the mover 3210 is supported in the illustrated embodiment by rollers on the guidance device 3243 instead of being levitated by the work body 3230. Although the mover 3210 lands on the guide rail by moving in the Z direction, the mover 3210 may also maintained a speed of movement in the −X direction.

iii) The mover 3210 is driven by the work body 3230 along the −X direction, as shown in FIG. 25D. In embodiments wherein the transfer device 3244 comprises a conveyor belt, the mover 3210 may be controllably driven at speed in the X direction close to or matching the conveyor belt linear speed. Alternatively, the mover may be driven with a controllable force. It should be noted that a suitable magnet array layout (such as but not limited to the magnet array design in FIG. 1 of U.S. Pat. No. 9,202,719 B2, for example) may enable that the mover to be controllably driven in the −X direction while being guided by the guidance device even if half of the mover 3210 extends out of the work body working plane in the −X direction. For example, as shown in FIG. 25F, half of the mover is already outside the work body working region, but the work body can still get X position feedback of mover 3210 and apply force on the mover to cause the mover to move in the X-direction.

iv) The descending curve at the end of the guide device 3243 in the −X direction may in various embodiments guide the mover towards the conveyor belt. Once the mover touches the conveyor belt 3244, the work body 3230 may disable its control of the mover and the mover is moved away by the conveyor belt 3244 as shown in FIG. 25E.

In various embodiments, the guidance device may comprise rollers, such as those shown in FIG. 25. Said rollers may be passive, or may be actively powered and driven by another motor (via belts, chains, cables, direct drives, gears, or other suitable means) to actively guide the mover as it lands and further along the guiding device. In this case, it may be unnecessary for the work body to drive the mover along the guidance device after the mover is moved in the −Z direction onto the guidance device, if the transfer device comprises a conveyor belt and the guidance device comprises active roller elements).

Figure 26A:
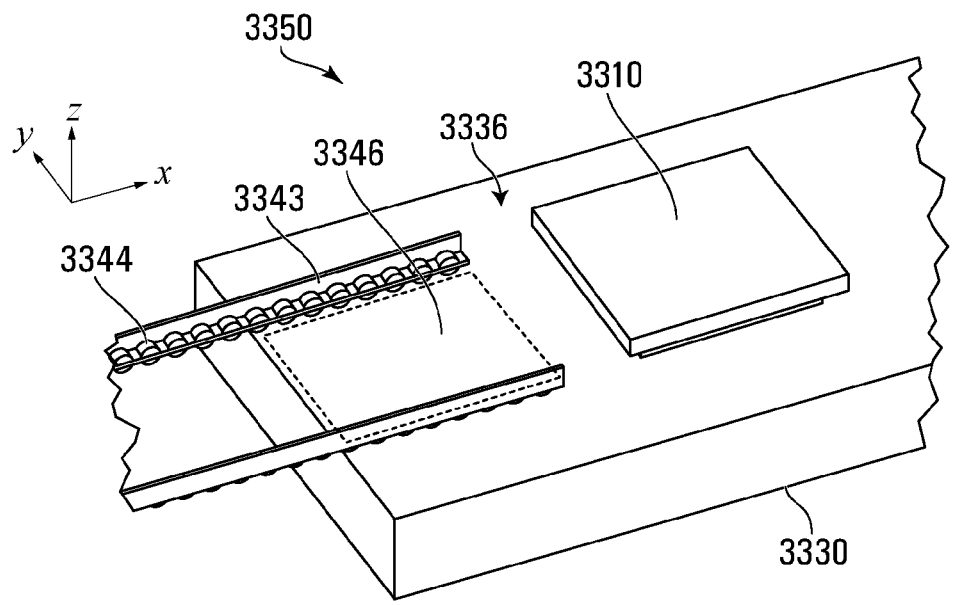
FIG. 26A is a partial isometric top view of an apparatus according to one embodiment.
Figure 26B:
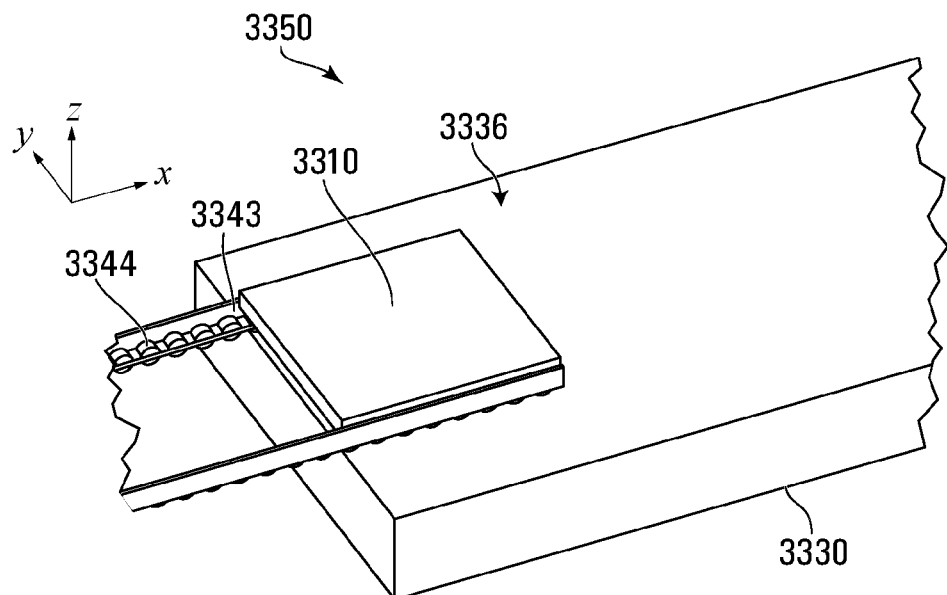
FIG. 26B is a partial isometric top view of the apparatus shown in FIG. 26A.

FIGS. 26A and 26B show a magnetic movement apparatus 3350 according to another embodiment of the invention. The magnetic movement apparatus 3350 comprises a work body 3330, a mover 3310, a powered roller conveyor 3344 such as the one described in reference to FIG. 25A-25F, a guidance device comprising linear guide rails 3343 and having passive rollers. In the illustrated embodiment, the work body 3330 and the mover 3310 are similar to embodiments previously discussed herein. The work body 3330 provides a working region 3336. The apparatus 3350 comprises an overlapping region 3346 (indicated by the dashed lines in FIGS. 26A and 26B), which is both part of the work body working region and part of the linear guide rail guiding region. FIG. 26B shows that the mover 3310 is located inside the overlapping region 3346. The mover 3310 may be transferred from the work body working region 3346 to the conveyor 3344 in a manner substantially similar to the embodiment described in relation to FIG. 25, except that in the present embodiment the transfer device 3344 comprises a powered roller conveyor rather than a conveyor belt. In various embodiments, in the overlapping region 3346, the rollers of the guide rail 3343 maybe passive due to space constraint. Outside of the overlapping region, the rollers on the guide rail are driven by an external mechanism such as, but not limited to, belts or cables or step motors.

In various embodiments, the rollers of the guide rail 3343 in FIGS. 26A and 26B may be powered rollers such that after the mover 3310 is switched from being levitated by the work body to being supported by the linear guide 3343, the mover 3310 will be driven away by power rollers immediately without the need of the work body controlling the mover in the −X direction. In the illustrated embodiment, guidance device 3343 and transfer device 3344 in FIGS. 26A and 26B is a powered conveyor, and the overlapping region 3346 is the overlapping region of the work body working area and the powered conveyor working area and the mover is transferred directly form the work body to the conveyor in the overlapping region.

In various embodiments, all rollers may be passive, and the guide rails may have a downslope towards the −X direction, such that when a mover is sitting on the guide rails, the mover may be pulled by gravity towards the −X direction (in the case where gravity is substantially in the −Z direction). In this case, guidance device 3343 and transfer device 3344 may comprise a passive gravity-driven conveyor, and the overlapping region 3346 may be the overlapping region of the work body working area and the passive conveyor working region. The mover may be transferred directly form the work body to the conveyor in this overlapping region.

Figure 27A:
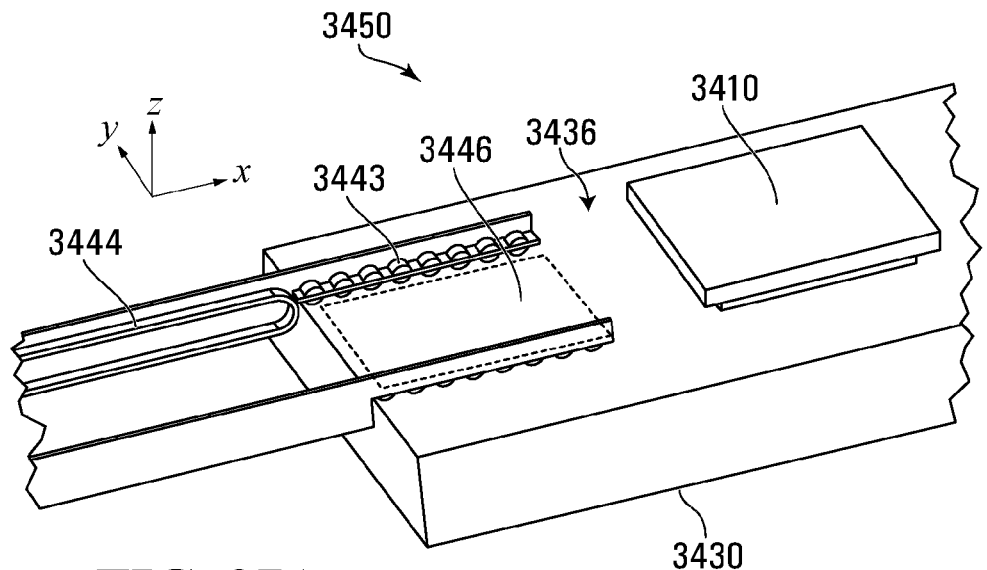
FIG. 27A is a partial isometric top view of an apparatus according to one embodiment.
Figure 27B:
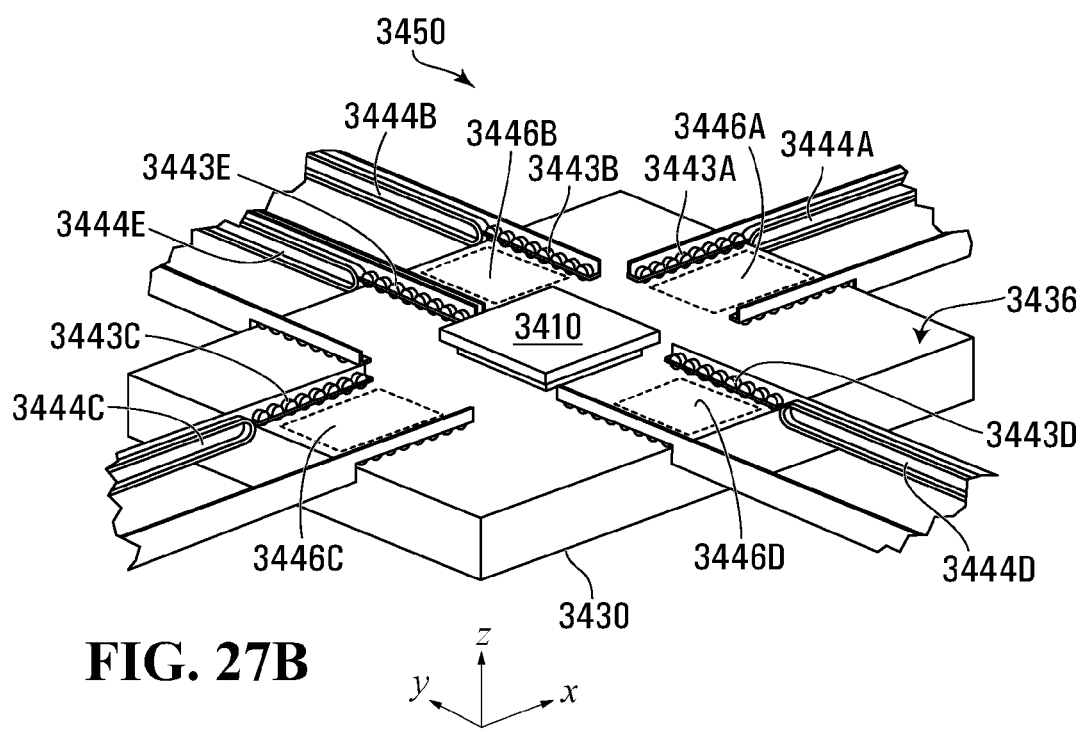
FIG. 27B is a partial isometric top view of the apparatus shown in FIG. 27A.

FIGS. 27A and 27B show a magnetic movement apparatus 3450 according to another exemplary embodiment, which is substantially similar to the embodiment described in relation to FIGS. 26A and 26B, except that the transfer device 3444 and guidance device 3443 comprise an edge belt conveyor instead of power rollers. The magnetic movement apparatus comprises a work body 3430, a mover 3410, an edge belt conveyor 3444, and a guidance device 3443 comprising linear guide rails with passive rollers, as shown in FIG. 27A. The work body 3430 provides a working region 3436. The system comprises an overlapping region 3446, which is both part of the work body working region and part of the guidance device 3443 working region. The mover 3410 may be controllably moved into the overlapping region 3446 by the work body 3430 and may land onto the passive roller guide rail 3443, and further may be driven by the work body 3430 in either a position control mode or a force control mode towards the conveyor belt 3444 until the mover is eventually made to frictionally contact the conveyor 3444.

Although the aforementioned embodiments only describe the process of transferring a mover from a work body working region to a transfer device such as a conveyor belt or other conveyor system, it will be appreciated by those skilled in the art that the process can be reversed to transfer a mover from a transfer device such as a conveyor belt or other conveyor system to a work body working region.

Referring to FIG. 27A, one non-limiting sequential process of moving a mover 3410 from conveyor belt 3444 to the work body 3430 working region may be as follows:

i) The conveyor 3444 belt may carry a mover 3410 into a guidance device (e.g. the linear guiding rail) 3443 in +X direction. The frictional contact between the conveyor belt 3444 and the mover 3410 may allow the mover 3410 to at least partially move onto the linear guide rail 3443.

ii) Once a Y-oriented linear magnet array (such as magnet array 3212D in mover 3210 shown in FIG. 25F) is inside the overlapping region 3446, the work body may controllably move the mover 3410 further along the linear guide rail in the X direction, until the mover 3410 fully enters the overlapping region 3446.

iii) Once the whole mover is inside the overlapping region, the mover 3410 may be levitated by the work body 3430 and controllably moved in as many as three in-plane directions/DOF; the mover 3410 may be driven by the work body 3430 to leave the overlapping region toward another part of the work body working region 3436.

FIG. 27B shows an example application of utilizing the embodiment in FIG. 27A, wherein a magnetic movement apparatus 3450 comprising a work body 3430, one or more movers 3410, five linear guides 3443A to 3443E, and five edge-belt conveyors 3444A to 3444E. In the illustrated embodiment, each linear guide along a respective connected edge belt conveyor is substantially similar to the embodiment shown in FIG. 27A, except that the guide rail orientation or position is different. Each linear guide rail in combination with the work body comprises a corresponding overlapping region 3446A to 3446E (indicated by the dashed lines in FIG. 27B), which allows a mover to transfer between the work body and any of the five conveyor edge belts. The magnetic movement apparatus 3450 in FIG. 27B may be used in various embodiments for multi-port routing in multiple conveyor system: for example, a mover coming from one conveyor may be transferred to the work body working region first and then be further transferred from the work body working region into any one of the other four conveyors based on operational needs. In various embodiments, the work body 3430 may be mounted on a rotatable transfer stage (for example, a rotatable transfer stage that can rotate around a Z oriented axis), in order to change the position and/or orientation of the mover.

Figure 35A:
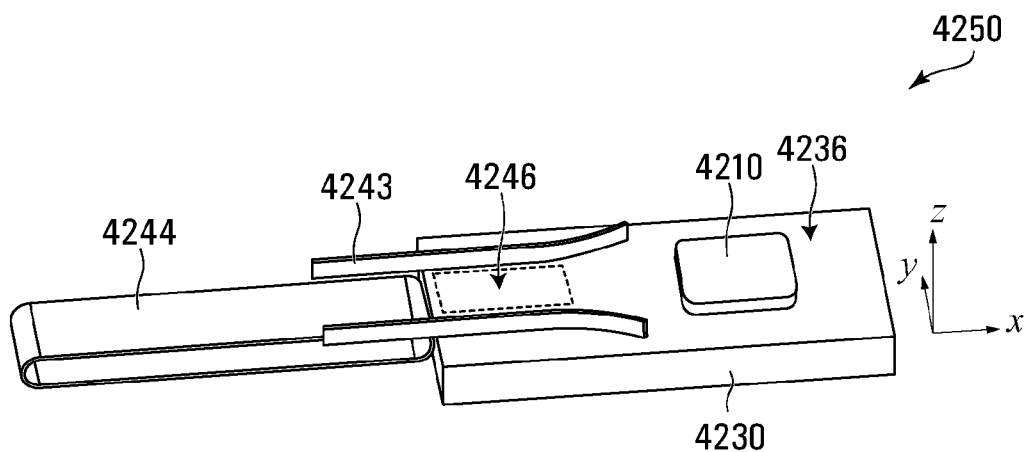
FIG. 35A is an isometric top view of an apparatus according to one embodiment.
Figure 35B:
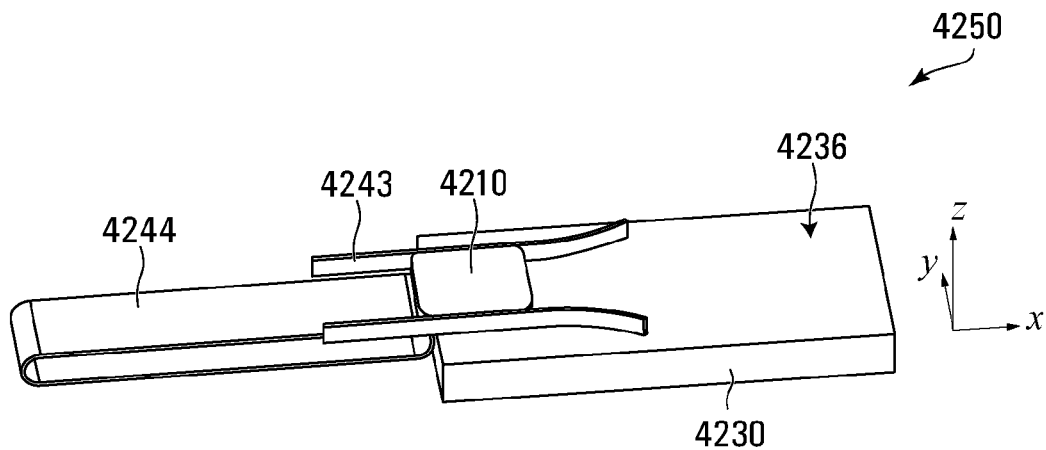
FIG. 35B is an isometric top view of the apparatus shown in FIG. 35B.

Referring to FIGS. 35A and 35B, a magnetic movement apparatus according to another exemplary embodiment comprises a work body 4230, a mover 4210, a conveyance device (e.g. conveyor belt in FIGS. 35A and 35B) 4244, and a guidance device (e.g. a pair of linear guide rails) 4243. The illustrated embodiment may function similarly to embodiments described in relation to FIG. 27A, for example. The work body 4230 provides a working region 4236. The apparatus comprises an overlapping region 4246 (indicated by the dashed lines in FIG. 35A), which is both part of the work body working region and part of the working region of the guidance device 4243. The mover may be controllably moved into the overlapping region by the work body, by controllably moving the mover in at least two in-plane directions/DOF, including but not being limited to controllable motion in three in-plane directions/DOF while in levitation mode, or controllable motion in three in-plane directions/DOF while in sitting mode, and/or in 6 directions/DOF while in levitation mode. In the illustrated embodiment, the widened opening at the entrance of the guidance device helps the mover enter the overlapping zone. Inside the overlapping region, the mover may be mechanically constrained/supported by the guidance device in the Rz and Y directions, and the work body may mechanically support the mover in the Rx, Ry, and Z directions via suitable sliding or rolling bearings, for example. Inside the overlapping region 4246, in various embodiments the mover 4210 may be driven by the work body towards the conveyor by switching from being controllably moved in at least 2-directions/DOF to being controllably moved in 1-direction/DOF so that during the process in which the mover is driven out of the work body working area, there are enough magnet arrays overlapping the work body in order for the work body to provide the required forces and or torques to control the mover. The work body may need to drive about half of the mover 4210 out of the work body working region, and the conveyor may then be able to catch the mover 4210 and continue to move the mover along the conveyor 4244 (in the −X direction).

Figure 28A:
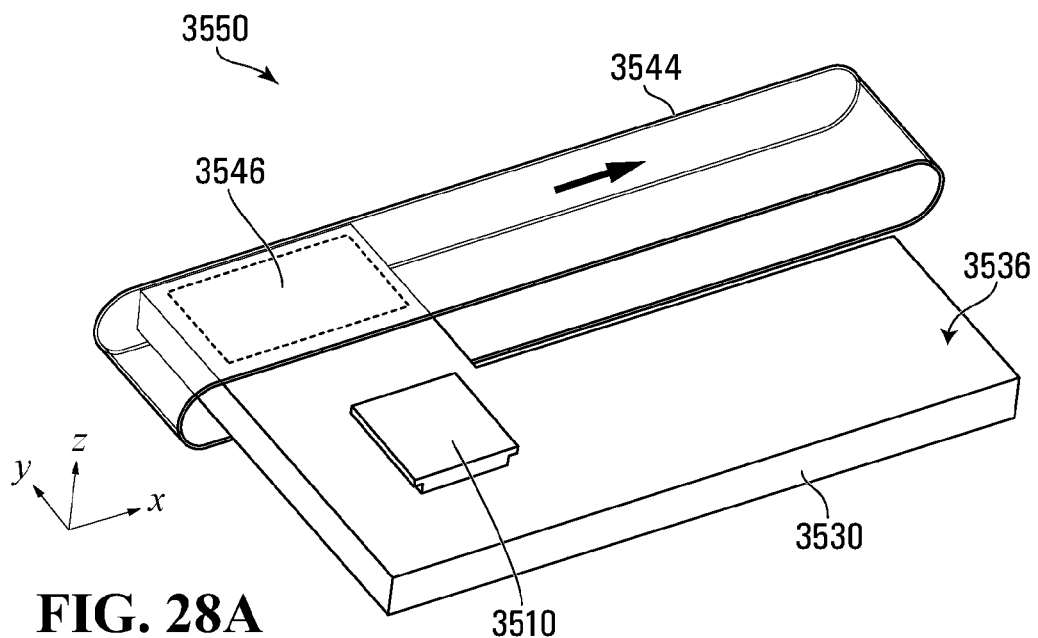
FIG. 28A is a partial isometric top view of an apparatus according to one embodiment.
Figure 28B:
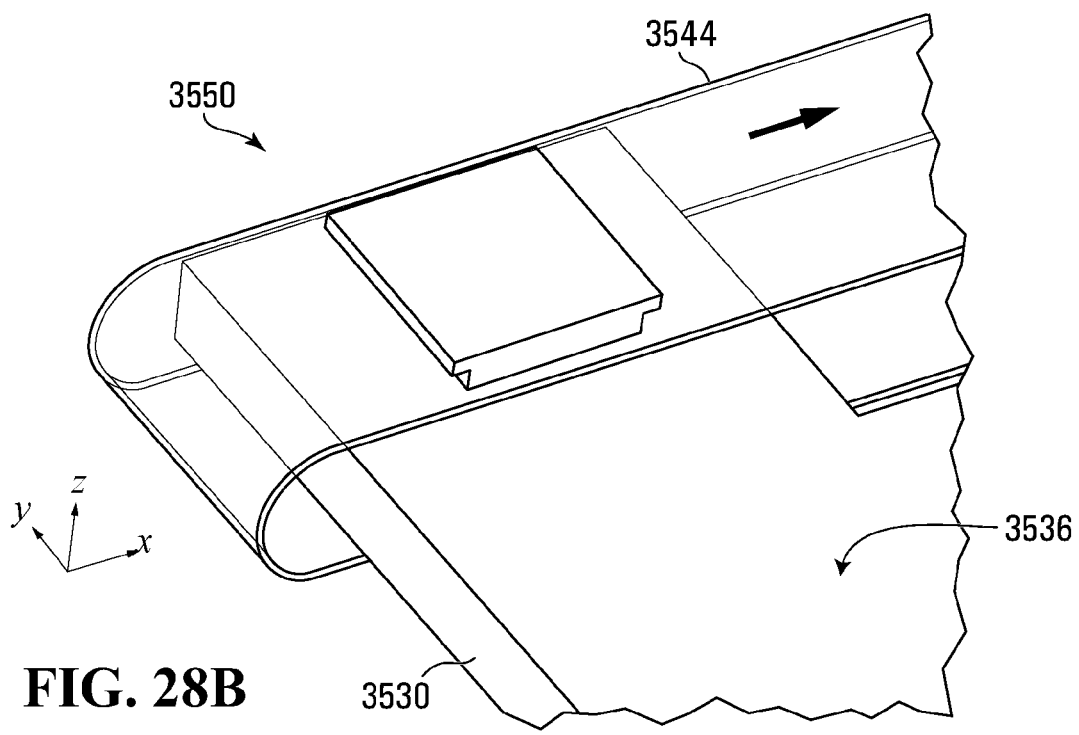
FIG. 28B is a partial isometric top view of the apparatus shown in FIG. 28A.

FIG. 28A and FIG. 28B (collectively FIG. 28) show a magnetic movement apparatus 3550 according to another non-limiting embodiment and comprising a work body 3530, one or more movers 3510, and a conveyor belt 3544. The supporting mechanism and the driving motor(s) for the conveyor belt are not shown to avoid unnecessarily obscuring the embodiment. The work body 3530 provides a working region 3536. The work body and the conveyor overlap with each other in the Z direction. The apparatus 3550 further comprises a overlapping region 3546 in the Z-direction (indicated by the dashed lines in FIG. 9) as shown in FIG. 28A, which is both part of the work body working region and part of the conveyor working region.

A non-limiting sequential process of transferring the mover 3510 from the work body 3530 to the conveyor 3544 is as follows:
i) The mover 3510 may be controllably driven in up to 6 directions/DOF in levitation mode (or up to 3 in-plane directions/DOF in levitation mode) by the work body 3530 from outside (FIG. 28A) to the inside of overlapping region 3546 (FIG. 28B).
ii) Once the mover is inside the overlapping region, the mover may come into contact with the conveyor belt in response to current commanded to be driven into the work body electrically conductive elements according to a suitable method (including but not limited to turning off particular electrically conductive element currents) or a soft landing operation as is described in detail below). As a result, the mover is switched from being supported and driven by the work body to being supported and driven by the conveyor belt. Although the mover lands on the conveyor by moving in the Z direction, the mover may maintain a speed of movement in the X-direction that matches the conveyor belt linear speed, which may minimize sliding between the mover and the conveyor belt. After the mover 3510 lands on the conveyor belt, the mover 3510 will be supported by the conveyor belt and will move with the conveyor belt 3544. Assuming the conveyor belt speed is in the positive X direction, the mover 3510 will be carried away from the overlapping region by the conveyor belt.

Figure 29:
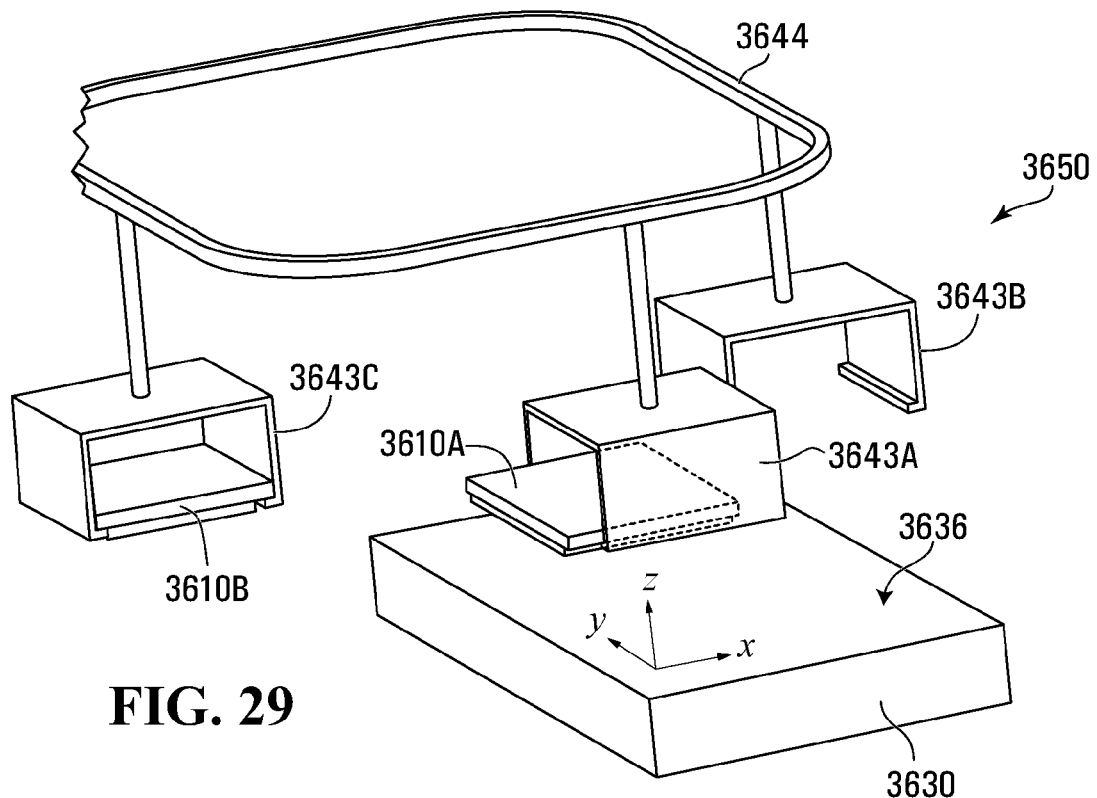
FIG. 29 is a partial isometric top view of an apparatus according to one embodiment.

FIG. 29 shows a magnetic movement apparatus 3650 according to another embodiment and comprising a work body 3630, one or more movers 3610A-3610B, and an overhead conveyor 3644, along with one or more carriers 3643A-3643C. Each carrier 3643A-3643C is attached with to the overhead conveyor 3644 and travel with the overhead conveyor 3644 along its path. In various embodiments, apparatus 3650 may further include a guidance device such as those described in reference to previous embodiments, as well as any suitable driving motors for the conveyor 3644. The work body and the conveyor overlap in the Z direction. The work body 3630 provides a working region 3636. The system comprises an overlapping region 3646 (indicated by the dashed lines in FIG. 29), which is both part of the work body working region and part of the carrier supporting region. In this case, since the carrier (e.g. 3643A) is moving, accordingly the overlapping region (between the carrier supporting region and the work body working region) also dynamically changes and moves with the carriers.

A non-limiting sequential process of transferring the mover 3610A to the conveyance system 3644 may be as follows:
i) The mover 3610 may be controllably driven by the work body from outside to the inside of overlapping region 3646, which is the overlapping region between work body working region and the mechanical carrier 3643A supporting region.
ii) Once the mover 3610 is inside the overlapping region 3646, the mover may land onto the mechanical carrier 3643A in response to current driven into the work body electrically conductive elements according to any suitable method (including but not being limited to turning off electrically conductive element currents). As a result, the mover may be switched from being driven by the work body to being supported and carried by the mechanical carrier 3643A. Although the mover is landed on the mechanical carrier by moving in the Z direction, the mover may also maintain a speed of movement in the X-direction matching with the carrier 3643 linear speed, which may minimize sliding.

Figure 30:
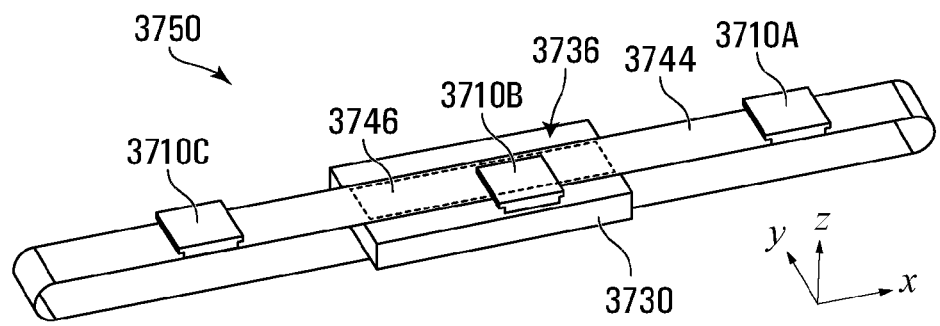
FIG. 30 is a partial isometric top view of an apparatus according to one embodiment.

FIG. 30 shows yet another magnetic movement apparatus 3750 according an exemplary embodiment comprises a work body 3730, one or more movers 3710A-3710C, and a conveyor 3744. The work body 3730 provides a working region 3736. The supporting mechanism and the driving motor(s) for the conveyor belt 3744 are not shown to avoid unnecessarily obscuring the embodiment, but it will be appreciated to those skilled in the art that any suitable methods can be applied here. The conveyor 3744 and the work body overlap in the Z direction. In the illustrated embodiment, the conveyor 3744 runs over the work body 3730 so that the system provides an overlapping region 3746 (indicated by the dashed lines in FIG. 30), which is the overlapping region between the work body working region 3736 and a conveyor supporting region.

A non-limiting sequential process of transferring a mover 3710B from the conveyor 3744 to work body 3730 and then from work body 3730 back to the conveyor 3744 may be as follows:
i) The mover 3710B may be carried on the conveyor from the outside of the overlapping region 3746 to the inside of 3746.
ii) Once the mover 3710B is inside the overlapping region 3746, the mover 3710B may be caused to levitate in up to 6 directions/DOF in response to controllably driven currents in the work body and to move inside the work body working region in up to 6 directions/DOF. In various embodiments, the mover may be caused to move in one or more particular directions, such as the X and/or Y directions, for example, in order to finish a particular operational task for a manufacturing purpose, for example.
iii) At the end of the work body control process in (ii), the mover 3710 is driven back to the overlapping region 3746, and consequently the mover 3710 lands back onto the conveyor by commanding appropriate currents driven into the work body electrically conductive elements with a suitable method (including but not being limited to turning off electrically conductive element currents or a soft landing operation as is described in detail below). In various embodiments, the mover 3710 may be caused to move at the same lateral speed as the conveyor which may minimize sliding.

iv) The mover 3710B may then be moved away by the conveyor out of the overlapping region 3746, for a next operational step, for example.

The embodiment described in reference to FIG. 30 may allow one or more automation steps to performed directly on a traditional conveyor belt system without otherwise needing a robot arm or other tool to pick parts from the conveyor belt for use in a processing cell, and to then from move the parts from the cell back to the conveyor belt after processing.

Figure 31A:
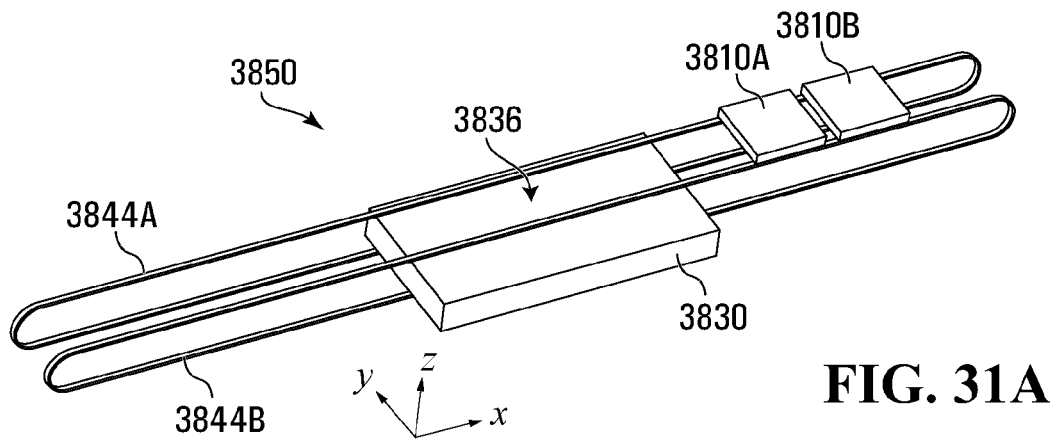
FIG. 31A is a partial isometric top view of an apparatus according to one embodiment.
Figure 31B:
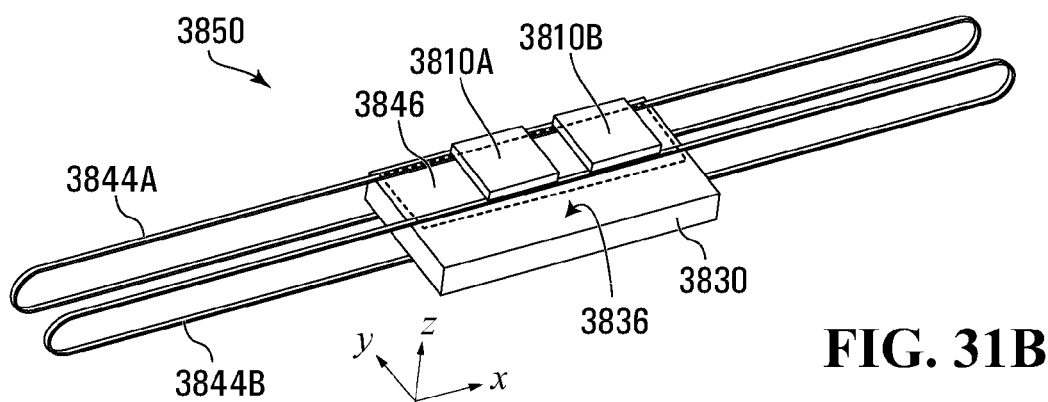
FIG. 31B is a partial isometric top view of the apparatus shown in FIG. 31A.
Figure 31C:
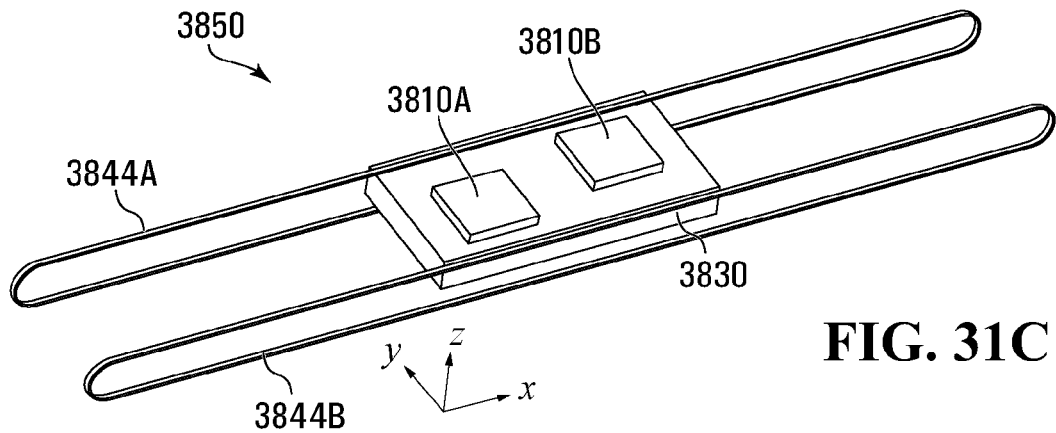
FIG. 31C is a partial isometric top view of the apparatus shown in FIG. 31A.

FIG. 31A, FIG. 31B, FIG. 31C (collectively FIG. 31) show another exemplary embodiment of a magnetic movement apparatus 3850 comprising a work body 3830 providing a work body working region 3836, one or more movers (3810A, 3810B), and a conveyor 3844, each of which may function substantially the same as described in relation to previous embodiments. In the illustrated embodiment, the conveyor 3844 is an adjustable conveyor wherein the spacing between two conveyor belts 3844A and 3844B can be changed to suit automated process needs. For example, one belt 3844A may be fixed in the Y direction and the other belt 3844B may be adjustable in its Y position; alternatively, the Y positions of both belts 3844A and 3844B may be adjustable. The details of conveyor supporting mechanism, driving motors, and Y position adjusting actuators are not shown to avoid obscuring the presentation of embodiments of the invention, and any suitable existing methods, mechanisms, actuator methods can be adopted here with proper modification and permutation. In the present embodiment, the conveyor belts and the work body overlap in the Z direction. The conveyor belts run over the work body working surface (top surface) so that the system provides an overlapping region 3846 (indicated by the dashed lines in FIG. 31B) between the work body working region and the conveyor supporting region. Inside the overlapping region 3846, a mover such as mover 3810A can be supported and driven by the work body 3830 and can also be supported and driven by the conveyor 3844.

A non-limiting sequential process of transferring mover 3810A and/or 3810B from the conveyor 3844 to work body 3830 and then from work body 3830 back to the conveyor 3844 may be as follows:

i) Movers 3810A and 3810B may be moved by the conveyor belt from outside of the work body working region 3836 in the −X direction towards the overlapping region 3846, as shown in FIG. 31A.

ii) Once the movers 3810A and 3810B are inside the overlapping region 3846, the movers may be controllably driven by the work body in up to 6 directions/DOF to levitate away from the conveyor belt in the Z direction, as shown in FIG. 31B. In various embodiments, the movers may be controllably moved in up to 3 in-plane directions/DOF in passive levitation mode.

iii) Once the movers are magnetically supported by the work body 3830, the conveyor support is not needed and accordingly the conveyor belt 3844B may retract in the −Y direction to give more space for the movers to work on the work body working region, which may cause the conveyor to be less of an obstacle/barrier. Movers may move inside the work body working region with desired X and/or Y motion, for example to finish a particular automation task for a manufacturing purpose.

iv) At the end of the work body control process in (iii), the mover may be driven back to the overlapping region 3846 indicated in FIG. 31B, and the conveyor belt 3844B may extend in the Y direction back to the configuration in FIG. 31B. Consequently, the movers may land hack onto the conveyor belts (while, in various embodiments, maintaining the same lateral speed as the conveyor which may minimize sliding), in response to electrical current commanded to be driven into the work body electrically conductive elements according to a suitable method (including but not being limited to turning off electrically conductive element currents or a soft landing operation as is described in detail below).

v) The movers may then be carried away in the −X direction by the conveyor belts out of the overlapping region 3846, which in various embodiments may result in the mover being moved to another area for a subsequent operational step.

The above process contemplates transferring two movers 3810A and 3810B together, however, in various embodiments only one mover may be transferred according to said process. The process described in reference to FIG. 31 may be only one particular step of an automation or other operational process; movers may be loaded on to conveyor 3844 from other suitable devices, such as automation devices, for example, before being moved as contemplated by the embodiment described in relation to FIG. 31, and movers may be taken away from conveyor 3844 to other suitable devices after the process, by way of other conveyors and/or robots or manually, for example.

Magnetic Movement Systems Including Isolators

Figure 33A:
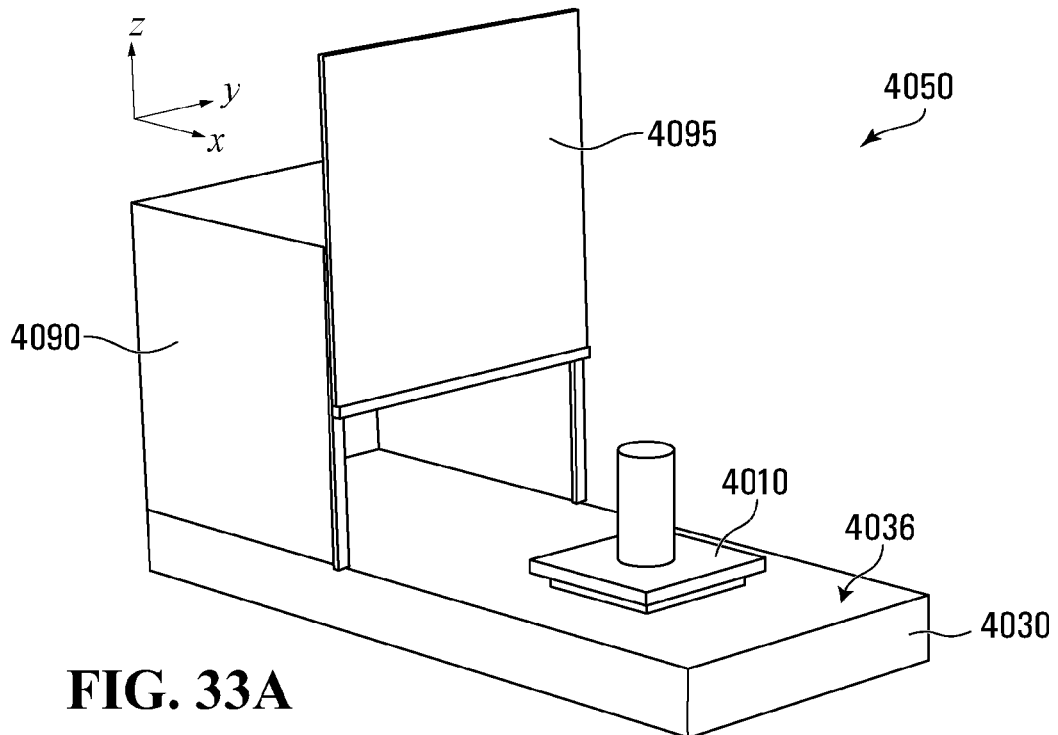
FIG. 33A is an isometric top view of an apparatus according to one embodiment.
Figure 33B:
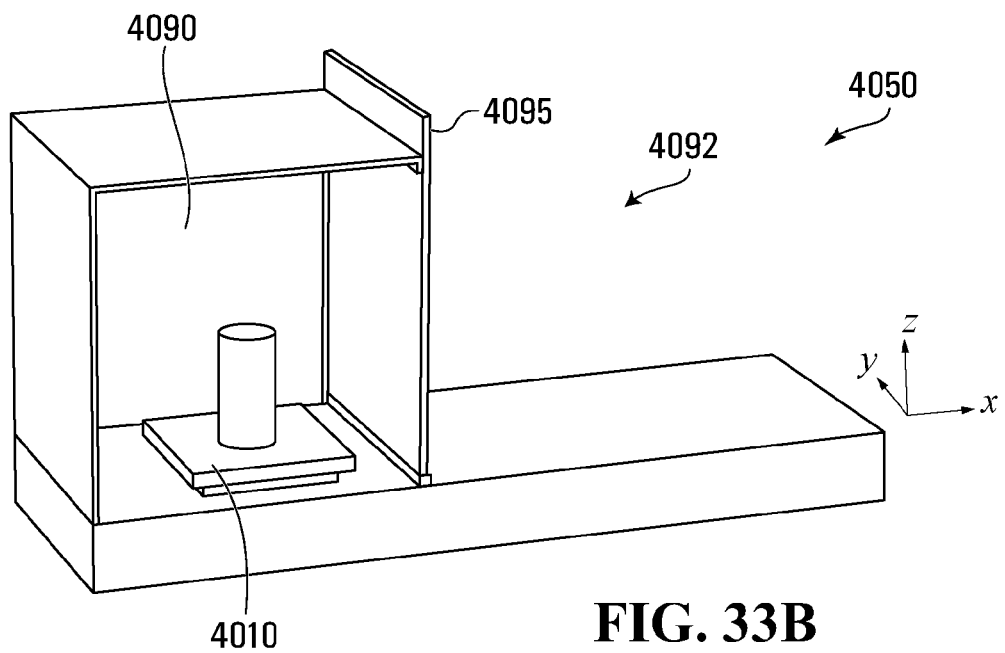
FIG. 33B is a cross-sectional isometric side view of the apparatus shown in FIG. 33A.

Referring to FIGS. 33A and 33B (collectively FIG. 33), a magnetic movement apparatus 4050 according to another embodiment is shown and comprises a work body 4030, a mover 4010 carrying one or more objects such as part(s) or sample(s), for example, an isolator 4090, and an isolator gate 4095. The work body and mover may function substantially similarly to other work bodies and movers as described herein. Work body 4030 provides a working region 4036. The working region 4036 extends into the isolator 4090 and also into the ambient environment 4092. Part of the working region 4036 is inside the isolator 4090, and part of the working region 4036 is outside of the isolator 4090. In various embodiments, the isolator 4090 may provide an isolated environment.

Although only one mover 4010 is shown in FIG. 33, in various embodiments multiple movers may work inside a system, each potentially having independently controllable motion as previously described; the mover 4010 comprises a magnetic body comprising one or more magnet arrays, and the magnetic body may interact with a magnetic field generated by current flowing through work body electrically conductive elements in the work body 4030 to controllably move the mover 4010 in up to two in-plane directions/DOF. In various embodiments, the mover may be controllably moved in up to 6-directions/DOF while operating in levitation mode without contact to the work body 4030.

The working surface 4036 may be covered with suitable covering materials (including but not being limited to stainless steel, aluminum, metals, glass, and/or plastic, for example) to protect the work body 4030 from an isolation environment inside the isolator 4090. In the illustrated embodiment, when the isolator gate 4095 opens (such as by moving up, for example), the isolator environment (or equivalently "isolation environment") will be connected to the ambient environment 4092. In various embodiments, seals may be used around gaps between the movable isolator gate 4095 and walls of the isolator 4090, and may also be used at the bottom of the gate 4095 so that the contact zone between the gate and the work body top surface 4036 form an air tight seal or any other type of seal, for example. When the isolator 4095 gate closes, the isolator environment will be disconnected from the ambient environment 4092. In various embodiments, the isolator environment inside the isolator may be a special environment that is different from the outside environment (e.g. the ambient environment 4092), including but not being limited to environments such as those having high pressure, a vacuum, those having high temperature, low temperature, those which are chemically reactive, corrosive, toxic, clean, water free environments, oxygen free environments, pure nitrogen environments, inert gas environments, polluted environments, and/or clean environments, for example. In various embodiments, one or more physical or chemical properties of the isolated environment may be substantially different from those of the outside environment. Suitable pipes/hoses (not shown) may be connected to the isolator 4090 to maintain the special physical and/or chemical properties of the isolator environment inside the isolator 4090. Inside the isolator environment, one or more operational tasks, such as automation tasks, for example, may be performed for a purpose related to manufacturing, assembly, test, inspection, and/or analysis, for example. Non-limiting examples of such tasks are filling, sputtering, electron beam inspection, lithography, painting, coating, and/or cleaning, for example. Before conducting one or more tasks in the isolator environment, the mover may be controllably moved into the isolator in the −X direction, after which the isolation gate 4095 may be closed. After the one or more tasks are done, the isolation gate may be opened, after which the mover may be controllably moved out of the isolator in the +X direction.

FIG. 33A shows that the mover 4010 may located outside the isolator, e.g. in the ambient environment, when the isolation gate 4095 is open. FIG. 33B is a cut-away view of the apparatus 4050 when the isolator gate 4095 is closed and the mover 4010 is inside the isolated environment, which is separated from the ambient environment 4092.

Figure 34:
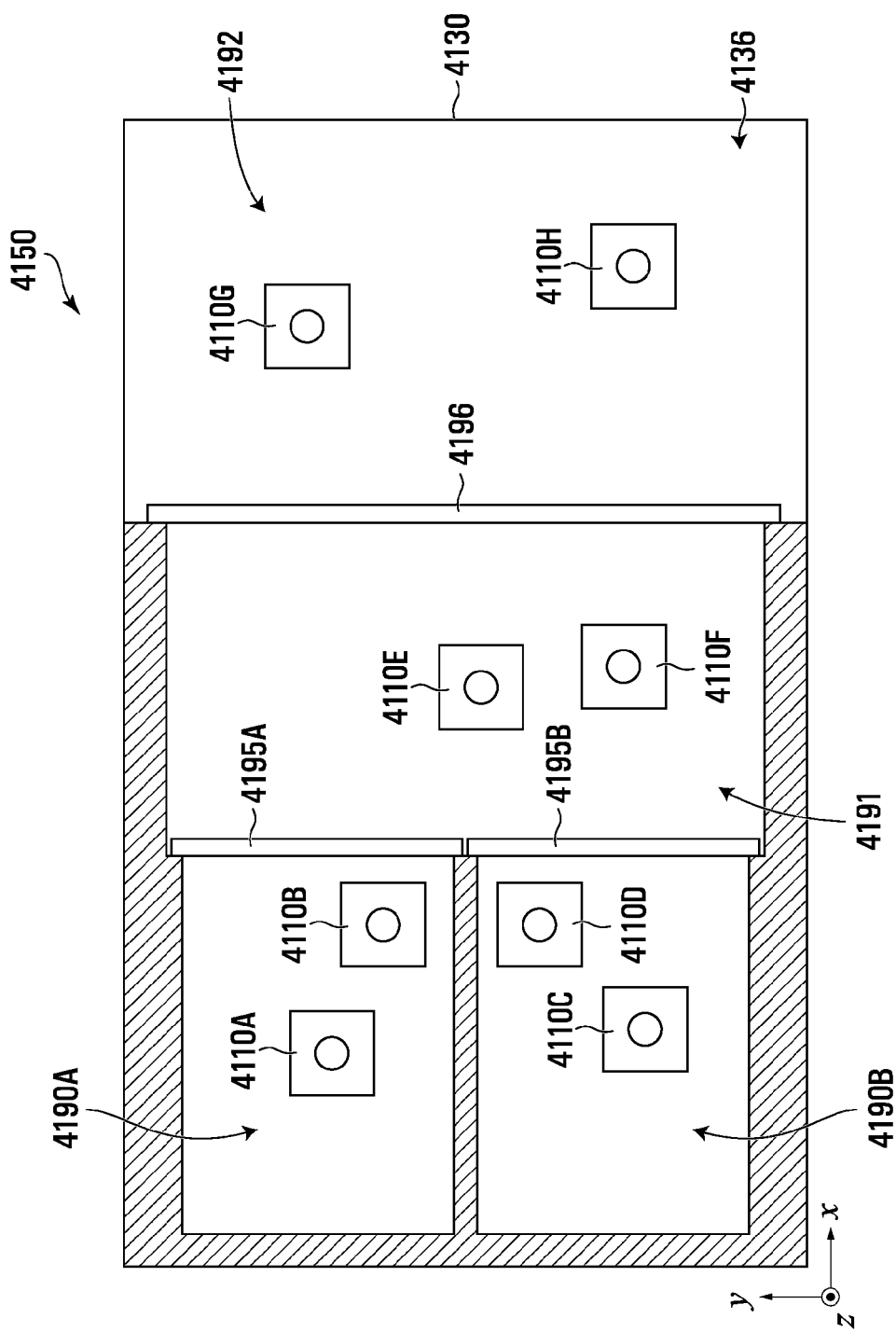
FIG. 34 is a cross-sectional top view of an apparatus according to one embodiment.

Referring to FIG. 34, another magnetic movement apparatus 4150 according to another exemplary embodiment is shown with side walls cut away. The apparatus comprises a work body 4130 having a working region 4136, a plurality of movers 4110A-4110H, a plurality of isolators 4190A-4190B (collectively, "4190"), and an isolation buffer 4191. The working region 4136 spans across the plurality of isolators 4190, the isolation buffer 4191, and the ambient environment 4192. Each isolator in the plurality of isolators 4190 provides an isolated environment, which in various embodiments may be configured to be switched on and off by a corresponding isolator gate such as isolator gate 4195A corresponding to isolator 4190A. In the illustrated embodiment, the isolation buffer 4191 provides a buffer environment between the ambient environment 4192 and the isolated environments. The buffer environment 4191 may be connected or disconnected with the ambient environment by a buffer gate such as buffer gate 4196, for example. Each isolated environment may be substantially different from the ambient environment 4192 in terms of one or more physical or chemical properties as previously described in relation to FIG. 33. Although two isolators are shown in FIG. 34, in various embodiments, the apparatus may comprise more or fewer isolators.

Generally, in embodiments such as those described above, one or more movers may be controllably moved into an isolator region defined by an isolator. An isolator gate may be closed to keep the one or more movers inside the controlled environment for a particular operation; afterwards, the isolator gate may be opened and the mover may be controllably moved out of the isolator. In some embodiments, the one or more movers may be controllably moved in up to 6 directions/DOF in and out of the isolator region without any contact therewith. In some embodiments, the one or more movers comprise a first mover and a second mover, wherein the first mover may be controllably moved into the isolator region at the same time that the second mover is controllably moved out of the isolator region, or vice versa.

The mover may function substantially the same as the mover 4010 as described in reference to FIG. 33. In the current embodiment, the mover 4110 can be controllably moved between the ambient environment 4192 and an isolated environment hack and forth via proper operation of the buffer gate 4196 and each associated isolator gate 4195. The buffer gate 4196 isolates the buffer environment in a way substantially similar to how the isolator gates isolate each isolator environment in the embodiment shown in FIG. 33.

A non-limiting example of the process for a mover (e.g. 41 mover 10G) to move from the ambient environment to an isolator (e.g. 4190A) may be as follows:

i) the buffer environment 4191 may be adjusted to make the buffer environment 4191 similar to the ambient environment 4192, in comparison to the difference between the isolated environment 4190A and the ambient environment 4192.

ii) After step i), the buffer gate may then be lifted to connect the buffer environment 4191 and the ambient environment 4192 so that mover 4110G can be controllably moved from the ambient environment 4192 to inside the buffer environment 4191.

iii) Once mover 4110G is inside buffer environment 4191, the buffer gate 4196 may then be closed and then the buffer environment may be adjusted to be substantially similar to that of the isolator environment 4190A.

iv) After step iii), the isolator gate 4195A may then be lifted to connect isolator environment 4190A and buffer environment 4191 so that mover 4110G can be controllably moved from 4191 to inside of 4190A.

v) Once mover 4110G is inside 4190A, the isolator gate 4195A may be closed and any object, such as one or more part(s), for example, carried by mover 4110G may be processed in 4190A. In various embodiments, mover 4110G may be configured to carry out an operation inside isolator environment 4190A, such as an automation operation, for example.

In various embodiments, a mover may be moved from an isolator back to the ambient by reversing the process above. In various embodiments, the process of transferring a mover into an isolator from an ambient environment may happen at the same time as the process of transferring another mover out of an isolator back to the ambient environment. For example, referring to FIG. 34, in various embodiments, during the step iv), another mover (e.g. 4110A) may be controllably moved from 4190A to 4191 simultaneously when 4110G is moved from 4191 to 4190A; during the step ii) another mover (e.g. 4110E) may be controllably moved from 4191 to 4192 simultaneously when 4110G is moved from 4192 to 4191.

Magnetic Movement Apparatus with Automatic Loading/Unloading/Storing of Movers In various embodiments, a magnetic movement apparatus such as those described previously herein may comprise a plurality of movers, and the number of movers may range from two or more to a thousand or more. Generally, it may be necessary to store, package, and/or move such a large number of movers onto a working surface of a work body such as a work body; due to the magnetization elements which each mover is comprised of, there may exist very strong interacting force between any two movers located close to each other, and the handling of such large number of movers in a safe way may therefore be challenging. Furthermore, the number of needed movers may vary with manufacturing needs which may change from time to time; if too many (e.g. more than necessary) movers are on the working surface of a work body, one or more movers may block the traffic of other movers and may thus reduce overall system operation efficiency; if too few (e.g. fewer than necessary) movers are on the working surface of a work body such, not enough movers may be available to perform an operation, and the overall system efficiency may suffer. To allow the number of movers in the work body working region to be dynamically adjusted to meet the time-varying needs of any given process, such as a manufacturing process, for example, a storage device may be used as a buffer to hold movers when they are not required to be on the work body, and/or to provide movers to the work body as necessary.

Figure 36A:
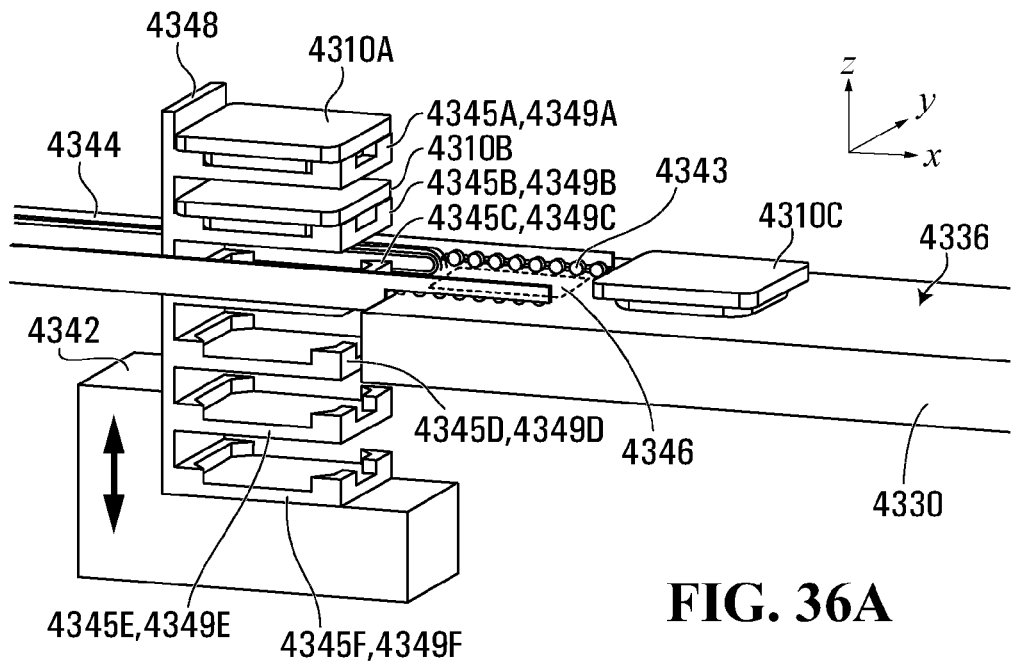
FIG. 36A is a partial isometric top view of an apparatus according to one embodiment.
Figure 36B:
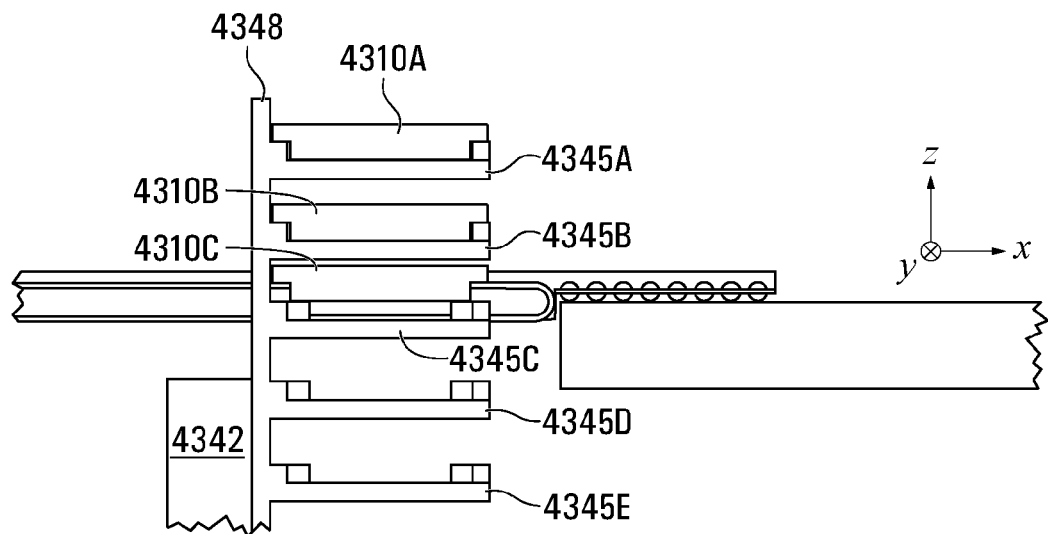
FIG. 36B is a partial side view of the apparatus shown in FIG. 36A.

Referring to FIGS. 36A and 36B (collectively FIG. 36) a magnetic movement apparatus according to another embodiment is shown, wherein the apparatus has automatic loading/unloading functionality. The apparatus comprises a plurality of movers 4310A-4310C, a work body 4330, a guidance device 4343, and an edge belt conveyor 4344, each of which being substantially similar to the components described in reference to the embodiment in FIG. 27A. In other various embodiments, any combination of embodiments describing movers, work bodies, guidance devices, and/or transfer devices as previously described herein may be combined in an apparatus having such automatic loading/unloading functionality.

In the illustrated embodiment, the apparatus comprises an overlapping region 4346 as shown by the dashed line in FIG. 36A, which is both part of the work body working region 4336 and part or the guidance device working region, wherein the guidance device overlaps with the work body 4330 in the Z direction. One or more movers, e.g. mover 4310C can be controllably moved from work body 4330 to conveyor belt 4344 via guidance device 4343, in a way substantially similar to the way described herein, for example in a way substantially similar to the way described with respect to the embodiment in FIG. 27A. The apparatus in FIG. 36A further comprises a storage device 4348 that is installed on a Z motion transfer stage 4342, which may function similarly to transfer stages previously disclosed herein, such as transfer stage 3042 as shown in FIG. 23A, for example. The Z motion transfer stage 4342 is guided with any suitable movement mechanism, such as bearings, for example (not shown), and is driven with any suitable motors or actuators (not shown) so that the transfer stage 4342 can move in the Z direction. The transfer stage 4342 may be configured to carry the storage device 4346 to move up and down in the Z direction. The storage device 4348 comprises a plurality of storage bodies 4345A-4345F, and these storage bodies overlap with each other in the Z direction. In various embodiments, the storage device 4348 may be made of non-magnetic materials, such as but not limited to plastic materials, woods, aluminum, copper, and/or ceramics, which may reduce or eliminate unwanted magnetic interaction with movers stored thereon.

In the illustrated embodiment, between two adjacent storage bodies, there is a Z-oriented gap to allow mover to enter. In various embodiments, each storage body may comprise one or more storage surfaces 4349, and each storage surface 4349 may hold one mover. Each storage surface 4349 may comprise a constraining mechanism to constrain a mover laterally (e.g. in the X and Y directions, for example). For example, mover 4310A may be held on the storage surface 4349A of storage body 4345A, so that movement of the mover is constrained in the X and Y directions. In various embodiments, each storage body may store one or more movers. For example, mover 4310A may be stored on storage body 4345A, and mover 4310B may be stored on storage body 4345B. An exemplary constraining mechanism of storage surface 4349F is shown in FIG. 36A, wherein the constraining mechanism comprises a concave octagon shape on the storage surface 4349 which may be configured to mate with a similar but smaller convex octagon shape on a lower surface of a corresponding mover, for example. In various embodiments, other suitable methods of constraining the movement of movers stored on the storage device may be implemented.

Assuming the gravity is in the −Z direction, one example process of transferring a mover 4310C to a storage body 4345C may be as follows:

1) Mover 4310C may be controllably moved by the work body in at least 2 directions/DOF in levitation mode from work body working region 4336 to inside of the overlapping region 4346;
2) The mover 4310C may be caused to land onto the guiding device 4343;
3) The mover 4310C may be controllably moved in 1-direction/DOF along the −X direction by the work body 4330 towards the conveyor 4344 until at least half of the mover 4310C is outside of the work body working region 4336.
4) The mover 4310C may land onto the conveyor belt by a soft landing operation or in response to the flow of current inside particular electrically conductive elements being stopped. The conveyor belt may further move the mover along the conveyor because of friction between the mover and the conveyor belt, until the mover is laterally aligned with a storage surface 4349C on the storage body 4345C as shown in FIG. 36B, which shows a cross-sectional side view of the system when the mover 4310C is laterally (in X and Y directions) aligned with the storage surface 4349C on storage body 4345C. In various embodiments, the mover 4310C may then be supported vertically by the edge belt conveyor 4344, if the mover is configured with extended features such as roof edges which may be held by the edge belt conveyor.
5) As the Y-direction width of the storage device is less than the Y-direction spacing between two edge belts of the conveyor, the Z motion transfer stage carrying the storage device 4348 may be caused to then move in the Z direction so that mover 4310C may be lifted up from the edge belt conveyor 4344 and constrained on the storage surface 4349C on storage body 4345C as shown in the cross-sectional side view of the system in FIG. 36C.
6) The Z motion transfer stage may then move further in the Z direction so that the next storage surface 4349D on storage body 4345D may be used to store another mover.

Figure 36C:
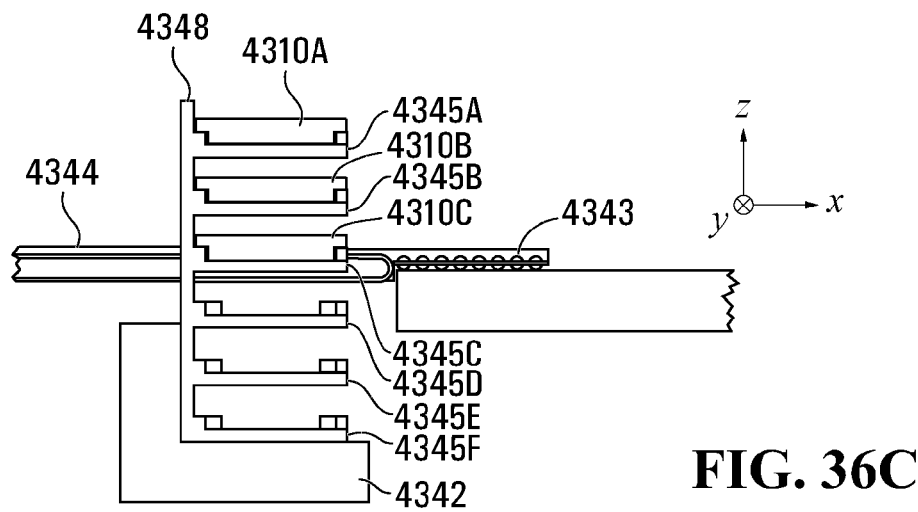
FIG. 36c is a partial side view of the apparatus shown in FIG. 36A.

In various embodiments, the above process may also be implemented in reverse work body so that movers may be transferred from the storage device 4348 to the work body working region 4336, i.e. for loading movers on to the work body. For example, to load a mover 4310C from the storage device to the work body, an exemplary process may be as follows:

1) The storage body 4345C may be lowered down from its position shown in FIG. 36C to its position shown in FIG. 36B so that mover 4310C is lifted up off of the storage surface 4349C on storage body 4345C to be supported by the conveyor.
2) The conveyor may then transfer the mover 4310C towards the work body 4330 until at least one Y-oriented magnet array of mover 4310C is inside the work body working region;
3) The mover may then be controllably moved in 1 direction/DOF by the work body 4330 in the X direction while being constrained/guided by the guidance device 4343, until the mover 4310C is completely inside the overlapping region 4346.
4) Mover 10C may then be moved in the Z direction up from the guidance device 4343 in response to magnetic forces generated by electrical current drive in the work body electrically conductive elements in the work body 4330, and may be controllably moved in up to 6-directions/DOF away from the overlapping region 4346 and toward the rest of the work body working region 4336 for the purpose of performing one or more operations, such as an automation task, for example.

In various embodiments, any other suitable transfer device, such as but not limited to a powered roller conveyor as shown in FIGS. 26A and 26B, may be used in the apparatus instead of the edge belt conveyor as shown in FIG. 36.

Figure 37:
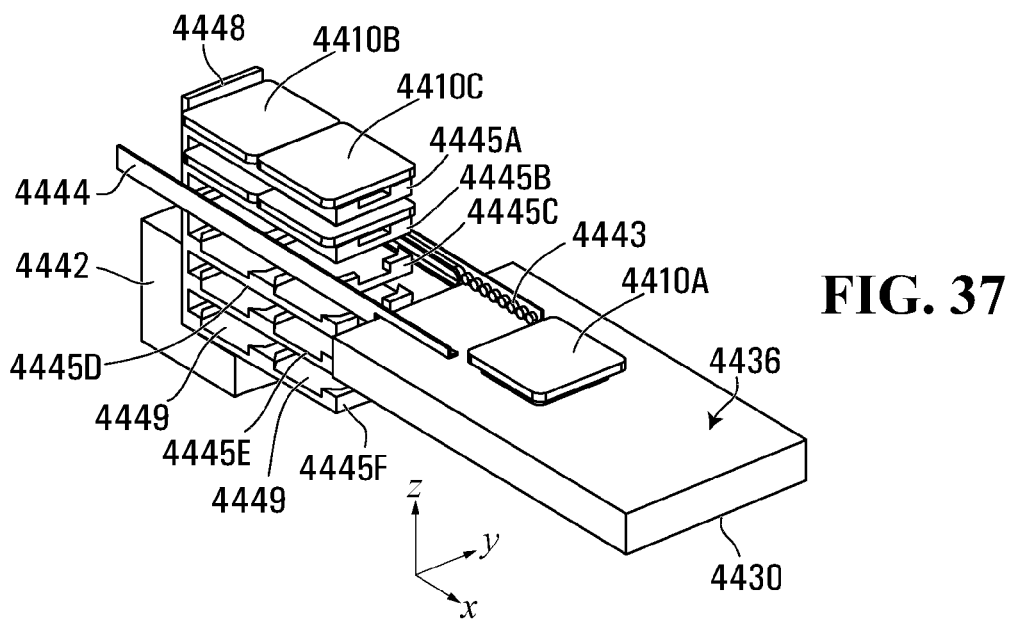
FIG. 37 is a partial isometric top view of an apparatus according to one embodiment.

Referring to FIG. 37 another magnetic movement apparatus is shown according to an embodiment wherein each storage body comprises more than one storage surface. Most of details of the apparatus of FIG. 37 are substantially similar to those in the apparatus shown in FIG. 36, except that each storage body 4445 in FIG. 37 comprises two storage surfaces 4449, which may be used to hold two movers on one storage body. In various embodiments, two movers may be transferred from the work body working region into one storage body (or the other way from one storage body to the work body working region) together, or one by one. For example, two movers 4410B, 4410C on the storage body 4445A can be transferred from the storage device 4448 to the work body 4436 one by one, assuming there are no movers on other storage bodies of the storage device: by lowering down a Z-motion transfer stage in the −Z direction until movers 4410B and 4410C are completely lifted off of their storage surfaces and are held by the edge belt conveyor, the edge belt conveyor may then transfer the two movers in the X direction together so that mover 4410B is laterally aligned with the storage surface where mover 4410C is occupying in FIG. 37; afterwards the Z motion transfer stage may be raised up so that mover 4410B is lifted up by the storage body 4445A and held on the aligned storage surface, and the mover 4410C may be further transferred by the conveyor and driven by the work body to enter the overlapping region and subsequently be controllably moved by the work body into the work body working region. In various embodiments, storage bodies may comprise more than two storage surfaces, and may be operable to hold more than two movers.

In various embodiments, when all or most storage surfaces in a storage device such as storage device 4448 are occupied with movers, the storage device 4448 may be removed from a transfer stage such as the Z-motion transfer stage 4442 via a quick release mechanism and another empty storage device may be installed on the Z motion transfer stage 4442. The newly installed empty storage device may be used to store additional movers. The above process can be used to move all movers from the work body to the storage device as necessary, for example but not being limited to, during system maintenance or work body replacement.

Similarly, in various embodiments a storage device holding one or more movers may be installed on a Z motion transfer stage such as transfer stage 4442 via a quick latch mechanism so that each mover can be moved from the storage device onto the work body working region, as described previously.

In various embodiments, the storage device may be used to hold one or more movers during shipping. After the one or more movers are placed on storage surfaces, either automatically or manually, the Z-oriented space between a mover top surface and the bottom surface of the above storage body may be filled with one or more spacing bodies, such as but not limited to plastic foams, or similar paper or plastic based packing materials, for example. The whole storage device, along with the movers inside, can be put inside a package for shipping, for example. In various embodiments, a storage device filled with one or more movers may be protected with proper magnetic shielding.

Generally, a mover may carry one or more objects such as parts, such as but not limited to a biological sample, a device, a drug possibly in a suitable container, a product being assembled, a raw material, a component, or any other object required to meet the needs of a desired operation, automated task, or manufacturing purpose, for example. Suitable tools and/or mechanisms, such as a material feeding mechanism, for example, may be installed or distributed on work bodies (for example, along a work body's sides, or over the work bodies from above).

Working Region Partitions

Generally, as used herein, work bodies comprise working surfaces that may be logically configured into one or more individual working regions in which one or more movers may be configured to move. FIGS. 38A and 38B show a graphical example of a 2D trajectory of an exemplary mover in the time domain (38A) and in a working region of a surface of a work body such as the working surface of a work body (38B), respectively. Generally, in various embodiments the length and shape of the 2D trajectory in the work body plane may both be configurable by modifying the time domain trajectories Xr(t) and Yr(t) of the mover's intended movement path accordingly. The trajectories may be modified such that a mover (such as any mover previously described herein) is commanded to move from a starting point 1 (having the coordinates Xr1, Yr1) to an ending point 2 (having the coordinates Xr2, Yr2) over a time span between times t1 and t2.

Figure 39:
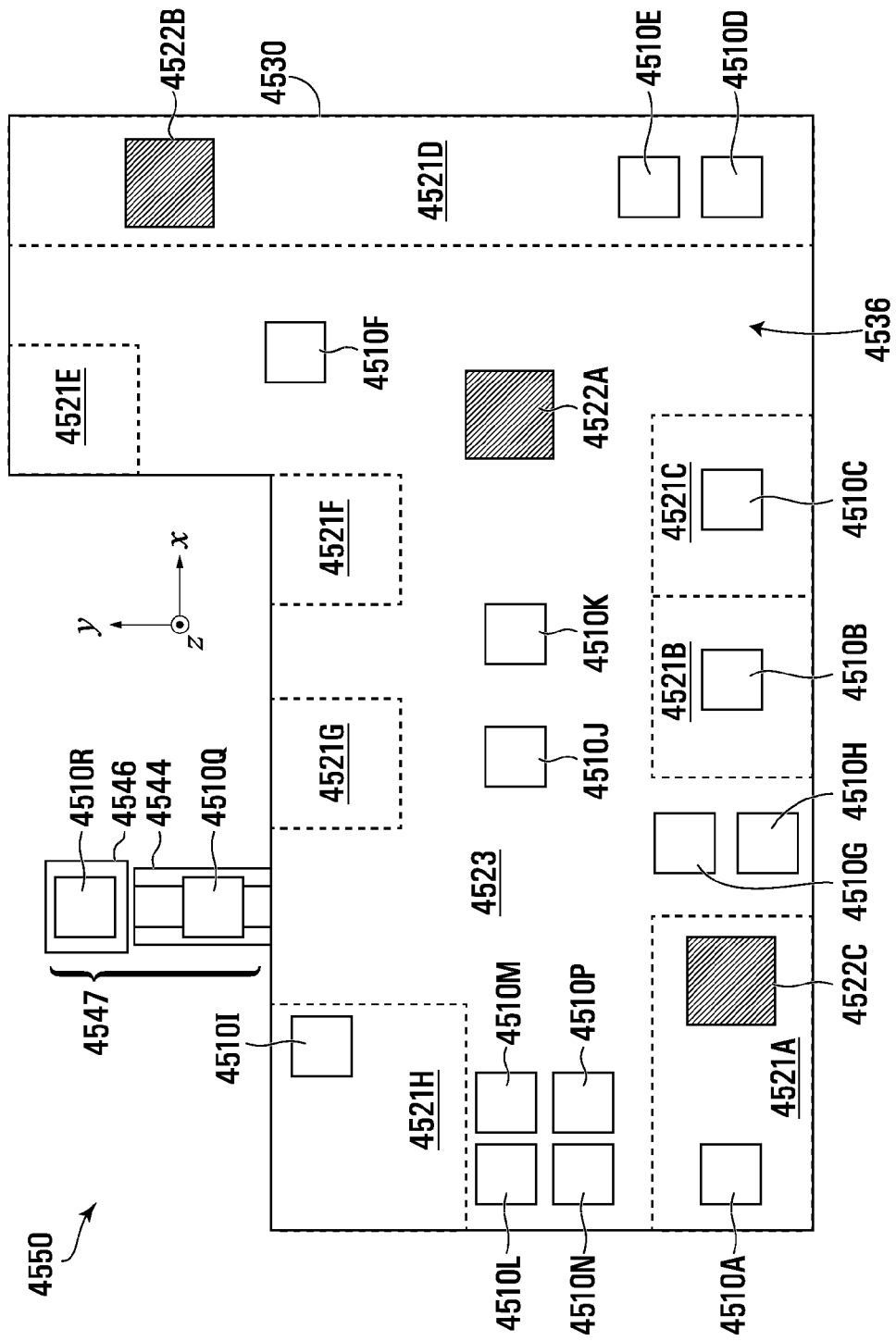
FIG. 39 is a top view of an apparatus according to one embodiment.

FIG. 39 shows an exemplary working region 4536 of a magnetic movement apparatus 4550 according to another exemplary embodiment. The apparatus 4550 comprises a work body 4530 comprising a working surface defining a working region 4536 and a plurality of movers 4510A to 4510R. In various embodiments, the overall layout of the work body 4530 may be determined by the needs of a particular process, such as a manufacturing, assembling, handling, or packaging, process, for example, In various embodiments, and the work body 4530 may be made up of modular tiles.

In various embodiments, the working region 4536 may comprise a plurality of work cells 4521A-4521H. Each work cell may comprise a 2D (two-dimensional) continuous area inside the working region 4536 in which a particular operation, process, and/or manufacturing step (for example) may be conducted. In various embodiments, work cells may be dedicated two-dimensional areas defined by users via a suitable software means. In various embodiments, the boundaries of a work cell may be rectangular, or may be any other arbitrary shape, such as but not limited to polygons, circles, or ellipses, for example.

In various embodiments, two or more work cells may be contiguous with each other and may share a boundary, such as work cells 4521B and 4521C as shown in FIG. 39. In various embodiments, two or more work cells may be spaced apart, such as work cells 4521G and 4521F in FIG. 39. A work cell boundary may coincide with a boundary of a working region, such as work cell 4521F and working region 4536 in FIG. 39. In embodiments wherein work cells are located along a work region boundary, as shown in FIG. 39, human operators may be able to conveniently access hardware or components in said work cells. In various embodiments, one or more work cells may be located completely inside the working region without any boundaries shared therebetween.

Generally, a work cell may correspond to one or more operations, processes, manufacturing steps, or other suitable functions. A work flow may comprise a plurality of such operations, processes, manufacturing steps, or other suitable functions. For example, a phone assembly production apparatus may comprise a number of work cells, and in each work cell a certain assembly task may be performed. Each of a number of movers may be configured to move into a work cell for a given assembly task, and may move from said work cell to another work cell for a subsequent assembly task according to a particular work flow.

Generally, a portion of a working region may surround or be coincident with one or more work cells, and that portion of the working region may be used as a routing region (shown as routing region 4523 in FIG. 39) for mover traffic, i.e. routing region 4523 comprises a portion of the working region of the work body in which one or more movers may move towards their respective destination positions based on application needs. One or more movers may be controllably moved in the routing region to follow 2D trajectories generated by one or more controllers such as one or more controllers 160 as shown in FIG. 1A, for example from a first work cell to a second work cell, by using a suitable routing algorithm configured to drive electrical current through certain conductive elements in the work body.

In various embodiments, an apparatus such as apparatus 4550 may comprise one or more obstacles, such as obstacles 4522A-4522C in FIG. 39. In the illustrated embodiment, each obstacle is a two-dimensional area of the working surface that movers are not allowed or are otherwise unable to move into. In various embodiments, an obstacle may correspond to a tool (or a tool mount) that is positioned or installed in such a way that a mover cannot or should not move into the area occupied by the tool/tool mount, because otherwise mechanical collision and/or interference with normal operation of the tool may occur. In various embodiments, one or more obstacles (such as obstacle 4522A) may be outside work cells, one or more obstacles (such as obstacles 4522B and 4522C) may be inside work cells, and one or more obstacles may cross boundaries between work cells and the routing region 4523. In various embodiments, obstacles may be logically configured via software or by one or more controllers (such as controller 160 shown in FIG. 1A, for example) so that the one or more controllers may be able to take said obstacles into account during trajectory generation for movers, which may allow the movers to be controllably moved to follow trajectories around the obstacles instead of hitting or colliding with obstacles.

In various embodiments, a magnetic movement apparatus may optionally comprise a mover buffer system 4547 as shown in FIG. 39. In various embodiments, mover buffer system 4547 may comprise a mover transfer device 4544 (such as but not limited to any one of the mover transfer stages described herein such as transfer stage 4342 shown in FIGS. 36A-36C, or simply a conventional conveyor belt, for example) and a mover storage device 4546 such as mover storage devices 4348 and 4448 as described in reference to FIGS. 36A-36C and 37, for example. Implementing a mover buffer system 4547 may allow temporarily unnecessary movers to move from work body working region 4536 into the mover storage device 4546 so that those temporarily-unwanted movers don't block mover traffic in the working region 4536; when the apparatus needs more movers in the working region 4536 to conduct a particular operation or process, the movers stored in the storage device 4546 may be moved back via mover transfer device 4544 into the working region for additional operations or processes. The mover buffer subsystem 4547 may thus help improve system traffic efficiency.

In various embodiments, an obstacle may have two states: an active state and a deactivated state. When an obstacle is in the deactivated state, the corresponding area of an obstacle may be used by one or more controllers for routing one or more movers and/or commanding one or more movers to perform one or more operations in a work cell, i.e. when the obstacle is in the deactivated state, movers may move into the obstacle area. When an obstacle is in the activated state, movers may not be allowed to move into the obstacle area, and one or more controllers may accordingly generate suitable trajectories to command movers to avoid the activated obstacles. An obstacle may be temporarily deactivated: for example, a tool may be temporarily lifted or moved away from the work body so that it doesn't block movers in the occupied area. In various embodiments, one or more obstacles may be permanently in an activated state.

Controller Architecture

Figure 40A:
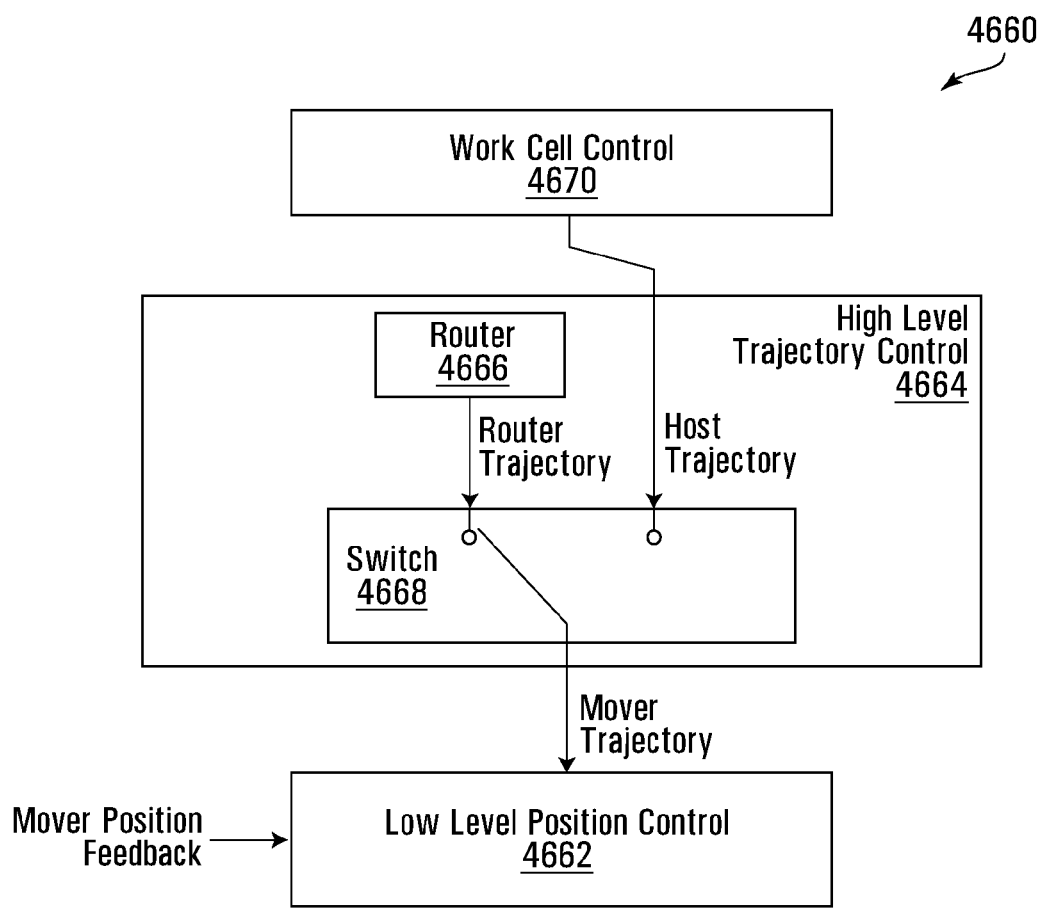
FIG. 40A is a schematic view of a work cell control module according to one embodiment.

Generally, movers are caused to move in response magnetic interaction between magnetization elements in each mover and magnetic fields generated by electrical currents driven through one or more electrically conductive elements in a work body positioned below the movers. Said electrical currents may be controlled by one or more controllers. As shown in FIG. 40A, in various embodiments a controller 4660, which may function substantially the same as any other controller described herein, such as controller 160 as shown in FIG. 1A, for example, may be divided into multiple levels of control modules. A non-limiting embodiment describing the implementation of three control modules in a controller 4660 is described as follows and is schematically shown in FIG. 40A:

a low-level position control module 4662 may be configured to control each controllable axis of one or more movers using a suitable control algorithm so that the actual positions of the one or more movers follows a desired trajectory (such as 2D trajectories, for example).

a high-level trajectory control module 4664 may be configured to generate trajectories for the one or more movers so that the one or more movers can move into one or more work cells to perform operations, and so that the one or more movers can move from one work cell to another based on a work flow. In various embodiments, the high-level trajectory control module 4664 may comprise a router module 4666, which may be configured to generate trajectories for the one or more movers in a routing region, and/or from one work cell to another, for example. The router module may output a router trajectory for a mover, which may be received by a switch module in the high-level trajectory control module. The switch module may be configured to switch to the router trajectory when one or more movers is in a routing region, and may switch to the host trajectory (explained below) when a mover is in a work cell for a particular operation.

A work cell control module 4670 may be configured to control the operation of one or more movers in a work cell for a particular operation. In various embodiments, each work cell may have a corresponding work cell control module. Each work cell control module 4670 may generate host trajectories for one or more movers in the work cell one after another or simultaneously.

In various embodiments, control module may be physically implemented centrally in one controller. In other embodiments, individual control modules may be distributed in individual controllers. For example, low level position control module 4662 may be implemented in a first controller, high level trajectory control module 4664 may be implemented in a second controller, and one or more work cell control modules 4670 may be implemented in one or more additional controllers programmed for specific operations and/or applications. In various embodiments, control modules may be implemented in two controllers: low level position control 4662 and high level trajectory control 4664 may be implemented in a central controller, and one or more work cell control modules 4670 may be implemented in one or more host controllers programmed for specific operations and/or applications. In other embodiments, control modules may be implemented in two controllers in a different way: low level position control module 4662 may be implemented in a tile controller, and high level trajectory control module 4664 and work cell control module 4670 may be implemented in a central controller. Generally, control modules can be implemented using suitable software running on any suitable computer hardware, such as but not limited to central processing units ("CPUs"), graphical processing units ("GPUs"), microprocessors, micro-controllers, digital signal processors, programmable logic controllers ("PLCs"), and/or industrial PCs ("IPCs"), etc., or can be directly implemented as hardware in field-programmable gate arrays ("FPGAs"), or in a combination of any of the above-mentioned ways. In various embodiments, bidirectional electrical communication channels may exist between one or more control modules in a controller or across controllers.

Figure 40B:
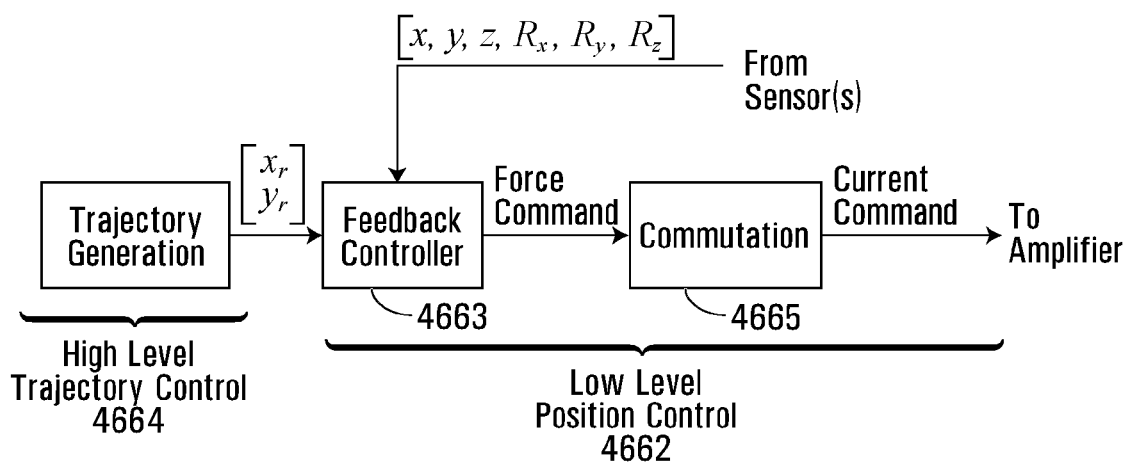
FIG. 40B is a schematic view of a portion of the work cell control module shown in FIG. 40A.

FIG. 40B shows a non-limiting example of a low level position control module such as module 4662 as shown in FIG. 40A. As previously discussed, movement of a mover may be controlled in response to feedback sent to the controller in at least 2 directions/DOF (generally, the X, Y, Z, Rx, Ry, and Rz directions); therefore the mover can be said to be capable of controlled movement in at least 2 directions/DOF. In the illustrated embodiment, the low-level position control module 4662 comprises a feedback controller module 4663 which is configured to take the trajectory from high-level trajectory control module 4664, and the position feedback signals generated by one or more sensors such as sensors 180 as shown in FIG. 1A, as input to calculate force command signals, which are transmitted to a commutation module 4665. The commutation module 4665 accordingly generates current command signals which are then transmitted to one or more amplifiers such as one or more amplifiers 170 as shown in FIG. 1A in order to drive the required electrically conductive elements with current according to the current command signals. The 2D trajectory of a mover (Xr, Yr) is calculated by the high level trajectory control module 4664. The feedback controller 4663 may be configured to control the mover's X and Y position to track the trajectory command Xr and Yr, respectively. For other axes, (e.g. motion in the Z, Rx, Ry, Rz directions), the feedback controller 4663 may either cause the mover to follow a constant reference position or to follow trajectories in the corresponding axes. Although the mover is capable of controlled motion in up to 6-directions/DOF, the mover may be required to follow a 2D trajectory calculated by the high level trajectory control module 4664.

Generally, motion of a mover is capable of being controlled in N-directions/DOF (wherein $N \geq 2$), which includes at least two in-plane axes X and Y. A mover may be commanded to move in an M-dimensional trajectory (wherein when $N \geq M \geq 2$), which may include at least two in-plane axes, Xr and Yr. In embodiments wherein $N > M$, movement of the mover in the direction that is not specified in the movement trajectory may be commanded using a constant reference value selected from one or more settings or according to operational requirements, for example. For example, a mover capable of controllable movement in up to 6-directions/DOF may be commanded to follow a 2D trajectory (Xr, Yr) only, in which case movement of the mover in the Zr, Rxr, Ryr, and Rzr directions may be negated by setting suitable constant settings such that the mover only moves within a stipulated range in those non-trajectory directions (such as, for example, being allowed a range of movement of approximately 1 mm in the Zr direction in the routing region, and being allowed a range of movement of approximately 1.2 mm in the Zr direction in a work cell, in order to maintain a desired air gap in the Zr direction between the working surface and the mover bottom surface). In various embodiments, a mover may be controllably moved in up to three in-plane directions/DOF by the feedback controller 4663, but may be commanded to follow 2D trajectory (Xr, Yr).

Generally, the 2D trajectory (Xr, Yr) for any given mover can be independently generated to for particular operations, processes, or to meet any other systemic need. As such, the resulting path of (Xr, Yr) a mover may be represented by a line in the work body plane in terms of both its shape and its length, both of which are configurable/modifiable by the high-level trajectory control module 4664. Although 2D trajectories are mentioned throughout this document, reference commands for other axis of mover do not have to be set at constant values; in various embodiments, a mover may be commanded according to a trajectory in more than two dimensions. Furthermore, although only one mover is discussed in reference to FIGS. 40A and 40B, in various embodiments a similar magnetic movement system may comprise a plurality of work cells and each work cell may have its own corresponding work cell control module (such as module 4670) in one or more controllers such as controller 160 in FIG. 1A. In various embodiments, each work cell control module may generate host trajectories for one or more movers in the work cell simultaneously. In various embodiments, the router module 4666 may simultaneously generate trajectories for a plurality of movers that are in a routing region, as will be discussed in greater detail later.

Furthermore, although only trajectory signals are shown in FIG. 40A, it should be understood that any two or more modules in the controller may have be able to transmit and receive signals between one another for proper feedback, commands, synchronization, handshaking, and/or for any other purpose. In various embodiments, movers may not be needed to move inside a work cell during a particular operation; accordingly, the corresponding work cell control module 4670 may not send a host trajectory to the high level trajectory control at all.

Work Cells

Generally, as used herein a work cell comprises a two-dimensional continuous area within a working region on a work body, in which one or more movers are configured to be controllably moved in at least two in-plane directions/degrees of freedom. Inside a work cell, a mover may be configured to be controllably moved to follow a 2D trajectory. A 2D trajectory for a mover may be a line or curve having a configurable shape and/or length inside the working region of the work body.

In various embodiments, some or all of a work cell may be configured to be activated or deactivated; i.e. a work cell may comprise a partial activation area or a complete activation area. When the activation area is activated, the activation area of the work cell may be used by a router module (such as router module 4666 as shown in FIG. 40A) to generate trajectories for mover routing; when the activation area is deactivated, the activation area of the work cell is reserved by a work cell control module (such as work cell control module 4670 shown in FIG. 40A) for a particular operation, such as a manufacturing process, and is not available to the router module 4666 for mover routing.

Figure 41A:
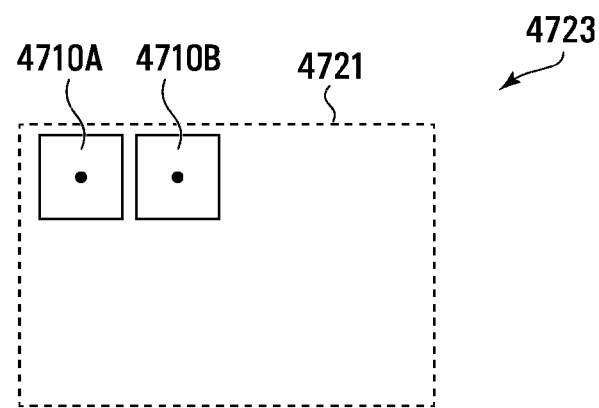
FIG. 41A is a top view of a work cell according to one embodiment.

FIG. 41A shows a non-limiting example of a work cell 4721 with a complete activation area according to an exemplary embodiment. The work cell 4721 is configured to accommodate two movers 4710A and 4710B; in other embodiments, a work cell with a complete activation area may be configured to accommodate any number of movers. In various embodiments, a work cell may be able to accommodate one or more movers as a "batch" of movers; a batch's size (i.e. the number of movers processed in a batch) may vary according to the needs of the particular operation. The entire area of work cell 4721 area may be activated or deactivated. A work cell control module (such as work cell control module 4670 shown in FIG. 40A) and a router module (such as router module 4666 shown in FIG. 40A) may work in a collaborative way so that two (or more) movers may enter the work cell 4721 from the routing region 4723, implement a particular operation inside the work cell 4721, and then leave the work cell 4721. One non-limiting example of the sequential process for such collaborative control is as follows:

(1) when the work cell is in activated, the router module may generate suitable 2D trajectories for two movers 4710A and 4710B from their present positions to respective destination positions in the work cell. The destination positions for movers in a work cell may be previously defined via one or more system configuration parameters or specified by the work cell control module, either offline or on the fly, for example. Further, the movers may be controllably moved in the working region to follow the generated trajectories and arrive at the trajectory destination. In this process, a switch module (such as switch module 4668 in FIG. 40A) may use the router trajectories as the mover trajectory. Afterwards, the router module may send a signal to the work cell control module indicating that the that two movers are ready for the work cell to process.

(2) The work cell is changed to a deactivated state. The switch module sends the host trajectory as a mover trajectory to a low-level position control module (such as low-level position control module 4662 as shown in FIG. 40A). The work cell control module starts to take over the movers from the router module, and the work cell area is not available to the router module for mover routing. During the particular operation inside the work cell, the movers may be held at specific positions; or may be moved to follow previously stored 2D trajectories; or may be required to follow host trajectories which are generated by the work cell control module in synchronization with an external process, such as but not limited to the motion of another external robot arm (or other too) or along another master axis, for example.

(3) After the particular operation is finished, the work cell control module may signal to the high level trajectory control module that the particular operation for the movers is done and the work cell is may be changed to an 'activated' state again;

(4) The switch module may pass the router trajectory to the low level position control module, and the router module may take over the trajectory generation for the movers in the work cell, controllably moving the movers out of the work cell to their next-step destinations by following the router generated trajectories. Meanwhile, the router module may generate suitable 2D trajectories for new incoming mover(s) to command them to their respective destination positions in the work cell. In various embodiments, the control flow may go back to step 1) and repeat itself again.

Figure 41B:
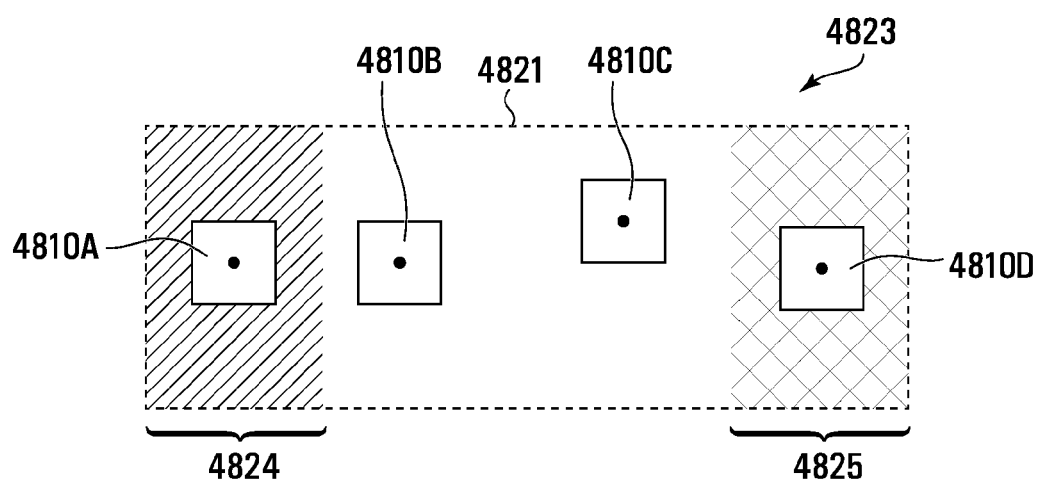
FIG. 41B is a top view of a working region according to one embodiment.

FIG. 41B shows another non-limiting example of a work cell according to another embodiment. The work cell 4821 in FIG. 41B comprises two activation areas: an entrance area 4824, and an exit area 4825. The entrance area may accept one or more movers in one batch (one mover in the case of FIG. 41B). The exit area may remove one or more movers in one batch (one mover in the case of FIG. 41B). A work cell control module and a router module (according to any previously described embodiment) work in a collaborative way so that one or more movers may be accepted from the routing region to the work cell via the entrance area, one or more movers may be commanded with 2D trajectories inside the work cell 4821 to implement a particular operation, and one or more movers may be removed from the work cell 4821 to the routing region. The area of the work cell other than the entrance area and the exit area is a non-activation area.

Although in FIG. 41B, there is a non-activation area in the work cell 4821, i.e. the work cell area other than the entrance area 4824 and the exit area 4825, in various embodiments, a work cell with an entrance area and an exit area may not comprise a non-activation area, in which case the entrance area may be side-by-side with the exit area.

Although in FIG. 41B, the entrance area 4824 and the exit area 4825 are not overlapping with each other, in various embodiments, the entrance area of a work cell may overlap with its exit area.

One non-limiting example of sequential process for such collaborative control in the entrance area in FIG. 41B may be as follows:

(1) when the entrance area is in activated state, the router module may generate suitable 2D trajectory for one mover 4810A from its current position (outside of the working region 4821) to its destination position in the entrance area 4824. The destination position for a mover 4810A in the entrance may be previously defined via system configuration parameters or specified by the work cell control module, either offline or on the fly (for example). A switch module such as any switch module previously described herein may use the router-generated) trajectory as the mover trajectory. Further, the mover may be controllably moved in the working region to follow the router trajectory and to arrive at the trajectory destination. Afterwards, the router module may send a signal to the work cell control module to report that a mover is ready in the specified position in the entrance area 4824 for the work cell to assume control of thereafter.

(2) The entrance area may then be changed to the deactivated state. The switch module sends the host trajectory as mover trajectory to the low-level position control module. The work cell control module starts to take over mover 4810A from the router module, and the entrance area 4824 is not available to the router module for mover routing. During the manufacturing process inside the work cell, the mover 4810A along with possibly movers already in the work cell non-activation area like 4810B and 4810C in FIG. 41B may be moved to follow previously stored 2D trajectories, or may be required to follow host trajectories which are generated by the work cell control module in synchronization with an external process or event, such as but not limited to the motion of another external robot arm (or other tool) or motion along another axis.

(3) After the mover 4810A leaves the entrance area and the entrance area is not needed for the particular operation, the work cell control module may signal to the router module that the entrance area may be changed back to activated state;

(4) The control flow for the work cell entrance area may go back to step (1) to accept a new mover (along with its carried part(s) in various embodiments).

In various embodiments, steps (2) and (3) in the above sequential process may happen simultaneously.

In various embodiments, while in the entrance area, the router module and the work cell control module may collaboratively accept new mover(s) into the work cell. Similarly, in various embodiments, in the exit area the router module and the work cell control module may collaboratively remove movers that have finished a particular operation in the work cell. One non-limiting example of a sequential process for collaborative control of movers in the exit area is as follows:

(1) when a mover (such as mover 4810D) finishes the particular operation in the work cell, it is commanded to move to the exit area according to the host trajectory generated by the work cell control module. Further, the work cell control module sends signal to the high level trajectory control module indicating that the exit area has changed to the activated state and that the mover(s) in the exit area are ready to be removed from the work cell.

(2) After the exit area is activated, the router module may generate one or more 2D trajectories for mover 4810D to move it from its current position in the exit area to its next destination position. The next destination position for mover 4810D may be another work cell for another particular operation specified by a work flow (such as another manufacturing step, for example). In this process, the switch module may use the router-generated trajectory as the mover trajectory. The mover 4810D is controllably moved in the work body working region to follow the generated trajectory and to arrive at its destination outside of the work cell 4821.

(3) After mover 4810D leaves the exit area, the router module may send a signal to the work cell control module indicating that mover 10D has been removed from the work cell and the exit area state is able to be changed to deactivated.

(4) The control flow for the work cell exit area may go back to step (1) to remove another mover (along with its carried part(s) in various embodiments) from the exit area.

Although there is only one mover shown in one activation area (the entrance area and the exit area in FIG. 41B), in various embodiments one or more movers may be removed from the exit area in one batch, each having its own destination position for its next particular operation.

Generally, in a magnetic movement apparatus, a working region on a work body may comprise one or more work cells and one routing region. One work cell may comprise one or more activation areas. Each activation area is configured to operate in one of two states: an activated state and a deactivated state. In the activated state, one or more movers may be commanded to move between the router region and the activation area to follow 2D trajectories generated by a router module. In the deactivated state, one or more movers may be commanded to controllably move to follow 2D trajectories generated by a work cell control module. A 2D trajectory may include at least two independently configurable trajectories Xr(t) and Yr(t) representing the desired positions of mover in the X and Y directions, respectively.

Non-limiting examples of operations that may be conducted in a work cells are: dropping a part on a base assembly carried by a mover, inspecting whether a part on a mover is properly assembled or not, dispensing glue on a base assembly carried by a mover, filling into glass vials with liquid, getting liquid samples from containers, and so on, wherein a liquid may be a drug or biological/chemical samples, for example. A work cell control module may generate trajectories for one or more movers in the work cell in synchronization with an external process, such as but not limited to an external event or movement along an external axis. For example, a drug-filling line held by an external robot may move in the X and/or Y direction(s) to fill liquid into vials held by one mover, and the X or Y motion of the mover may be required to follow the X and Y motion of the external robot so that the filling line can remain inside the mover-carried vials. In various embodiments, a plurality of movers may be commanded to move in a work cell to follow 2D trajectories generated by a work cell control module, and the 2D trajectories of the plurality of movers are in synchronization with each other. For example, in a work cell a plurality of movers each may carry an injection printing head to collaboratively print a pattern on a large format substrate held on the work body. In various embodiments, as one activation area of a work cell may be in the activated state, the working region available to the router module to route a plurality of movers may not necessarily limited to the routing region, i.e. the routing region may be temporarily extended into activation areas of work cells which may help improve routing efficiency.

Work Flow

Generally, as used herein a work flow is a set of sequential operations, steps, or other actions to be performed using one or more movers during a particular process (such as a manufacturing process, for example). Each step may be performed in a work cell. A work flow may be specified offline at the beginning of the process, and may be modified during the process based on the changed customer requirements or based on the processing results in some steps. For example, one work flow may include a step of inspection of a part on the mover, and based on the inspection results the next step for that part may be modified accordingly. For example, according to an embodiment of a magnetic movement apparatus (such as any embodiment disclosed herein) in which a plurality of parts is being subjected to a particular process, each part may have an identical work flow, or each part may have a different work flow to accommodate requirements from users (such as mass customization requirements, for example).

In an exemplary magnetic movement system such as the magnetic movement system 4550 as shown in FIG. 39, the working region may comprise multiple redundant work cells that may have identical functionality for a particular operation. For each mover that needs to perform the particular operation, a router module (such as router module 4666 as shown in FIG. 40A) may select one of the redundant work cells, based on one or more factors such as but not limited to the availability of said work cells, the traffic situation of the robotic system, the urgency of the part(s) on the mover, and the optimization of the system performance such as throughput, for example.

Figure 42:
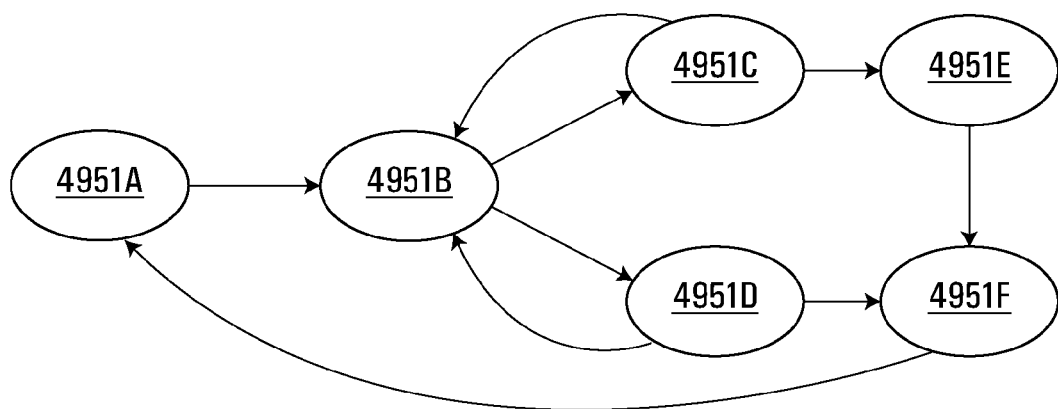
FIG. 42 is a schematic view of a work flow according to one embodiment.

FIG. 42 shows a non-limiting example of a work flow: each step 4951 (4951A to 4951F) represents a particular operation, task, action, or the like to be performed. Each step 4951 may be performed in one work cell. Multiple work cells may be assigned for a particular step; a router module may decide which work cell to use from the multiple assigned work cells for a step to be performed for a part as previously described. In various embodiments, a work flow may comprise one or more branches. In FIG. 42, after finishing step 4951B there are two possible steps 4951C and 4951D, which means that one of steps 4951C and 4951D must be performed based on factors such as but not limited to the processing result at step 4951B or time-varying user requirements, for example.

In various embodiments, the work flow may be dynamically changed from time to time, and may be changed according to different parts, products, or manufacturing processes, for example. In an exemplary embodiment comprising a mass customization manufacturing system, each product to be produced may be associated with a unique work flow specified according to a particular customer or particular operation. At the beginning of a manufacturing process for a product, a unique work flow may be created for the product, and such work flow may be associated with a corresponding mover. The router module may generate corresponding trajectories for movers according to the next operation 4951 of each work flow associated with their carried part(s).

In addition, in various embodiments a work flow for a mover (and/or the associated part carried by the mover) may be also dynamically changed during a particular process such as a manufacturing process. For example, a mover is tasked to carry a vial to be filled with 20 ml type-A liquid at step 4951B and the filled liquid volume (or weight) will be checked at another step such as 4951D (for example in a work cell with a weighing station). If the weighing result indicates that the vial is 2 ml under filled, the work flow for the mover will be dynamically modified to send the mover back to the step 4951B for refilling.

In various embodiments, information (such as processing results of particular operations, recipes, requirements, and other data related to processes such as manufacturing processes) at each particular operation may be also recorded as an electronic document for each mover and its carried part(s). For example, in one embodiment, work flow related information may be initially recorded in an electronic document associated with a mover, which corresponds to a product to be built. Such work flow related information may be used by a controller (such as controller 160 as shown in FIG. 1A) to determine the work flow, or simply by the work flow itself. For example, the electronic document may contain a set of customized features for a customized product, and the controller may create a work flow for the mover at least partially based on the electronic document. Other non-limiting examples of information that may be included or appended to the electronic document are inspection results, features/procedures to be implemented during a particular process, materials used in assembly, time and/or place of a specific work cell for one or more particular operations performed on a product, etc. The information in the electronic document may be fetched and/or used by work cell control modules and/or the router module for purposes such as but not limited to traceability, work flow optimization, mover routing, and product quality assurance, for example. For example, one work cell may be configured to measure a part content, and such measurement result may be included in the electronic document associated with the mover; in a work cell for laser marking, some information from the electronic document associated with the part may be marked on the part, for example.

Movers

In various embodiments, a mover, such as any mover previously described herein, may be associated with a System ID ("SID") and/or a User ID ("UID"). In various embodiments, a mover may be configured to carry one or more parts, finished products, or half-finished products, for example. A controller, such as any controller previously described herein, may be configured to internally generate a SID to uniquely identify each mover in a magnetic movement apparatus, such as any magnetic movement apparatus as previously described herein. Such SID may be initially assigned by the controller based on certain rules, such as but not limited to the initial position of the mover, or information in a tag affixed to the mover. For example, such SID may be generated by reading from a mover-mounted tag (such as but not limited to RFID tag, infra-red tag, barcode, QR code, or the like) using optical means or electronic means or magnetic means or electromagnetic means, for example. Mover-specific parameters may be fetched based on the SID, such as but not limited to position sensor gain, position sensor offset, geometric or mechanical parameters, serial number, force coefficients, magnet strength, and so on.

In various embodiments, a mover may additionally be temporarily assigned with a UID, which may be related to one or more parts carried by the mover, for example. For example, at the beginning of the work flow for a part, a UID may be assigned to a mover in order to identify the part during the manufacturing process. After the part is removed from the mover, the UID may be released and not associated with the mover any more. When the mover is tasked to carry a new part, a new UID may be associated with the mover.

Generally, a SID is generally used to identify a mover, and a UID is used to identify one or more parts (or other objects, as the case may be) carried on a mover. When one or more parts are carried by a mover, the UID and SID are associated together; when the part(s) are removed from the mover, the SID is still associated with the mover but the UID is no longer associated with the mover any more; when a new part is subsequently carried by the mover, a new UID may be assigned to (or associated with) the mover.

In various embodiments, a UID may be assigned to a mover by a work cell control program sending a command to the router module. A work cell control program may be configured to transmit a signal to the router module asking the router module about the UID for the movers in a work cell.

Routing

In various embodiments, a routing region such as a routing region described in reference to any aforementioned embodiment may comprise one or more queueing areas to store movers when work cells into which movers are commanded to move are not activated to accept new movers. For example, a destination work cell having a complete activation area may be in a deactivated state, or the entrance area of a destination work cell may be in a deactivated state. With a queueing area as part of the routing region, a mover that is ready to leave a source work cell can be commanded with a 2D trajectory by the router module of a controller (such as routing module 4666 as shown in FIG. 40A) to move into the queueing area first if its destination work cell is deactivated or otherwise not ready to accept new movers, so that the source work cell can be deactivated without having to wait until the destination work cell is activated.

Figure 43:
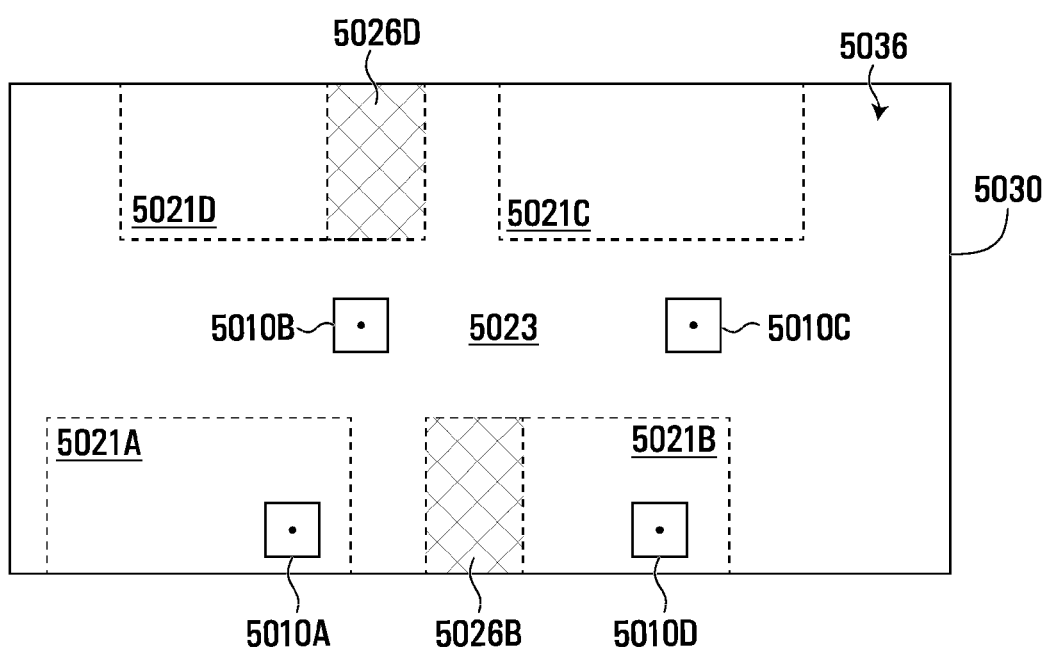
FIG. 43 is a top view of a working region according to one embodiment.

Referring to FIG. 43, a non-limiting example of a working region 5036 is shown, comprising work cells 5021A to 5021D. Working region 5036 may be defined on a working surface of a work body, such as a work body, as described in reference to other embodiments herein. As previously discussed, the routing region 5023 is the area of the working region 5036 but outside of all work cells. In the illustrated embodiment, routing region 5023 comprises queueing areas 5026B and 5026D. In other various embodiments, a routing region may comprise more or fewer queuing areas.

In one embodiment, a mover 5010A may have a work flow comprising a first operation to be performed in work cell 5021A, followed by a second operation to be performed in work cell 5021B. When mover 5010A finishes its first operation, the work cell 5021A is activated, but the work cell 5021B may be still be busy with its current mover 5010D and thus cannot be activated to receive mover 5010A; in this situation, the mover 5010A may be commanded by the router module according to one or more suitably generated 2D trajectories to move to the queueing area 5026B first instead of waiting until work cell 5021B is activated; as a result, the router module may bring a new mover (such as mover 5010B) to the work cell 5021A.

In various embodiments, queueing areas in the routing region may be specified by users explicitly or may be created by the router module automatically when needed by the mover traffic flow, either statically at the beginning of a manufacturing system setup or dynamically on the fly. In the illustrated embodiment, the router module of a controller (not shown) generates two dimensional (2D) in-plane trajectories for one or more movers in the routing region 5023 and the activated areas (the whole work cell when the complete-activation work cell is activated, or the activated entrance area and the activated exit area) in work cells, at least partially based on one or more of the following methods according to various embodiments:

(1) Destination work cell (positions) for each mover: In various embodiments, destinations may be derived from the work flow specification or process results in a work cell. According to the needs of carried part(s), after finishing a particular operation, one or more movers may be commanded to move to a destination work cell for a next operation; the router module of a controller may generate a 2D trajectory for the mover with an ending position in the destination work cell.

(2) Work body local temperatures: In various embodiments, a plurality of temperature sensors may be distributed inside a work body (such as any work body previously described herein), for example but not limited to a 2D matrix pattern distribution, and each temperature sensor may indicate temperature in a local area of the work body. As heat is generated by current flowing through electrically conductive elements in the work body, the work body local temperature may indicate the load situation of surrounding electrically conductive elements. In order not to overload electrically conductive elements and cause possible performance loss or reduced life of such work bodies, relatively high-temperature regions of the working region may be less preferred than relatively low-temperature regions for movers to move through. Accordingly, the router module in the controller may actively avoid routing movers through areas of the working region with high working temperatures, or may use high-temperature tiles less frequently than those with lower temperature during trajectory planning. For example, when the temperature of a work body tile exceeds a threshold value, the router module may generate trajectories for movers to avoid using the tile whenever possible.

Figure 44A:
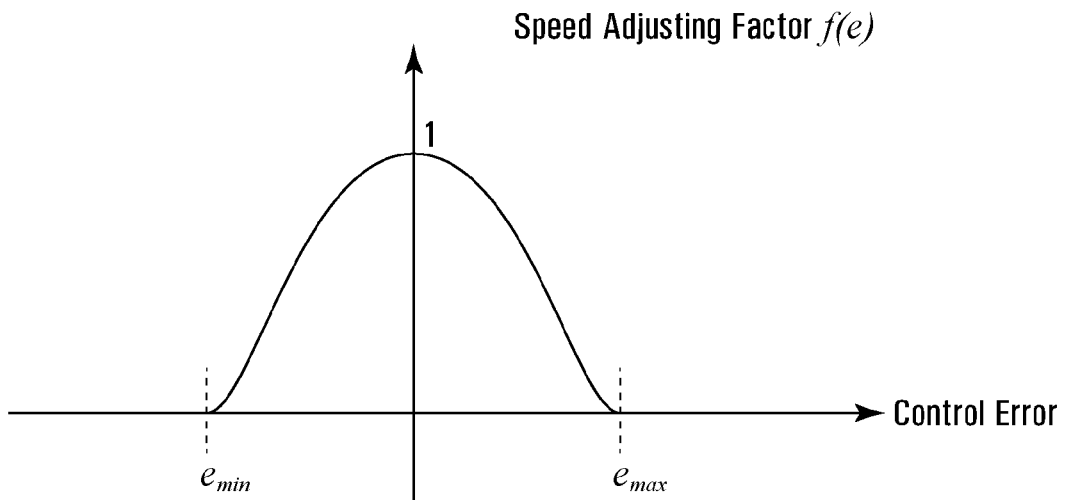
FIG. 44A is a graphical view of a speed adjusting factor according to one embodiment.
Figure 44B:
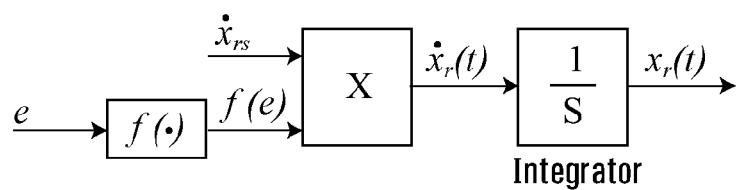
FIG. 44B is a schematic view of an X-direction trajectory generation process according to one embodiment.

(3) In various embodiments, the router module may actively monitor for control errors in one or more directions of movement of a mover. A mover's control error in one axis is the difference between a desired position of the mover in the axis and the mover's actual position in the axis. When a monitored control error increases, the speed and acceleration of the mover may be adjusted in real time in response to the increased error. For example, FIGS. 44A and 44B show one non-limiting example of an X-direction trajectory generation process for an exemplary mover. As shown in FIG. 44B, the X-component of a 2D trajectory speed $\dot{x}r(t)$ is an X-direction specified speed $\dot{x}rs$ multiplied by a speed adjusting factor $f(e)$. The X-direction trajectory $xr(t)$ is generated based on the integration of $\dot{x}r(t)$. An example of $f(e)$ is shown in FIG. 44A, showing the speed adjusting factor $f(e)$ as a function of the control error e. When the control error goes beyond certain limits (i.e. emin and emax, as shown in FIG. 44A), the speed adjusting factor $f(e)$ may be reduced to zero, such that the mover is caused to stop moving. When the error is small, the speed adjusting factor may be set at 1 to ensure that the generated trajectory speed matches with the specified trajectory speed $\dot{x}rs$. In various embodiments, the control error e may be calculated based on or be equal to any suitable value, such as the feedback control error in one axis, or the maximum absolute values of control errors in multiple axes, or the means squared value of control errors in multiple axes, or the control error vector in multiple axes, for example. Although FIGS. 44A and 44B show the trajectory adjustment process in the X direction only, in various embodiments the Y-direction trajectory may be adjusted in a similar way. In various embodiments, the speed adjustment factors for generating the X-direction trajectory and the Y-direction trajectory may not be the same.

(4) In various embodiments, the router module in the controller may generate a 2D trajectory for one or more movers based on their carried loads. When a mover is held stationary in levitation mode, the force commands (as shown in FIG. 40B) are related to the mover load. Using the force commands, the mover load can be estimated. Alternatively, in various embodiments the load information may be provided by the user configuration or may be derived from the work flow: for example, if a mover is moved into a work cell with a part having a known weight, then any added load can be derived from the work flow and be further used in the trajectory generation afterwards. For example, increased load may means increased inertia and thus reduced acceleration capability for a given actuating force capacity of a mover. When the mover load is high, the acceleration and/or deacceleration of the mover trajectory may be reduced, which may reduce the chance of overloading the work body electrically conductive elements.

(5) 2D collision avoidance: In various embodiments, during operation of a plurality of movers in the working region, the router module will predict the possible 2D collision between any movers if following their respective trajectories (wherein one mover footprint in the working region plane would overlap with another mover's footprint in the work body Z direction at a certain time), at least partially based on one or more of the following mover factors: present locations (or their present trajectory locations), velocities (or their trajectory velocities), and their maximum allowable 2D accelerations/deaccelerations, for example. When such 2D collision is predicted to possibly happen, the router may be configured to adjust its generated 2D trajectory for the corresponding movers by changing its 2D velocity (speed and/or direction) to avoid such collision, such as but not limited to reducing the speeds of one or more movers, or changing the direction of one or more movers, for example.

(6) In various embodiments the router module may generates trajectories for movers to ensure that no mover will bump into activated obstacles (such as those described in reference to FIG. 39, for example) that are configured by users or are specified by work cell control modules. The trajectories for movers are generated by moving around the areas occupied by activated obstacles. When an obstacle is deactivated, the corresponding area may be used by the router module for mover routing.

(7) Mover priorities. In various embodiments a priority index may be associated with each mover. Such a priority index may be dynamically determined according to one or more of the following non-limiting example factors: customized product requirements, or the availability of the next-stop work cell mover location, for example. In one example, a mover carrying an object such as a part or product ordered by a customer with an urgency requirement may be associated with a higher priority index than those movers carrying products for customers with a lower urgency requirement. In another example, if one mover's next stop destination work cell is activated and waiting for a new mover to come in for a particular operation, then the priority index of the mover may be increased so that this mover will be routed with high priority during mover routing. The router module will first consider movers with high priority index during trajectory generation: movers with low priority index may be commanded with router trajectories to yield to movers with high priority index.

Non-limiting examples of routing algorithms according to various embodiments include dynamic programing, global optimization (wherein a routing algorithm is implemented for the whole routing region for performance optimization), localized optimization (wherein a routing region is split into multi smaller sub-routing regions and an algorithm is implemented for each sub-routing region), artificial intelligence, fuzzy control, neural networks, traffic rules based routing, pre-routed trajectories (wherein for certain routing tasks, previously routed trajectories may be stored and then be used later as mover trajectories), etc.

Generally, routing optimization may factor in multiple objectives, and may use the current position of each movers as initial conditions, and the ending position (i.e. destination) of each mover as constraints. In various embodiments, the cost function may be throughput, traveling time, system productivity, or a weighted sum of one or more these listed factors.

Force-Assisted Operations

In various embodiments, one or more feedback controllers (such as feedback controller as described in reference to FIG. 40B) may be associated with each direction/axis of motion of a mover. In such embodiments, force command signals that are output from such feedback controllers may be used to improve system performance. As shown in FIG. 40B, in various embodiments the force commands for a mover may be the output from such a feedback controller, and may represent the desired forces to be applied on the mover. During steady state operation, wherein the mover is held stationary, the actuating forces applied on the mover balance the external forces such as gravity or other forces applied by tools or other objects (such as other movers, or forces transferred from another mover via a mechanical link as described herein) on the mover. The force commands may be used to assist and/or improve the operation of a magnetic movement apparatus as contemplated herein. It should be understood throughout this description that the term "forces" is used generally to include both forces in linear directions and torques around axes of rotation unless otherwise specified. In other words, a mover capable of controllable movement in 6 directions/DOF may experience forces in up to 6 directions: X, Y, Z, Rx, Ry, and Rz as previously described.

In various embodiments wherein the Z direction of a work body is parallel with or opposite to gravity, and the mover is held stationary in the 6-direction/DOF controlled levitation mode, the force command Fz (i.e. the desired force in the Z direction calculated by the Z-axis feedback controller) may be used to indicate the mover weight. For example, if an installed part is removed from a mover and gravity is in the $-Z$ direction, the Z-axis feedback controller output (i.e. the Z direction force command) will be reduced, which may indicate that the part has been removed. Similarly, the Z-direction force command may be used to determine whether a part with a known weight has been loaded on the mover or not.

Soft Landing Operation

In various embodiments, during levitation operation the actual physical gap between a mover bottom surface and a working surface may deviate from a nominal value due to manufacturing variations in movers and work bodies, and sensors such as sensor 180 as shown in FIG. 1A may not be able to detect the actual gap accurately due to misalignment and/or process variation, for example. In order for movers to land on the work body in a controlled way with minimal impact, the interacting forces between a mover and a work body may be derived from force commands, and may be further used by a controller (such as any controller previously described herein) to assist the landing process.

In one embodiment, during a landing process of a levitated mover capable of controllable motion in up to 6 directions/DOF, the mover is first commanded to descend in the Z direction (i.e. move towards the work body in $-Z$ direction, with Z the normal direction of work body working region and gravity in $-Z$ direction), for example, $Zr(t)$ is a ramping down signal; during the descending process, the controller monitors the force/torque commands on the three out-of-plane axes (i.e. force in Z direction, torque in rotation around X, torque in rotation around Y) and compares them with their respective threshold values to detect possible contact between the mover and the work body; if contact occurs between the mover and the work body, the force commands from the feedback controller will conflict with the force of contact, and thus the controller may detect that one of the three out-of-plane commands has exceeded a threshold value. If contact is detected, the corresponding feedback control loop associated with the axis whose force command exceeded the threshold value may be turned off by switching the associated axis from a closed loop control mode to an open loop control mode (wherein the associated force command in the corresponding axis is set at a preset constant value). In various embodiments, after one out-of-plane axis control mode is switched to the open loop mode, the soft landing control process may be finished by causing all out-of-plane axes to change to open loop control modes, with reference command forces at a preset value, such as, but not limited to, zero. In other various embodiments, after the control mode of two out-of-plane axes is switched to the open loop mode, the soft landing control process may be finished by causing all out-of-plane axes to change to open loop control modes, with reference command forces such as, but not limited to, zero. In various embodiments, after three out-of-plane axes control modes are switched to open loop modes, the soft landing control process may be finished.

In various embodiments, after the soft landing, the three in-plane axes (in this example, X, Y, and Rz) may be still operated in closed loop control modes to resist possible in-plane disturbance forces. In various embodiments, after the soft landing, the three in-plane axes (X, Y, Rz) may also be turned off and be operated in open loop control modes with preset force commands such as, but not limited to, zero.

In various embodiments, the force threshold values may be determined experimentally or may be based on their corresponding steady state force command values when a mover is operating in 6-direction/DOF controlled levitation mode.

In various embodiments, a mover may be commanded to descend to a preset Z reference position, and then three out-of-plane axes (Z, Rx, Ry) control is switched to open loop, for example, with zero torque command in Rx and Ry axis and an initial open loop Z force command equal to the Z-axis feedback controller output right before the control mode switching; after the switching, the Z height compensation may be turned off in a commutation module (such as commutation module 4665 as shown in FIG. 40B) by setting the Z height at a constant value in a commutation algorithm, and further the Z open loop force command may be gradually ramped down to a small value (such as but not limited to zero) to finish a soft landing process.

In various embodiments, during the landing process, the mover may be switched from 6-direction/DOF closed loop controlled mode to three in-plane direction/DOF controlled levitation mode with the three out-of-plane axes (Rx, Ry, and Z) set in the open-loop current mode, i.e. open loop force/torque commands in the Rx, Ry, and Z directions are used instead of commands calculated from feedback controllers. The mover may then be driven with Z-direction force command that gradually decrease to a smaller value such as but not limited to zero. In various embodiments the torque commands Tx and Ty may be set to zero.

In various embodiments, during a soft landing process, the number of closed-loop controlled axes of the mover controlled by the position feedback controller may be reduced from M ($\geq$4) to a lower integer number by switching positional control of at least one out-of-plane axis from a closed loop mode to an open loop mode, after detecting at least one force command triggering its respective threshold value. In one embodiment, M=6. In other various embodiments, M may equal any other integer less than or equal to 6. In various embodiments, during a soft landing, the Z axis control for a mover may be switched from a closed-loop control mode to an open loop control mode with a Z force command, and the Z force command may be reduced gradually to a low value such as but not limited to zero, wherein the Z direction is substantially opposite to the gravity direction.

Soft Taking Off Operation

During a mover's taking off (or levitation) process, it may be desirable to achieve a smooth transition from sitting on the work body to being levitated by the work body. When a mover is switched from sitting on the work body to being levitated by the work body, a mover may first be controlled in a closed loop mode in three in-plane axes (e.g. X, Y, and Rz), and controlled in an open-loop control mode in three out-of-plane axes (Rx, Ry, and Z), with a ramping up force command in the Z direction (opposite to gravity) and constant torque commands in Rx and Ry directions of zero, for example. The ramping-up force command may start from an initial value lower than the mover weight. In this way, the Z-compensation in the commutation module (see FIG. 40B) may be turned off to potentially reduce instability.

After a position sensor (such as any sensors described herein, or any other suitable position sensor) indicates that the mover is fully levitated away from the work body, such as being raised up by a particular value (such as but not limited to a value between 300 microns and 1 mm higher than the difference in the Z position when the mover is sitting on the work body), control of the three out-of-plane motion axes of the mover may be switched from open loop control mode to closed loop control mode, wherein feedback controllers are configured to calculate the force/torque commands on the three out-of-plane axes (Z, Rx, Ry).

In various embodiments wherein a mover operating in 6-direction/DOF controlled levitation mode is loaded with a part, the Z direction force command (assuming gravity is in the negative Z direction) will increase proportionally to balance the increased weight of the part. Such change in the Z force command may be optionally used to detect whether a part is loaded on the mover successfully or not, and/or detect the finishing of a part loading process so that the following process can be scheduled accordingly.

In various embodiments, when a mover in 6-direction/DOF controlled levitation mode carries a part, the Z force command (output from feedback controller for Z axis) may reduce noticeably if its carried part is unexpectedly removed. Such a change in the Z force command may be used by a controller to detect whether a part is unexpectedly removed from the mover or not. Such automatic detection of unloading can be used to adjust the work flow for the mover, or to alarm the robotic system operation with suitable visual/audio signals.

Calibration Work Cell

In various embodiments, a work cell in the working region may be dedicated for mover calibration, such as but not limited to sensor offset calibration, or current-to-actuating force coefficient calibration, for example. In an exemplary embodiment, a difference between an actual position of a part carried on a mover and a tool installed on a frame of the work body may be important to a particular process or operation. For example, a part dispenser may be required to dispense a part on a cell phone assembly carried on a mover, which requires high accuracy position information between the dispensing tool and the actual position of the cell phone assembly. A built-in position sensor such as sensor 180 as shown in FIG. 1A that is configured to measure the mover displacement relative to the work body may be insufficient to provide the required relative position between a point of interest on a mover-carried part and a work body mounted tool due to installation uncertainties.

Figure 45A:
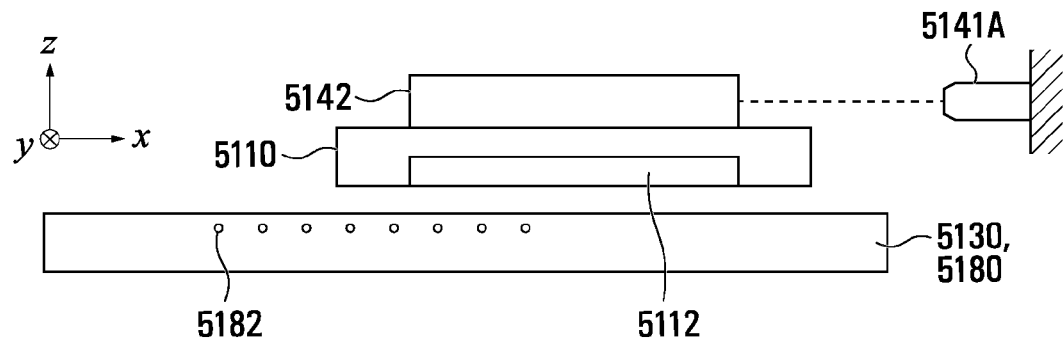
FIG. 45A is a side view of an apparatus according to one embodiment.
Figure 45B:
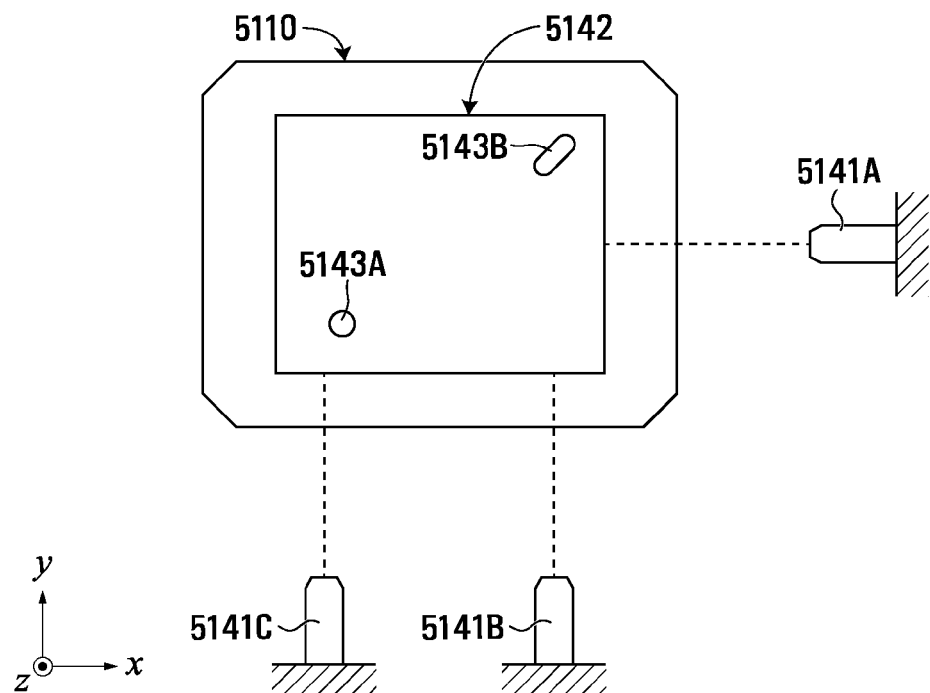
FIG. 45B is a partial top view of the apparatus shown in FIG. 45A.

FIGS. 45A and 45B (together FIG. 45) shows a calibration work cell according to a non-limiting embodiment and comprising three external displacement measurement sensors 5141A, 5141B, and 5141C). In other various embodiments, there may be more or fewer external displacement measurement sensors. Each external displacement measurement sensor can measure a relative distance between a stationary sensor head and a reference feature 5142 mounted on a mover 5110. A reference feature 5142 may be a flat surface, a mirror surface for optical sensors, based on suitable working principles, or a surface with special pattern for read heads 5141 to read out, for example. Non-limiting examples of such external displacement measurement sensors include optical sensors, triangulation sensors, laser sensors, capacitive sensor, camera, magnetic sensor, eddy current sensor, inductive sensors, LVDT, and so on. The mover may comprise one or more tooling feature(s), such as a round hole and a slot as shown in the FIG. 45B, which enables a part holder or a part to be repeatedly mounted on the mover with very small variation in the relative position between the part and the reference feature 5142. The calibration work cell may be configured to measure the actual difference between the readout from build-in mover displacement system sensors 5180 (which may operate substantially the same way as sensor 180 as shown in FIG. 1A) and the external displacement measurement sensor 5141. The system sensor 5180 may comprise a reference target (such as a magnetic pattern 5112 on the mover), and magnetic field read head 5182 mounted on the work body. With the calibration data, a part may be able to be positioned more accurately relative to a work body-mounted tool. The external displacement measurement sensors may have very limited working range, such as very small working region in the calibration work cell, and the system sensor 5180 may work over a much more extended region, such as but not limited to the whole working region. The calibration data obtained from the calibration work cell represents the spatial position offset between the system sensor target and the point of interest of a mover carried part, and therefore may be used to help improve the positioning accuracy of the part over much larger working areas than the calibration work cell.

Misalignment Sensing

Figure 46A:
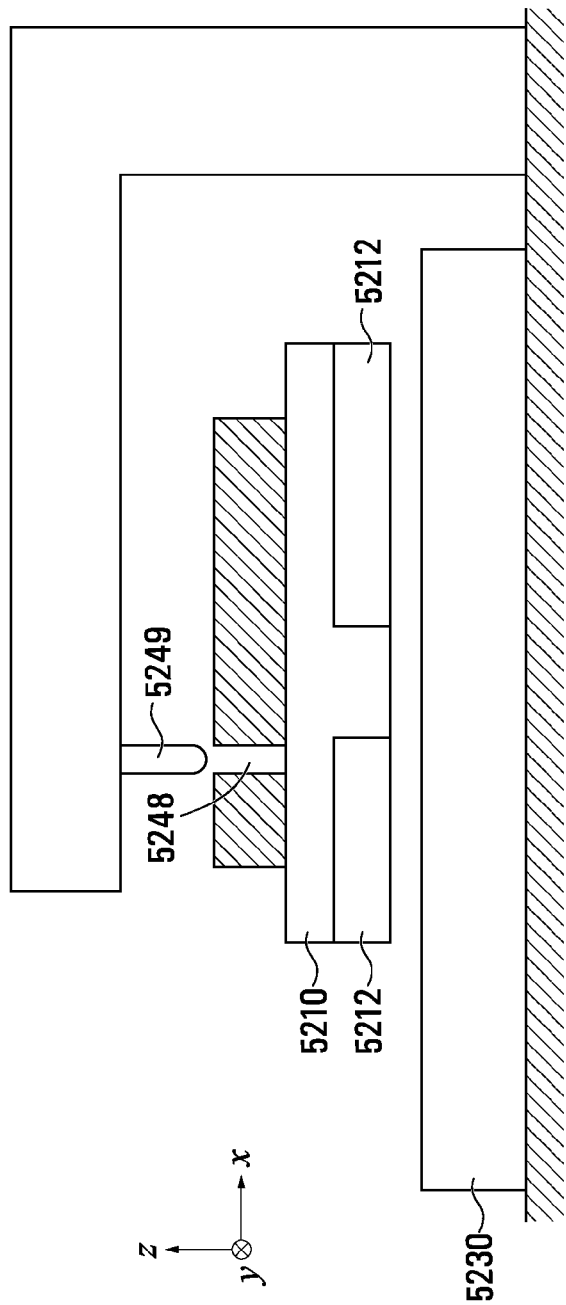
FIG. 46A is a cross-sectional side view of an apparatus according to one embodiment.
Figure 46B:
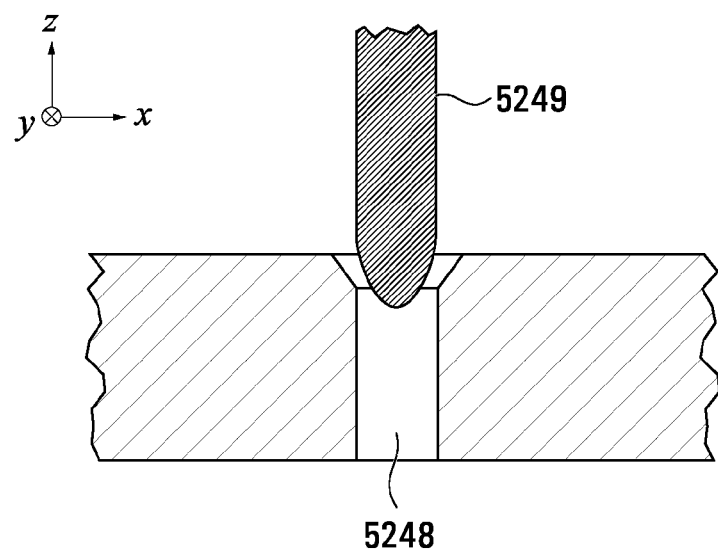
FIG. 46B is a close-up partial side view of the apparatus shown in FIG. 46A.

In various embodiments, force commands that are the output from feedback controllers may be used to detect assembly offset during a manufacturing process. When installing a work piece into an assembly carried by a mover, the mating forces will change with the misalignment error between the work piece and the assembly on the mover. For example, as shown in FIG. 46A, in a work cell, a pin 5249 is expected to be dispensed into a hole 5248 in an assembly carried by a mover 5210. If the pin is misaligned in one direction such as but not limited to X, then the insertion force between the pin and the hole will increase significantly. The force commands information may be used as interacting force feedback to assist the assembly process. For example, as shown in FIG. 46B, when the hole is offset from the pin in the X direction, during inserting process, a force Fxr (i.e. an X-direction force command from X axis feedback controller) will be higher than the case that the pin is perfectly centered with the hole; when Fxr is higher than certain threshold, the mover may be commanded to move in the −X direction according to an algorithm (such as but not limited to the feedback control law, for example).

Figure 47:
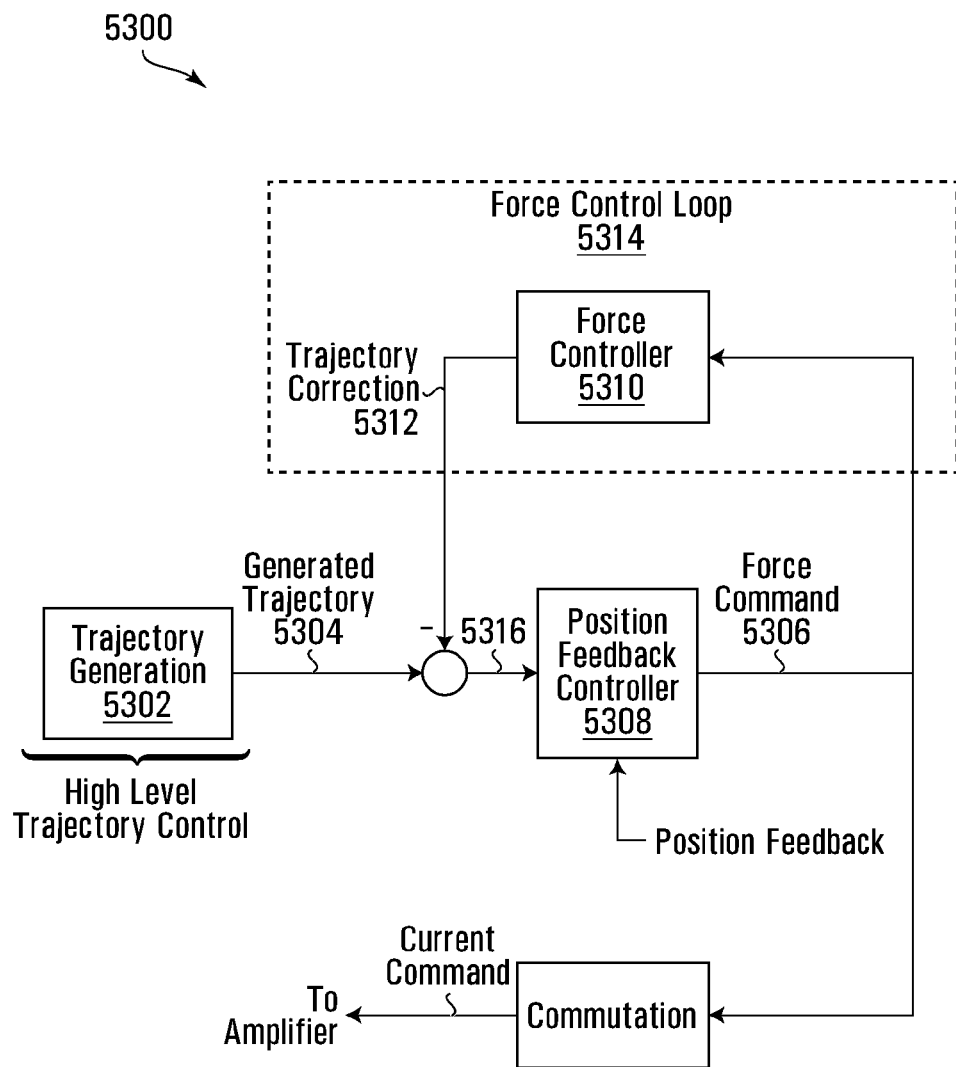
FIG. 47 is a force-assisted assembly process according to one embodiment.

FIG. 47 shows a non-limiting example of a force-assisted assembly process 5300, according to a particular embodiment. The trajectory generation modules 5302 output a generated trajectory 5304. During a force-assisted assembly process, the force command outputs 5306 from position feedback control module 5308 is optionally fed into a force controller 5310, which produces a trajectory correction signal 5312. When the force control loop 5314 is activated, the corrected trajectory 5316 (generated trajectory minus trajectory correction) is sent to the position feedback controller 5308. In various embodiments, the force controller 5310 may use the force commands 5306 in one or more direction(s) to produce trajectory correction 5312 in one or more direction(s). In various embodiments, the force controller 5310 may run at a significantly lower sampling rate than the sampling rate for the position control loop. The trajectory correction may be limited to a preset maximum allowable value to avoid over correction. When the force controller 5310 is turned off, the trajectory correction 5312 may be set at zero. The force controller 5310 may be implemented using suitable feedback control laws, known in the literature, such as but not limited to a PID controller, a robust controller, a sliding mode controller, adaptive controller, or a loop shaping controller, for example.

In various embodiments, when a mover is working in a work cell for a particular operation, a force control loop may be optionally turned on for the mover control which may assist the manufacturing process in the work cell: the force controller may take the force commands (in one or more directions) as inputs and calculate a trajectory correction (in one or more directions), and the generated trajectory minus the trajectory correction may be sent to the position feedback controller, which may improve the quality of the manufacturing process such as but not limited to assembly.

It should be understood to those skilled in the art that the trajectory correction is equivalent to the generated trajectory plus another correction value, which is the negative trajectory correction.

Power Saving

In various embodiments, when movers are levitated with air gaps between movers and the working surface of a work body (assuming gravity is in the −Z direction), magnetic forces are required to balance gravity, and thus electrical energy is required to provide such forces. For the sake of reducing power consumption, movers may be landed on the work body for power saving when they are idling (i.e. are not being commanded to move, such as when waiting for a task to be performed. Once an idling mover is assigned with a trajectory to move to a new position, the mover may take off, leave the work body in the Z direction, and then be controllably moved to the destination according to a 2D trajectory. A mover may be considered to enter idling state if the mover trajectory has not changed for a certain amount of time.

In various embodiments a mover may be switched between two operation modes: mode 1) 6 or more direction/DOF controlled levitation mode with an operation air gap between the mover and work body in the normal direction of the working surface, wherein the mover is controllably moved in 6 or more directions/DOF to follow a 2D trajectory in the working region; mode 2) three in-plane direction/DOF controlled mode sitting in the work body plane at a 2D position, wherein the mover is commanded to be held at a position in the working region, with three in-plane axes (X, Y, and Rz) being controlled with feedback controllers. When the mover is switched from mode 1) to mode 2), a soft landing process as previously described may be required during transition; When the mover is switched from mode 2) to mode 1), a soft taking off process as previously described may be required during transition.

Generally, a mover may be controllably moved in 6 directions/DOF in levitation mode while traveling from one location to another; once the mover arrives at the destination and is in the state of waiting for the next-step process, the mover may land onto the work body for power saving and the mover may be controllably held with respect to 3-directions/DOF (X and Y and rotation around Z) while sitting on the work body. Controlling a mover with three in-plane directions/DOF at a fixed position may help minimize the disturbance from other passing by movers. Once the mover is commanded to perform a task, the mover may be switched from the three in-plane direction/DOF controlled sitting mode to the 6 direction/DOF controlled levitation mode.

In various embodiments, either the 6 direction-DOF controlled levitation mode or the 3-direction/DOF levitation mode with passive levitation in the Z, Rx and Ry directions may be used when a mover travels from one location to another.

In another embodiment, currents in the electrically conductive elements associated with a mover sitting on the work body and idling may be completely turned off if there are no surrounding movers that may affect the motion or position of the mover.

Non-Limiting Exemplary Embodiment

Figure 48:
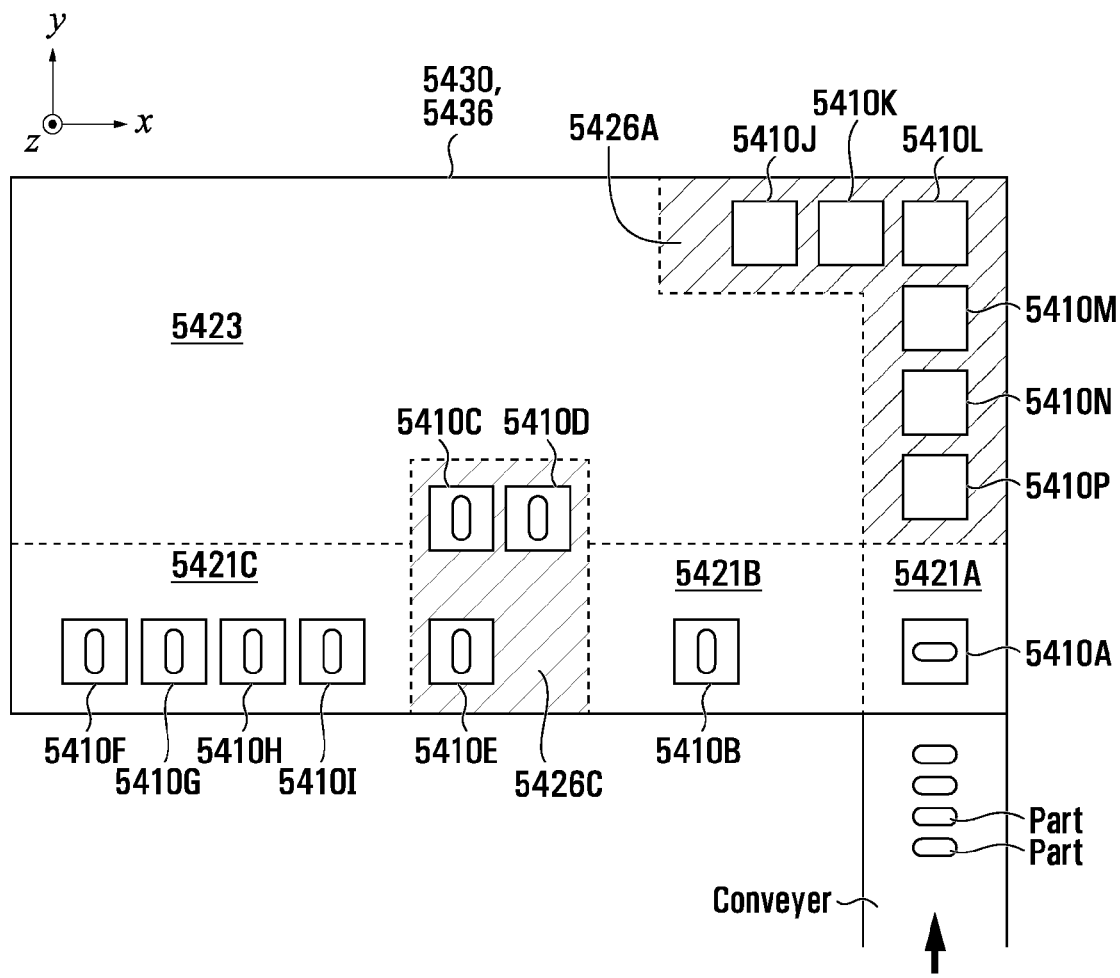

FIG. 48 shows a magnetic movement apparatus according to another embodiment, comprising a work body 5430 having a surface which defines a work body working region 5436, on which a plurality of movers (5410A to 5410Q) may be controllably moved in at least three in-plane directions/DOF (X, Y, Rz). The work body working region 5436 comprises a plurality of work cells, 5421A, 5421B, 5421C, as shown in FIG. 48, and a routing region 5423. The routing region comprises a queuing area 5426C near the work cell 5421C, and a queuing area 5426A near work cell 5421A. A conveyor is connected with work cell 5421A to send one part to a mover at a time, for example, a part is passed from the conveyor belt to mover 10A shown in FIG. 48, where each part is represented with an ellipse (representing its cross-section). When parts are on the conveyor, the long axis of each elliptical part is oriented in X direction. The robotic system tasks are: a) use a mover to get one part from the conveyor at a time in work cell 5421A; b) rotate the part orientation by 90 degrees in work cell 5421B; c) re-pitch fours movers along with their carried parts in work cell 5421C so that four parts can be grabbed/removed by a robot arm with vacuum cups (as previously described herein) at one time.

The work cell 5421A is dedicated to catch one part from the conveyor system at a time, either by directly passing or fly dropping with momentum and/or gravity. After a mover catches a part in 5421A, the mover will move into work cell 5421B to rotate the part by 90 degrees around Z axis in work cell 5421B will be discussed later with reference to FIG. 49. After the carried part is rotated by 90 degrees around Z, the mover will leave work cell 5421B and move into a queuing area 5426C.

Movers in the queuing area 5426C will be fed into predefined initial positions in work cell 5421C until four movers are inside 5426C. Further a robot arm will take the four parts away from the four movers with some mechanisms (such as but not limited to vacuum cups). Next, the four empty movers will be released from work cell 5421C and are commanded to move into queuing area 5426A, so that one mover will be send to work cell 21A to catch a new part from conveyor when work cell 5421A is activated. The queuing area 5426C is used to store movers released from work cell 5421B but are not allowed to enter work cell 5421C due to that work cell 5421C is not activated yet. The queuing area 5426A is used to store movers released from work cell 5421C but not allowed to move into work cell 5421A yet due to the conveyor belt transfer limitation.

Although the pattern in work cell 5421C is in matrix pattern of 1 by 4, in other various embodiments the patter may be an arbitrary matrix format such as 2 by 3 with suitable modification of the control system configuration, and such configuration may be changed on the fly.

Figure 49B:
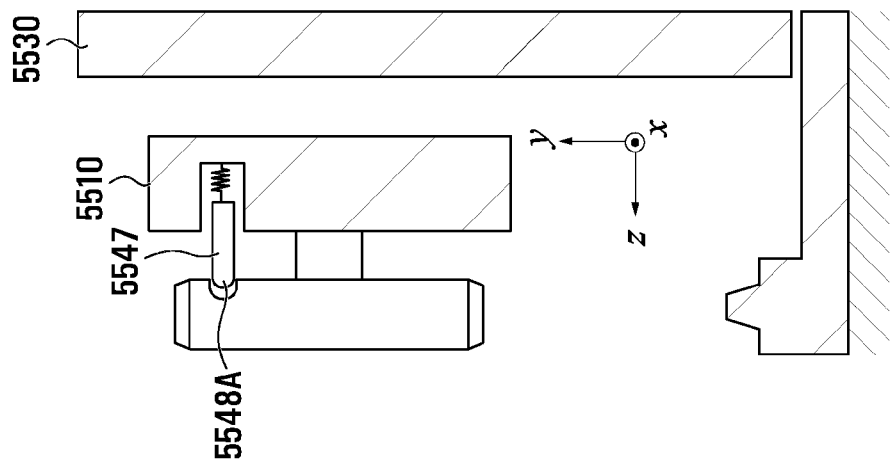
Figure 49A:
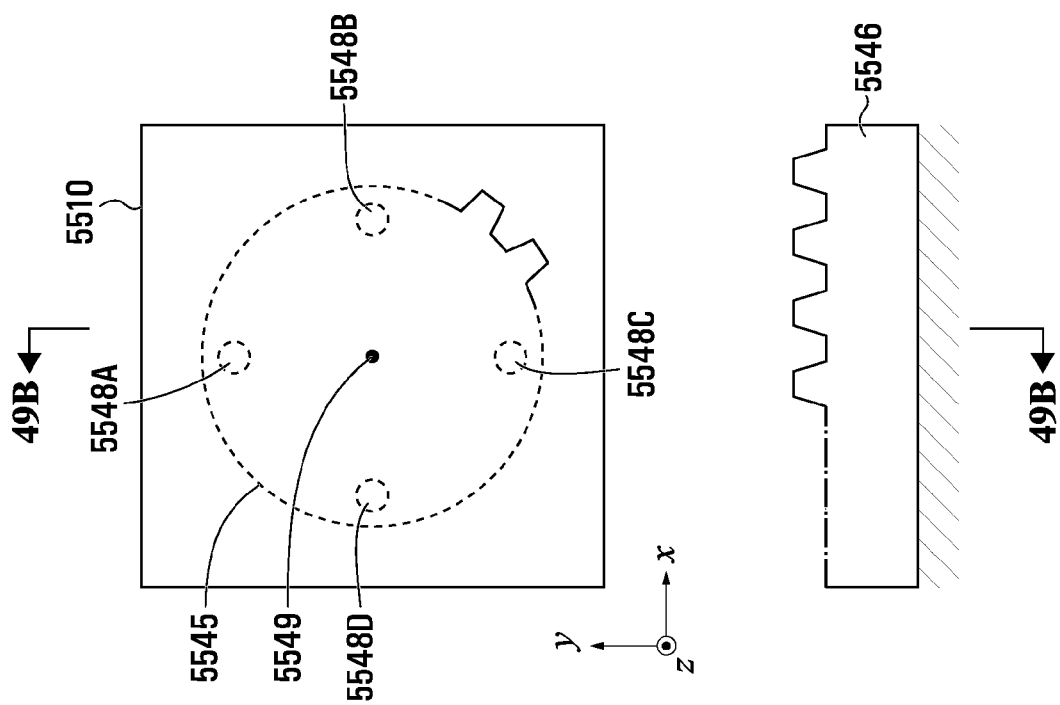

According to another embodiment, FIGS. 49A and 49B (together FIG. 49) show a non-limiting example of a mechanism which may be used in a work cell to rotate a mover-mounted part by 90 degrees around the Z axis. Particularly, FIG. 49A is a top view of a mover 5510 inside the work cell 5521B, and FIG. 49B is cross-sectional view along B-B line in FIG. 49A.

The rotating mechanism comprises a first rotatable body 5545 having a first engagement body (such as but not limited to a gear). The first rotatable body is installed on a mover 5510, and is rotatable around an axis of rotation 5549 parallel to the Z-direction relative to mover 5510 with the aid of a hinge or suitable bearings. On the work body frame an actuating member 5546 is installed having a second engagement body (such as but not limited to a rack). A part will be carried by the first rotating body 5545. In order to rotate the part by 90 degrees about the axis of rotation 5549, the mover 5510 is first controllably moved by the work body 5530 relative to the second engagement body in the −Y direction until the first and second engagement bodies are engaged. Next, the mover 5510 is controllably moved in the X direction relative to the actuating member 5546, and accordingly the actuating member will force the rotatable body 5545 to rotate around the axis of rotation 5549 due to their engagement.

Additionally, the rotatable body may comprise a multi-stable mechanism that may be configured to latch the rotary body 5545 relative to the mover 5510 at one of the multiple stable positions when the first and second engagement bodies are not engaged. For example, four blind holes (5548A to 5548D) are arranged on the first rotating member, and a multi-latch mechanism 5547 (such as but not limited to a spring loaded piston, for example) is installed on the mover; when a blind hole (such as 5548A) is co-axially aligned with the multi-latch mechanism 5547, the rotating body is locked at a local stable position with a local minimum potential energy point. Although the second engagement body on the actuating member is a rack in FIG. 49A, in other various embodiments, the actuating member 5546 may be another gear (a second rotatable body) with its axis of rotation fixed with the stator frame), for example. In order to rotate the first rotatable body (together with its carried part), the second rotatable body can be driven to produce a second motion, e.g. rotary motion around its rotation axis with suitable motor or actuators. Mover 5510 may be controllably moved relative to the actuation member 5546, e.g. mover 5510 may be controllably moved in the −Y direction so that the first and second engagement bodies are engaged with each other. Further, the actuation member may be driven by an actuator to rotate around its Z oriented axis to produce a second relative motion between the mover and the actuation member The engagement between the first rotatable body and the actuation member will convert the actuation member's rotary motion into the first rotatable body's rotary motion around axis 5549.

Although the example in FIG. 49 is to rotate the first rotatable body and further to latch the rotatable body at rotary positions with 90 degrees interval, this is not necessary for all cases. In various embodiments, the first rotatable body may achieve rotation an arbitrary angle with suitable modification of the locations of blind holes 5548A, such as but not limited to 30 degrees spaced apart.

In some embodiments, the second engagement body (such as a rack, for example) may be installed on a second mover, instead of on the stator. The second mover may move towards the mover 5510 in a first direction so that the rotatable body installed on the first mover is engaged with the second engagement body, and then a relative motion between the first and second movers in a second direction (which is non-parallel with the first direction, for example the second direction is orthogonal to the first direction) are controllably generated to rotate the first rotatable body relative to the first mover. The relative motion between the first mover and the second mover can be generated by moving the first mover only, or by moving the second mover only, or by moving both the first mover and the second mover, relative to the stator. The first rotatable body may be able to be rotated without requiring any motion on the first mover, i.e. the relative motion between the first mover and the second mover may be created by controllably moving the second mover only while holding the first mover stationary with the stator.

Generally, in a work cell, the magnetic movement apparatus may comprise a first mover comprising a first rotatable body that is able to rotate around a Z oriented axis relative to the first mover, and a second engagement body. The first rotatable body comprises a first engagement body; the second engagement body. The first mover and the second engagement body are configured to rotate the rotatable body as follows: (1) the first mover may be controllably moved relative to the second engagement body to engage the first and second engagement bodies (the "first relative motion"); (2) the first mover may be controllably moved relative to the second engagement body to rotate the first rotatable body relative to the first mover (the "second relative motion"). In various embodiments, the first engagement body may be a gear and the second engagement body may be a rack. In various embodiments, the second engagement body may be stationary. In various embodiments, the second engagement body may be installed on a second mover. In various embodiments, movement of the first mover relative to the second engagement body may be linear motion, rotational motion, or both. In various embodiments, the first relative motion may be linear motion, and the second relative motion may be rotary motion. In some embodiments, the first engagement body may be a fork and the second engagement body may be a pin as shown in FIGS. 14A and 14B.

In some embodiment, the first relative motion direction may be orthogonal with the second relative motion direction.

In some embodiments, there may be a multi-stable latch mechanism installed between the first rotatable body and the first mover that can latch the Z rotary position (rotation around Z axis 49) of the first rotatable body relative to the mover in multiple stable locations, so that the first rotatable body can maintain its rotary position around Z after getting disengaged from the second engagement body.

In some embodiments, the first rotatable body may be a first gear (a first engagement body) supported by the first mover via rotating bearings, and the second engagement body is a rack fixed with the stator frame. The first relative motion may be a translation motion in the direction orthogonal to the rack orientation (for example -Y in FIG. 12) so that the gear on the first rotatable body can get engaged with the rack (the second engagement body). The second relative motion may be a translation motion along the rack orientation (for example X in FIG. 12).

Figure 50A:
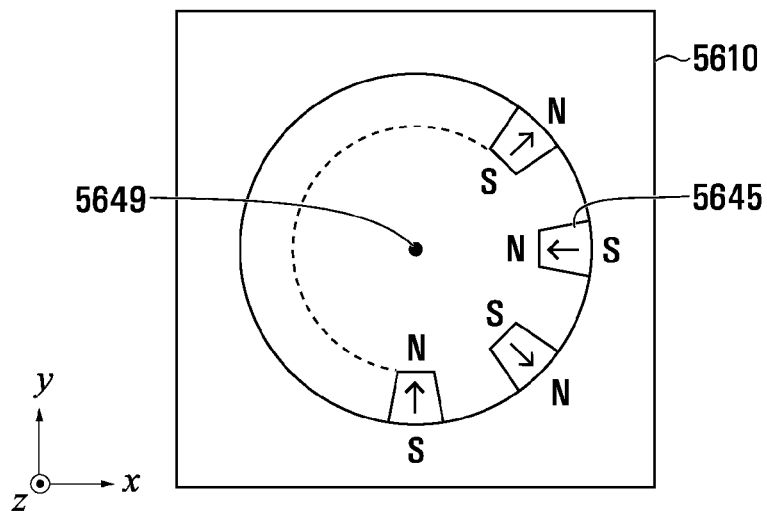
Figure 50B:
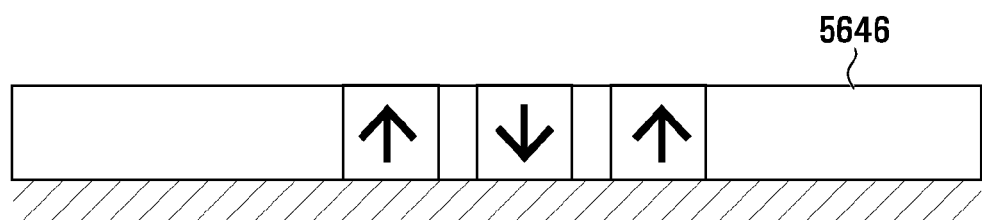

In some embodiments, the first rotating body may be a magnetic gear 5645 shown in FIG. 50A comprising alternating magnet segments distributed along its circular peripheral surface, and the magnetic gear 5645 (the first engagement body) may rotate around a Z oriented axis 5649 attached to the first mover 5610. The second engagement body may accordingly be a magnetic rack 5646 comprising alternating magnet segments distributed a long a line as shown in FIG. 50B. The first and second engagement bodies may detachably coupled via the alternating magnetic field on the outer surface of the magnetic gear 5645, and the alternating magnetic field distributed on the magnetic rack surface 5646. As a result, the first and second engagement bodies may engage without physical contact.

Figure 51A:
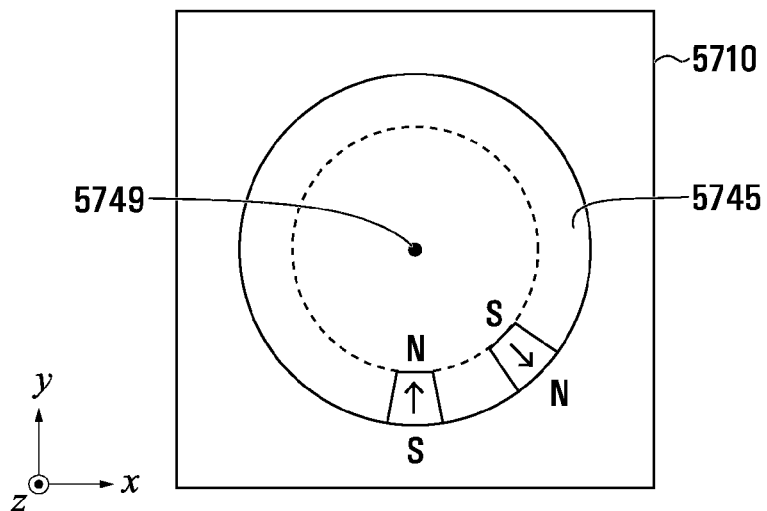
Figure 51B:
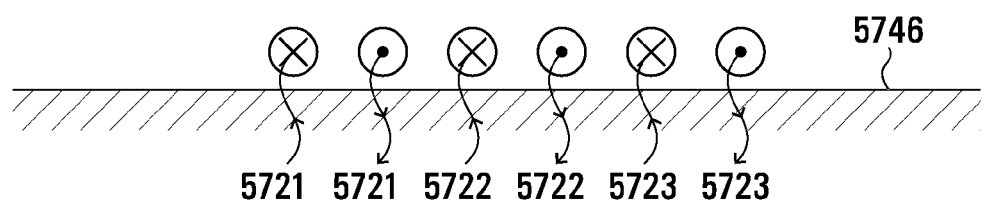

In some embodiments as shown in FIGS. 51A and 51B, the first mover and the first rotatable body are substantially similar to those in FIGS. 50A and 50B. The second engagement body may be a set of coils that can produce magnetic field by driving current flow through coils, producing an alternative magnetic field.

In some embodiments, the first rotatable body member comprises a first gear (a first engagement body) supported by the first mover via rotating bearings, and the second engagement body is a second gear rotating around a Z oriented axis fixed with the stator frame. The first relative motion is a translation motion in the direction connecting the centers of the first gear and the second gear so that the two gears can get engaged. The second relative motion is a rotary motion around the Z axis of the second gear actuated with a suitable actuator or motor.

In some embodiments, the first rotatable body may comprise a gear (the first engagement body) supported by the first mover via rotating bearings, and the second engagement body is a rack fixed with a second mover. The first relative motion is a translation motion in the direction orthogonal to the rack orientation so that the gear can get engaged with the rack. The second relative motion is a translation motion along the rack orientation (tangential to the gear circle), is created by the motion of the second mover, the motion of the first mover, or the motion of both movers.

Non-Limiting Example of System with Vertical Work Body and Horizontal Work Body

Figure 52:
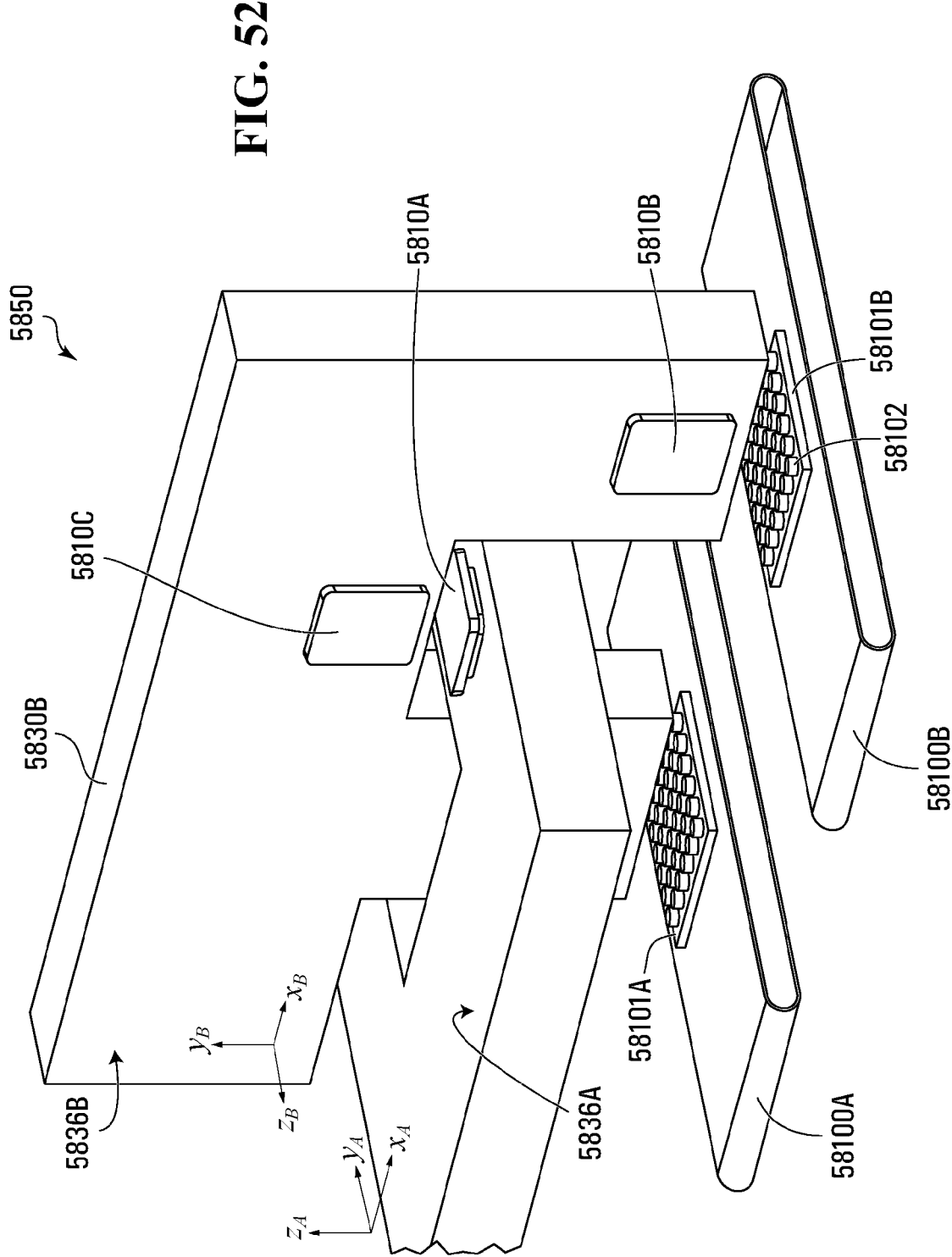

FIG. 52 shows a magnetic movement apparatus 5850 according to a particular embodiment of the invention. The apparatus 5850 comprises a first work body 5830A and a second work body 5830B. The first work body provides a first working region 5836A, and the second work body provides a second working region 5836B. The in-plane direction for the first work body working region is $X_A, Y_A$, and the normal direction of the first work body working region 5836A is $Z_A$. The in-plane direction for the second work body working region is $X_B, Y_B$, and the normal direction of the second work body working region 5836B is $Z_B$. Generally, $Z_A$ and $Z_B$ are non-parallel with each other.

Particularly, $Z_A$ and $Z_B$ may be orthogonal to each other, for example, $Z_B$ is in the $-Y_A$ direction. The gravity may be in the $-Z_A$ direction. A first plurality of movers are working in the first working region, such as mover 5810A with other movers not shown for sake of brevity. A second plurality of movers are working in the second working region, such as movers 5810B, 5810C. The first working region and the second working region may be orthogonal to each other.

In various embodiments, the apparatus may comprise one or more conveyors that transfer parts for the second plurality of movers to pick up. A mover in the second plurality of movers (working in the second working region) may pick a part from a part carrier 58101 transferred by a conveyor 58100. For example, mover 5810B may pick a part 58102 from a tray 58101B that carries a plurality of parts 58102, and the tray 58101B may be transferred in $Y_A$ direction by a conveyor system 58100B. Mover 5810B may comprise an end effector such as but not limited to a gripper or a suction cup, for example; alternatively, mover 5810B may carry an actuator powered by an on-board battery (i.e. battery carried by the mover); either the end effector or the actuator powered by battery can be used to pick up a part 58102 from the tray 58101B. Afterwards, mover 5810B may be controllably moved to a location to dispense the picked part onto another mover in the first plurality of movers working in the first working region 5836A. For example, a mover in the second plurality of movers may move to the location of where mover 5810C is occupying in FIG. 52, and another mover 5810A may be controllably moved on the first working region to a location so that the second work body working region plane intersects with the work body 5810A. The magnetic movement apparatus may comprise a plurality of conveyors (58100A, 58100B) and each may carry a type of parts to be assembled on a mover working in the first work body working region; the second plurality of movers in the second work body working region (such as 5810B or 5810C) may be controllably moved to pick one or more parts from part carriers (such as the tray 58101A, 58101B) and further dispense the picked part(s) onto the first plurality of movers working in the first work body working region.

Generally, a magnetic movement apparatus 5850 may comprise a first work body providing the first work body working region and a second work body providing a second work body working region. The first work body working region has a first normal direction $Z_A$ and the second work body working region has a second normal direction $Z_B$ non-parallel with the first normal direction $Z_A$. A first plurality of movers work within the first work body working region and a second plurality of movers work within the second work body working region. The first work body working region intersects with the second work body working region plane (the plane where the second work body working region is located). The apparatus 5850 may comprise one conveyor carrying parts in a plane at a $Z_A$ location different from the first work body's $Z_A$ location; in various embodiments, the first work body working region overlaps with the conveyor in the $Z_A$ direction. A second mover in the second plurality of movers may be controllably moved in the second working region to pick a part from the conveyor, and a first mover in the first plurality of movers may be controllably moved to intersect with the second work body working region plane; further the second mover may be controllably moved in the second work body working region to dispense one or more parts on the first mover.

Although the above described apparatus shows that the second mover picks a part from the conveyor and dispenses the picked part on the first mover, in various embodiments, the second mover may pick up a part from the first mover and further dispense the picked part on the conveyor.

Manual Operation Mode

In various embodiments, a mover may be feedback controlled in the Rz axis and be controlled with open loop force command(s) in one or two of the X and Y directions. This mode may be used to teach an alignment position between a mover and a work body mounted tool, by manually moving the mover in the one or two of X and Y directions. The mover may be manually moved in the work cell to a specific position to be mated with a work body mounted tool. Such mating position may be logged for later use when the mover is operated in three in-plane direction/DOF controlled mode. The mover may be moved in the work cell along a user preferred path and the path is recorded by the a controller to form a stored trajectory, which may be used later to drive a mover motion when all three in-plane directions/DOF motion are controlled in the closed-loop mode. The recorded path may be processed with suitable algorithm such as but not limited to smoothing, filtering, acceleration adjustment, and the processed result will be used as a stored trajectory.

Exemplary Embodiment Clauses

Non-limiting embodiments according as contemplated by this description are described according to the clauses as follows:

1a. A mobile apparatus comprising:
   a plurality of magnetic bodies, each magnetic body in the plurality of magnetic bodies comprising a plurality of magnets;
   wherein at least two of the plurality of magnetic bodies are configured to be mechanically linked; and
   wherein a first magnetic body and a second magnetic body of the at least two magnetic bodies are configured to move relative to one another when mechanically linked.

1b. The mobile apparatus of clause 1a, wherein when the at least two magnetic bodies are mechanically linked, the relative movement between the at least two magnetic bodies is constrained in at least one linear direction.

1c. The mobile apparatus of clause 1b, wherein when the at least two magnetic bodies are mechanically linked, the relative movement between the at least two magnetic bodies is constrained in at least two linear directions.

1d. The mobile apparatus of any one of clauses 1a to 1c, wherein when the at least two magnetic bodies are mechanically linked, the relative movement between the at least two magnetic bodies is constrained in at least one rotational direction.

1e. The mobile apparatus of clause 1d, wherein when the at least two magnetic bodies are mechanically linked, the relative movement between the at least two magnetic bodies is constrained in at least two rotational directions.

1f. The mobile apparatus of any one of clauses 1a to 1e, wherein:
   the first magnetic body comprises a first at least one retaining surface; and
   the second magnetic body comprises a second at least one retaining surface;
   wherein the first and second at least one retaining surfaces are configured to mechanically link the at least two of the plurality of magnetic bodies when the first and second at least one retaining surfaces are positioned against one another; and wherein the first and second magnetic bodies are configured to move relative to one another when the first and second at least one retaining surfaces are positioned against one another to mechanically link the at least two magnetic bodies.

1g. The mobile apparatus of any one of clauses 1a to 1f, further comprising at least one hinge configured to mechanically link the at least two magnetic bodies, wherein the first and second magnetic bodies are configured to move relative to each other when the at least one hinge mechanically links the at least two magnetic bodies.

1h. The mobile apparatus of any one of clauses 1a to 1g, further comprising a rotatable body configured to mechanically link the at least two magnetic bodies, wherein the first and second magnetic bodies are configured to move relative to each other when the rotatable body mechanically links the at least two magnetic bodies.

1i. The mobile apparatus of any one of clauses 1a to 1h, further comprising an end effector configured to move in response to the relative movement between the first and second magnetic bodies when the at least two magnetic bodies are mechanically linked.

1j. The mobile apparatus of any one of clauses 1a to 1h, further comprising a tool comprising opposing jaws, wherein the opposing jaws are configured to move in response to relative motion between the first and second magnetic bodies when the at least two magnetic bodies are mechanically linked.

1k. The mobile apparatus of any one of clauses 1 to 1j, further comprising at least one actuator configured to actuate in response to relative motion between the first and second magnetic bodies when the at least two magnetic bodies are mechanically linked.

1l. The mobile apparatus of any one of clauses 1a to 1k, further comprising a resiliently deformable component configured to mechanically link the at least two magnetic bodies, wherein the first and second magnetic bodies are configured to move relative to each other when the resiliently deformable component mechanically links the at least two magnetic bodies.

1m. The mobile apparatus of any one of clauses 1a to 1l, further comprising a linkage body configured to mechanically link the at least two magnetic bodies, wherein the first and second magnetic bodies are configured to move relative to each other when the linkage body mechanically links the at least two magnetic bodies.

1n. The mobile apparatus of clause 1m, wherein when the at least two magnetic bodies are mechanically linked, relative motion between the first and second magnetic bodies in a first direction causes the linkage body to move in a second direction different than the first direction.

1o. The mobile apparatus of clause 1n, wherein the first direction is in a first plane, and wherein the second direction is in a second plane substantially orthogonal to the first plane.

1p. The mobile apparatus of any one of clauses 1m to 1o, further comprising:
a first at least one connector configured to be rotatably coupled to the first magnetic body and to the linkage body;
a second at least one connector configured to be rotatably coupled to the second magnetic body and to the linkage body; and
a connector linkage mechanically coupling the first at least one connector and the second at least one connector such that the first and second at least one connectors are configured to rotate substantially coequally in response to the relative movement of the first and second magnetic bodies.

1q. The mobile apparatus of clause 1p, further comprising at least one resiliently deformable component configured to connect the linkage body to at least one of the first and second at least one connectors.

1r. A method of controlling movement of a mobile apparatus comprising a plurality of magnetic bodies each comprising a plurality of magnets, the method comprising:
causing a first one of the plurality of magnetic bodies mechanically linked to a second one of the plurality of magnetic bodies to move relative to the second magnetic body in response to modulating at least one magnetic field within a range of the first magnetic body.

1s. A linkage apparatus comprising:
a first at least one gear associated with a first magnetic field; and
a second at least one gear associated with a second magnetic field;
wherein the first and second at least one gears are configured to be detachably coupled to one another in response to magnetic interaction between the first and second magnetic fields.

1t. A method of detachably coupling a first at least one gear to a second at least one gear, the method comprising:
causing a first at least one gear associated with a first magnetic field to detachably couple to a second at least one gear associated with a second magnetic field in response to magnetic interaction between the first and second magnetic fields.

1u. An apparatus for moving at least one magnetically moveable device, the apparatus comprising:
a plurality of work bodies, each comprising a work surface upon which the at least one magnetically moveable device is configured to move, wherein each work surface is associated with at least one work magnetic field; and
at least one transfer device comprising a transfer surface upon which the at least one magnetically movable device is configured to move, wherein the transfer surface is associated with at least one transfer magnetic field;
wherein the magnetically movable device is movable between the transfer surface and a work surface of a work body in response to modulating one or both of the at least one work magnetic field and the at least one transfer magnetic field.

1v. A method of moving at least one magnetically moveable device, the method comprising:
in response to modulating one or both of at least one work magnetic field associated with a first work surface of a first work body and at least one transfer magnetic field associated with a transfer surface of a transfer device positioned adjacent the first work body, causing the at least one magnetically movable device to move from the first work surface to the transfer surface;
after moving the at least one magnetically movable device onto the transfer surface, positioning the transfer device adjacent to a second body having a second work surface associated with a second at least one work magnetic field; and
after positioning the transfer device adjacent to the second body, modulating one or both of the second at least one work magnetic field and the at least one transfer magnetic field to cause the at least one magnetically movable device to move from the transfer surface to the second work surface.

1w. An apparatus for controlling movement of at least one magnetically-movable device, the apparatus comprising:
    an operating structure having a work surface upon which the at least one magnetically-moveable device may move;
    at least one magnetic field modulator;
    at least one sensor configured to:
        detect a current position of the at least one magnetically-movable device relative to the work surface; and
        generate at least one position feedback signal representing the current position of the magnetically-movable device relative to the work surface; and at least one controller configured to:
        receive the at least one position feedback signal from the at least one sensor;
        calculate at least one magnetic field command based on the at least one position feedback signal and a desired position of the magnetically-movable device; and
        transmit at least one movement signal to the at least one magnetic field modulator to cause the at least one magnetic field modulator to modulate one or more magnetic fields to move the magnetically-movable device from the current position to the desired position.
1x. A method of controlling at least one magnetically-movable device to a desired position relative to a work surface, the method comprising:
    determining an actual position of the at least one magnetically-movable device relative to the work surface;
    calculating a difference between the desired position and the actual position; and
    using the difference to modulate at least one magnetic field associated with the work surface to cause the magnetically-movable device to move toward the desired position.
2a. A mobile apparatus comprising:
    a stator comprising a plurality of coils;
    a mover comprising at least two magnetic bodies placed in vicinity of the stator, each magnetic body in the plurality of magnetic bodies comprising a plurality of magnets, the at least two magnetic bodies comprising a first magnetic body and a second magnetic body;
    a plurality of currents driven through the plurality of coils to respectively follow a plurality of reference commands;
    a controller calculating the plurality of reference commands at least partially based on the positions of the first magnetic body and the second magnetic body;
    wherein the first magnetic body and the second magnetic body are configured to be mechanically linked; and
    wherein the stator generates at least four independently controllable forces on the mover by the interaction between the plurality of currents and the first and second magnetic bodies; and
    wherein the at least four independently controllable forces comprise at least two forces on the first magnetic body and at least one force on the second magnetic body; and
    wherein the first magnetic body and the second magnetic body are configured to controllably move relative to one another when mechanically linked.
2b. The mobile apparatus of clause 2a, wherein when the at least two magnetic bodies are mechanically linked, the relative movement between the at least two magnetic bodies is constrained in at least one linear direction.
2c. The mobile apparatus of clause 2b, wherein when the at least two magnetic bodies are mechanically linked, the relative movement between the at least two magnetic bodies is constrained in at least two linear directions.
2d. The mobile apparatus of any one of clauses 2a to 2c, wherein when the at least two magnetic bodies are mechanically linked, the relative movement between the at least two magnetic bodies is constrained in at least one rotational direction.
2e. The mobile apparatus of clause 2d, wherein when the at least two magnetic bodies are mechanically linked, the relative movement between the at least two magnetic bodies is constrained in at least two rotational directions.
2f. The mobile apparatus of any one of clauses 2a to 2e, wherein:
    the first magnetic body comprises a first at least one retaining surface; and
    the second magnetic body comprises a second at least one retaining surface;
    wherein the first and second at least one retaining surfaces are configured to mechanically link the at least two of the plurality of magnetic bodies when the first and second at least one retaining surfaces are positioned against one another; and
    wherein the first and second magnetic bodies are configured to move relative to one another when the first and second at least one retaining surfaces are positioned against one another to mechanically link the at least two magnetic bodies.
2g. The mobile apparatus of any one of clauses 2a to 2f, further comprising at least one hinge configured to mechanically link the at least two magnetic bodies, wherein the first and second magnetic bodies are configured to move relative to each other when the at least one hinge mechanically links the at least two magnetic bodies.
2h. The mobile apparatus of any one of clauses 2a to 2g, further comprising a rotatable body configured to mechanically link the at least two magnetic bodies, wherein the first and second magnetic bodies are configured to move relative to each other when the rotatable body mechanically links the at least two magnetic bodies.
2i. The mobile apparatus of any one of clauses 2a to 2h, further comprising an end effector configured to move in response to the relative movement between the first and second magnetic bodies when the at least two magnetic bodies are mechanically linked.
2j. The mobile apparatus of any one of clauses 2a to 2h, further comprising a tool comprising opposing jaws, wherein the opposing jaws are configured to move in response to relative motion between the first and second magnetic bodies when the at least two magnetic bodies are mechanically linked.
2k. The mobile apparatus of any one of clauses 2 to 2j, further comprising at least one actuator configured to actuate in response to relative motion between the first and second magnetic bodies when the at least two magnetic bodies are mechanically linked.
2l. The mobile apparatus of any one of clauses 2a to 2k, further comprising a resiliently deformable component configured to mechanically link the at least two magnetic bodies, wherein the first and second magnetic bodies are configured to move relative to each other when the resiliently deformable component mechanically links the at least two magnetic bodies.
2m. The mobile apparatus of any one of clauses 2a to 2l, further comprising a linkage body configured to mechanically link the at least two magnetic bodies, wherein the first and second magnetic bodies are configured to move relative to each other when the linkage body mechanically links the at least two magnetic bodies.

2n. The mobile apparatus of clause 2m, wherein when the at least two magnetic bodies are mechanically linked, relative motion between the first and second magnetic bodies in a first direction causes the linkage body to move in a second direction different than the first direction.

2o. The mobile apparatus of clause 2n, wherein the first direction is in a first plane, and wherein the second direction is in a second plane substantially orthogonal to the first plane.

2p. The mobile apparatus of any one of clauses 2m to 2o, further comprising:
- a first at least one connector configured to be rotatably coupled to the first magnetic body and to the linkage body;
- a second at least one connector configured to be rotatably coupled to the second magnetic body and to the linkage body; and
- a connector linkage mechanically coupling the first at least one connector and the second at least one connector such that the first and second at least one connectors are configured to rotate substantially coequally in response to the relative movement of the first and second magnetic bodies.

2q. The mobile apparatus of clause 2p, further comprising at least one resiliently deformable component configured to connect the linkage body to at least one of the first and second at least one connectors.

2r. A linkage apparatus comprising:
- a first at least one gear associated with a first magnetic field; and
- a second at least one gear;
- wherein the first and second at least one gears are configured to be detachably coupled to one another in response to magnetic interaction between the first and second magnetic fields.

2s. A method of detachably coupling a first at least one gear to a second at least one gear, the method comprising:
- causing a first at least one gear associated with a first magnetic field to detachably couple to a second at least one gear in response to magnetic interaction between the first and second magnetic fields.

2t. An apparatus for moving at least one magnetically moveable device, the apparatus comprising:
- a plurality of work bodies, each comprising a work surface upon which the at least one magnetically moveable device is configured to move, wherein each work surface is associated with at least one work magnetic field; and
- at least one transfer device comprising a transfer surface upon which the at least one magnetically movable device is configured to move;
- wherein the magnetically movable device is movable from the work surface of a work body to the transfer surface in response to modulating the at least one work magnetic field.

3a. A mobile apparatus comprising:
- a stator comprising a plurality of electrical coils and a stator working surface;
- a mover comprising a plurality of magnetic bodies placed in vicinity of the stator, each magnetic body in the plurality of magnetic bodies comprising a plurality of magnets, the plurality of magnetic bodies comprising at least a first magnetic body and a second magnetic body;
- a plurality of currents driven through the plurality of coils to respectively follow a plurality of current reference commands;
- a linking assembly mechanically linked to both the first magnetic body and the second magnetic body;
- a controller calculating the plurality of current reference commands at least partially based on the positions of the first and second magnetic bodies to produce a first at least two independent forces on the first magnetic body and a second at least two independent forces on the second magnetic body;
- wherein the stator working surface separates the stator coils from the plurality of magnetic bodies; and
- wherein the linking assembly comprises one extended linking body; and
- wherein the controller controls the extended linking body to controllably move and generate an extended controllable motion with at least 3 degrees of freedom via the first at least two independent forces and the second at least two independent forces; and
- wherein the first at least two independent forces comprises at least a first magnetic body's first force in a first stator direction parallel to the stator working surface and a first magnetic body's second force in a second stator direction parallel to the stator working surface; and
- wherein the second at least two independent forces comprises at least a second magnetic body's first force in the first stator direction and a second magnetic body's second force in the second stator direction; and
- wherein the first stator direction is not parallel with the second stator direction; and
- wherein the extended controllable motion comprises at least a first extended motion component in the first stator direction and a third extended motion component in a third stator direction normal to the stator surface; and
- wherein the first and second extended motion components are independently controllable; and
- wherein the third extended motion component is caused by the relative motion between the first magnetic body and the second magnetic body in the first stator direction, and the third extended motion component has a stroke significantly longer than the strokes of the first and second magnetic bodies' motion in the third stator direction.

3b. A mobile apparatus according to clause 3a wherein the stator working surface is a plane;

3c. A mobile apparatus according to any one of clauses 3a to 3b wherein the first stator direction is orthogonal to the second stator direction.

3d. A mobile apparatus according to any one of clauses 3a to 3c wherein the extended controllable motion further comprises at least a second extended motion component in the second stator direction, controllable independently of the first and third extended motion component;

3e. A mobile apparatus according to clause 3d wherein the controller controls the second extended motion component at least partially based on feedback of the first magnetic body's position in the second stator direction and the second magnetic body's position in the second stator direction.

3f. A mobile apparatus according to any one of clauses 3a to 3e wherein the extended controllable motion further comprises at least a sixth extended rotary motion component around the third stator direction, controllable independently of the first, second, and third extended motion components.

3g. A mobile apparatus according to clause 3f wherein the controller controls the sixth extended rotary motion component at least partially based on feedback of the first magnetic body's position in the second stator direction and the second magnetic body's position in the second stator direction.

3h. A mobile apparatus according to clause 3f wherein the controller controls the sixth extended rotary motion component at least partially based on feedback of the first magnetic body's rotary position around the third stator direction.

3i. A mobile apparatus according to any one of clauses 3a to 3h wherein the extended controllable motion further comprises at least a fourth extended rotary motion component around the first stator direction, controllable independently of the first, second, and third extended motion components.

3j. A mobile apparatus according to clause 3i wherein the controller controls the fourth extended rotary motion component at least partially based on feedback of the first magnetic body's rotary position around the first stator direction and the second magnetic body's rotary position around the first stator direction.

3k. A mobile apparatus according to any one of clauses 3a to 3j wherein the extended controllable motion further comprises at least a fifth extended rotary motion component around the second stator direction, controllable independently of the first, second, and third extended motion components.

3l. A mobile apparatus according to clause 3k wherein the controller controls the fifth extended rotary motion component at least partially based on feedback of the first magnetic body's position in the third stator direction and the second magnetic body's position in the third stator direction.

3m. A mobile apparatus according to clause 3k wherein the controller controls the fifth extended rotary motion component at least partially based on feedback of the first magnetic body's rotary position around the second stator direction.

3n. A mobile apparatus according to clause 3d wherein the controller controls the second extended motion component at least partially using the first body's second force and the second body's second force.

3o. A mobile apparatus according to clause 3f wherein the controller controls the sixth extended rotary motion component at least partially using the first body's second force and the second body's second force.

3p. A mobile apparatus according to any one of clauses 3a to 3o wherein the controller controls the first extended motion component at least partially using the first body's first force and the second body's first force.

3q. A mobile apparatus according to any one of clauses 3a to 3p wherein the controller controls the third extended motion component at least partially using the first body's first force and the second body's first force.

3r. A mobile apparatus according to clause 3g wherein the controller controls the sixth extended motion component at least partially based on a sixth coordinated feedback calculated from a scaled difference between the feedback signal of the first magnetic body's position in the second stator direction and the feedback signal of the second magnetic body's position in the second stator direction.

3s. A mobile apparatus according to clause 3e wherein the controller controls the second extended motion component at least partially based on a second coordinated feedback calculated from a weighted sum of the feedback signal of the first magnetic body's position in the second stator direction and the feedback signal of the second magnetic body's position in the second stator direction.

3t. A mobile apparatus according to clause 3j wherein the controller controls the fourth extended motion component at least partially based on a fourth coordinated feedback calculated from a weighted sum of the feedback signal of the first magnetic body's rotary position around the first stator direction and the feedback signal of the second magnetic body's rotary position around the first stator direction.

3u. A mobile apparatus according to any one of clauses 3a to 3t wherein the controller is configured to:
determine a sixth coordinated force based on a sixth coordinated feedback;
determine a second coordinated force based on a second coordinated feedback;
determine the current reference commands to produce the second magnetic body's second force at least partially based on the sum of the sixth coordinated force and the second coordinated force; and
determine the current reference commands to produce the first magnetic body's second force at least partially based on the difference between the second coordinated force and the sixth coordinated force.

3v. A mobile apparatus according to any one of clauses 3a to 3u wherein:
the first at least two independent forces further comprises at least a first magnetic body's fourth torque around the first stator direction;
the second at least two independent forces further comprises at least a second magnetic body's fourth torque around the first stator direction;
the controller is configured to determine the current reference commands to generate the first magnetic body's fourth torque and the second magnetic body's fourth torque at least partially based on a fourth coordinated feedback.

3w. A mobile apparatus according to any one of clauses 3a to 3v wherein:
the linking assembly comprises at least a first arm body and a second arm body;
the first arm body is linked to the extended body via a third hinge;
the second arm is connected to the extended body via a fourth hinge;
the first arm body comprises a first gear profile with its axis concentric with the third hinge axis;
the second arm body comprises a second gear profile with its axis concentric with the fourth hinge axis;
the first arm body and the second arm body are further linked by the engagement between the first gear profile and the second gear profile.

3x. A mobile apparatus according to any one clauses of 3w wherein each of the third and fourth hinges comprises:
a T-shaped axle attached to one of the first and second arm bodies;
a hinge bracket attached to the extended body.

3y. A mobile apparatus according to any one of clauses 3w to 3x wherein the first magnetic body is linked to the first arm body by a first hinge and the second magnetic body is linked to the second arm body by a second hinge.

3z. A mobile apparatus according to clause 3y wherein the first hinge axis and the second hinge axis are respectively parallel to the third hinge axis and the fourth hinge axis.

3aa. A mobile apparatus according to any one of clauses 3w to 3z wherein the first magnetic body is linked to the first arm body by a first two-axes hinge and the second magnetic body is linked to the second arm body by a second two-axes hinge.

3bb. A mobile apparatus according to clause 3aa wherein:
the first two-axis hinge comprises a first perpendicular hinge, a first connector, and a first parallel hinge;
the first magnetic body is linked to the first connector by the first perpendicular hinge;
the first arm body is linked to the first connector by the first parallel hinge;
the second two-axis hinge comprises a second perpendicular hinge, a second connector, and a second parallel hinge;
the second magnetic body is linked to the second connector by the second perpendicular hinge;
the second arm body is linked to the second connector by the second parallel hinge.

3cc. A mobile apparatus according to clause 3bb wherein the first perpendicular hinge axis is perpendicular to the working surface.

3dd. A mobile apparatus according to any one of clauses 3bb to 3cc wherein the first parallel hinge axis is parallel to the working surface.

3ee. A mobile apparatus according to any one of clauses 3bb to 3dd wherein the second perpendicular hinge axis is perpendicular to the working surface and the second parallel hinge axis is parallel to the working surface.

3ff. A mobile apparatus comprising:
a stator comprising a plurality of electrical coils and a stator working surface;
a mover comprising at least two magnetic bodies placed in vicinity of the stator, each magnetic body in the plurality of magnetic bodies comprising a plurality of magnets, the at least two magnetic bodies comprising at least a first magnetic body and a second magnetic body;
a plurality of currents driven through the plurality of coils to respectively follow a plurality of current reference commands;
a controller calculating the plurality of current reference commands at least partially based on the positions of the first magnetic body and the second magnetic body to produce a first at least two independent forces on the first magnetic body and a second at least one independent force on the second magnetic body;
wherein the stator working surface separates the stator coils from the at least two magnetic bodies; and
wherein the first magnetic body and the second magnetic body are mechanically linked directly by a first bearing; and
wherein the first and second magnetic bodies are configured to controllably move relative to one another when the first and second magnetic bodies are linked by the first bearing; and
wherein the controller controls the first magnetic body to controllably move and generate a first controllable motion with at least 3 degrees of freedom; and
wherein the controller controls the second magnetic body to controllably move and generate a second controllable motion with at least 1 degree of freedom; and
wherein the first controllable motion comprises at least a first controllable motion component in a first stator direction parallel with the stator working surface, a second controllable motion component in a second stator direction parallel with the stator working surface, and a sixth controllable motion component around a third stator direction normal to the stator working surface; and
wherein the first and second stator directions are not parallel; and
wherein the second controllable motion comprises at least a seventh controllable motion component; and
wherein the first, second, sixth, and seventh controllable motion components are each independently controllable.

3gg. The mobile apparatus of clause 3ff, wherein when the at least two magnetic bodies are mechanically linked, the relative movement between the first and second magnetic bodies is constrained in at least one linear direction by the first bearing.

3hh. The mobile apparatus of any one of clauses 3ff to 3gg, wherein the seventh controllable motion component is a linear motion in the first stator direction.

3ii. The mobile apparatus of any one of clauses 3ff to 3hh, wherein when the at least two magnetic bodies are mechanically linked, the relative movement between the first and second magnetic bodies is constrained in at least two linear directions by the first bearing.

3jj. The mobile apparatus of any one of clauses 3ff to 3ii, wherein when the at least two magnetic bodies are mechanically linked, the relative movement between the first and second magnetic bodies is constrained in at least one rotational direction by the first bearing.

3kk. The mobile apparatus of clause 3jj, wherein when the at least two magnetic bodies are mechanically linked, the relative movement between the first and second magnetic bodies is constrained in at least two rotational direction by the first bearing.

3ll. The mobile apparatus of any one of clauses 3ff to 3kk, wherein when the at least two magnetic bodies are mechanically linked, the relative movement between the first and second magnetic bodies is constrained in at least 5 degrees of freedom by the first bearing.

3mm. The mobile apparatus of any one of clauses 3ff to 3ll, wherein:
the first bearing is a linear bearing comprising a first guide rail and a first slider;
the first guide rail is attached to one of the first and second magnetic bodies, and the first slider is attached the other of the first and second magnetic bodies.

3nn. The mobile apparatus of any one of clauses 3ff to 3kk, wherein:
the first bearing is a radial bearing comprising a first axle and a first brace;
the first axle is attached to one of the first and second magnetic bodies, and the first brace is attached the other of the first and second magnetic bodies.

3oo. The mobile apparatus of any one of clauses 3ff to 3nn, wherein
the first magnetic body comprises a first magnet array comprising a first plurality of magnetization segments linearly elongated in a first mover direction each having a magnetization direction, and a second magnet array comprising a second plurality of magnetization segments linearly elongated in a second mover direction each having a magnetization direction;
the second magnetic body comprises a third magnet array comprising a third plurality of magnetization segments linearly elongated in the first mover direction each having a magnetization direction;

in each of the first, second, and third plurality of magnetization segments, at least two magnetization segments have different magnetization directions;
the first mover direction is different from the second mover direction.

3pp. The mobile apparatus of clause 3oo, wherein the first mover direction is orthogonal to the second mover direction.

3qq. The mobile apparatus of any one of clauses 3oo to 3pp, wherein:
the second magnetic body further comprises a fourth magnet array comprising a fourth plurality of magnetization segments linearly elongated in the second mover direction each having a magnetization direction, and at least two of the four plurality of magnetization segments have different magnetization directions.

3rr. The mobile apparatus of clause 3qq, wherein the second and fourth magnet array overlap with each other in the first mover direction with a second overlapping length in the second mover direction, and the second overlapping length is greater than 85% of each of the second and fourth magnet arrays' dimension in the second mover direction.

3ss. The mobile apparatus of any one of clauses 3ff to 3rr, wherein:
the first at least two independent forces comprise at least (1) a first magnet array lateral force in the second mover direction generated by the interaction between the first magnet array and the stator currents and (2) a second magnet array lateral force in the first mover direction generated by the interaction between the second magnet array and the stator currents:
the second at least one independent force comprise at least a third magnet array to lateral force in the second mover direction generated by the interaction between the third magnet array and the stator currents.

3tt. The mobile apparatus of any one of clauses 3ff to 3ss, wherein the first guide rail and the first slider can move relative to each other in the first mover direction.

3uu. The mobile apparatus of any one of clauses 3ff to 3tt, wherein the first mover direction and the second mover direction are parallel to the stator surface.

3vv. The mobile apparatus of any one of clauses 3ff to 3uu, wherein the controller is configured to control the sixth controllable motion component at least partially based on a sixth coordinated feedback calculated from a scaled difference between the feedback of the first and second magnetic bodies' position in the second stator direction.

3ww. The mobile apparatus of any one of clauses 3ff to 3vv, wherein the controller is configured to control the sixth controllable motion component at least partially based on a sixth coordinated feedback calculated from a scaled difference between the feedback of the first and third magnet arrays' position in the second stator direction.

3xx. The mobile apparatus of any one of clauses 3ff to 3ww, wherein the controller is configured to control the second controllable motion component at least partially based on a second coordinated feedback calculated from a weighted sum of the feedback of the first and second magnetic bodies' position in the second stator direction.

3yy. The mobile apparatus of any one of clauses 3ff to 3xx, wherein the controller is configured to control the second controllable motion component at least partially based on a second coordinated feedback calculated from a weighted sum of the feedback of the first and third magnet arrays' position in the second stator direction.

3zz. The mobile apparatus of any one of clauses 3ff to 3yy, wherein the controller is configured to:
determine a sixth coordinated force based on a sixth coordinated feedback;
determine a second coordinated force based on a second coordinated feedback;
determine the current reference commands to generate the first magnet array's lateral force at least partially based on the sum of the sixth coordinated force and the second coordinated force;
determine the current reference commands to generate the third magnetic body's second force at least partially based on the difference between the second coordinated force and the sixth coordinated force.

3aaa. The mobile apparatus of any one of clauses 3ff to 3zz, wherein the second at least one independent force further comprises at least a fourth magnet array lateral force in the first mover direction generated by the interaction between the fourth magnet array and the stator currents.

3bbb. The mobile apparatus of any one of clauses 3ff to 3aaa, wherein the controller is configured to control the first controllable motion component and the seventh motion component at least partially based on the second magnet array lateral force and the fourth magnet array lateral force.

3ccc. The mobile apparatus of any one of clauses 3ff to 3bbb, wherein the mover further comprises at least one actuator configured to actuate in response to the relative motion between the first and second magnetic bodies when the at least two magnetic bodies are mechanically linked.

3ddd. The mobile apparatus of any one of clauses 3ff to 3ccc, wherein the at least one actuator comprises a vacuum generation pump.

3eee. The mobile apparatus of any one of clauses 3a to 3ddd, wherein the mover further comprises at least one resiliently deformable component configured to mechanically link the at least two magnetic bodies, wherein the first and second magnetic bodies are configured to move relative to each other when the resiliently deformable component mechanically links the at least two magnetic bodies.

3fff. The mobile apparatus of any one of clauses 3a to 3ee, wherein the mover further comprises at least one resiliently deformable component configured to reduce the power consumption when the extended linking body moves in the third stator direction.

3ggg. The mobile apparatus of any one of clauses 3a to 3fff, wherein the first magnet array and the third magnet array overlaps in the second mover direction.

3hhh. The mobile apparatus of any one of clauses 3a to 3ggg, wherein the first magnet array and the second magnet array overlaps in the second mover direction with an overlapping length in the first mover direction equals to the dimensions of the first magnet array and the second magnet array in the first mover direction.

3iii. The mobile apparatus of any one of clauses 3a to 3hh, wherein the mover further comprises an end effector, and the end effector is configured to generate an end effect in response to relative motion between the first and second magnetic bodies when the at least two magnetic bodies are mechanically linked.

3jjj. The mobile apparatus of clause 3iii, wherein the end effector comprises an elastic member configured to generate a gripping force on a part held by the end effector and the gripping force is proportional to the relative motion between the first and second magnetic bodies.

3kkk. A mobile apparatus comprising:
- a stator comprising a plurality of electrical coils and a stator working surface;
- a first mover comprising a magnetic body comprising a plurality of magnets and a rotary body comprising a first engagement feature;
- a plurality of currents driven through the plurality of coils to respectively follow a plurality of current reference commands;
- a controller calculating the plurality of current reference commands to controllably move the magnetic body to generate a controllable motion with at least two degrees of freedom;
- wherein the stator working surface separates the stator coils from the magnetic body; and
- wherein the controllable motion comprises at least a first motion component in a first mover direction and a second motion component in a second mover direction different from the first mover direction; and
- wherein the first and second mover directions are parallel with the stator working surface;
- wherein the first and second motion components are each independently controllable; and
- wherein the first mover direction is not parallel with the second mover direction;
- wherein the rotary body and the magnetic body are linked together by a hinge with its rotation axis in a third mover direction not coplanar with the first and second mover directions;
- wherein the rotary body and the magnetic body are configured to rotate relative to each other around the hinge axis;
- wherein the controller is configured to control the rotary body's rotary motion around the hinge axis with the aid of a second engagement feature;
- wherein the first and second engagement features are configured to be switchable from being engaged to being disengaged at least partially based on the relative position between the first and second engagement features.

3lll. The mobile apparatus of clause 3kkk wherein the first engagement feature is a engaging fork, and the second engagement feature is an engaging pin engageable with the first engagement feature.

3mmm. The mobile apparatus of clause 3lll wherein the engaging pin is mounted on an assistive mobile platform.

3nnn. The mobile apparatus of clause 3mmm wherein the assistive mobile platform comprises a magnetic body comprising a plurality of magnets interacting with the stator currents commanded by the controller to generate controllable motion with independently controllable motion components in the first and second mover directions.

3ooo. The mobile apparatus of clause 3kkk wherein the first engagement feature is an engagement gear, and the second engagement feature is an engagement rack.

3ppp. The mobile apparatus of clause 3ooo wherein the engagement rack is stationary.

3qqq. The mobile apparatus of clause 3ooo wherein the engagement rack is mounted on an assistive mobile platform.

3rrr. The mobile apparatus of clause 3qqq wherein the assistive mobile platform comprises a magnetic body comprising a plurality of magnets interacting with the stator currents commanded by the controller to generate controllable motion with independently controllable motion components in the first and second mover directions.

3sss. The mobile apparatus of any one clauses of 3kkk to 3rrr wherein when the engagement features are engaged, the relative position between the first mover and the second engagement feature is configured to change the rotary body's rotary position around the third mover direction.

3ttt. The mobile apparatus of any one clauses of 3kkk to 3sss wherein the first engagement feature is an engagement cylinder with alternating magnetic fields on its outer surface, and the second engagement feature comprise a surface with alternating magnetic fields.

3uuu. The mobile apparatus of any one of clause 3kkk to 3ttt wherein the first mover further comprises a latching mechanism with at least two lockable positions each corresponding to a relative rotary position around the third mover direction between the rotary body and the magnetic body.

3vvv. A mobile apparatus comprising:
- a stator comprising a plurality of electrical coils and a stator working surface;
- one or more movers each comprising a magnetic body comprising a plurality of magnets;
- a plurality of currents driven through the plurality of coils to respectively follow a plurality of current reference commands;
- a controller calculating the plurality of current reference commands to controllably move the magnetic body in each of the one or more movers to generate a controllable motion on each mover with at least two degrees of freedom;
- wherein the stator working surface separates the stator coils from the magnetic body; and
- wherein the controllable motion on each mover comprises at least a first motion component in a first mover direction and a second motion component in a second mover direction different from the first mover direction; and
- wherein the first and second mover directions are parallel with the stator working surface;
- wherein the first and second motion components of each mover are each independently controllable; and
- wherein the first mover direction is not parallel with the second mover direction;
- wherein the one or more movers comprise a first mover comprising a multi stable mechanism comprising at least two locally minimum energy states;
- wherein the first mover further comprises an actuatable handle, and the relative motion between the actuatable handle and the magnetic body is configured to change the multi stable mechanism from one of the at least two locally minimum energy states to another.

3www. The mobile apparatus of clause of 3vvv wherein the handle is actuated by controllably moving the first mover towards a pushing feature to generate an actuating force on the handle thereby causing the relative motion between the handle and the magnetic body.

3xxx. The mobile apparatus of clause of 3www wherein the pushing feature is stationary.

3yyy. The mobile apparatus of clause of 3www wherein the one or more movers further comprises a second mover and the pushing feature is attached to the second mover.

3zzz. A method for taking a workpiece out of a storage device, the method comprising:
- providing a stator comprising a plurality of electrical coils and a stator working surface;

providing a mover comprising a magnetic body comprising a plurality of magnets;

providing a plurality of currents driven through the plurality of coils to respectively follow a plurality of current reference commands;

providing a controller calculating the plurality of current reference commands to controllably move the magnetic body to generate a controllable motion with at least two degrees of freedom;

wherein the stator working surface separates the stator coils from the magnetic body; and wherein the controllable motion comprises at least a first motion component in a first stator direction and a second motion component in a second stator direction different from the first mover direction; and wherein the first and second stator directions are parallel with the stator working surface;

wherein the first and second motion components are each independently controllable; and wherein the first stator direction is not parallel with the second mover direction;

wherein the mover comprises an elastic gripper with deformable prongs, controlling the mover to controllably move the gripper in the first stator direction towards the workpiece in the storage device to thereby grab the workpiece;

after grabbing the workpiece, controlling the mover to controllably move the gripper in the second stator direction to thereby take the workpiece out of the storage device.

4a. A magnetic movement apparatus comprising:
at least one mover comprising:
a plurality of magnetic bodies comprising at least a first and a second magnetic body, each magnetic body in the plurality of magnetic bodies comprising at least one magnet array comprising a plurality of magnetization elements configured to cause the at least one mover to experience one or more forces when at least one of the plurality of magnetization elements interacts with one or more magnetic fields such that at least the first and second magnetic bodies move relative to each other.

4b. The magnetic movement apparatus of clause 4a, further comprising:
a mechanical link mechanically linking at least the first and second magnetic bodies and constraining the relative movement between at least the first and second magnetic bodies in one or more linear or rotational directions.

4c. The magnetic movement apparatus of clause 4b, wherein the mechanical link constrains relative movement of the first and second magnetic bodies in at least one linear direction of the linear or rotational directions.

4d. The magnetic movement apparatus of clause 4c, wherein the mechanical link constrains relative movement between the first and second magnetic bodies in at least two linear directions of the linear or rotational directions.

4e. The magnetic movement apparatus of any one of clauses 4h to 4d, wherein the mechanical link constrains relative movement between the first and second magnetic bodies in at least one rotational direction of the linear or rotational directions.

4f. The magnetic movement apparatus of clause 4e, wherein the mechanical link constrains relative movement between the first and second magnetic bodies in at least two rotational directions of the linear or rotational directions.

4g. The magnetic movement apparatus of any one of clauses 4b to 4f, wherein the mechanical link constrains relative movement between the first and second magnetic bodies in at least five of the linear or rotations.

4h. The magnetic movement apparatus of any one of clauses 4b to 4g, wherein the mechanical link is configured to move with at least 3 degrees of freedom.

4i. The magnetic movement apparatus of any one of clauses 4b to 4h, wherein:
the mechanical link comprises a at first guide rail and a first slider; and
the first guide rail is attached to one of the first and second magnetic bodies, and the first slider is attached to the other of the first and second magnetic bodies.

4j. The magnetic movement apparatus of clause 4i, further comprising at least one rotational bearing disposed between the first guide rail and the first slider.

4k. The magnetic movement apparatus of any one of clauses 4b to 4h, wherein
the mechanical link comprises a rotatable body comprising a first axle and a first brace;
wherein the first axle is attached to one of the first and second magnetic bodies, and the first brace is attached the other of the first and second magnetic bodies.

4l. The magnetic movement apparatus of any one of clauses 4b to 4k, wherein the mechanical link further comprises at least one resiliently deformable component.

4m. The magnetic movement apparatus of any one of clauses 4a to 4l, wherein the at to least one mover further comprises at least one actuator configured to actuate in response to the relative movement between the first and second magnetic bodies.

4n. The magnetic movement apparatus of clause 4m, wherein the at least one mover further comprises a vacuum-generating pump, and wherein the at least one actuator is configured to activate the vacuum generation pump.

4o. The magnetic movement apparatus of any one of clauses 4a to 4n, wherein the at least one mover further comprises an end effector configured to generate an end effect in response to the relative movement between the first and second magnetic bodies.

4p. The magnetic movement apparatus of clause 4o, wherein the end effector comprises at least two members configured to generate a gripping force between opposing gripping surfaces of the at least two members, wherein the gripping force is proportional to the relative movement between the first and second magnetic bodies.

4q. The magnetic movement apparatus of any one of clauses 4a to 4p, further comprising:
a work body comprising:
a plurality of electrically conductive elements; and
a working surface configured to support the at least one mover;
wherein at least one of the plurality of electrically conductive elements is configured to conduct electric current to produce the one or more magnetic fields.

4r. The magnetic movement apparatus of clause 4q, wherein the working surface separates the plurality of electrically conductive elements from the at least one mover.

4s. The magnetic movement apparatus of clause 4q or 4r, wherein the working surface is a plane.

4t. The magnetic movement apparatus of any one of clauses 4q to 4s, further comprising:
a first rotatable body comprising a first engagement body, the first rotatable body attached to the first magnetic body, wherein the rotatable body and the first magnetic body are configured to rotate relative to each other around an axis of rotation; and
a second engagement body;
wherein the first and second engagement bodies are configured to be detachably coupled at least partially based on movement of the first magnetic body.

4u. The magnetic movement apparatus of clause 4t, wherein the second engagement body is stationary.

4v. The magnetic movement apparatus of clause 4t, wherein the second engagement body is attached to the second magnetic body.

4w. The magnetic movement apparatus of clause 4v, wherein the first and second engagement bodies are configured to be detachably coupled at least partially based on the relative movement between the first and second magnetic bodies.

4x. The magnetic movement of any one of clauses 4t to 4w, wherein the first engagement body is an engagement fork, and the engagement body is an engagement pin, wherein the engagement fork is configured to receive the engagement pin.

4y. The magnetic movement apparatus of any one of clauses 4t to 4w, wherein the first engagement feature is an engagement gear, and the second engagement feature is an engagement rack, wherein the engagement gear and the engagement rack are configured to interact.

4z. The magnetic movement apparatus of any one of clauses of 4t to 4w, wherein the first engagement body comprises an engagement cylinder comprising an outer surface and a plurality of first magnetic field generators on the outer surface configured to generate alternating magnetic fields, and the second engagement body comprises plurality of second magnetic field generators configured to generate alternating magnetic fields, such that the first and second engagement bodies are configured to be magnetically coupled to each other.

4aa. The magnetic movement apparatus of any one of clauses 4t to 4z wherein when the engagement bodies are detachably coupled, the relative movement between the first and second engagement bodies is configured to rotate the rotatable body.

4bb. The magnetic movement apparatus of any one of clauses 4t to 4aa wherein the first magnetic body further comprises a latching mechanism with at least two lockable positions configured to hold the rotatable body in one of at least two corresponding relative positions relative to its axis of rotation.

4cc. The magnetic movement apparatus of any one of clauses 4q to 4bb, wherein a first one of the at least one movers further comprises:
a multi-stable mechanism configured to be in one of at least two locally minimum energy states; and
an actuatable handle, wherein relative motion between the actuatable handle and one of the plurality of magnetic bodies is configured to change the multi stable mechanism from one of the at least two locally minimum energy states to another.

4dd. The magnetic movement apparatus of clause of 4cc wherein the actuatable handle is actuated by controllably moving the at least one mover toward a pushing feature to generate an actuating force on the actuatable handle thereby causing relative motion between the actuatable handle and the one of the plurality of magnetic bodies.

4ee. The magnetic movement apparatus of clause 4dd wherein the pushing feature is stationary.

4ff. The magnetic movement apparatus of clause 4dd wherein the at least one mover comprises a second mover, and the pushing feature is attached to the second mover.

4gg. The magnetic movement apparatus of any one of clauses 4q to 4ff, further comprising:
at least one controller configured to generate at least one current reference command signal at least partially based on positions of the plurality of magnetic bodies relative to the working surface; and
at least one current generator configured to generate the electrical current conducted by the at least one of the plurality of electrically conductive elements in response to receiving the at least one current reference command signal;
wherein the electrical current causes the first magnetic body to experience a first at least one independent force, and causes the second magnetic body to experience a second at least one independent force.

4hh. The magnetic movement apparatus of clause 4gg, wherein:
the at least one current reference command signal is configured to cause the at least one current generator to generate current such that:
the first at least one independent force comprises at least one force in a first direction parallel to the working surface, and at least one force in a second direction parallel to the working surface and not parallel with the first direction; and
the second at least one independent force comprises at least one force in the first direction and at least one force in the second direction.

4ii. The magnetic movement apparatus of clause 4hh, wherein the first direction is orthogonal to the second direction.

4jj. The magnetic movement apparatus of clause 4hh or 4ii, when ultimately dependent on clause 4b, wherein the mechanical link is configured to move in response to the forces imparted on the first and second magnetic bodies due to the electric current.

4kk. The magnetic movement apparatus of any one of clauses 4hh to 4jj, when ultimately dependent on clause 4b, wherein the mechanical link is configured to move in at least the first direction and a third direction normal to the working surface.

4ll. A magnetic movement apparatus according clause 4kk wherein the controller is configured to control movement of the mechanical link in the first direction at least partially based on the at least one force experienced by the first body in the first direction, and the at least one force experienced by the second body in the first direction.

4mm. The magnetic movement apparatus of clause 4kk or 4ll, wherein the mechanical link is configured to move in the third direction in response to relative movement between the at least two mechanically linked magnetic bodies in the first direction, wherein the mechanical link has a range of motion in the third direction larger than the range of motion of the at least two mechanically linked magnetic bodies in the third direction.

4nn. A magnetic movement apparatus according to any one of clauses 4kk to 4mm wherein the controller is configured to control movement of the mechanical link in the third direction at least partially based on the at least one force experienced by the first body in the first direction, and the at least one force experienced by the second body in the first direction.

4oo. The magnetic movement apparatus of any one of clauses 4kk to 4nn, wherein the mechanical link is configured to be controllably moved in the first direction independently from the third direction.

4pp. The magnetic movement apparatus of any one of clauses 4hh to 4oo, when ultimately dependent on clause 4b, wherein the mechanical link is further configured to be controllably moved in the second direction independently from any other direction.

4qq. The magnetic movement apparatus of clause 4pp, wherein the controller is configured to control movement of the mechanical link in the second direction at least partially based on the positions of the first and second magnetic bodies relative to the second direction.

4rr. A magnetic movement apparatus according to clause 4pp or 4qq, wherein the controller is configured to control movement of the mechanical link in the second direction at least partially based on the at least one force experienced by the first body in the second direction, and the at least one force experienced by the second body in the second direction.

4ss. A magnetic movement apparatus according to any one of clauses 4pp to 4rr wherein the controller is configured to control the movement of the mechanical link in the second direction at least partially based on a weighted sum of the positions of the first and second magnetic bodies relative to the second direction.

4tt. A magnetic movement apparatus according to any one of clauses 4kk to 4ss wherein the mechanical link is further configured to move in at least a sixth rotational direction having an axis of rotation in the third direction, controllable independently of movement of the mechanical link in the first, second, and third directions.

4uu. A magnetic movement apparatus according to clause 4tt wherein the controller is configured to control movement of the mechanical link in the sixth rotational direction at least partially based on the positions of the first and second magnetic bodies relative to the second direction.

4vv. A magnetic movement apparatus according to clause 4tt or 4uu wherein the controller is configured to control movement of the mechanical link in the sixth rotational direction at least partially based on the position of the first magnetic body's position relative to the sixth rotational direction.

4ww. A magnetic movement apparatus according to any one of clauses 4tt to 4vv wherein the controller is configured to control movement of the mechanical link in the sixth rotational direction at least partially based on the at least one force experienced by the first body in the second direction, and the at least one force experienced by the second body in the second direction.

4xx. A magnetic movement apparatus according to any one of clauses 4tt to 4ww wherein the controller is configured to control movement of the mechanical link in the sixth rotational direction at least partially based on a scaled difference between the positions of the first and second magnetic bodies relative to the second direction.

4yy. A magnetic movement apparatus according to any one of clauses 4kk to 4xx wherein the mechanical link is further configured to move in a fourth rotational direction having an axis of rotation in the first direction, controllable independently of movement of the mechanical link in the first, second, third, and sixth directions.

4zz. A magnetic movement apparatus according to clause 4yy wherein the controller is configured to control the movement of the mechanical link in the fourth rotational direction at least partially based on the position of the first and second magnetic bodies relative to the fourth rotational direction.

4aaa. A magnetic movement apparatus according to clause 4yy or 4zz wherein the controller is configured to control movement of the mechanical link in the fourth rotational direction at least partially based on a weighted sum of the positions of the first and second magnetic bodies relative to the fourth rotational direction.

4bbb. A magnetic movement apparatus according to any one of clauses 4kk to 4aaa wherein the mechanical link is further configured to move in a fifth rotational direction having an axis of rotation in the second direction, controllable independently of movement of the mechanical link in the first, second, and third directions.

4ccc. A magnetic movement apparatus according to clause 4bbb wherein the controller is configured to control the movement of the mechanical link in the fifth rotational direction at least partially based on the position of the first and second magnetic bodies relative to the third direction.

4ddd. A mobile apparatus according to clause 4bbb or 4ccc wherein the controller is configured to control the movement of the mechanical link in the fifth rotational direction at least partially based on the position of the first magnetic body relative to the fifth rotational direction.

4eee. The magnetic movement apparatus of any one of clauses 4a to 4ddd, wherein:
the first magnetic body comprises a first magnet array comprising a first plurality of magnetization segments linearly elongated in the a first elongation direction each having a magnetization direction, and a second magnet array comprising a second plurality of magnetization segments linearly elongated in a second elongation direction each having a magnetization direction; and
the second magnetic body comprises a third magnet array comprising a third plurality of magnetization segments linearly elongated in the first elongation direction each having a magnetization direction;
wherein in each of the first, second, and third pluralities of magnetization segments, at least two magnetization segments have different magnetization directions; and
wherein the first elongation direction is different from the second elongation direction.

4fff. The magnetic movement apparatus of clause 4eee, wherein the first elongation direction is orthogonal to the second elongation direction.

4ggg. The magnetic movement apparatus of clause 4eee or 4fff, wherein
the second magnetic body further comprises a fourth magnet array comprising a fourth plurality of magnetization segments linearly elongated in the second elongation direction each having a magnetization direction;
wherein at least two of the four pluralities of magnetization segments have different magnetization directions.

4hhh. The magnetic movement apparatus of clause 4ggg, wherein the second and fourth magnet arrays overlap with each other in the first elongation direction, the length of overlap in the second elongation direction is greater than 85% of each of the second and fourth magnet arrays' dimension in the second elongation direction.

4iii. The magnetic movement apparatus of any one of clauses 4eee to 4hhh, when ultimately dependent on clause 4gg, wherein:
the at least one current reference command signal is configured to cause the at least one current generator to generate current such that:
the first at least one independent force comprises a first at least one force in the second elongation direction generated by the interaction between the first magnet array and the electrical current and a second at least one force in the first elongation direction generated by the interaction between the second magnet array and the electrical current; and the second at least one independent force comprises a third at least one force in the second elongation direction generated by the interaction between the third magnet array and the electrical current.

4jjj. The mobile apparatus of any one of clauses 4eee to 4iii, when ultimately dependent on clause 4b, wherein the controller is configured to controllably move the mechanical link in at least one rotational direction having an axis normal to the working surface at least partially based on a scaled difference between positions of the first and third magnet arrays relative to the second direction.

4kkk. The mobile apparatus of any one of clauses 4eee to 4jjj, when ultimately dependent on clause 4h, wherein the controller is configured to controllably move the mechanical link in the second direction at least partially based on a weighted sum of the positions of the first and third magnet arrays relative to the second direction.

4lll. The mobile apparatus of any one of clauses 4eee to 4kkk, wherein the at least one current reference command signal is configured to cause the at least one current generator to generate current such that the second at least one independent force further comprises a fourth at least one force in the first direction in response to interaction between the fourth magnet array and the electrical current.

4mmm. The mobile apparatus of clause 4lll, wherein the controller is configured to controllably move the mechanical link at least partially based on the second at least one force and the fourth at least one force.

4nnn. A magnetic movement apparatus according to any one of clauses 4gg to 4mmm wherein:
the at least one current reference command signal is configured to cause the at least one current generator to generate current such that:
the second at least one independent force is at least partially based on the positions of the first and second magnetic bodies; and
the first at least one independent force is at least partially based on the positions of the first and second magnetic bodies.

4ooo. A magnetic movement apparatus according to any one of clauses 4gg to 4nnn wherein:
the at least one current reference command signal is configured to cause the at least one current generator to generate current such that:
the first at least one independent force comprises a first at least one torque having an axis of rotation in the first direction; and
the second at least one independent force comprises a second at least one torque having an axis of rotation in the first direction;
and wherein the controller is configured to determine the current reference command signals to generate the first and second at least one torque at least partially based on positions of the first and second magnetic bodies.

4ppp. A magnetic movement apparatus according to any one of clauses 4b to 4v, when ultimately dependent on clause 4b, wherein the mechanical link further comprises:
a linkage body;
a first at least one connector connecting the first magnetic body to the linkage body; and
a second at least one connector connecting the second magnetic body to the linkage body;

4qqq. The magnetic movement apparatus of clause 4w, wherein:
the first at least one connector is coupled to the linkage body via a first at least one linkage hinge, and coupled to the first magnetic body via a first at least one body hinge; and
the second at least one connector is coupled to the linkage body via a second at least one linkage hinge, and coupled to the second magnetic body via a second at least one body hinge.

4rrr. The magnetic movement apparatus of clause 4qqq further comprising a first at least one resiliently deformable component connecting the first at least one connector and the linkage body, and a second at least one resiliently deformable component connecting the second at least one connector and the linkage body.

4sss. The magnetic movement apparatus of clause 4qqq or 4rrr, wherein:
the first at least one connector comprises a first gear with its axis of rotation concentric with the axis of rotation of the first at least one linkage hinge; and
the second at least one connector comprises a second gear with its axis of rotation concentric with the second at least one axis hinge;
wherein the first at least one connector and the second at least one connector are further linked by the engagement between the first gear and the second gear.

4ttt. A magnetic movement apparatus according to any one clauses 4qqq to 4sss wherein each of the first and second linkage hinges comprises:
a T-shaped axle attached to a respective one of the first and second at least one connectors; and
a hinge bracket attached to the linkage body.

4uuu. A magnetic movement apparatus according to any one of clauses 4qqq to 4x wherein the axes of rotation of the first and second at least one body hinges are respectively parallel to the axes of rotation of the first and second at least one linkage hinges.

4vvv. A magnetic movement apparatus according to any one of clauses 4qqq to 4uuu wherein the first at least one body hinge comprises a first two-axis hinge, and the second at least one body hinge comprises a second two-axis hinge.

4www. A magnetic movement apparatus according to clause 4vvv wherein:
the first two-axis hinge comprises a first perpendicular hinge, a first hinge body, and a first parallel hinge; and
the second two-axis hinge comprises a second perpendicular hinge, a second hinge body, and a second parallel hinge;
wherein the first magnetic body is linked to the first hinge body via the first perpendicular hinge, and wherein the first at least one connector is linked to the first hinge body via the first parallel hinge; and
wherein the second magnetic body is linked to the second hinge body by the second perpendicular hinge, and the second at least one connector is linked to the second hinge body by the second parallel hinge.

4xxx. A magnetic movement apparatus according to clause 4bb wherein the axis of rotation of the first perpendicular hinge is perpendicular to the working surface.

4yyy. A magnetic movement apparatus according to any one of clauses 4bb or 4xxx wherein the axis of rotation of the first parallel hinge is parallel to the working surface.

4zzz. A magnetic movement apparatus according to clause 4p, wherein the at least two members comprise resiliently deformable prongs operable to hold an object.

5a. A magnetic movement apparatus comprising:
- a work body comprising a plurality of electrically conductive elements and a work body working surface; and
- a mover comprising a plurality of magnetic bodies placed in vicinity of the work body, each magnetic body in the plurality of magnetic bodies comprising a plurality of magnets, the plurality of magnetic bodies comprising at least a first magnetic body and a second magnetic body; and
- a mechanical link mechanically linking the first magnetic body and the second magnetic body; and
- at least one sensor configured to:
  - detect a current position of the at least one magnetic body relative to the working surface; and
  - generate at least one feedback signal representing the current position of the magnetic body relative to the work surface; and
- at least one controller configured to receive the at least one feedback signal and generate at least one current reference command signal at least partially based on positions of the plurality of magnetic bodies relative to the working surface; and
- at least one current generator configured to generate a plurality of electrical currents conducted by the at least one of the plurality of electrically conductive elements in response to receiving the at least one current reference command signal; and
- wherein the plurality of electrical current causes the first magnetic body to experience a first at least two independent force and causes the second magnetic body to experience a second at least two independent force;
- wherein the work body working surface separates the work body's electrically conductive elements from the plurality of magnetic bodies; and
- wherein the mechanical link comprises one linkage body; and
- wherein the controller is configured to control the movement of the linkage body and generate a linkage body controllable movement with at least 3 degrees of freedom through the first at least two independent forces and the second at least two independent forces; and
- wherein the at least one current reference command signal is configured to cause the at least one current generator to generate current such that:
  - the first at least two independent forces comprises at least a first magnetic body's first force in a first work body direction parallel to the work body working surface and a first magnetic body's second force in a second work to body direction parallel to the work body working surface; and
  - the second at least two independent forces comprises at least a second magnetic body's first force in the first work body direction and a second magnetic body's second force in the second work body direction; and
- wherein the first work body direction is not parallel with the second work body direction; and
- wherein the linkage body controllable movement comprises at least a first linkage body movement component in the first work body direction and a third linkage body movement component in a third work body direction normal to the work body surface; and
- wherein the first and second linkage body movement components are independently controllable; and
- wherein the third linkage body movement component is caused by the relative movement between the first magnetic body and the second magnetic body in the first work body direction, and the third linkage body movement component has a stroke significantly longer than the strokes of the first and second magnetic bodies' movement in the third work body direction.

5b. A magnetic movement apparatus according to clause 5a wherein the work body working surface is a plane;

5c. A magnetic movement apparatus according to any one of clauses 5a to 5b wherein the first work body direction is orthogonal to the second work body direction.

5d. A magnetic movement apparatus according to any one of clauses 5a to 5c wherein the linkage body controllable movement further comprises at least a second linkage body movement component in the second work body direction, controllable independently of the first and third linkage body movement components;

5e. A magnetic movement apparatus according to clause 5d wherein the controller is configured to control the second linkage body movement component at least partially based on the first magnetic body's position in the second work body direction and the second magnetic body's position in the second work body direction.

5f. A magnetic movement apparatus according to any one of clauses 5a to 5e wherein the linkage body controllable movement further comprises at least a sixth linkage body rotational movement component around the third work body direction, controllable independently of the first, second, and third linkage body movement components.

5g. A magnetic movement apparatus according to clause 5f wherein the controller is configured to control the sixth linkage body rotational movement component at least partially based on the first magnetic body's position in the second work body direction and the second magnetic body's position in the second work body direction.

5h. A magnetic movement apparatus according to clause 5f wherein the controller is configured to control the sixth linkage body rotational movement component at least partially based on the first magnetic body's rotational position around the third work body direction.

5i. A magnetic movement apparatus according to any one of clauses 5a to 5h wherein the linkage body controllable movement further comprises at least a fourth linkage body rotational movement component around the first work body direction, controllable independently of the first, second, and third linkage body movement components.

5j. A magnetic movement apparatus according to clause 5i wherein the controller is configured to control the fourth linkage body rotational movement component at least partially based on the first magnetic body's rotational position around the first work body direction and the second magnetic body's rotational position around the first work body direction.

5k. A magnetic movement apparatus according to any one of clauses 5a to 5j wherein the linkage body controllable movement further comprises at least a fifth linkage body rotational movement component around the second work body direction, controllable independently of the first, second, and third linkage body movement components.

5l. A magnetic movement apparatus according to clause 5k wherein the controller is configured to control the fifth linkage body rotational movement component at least partially based on the first magnetic body's position in the third work body direction and the second magnetic body's position in the third work body direction.

5m. A magnetic movement apparatus according to clause 5k wherein the controller is configured to control the fifth linkage body rotational movement component at least partially based on the first magnetic body's rotational position around the second work body direction.

5n. A magnetic movement apparatus according to clause 5d wherein the controller is configured to control the second linkage body movement component at least partially using the first body's second force and the second body's second force.

5o. A magnetic movement apparatus according to clause 5f wherein the controller is configured to control the sixth linkage body rotational movement component at least partially using the first body's second force and the second body's second force.

5p. A magnetic movement apparatus according to any one of clauses 5a to 5o wherein the controller is configured to control the first linkage body movement component at least partially using the first body's first force and the second body's first force.

5q. A magnetic movement apparatus according to any one of clauses 5a to 5p wherein the controller is configured to control the third linkage body movement component at least partially using the first body's first force and the second body's first force.

5r. A magnetic movement apparatus according to clauses 5g wherein the controller is configured to control the sixth linkage body movement component at least partially based on a sixth coordinated feedback calculated from a difference between the first magnetic body's position in the second work body direction and the second magnetic body's position in the second work body direction.

5s. A magnetic movement apparatus according to clause 5e wherein the controller is configured to control the second linkage body movement component at least partially based on a second coordinated feedback calculated from a weighted sum of the first magnetic body's position in the second work body direction and the second magnetic body's position in the second work body direction.

5t. A magnetic movement apparatus according to clause 5j wherein the controller is configured to control the fourth linkage body movement component at least partially based on a fourth coordinated feedback calculated from a weighted sum of the first magnetic body's rotational position around the first work body direction and the second magnetic body's rotational position around the first work body direction.

5u. A magnetic movement apparatus according to any one of clauses 5a to 5t wherein the controller is configured to:
   determine a sixth coordinated force based on a sixth coordinated feedback from the at least one sensor;
   determine a second coordinated force based on a second coordinated feedback from the at least one sensor;
   generate the current reference commands to cause the second magnetic body's second force at least partially based on the weighted sum of the sixth coordinated force and the second coordinated force; and
   generate the current reference commands to cause the first magnetic body's second force at least partially based on the difference between the second coordinated force and the sixth coordinated force.

5v. A magnetic movement apparatus according to any one of clauses 5a to 5u wherein:
   the first at least two independent forces further comprises at least a first magnetic body's fourth torque around the first work body direction;
   the second at least two independent forces further comprises at least a second magnetic body's fourth torque around the first work body direction;
   the controller is configured to determine the current reference commands to cause the first magnetic body's fourth torque and the second magnetic body's fourth torque at least partially based on a fourth coordinated feedback.

5w. A magnetic movement apparatus according to any one of clauses 5a to 5v wherein:
   the mechanical link further comprises a first at least one connector and a second at least one connector;
   the first at least one connector is linked to the linkage body via a third hinge;
   the second at least one connector is connected to the linkage body via a fourth hinge;
   the first at least one connector comprises a first gear with its axis of rotation concentric with the third hinge axis;
   the second at least one connector comprises a second gear with its axis of rotation concentric with the fourth hinge axis;
   the first at least one connector and the second at least one connector are further linked by the engagement between the first gear and the second gear.

5x. A magnetic movement apparatus according to any one clauses of 5w wherein each of the third and fourth hinges comprises:
   a T-shaped axle attached to a respective one of the first and second at least one connector; and
   a hinge bracket attached to the linkage body.

5y. A magnetic movement apparatus according to any one of clauses 5w to 5x wherein the first magnetic body is linked to the first connector by a first hinge and the second magnetic body is linked to the second connector by a second hinge.

5z. A magnetic movement apparatus according to clause 5y wherein the first hinge axis and the second hinge axis are respectively parallel to the third hinge axis and the fourth hinge axis.

5aa. A magnetic movement apparatus according to any one of clauses 5w to 5z wherein the first magnetic body is linked to the first connector by a first two-axes hinge and the to second magnetic body is linked to the second connector by a second two-axes hinge.

5bb. A magnetic movement apparatus according to clause 5aa wherein:
   the first two-axes hinge comprises a first perpendicular hinge, a first hinge body, and a first parallel hinge;
   the second two-axes hinge comprises a second perpendicular hinge, a second hinge body, and a second parallel hinge;
   wherein the first magnetic body is linked to the first hinge body via the first perpendicular hinge, and wherein the first at least one connector is linked to the first hinge body via the first parallel hinge; and
   wherein the second magnetic body is linked to the second hinge body by the second perpendicular hinge, and the second at least one connector is linked to the second hinge body by the second parallel hinge.

5cc. A magnetic movement apparatus according to clause 5bb wherein the axis of rotation of the first perpendicular hinge is perpendicular to the working surface.

5dd. A magnetic movement apparatus according to any one of clauses 5bb to 5cc wherein the axis of rotation of the first parallel hinge is parallel to the working surface.

5ee. A magnetic movement apparatus according to any one of clauses 5bb to 5dd wherein the axis of rotation of the second perpendicular hinge is perpendicular to the working surface and the axis of rotation of the second parallel hinge is parallel to the working surface.

5ff. A magnetic movement apparatus comprising:
- a work body comprising a plurality of electrically conductive elements and a work body working surface;
- a mover comprising at least two magnetic bodies placed in vicinity of the work body, each magnetic body in the plurality of magnetic bodies comprising a plurality of magnets, the at least two magnetic bodies comprising at least a first magnetic body and a second magnetic body;
- a mechanical link mechanically linking the first magnetic body and the second magnetic body;
- at least one sensor configured to:
  - detect a current position of the at least one magnetic body relative to the working surface; and
  - generate at least one feedback signal representing the current position of the magnetic body relative to the work surface; and
- at least one controller configured to receive the at least one feedback signal and generate a at least one current reference command signal at least partially based on positions of the first and second magnetic bodies relative to the working surface; and
- at least one current generator configured to generate a plurality of electrical currents conducted by the at least one of the plurality of electrically conductive elements in response to receiving the at least one current reference command signal; and
- wherein the plurality of electrical current causes the first magnetic body to experience a first at least two independent force and causes the second magnetic body to experience a second at least one independent force; and
- wherein the work body working surface separates the work body's electrically conductive elements from the at least two magnetic bodies; and
- wherein the mechanical link comprises a first bearing, and the first magnetic body and the second magnetic body are mechanically linked directly by the first bearing; and
- wherein the first and second magnetic bodies are configured to controllably move relative to one another when the first and second magnetic bodies are linked by the first bearing; and
- wherein the controller is configured to control the first magnetic body to controllably move and generate a first controllable movement with at least 3 degrees of freedom; and
- wherein the controller is configured to control the second magnetic body to controllably move and generate a second controllable movement with at least 1 degree of freedom; and
- wherein the first controllable movement comprises at least a first controllable movement component in a first work body direction parallel with the work body working surface, a second controllable movement component in a second work body direction parallel with the work body working surface, and a sixth controllable movement component around a third work body direction normal to the work body working surface; and
- wherein the first and second work body directions are not parallel; and
- wherein the second controllable movement comprises at least a seventh controllable movement component; and
- wherein the first, second, sixth, and seventh controllable movement components are each independently controllable.

5gg. The magnetic movement apparatus of any one of clauses 5ff, wherein the seventh controllable movement component is a linear movement in the first work body direction.

5hh. The magnetic movement apparatus of any one of clauses 5ff to 5gg, wherein the mechanical link constrains relative movement of the first and second magnetic bodies in at least one linear direction.

5ii. The magnetic movement apparatus of any one of clauses 5ff to 5hh, wherein the mechanical link constrains relative movement between the first and second magnetic bodies in at least two linear directions.

5jj. The magnetic movement apparatus of any one of clauses 5ff to 5ii, wherein the mechanical link constrains relative movement between the first and second magnetic bodies in at least one rotational direction.

5kk. The magnetic movement apparatus of clause 5jj, wherein the mechanical link constrains relative movement between the first and second magnetic bodies in at least two rotational directions.

5ll. The magnetic movement apparatus of any one of clauses 5ff to 5kk, wherein the mechanical link constrains relative movement between the first and second magnetic bodies in at least five degrees of freedom.

5mm. The magnetic movement apparatus of any one of clauses 5ff to 5ll, wherein:
- the mechanical link comprises a first guide rail and a first slider;
- the first guide rail is rigidly attached to one of the first and second magnetic bodies, and the first slider is rigidly attached the other of the first and second magnetic bodies.

5nn. The magnetic movement apparatus of any one of clauses 5ff to 5kk, wherein:
- the mechanical link comprises a first axle and a first brace;
- the first axle is rigidly attached to one of the first and second magnetic bodies, and the first brace is rigidly attached the other of the first and second magnetic bodies.

5oo. The magnetic movement apparatus of any one of clauses 5ff to 5nn, wherein
- the first magnetic body comprises a first magnet array comprising a first plurality of magnetization segments linearly elongated in a first elongation direction each having a magnetization direction, and a second magnet array comprising a second plurality of magnetization segments linearly elongated in a second elongation direction each having a magnetization direction;
- the second magnetic body comprises a third magnet array comprising a third plurality of magnetization segments linearly elongated in the first elongation direction each having a magnetization direction;
- wherein in each of the first, second, and third plurality of magnetization segments, at least two magnetization segments have different magnetization directions; and
- wherein the first elongation direction is different from the second elongation direction.

5pp. The magnetic movement apparatus of clause 5oo, wherein the first elongation direction is orthogonal to the second elongation direction.

5qq. The magnetic movement apparatus of any one of clauses 5oo to 5pp, wherein:
- the second magnetic body further comprises a fourth magnet array comprising a fourth plurality of magnetization segments linearly elongated in the second elongation direction each having a magnetization direction;

wherein at least two of the four pluralities of magnetization segments have different magnetization directions.

5rr. The magnetic movement apparatus of clause 5qq, wherein the second and fourth magnet arrays overlap with each other in the first elongation direction, the length of overlap is greater than 85% of each of the second and fourth magnet arrays' dimension in the second elongation direction.

5ss. The magnetic movement apparatus of any one of clauses 5ff to 5rr, wherein:
the at least one current reference command signal is configured to cause the at least one current generator to generate current such that:
the first at least one independent force comprises a first at least one force in the second elongation direction generated by the interaction between the first magnet array and the electrical current and a second at least one force in the first elongation direction generated by the interaction between the second magnet array and the electrical current; and
the second at least one independent force comprises a third at least one force in the second elongation direction generated by the interaction between the third magnet array and the electrical current.

5tt. The magnetic movement apparatus of any one of clauses 5ff to 5ss, wherein the first guide rail and the first slider can move relative to each other in the first elongation direction.

5uu. The magnetic movement apparatus of any one of clauses 5ff to 5tt, wherein the first to elongation direction and the second elongation direction are parallel to the work body surface.

5vv. The magnetic movement apparatus of any one of clauses 5ff to 5uu, wherein the controller is configured to control the sixth controllable movement component at least partially based on a sixth coordinated feedback calculated from a difference between the first and second magnetic bodies' position in the second work body direction.

5ww. The magnetic movement apparatus of any one of clauses 5ff to 5vv, wherein the controller is configured to control the sixth controllable movement component at least partially based on a sixth coordinated feedback calculated from a difference between the first and third magnet arrays' position in the second work body direction.

5xx. The magnetic movement apparatus of any one of clauses 5ff to 5ww, wherein the controller is configured to control the second controllable movement component at least partially based on a second coordinated feedback calculated from a weighted sum of the first and second magnetic bodies' position in the second work body direction.

5yy. The magnetic movement apparatus of any one of clauses 5ff to 5xx, wherein the controller is configured to:
determine a sixth coordinated force based on a sixth coordinated feedback from the at least one sensor;
determine a second coordinated force based on a second coordinated feedback from the at least one sensor;
generate the current reference commands to cause the first at least one force in the second elongation direction at least partially based on the sum of the sixth coordinated force and the second coordinated force;
generate the current reference commands to cause the third at least one force in the second elongation direction at least partially based on the difference between the second coordinated force and the sixth coordinated force.

5zz. The magnetic movement apparatus of any one of clauses 5ff to 5zz, wherein:
the at least one current reference command signal is configured to cause the at least one current generator to generate current such that:
the second at least one independent force comprises a fourth at least one force in the first elongation direction generated by the interaction between the fourth magnet array and the electrical current.

5aaa. The magnetic movement apparatus of any one of clauses 5ff to 5aaa, wherein the controller is configured to control the first controllable movement component and the seventh movement component at least partially based on the second at least one force in the first elongation direction and the fourth at least one force in the first elongation direction.

5bbb. The magnetic movement apparatus of any one of clauses 5ff to 5bbb, wherein the mover further comprises at least one actuator configured to actuate in response to the relative movement between the first and second magnetic bodies.

5ccc. The magnetic movement apparatus of any one of clauses 5ff to 5ccc, wherein the at least one mover further comprises a vacuum-generating pump, and wherein the at least one actuator is configured to activate the vacuum generation pump.

5ddd. The magnetic movement apparatus of any one of clauses 5a to 5ddd, wherein the mover further comprises at least one resiliently deformable component configured to mechanically link the at least two magnetic bodies, wherein the first and second magnetic bodies are configured to move relative to each other when the resiliently deformable component mechanically links the at least two magnetic bodies.

5eee. The magnetic movement apparatus of any one of clauses 5a to 5ee, wherein the mover further comprises at least one resiliently deformable component configured to reduce the power consumption when the linkage body moves in the third work body direction.

5fff. The magnetic movement apparatus of any one of clauses 5oo to 5fff, wherein the first magnet array and the third magnet array overlap in the second elongation direction.

5ggg. The magnetic movement apparatus of clause 5fff, wherein the second magnet array and the fourth magnet array overlap in the first elongation direction.

5hhh. The magnetic movement apparatus of any one of clauses 5a to 5ggg, wherein the first magnet array and the second magnet array overlaps in the second elongation direction, the length of overlap equals to the dimensions of the first magnet array and the second magnet array in the first elongation direction.

5iii. The magnetic movement apparatus of any one of clauses 5a to 5hhh, wherein the mover further comprises an end effector, and the end effector is configured to generate an end effect in response to relative movement between the first and second magnetic bodies.

5jjj. The magnetic movement apparatus of clause 5iii, wherein the end effector comprises an elastic member configured to generate a gripping force on a part held by the end effector and the gripping force is proportional to the relative movement between the first and second magnetic bodies.

5kkk. A magnetic movement apparatus comprising:
  a work body comprising a plurality of electrically conductive elements and a working surface;
  at least one mover each comprising a magnetic body, the at least one mover comprising a first mover,
  a first rotatable body comprising a first engagement body, the first rotatable body attached to the magnetic body of the first mover, wherein the rotatable body and the magnetic body of the first mover are configured to rotate relative to each other around an axis of rotation; and
  a second engagement body;
  wherein at least one of the plurality of electrically conductive elements is configured to conduct electric current to produce one or more magnetic fields; and
  wherein the magnetic body of each of the at least one mover comprising at least one magnet array comprising a plurality of magnetization elements is configured to correspondingly cause each of the at least one mover to experience one or more forces when the at least one of the plurality of magnetization elements interacts with the one or more magnetic fields; and
  wherein the working surface separates the plurality of electrically conductive elements from the at least one mover; and
  wherein the first and second engagement bodies are configured to be detachably coupled at least partially based on movement of the first mover; and
  wherein the one or more magnetic fields is configured to cause the first mover to experience at least two first independently controllable forces in non-parallel directions generally parallel with the working surface, when the first mover's magnetic body interacts with the one or more magnetic fields.
5lll. The magnetic movement apparatus of clause 5kkk, wherein the second engagement body is stationary.
5mmm. The magnetic movement apparatus of clause 5kkk, wherein the at least one mover further comprises a second mover and the second engagement body is attached to the magnetic body of the second mover.
5nnn. The magnetic movement apparatus of any one of clauses 5kkk to 5mmm, wherein the first and second engagement bodies are configured to be detachably coupled at least partially based on the relative movement between the first and second movers.
5ooo. The magnetic movement apparatus of any one of clauses 5kkk to 5nnn, wherein the first engagement body is an engagement fork, and the second engagement body is an engagement pin, wherein the engagement fork is configured to receive the engagement pin.
5ppp. The magnetic movement apparatus of any one of clauses 5kkk to 5nnn, wherein the first engagement body is an engagement gear, and the second engagement body is an engagement rack, wherein the engagement gear and engagement rack are configured to mate with each other.
5qqq. The magnetic movement apparatus of any one of clauses of 5kkk to 5nnn, wherein the first engagement body comprises an engagement cylinder comprising an outer surface and a plurality of first magnetic field generators on the outer surface configured to generate alternating magnetic fields, and the second engagement body comprises plurality of second magnetic field generators configured to generate alternating magnetic fields, such that the first and second engagement bodies are configured to be detachably magnetically coupled to each other.
5rrr. The magnetic movement apparatus of any one of clauses of 5kkk to 5qqq, wherein when the engagement bodies are detachably coupled, the relative movement between the first mover and the second engagement body is configured to rotate the rotatable body.
5sss. The magnetic movement apparatus of any one of clause 5kkk to 5rrr wherein the first mover further comprises a latching mechanism with at least two lockable positions configured to hold the rotatable body in one of at least two corresponding relative positions relative to its axis of rotation.
5ttt. A magnetic movement apparatus comprising:
  a work body comprising a plurality of electrically conductive elements and a working surface;
  at least one mover each comprising a magnetic body, the at least one mover comprising a first mover,
  wherein at least one of the plurality of electrically conductive elements is configured to conduct electric current to produce one or more magnetic fields; and
  wherein the magnetic body of each of the at least one mover comprising at least one magnet array comprising a plurality of magnetization elements is configured to correspondingly cause each of the at least one mover to experience one or more forces when the at least one of the plurality of magnetization elements interacts with the one or more magnetic fields; and
  wherein the working surface separates the plurality of electrically conductive elements from the at least one mover; and
  wherein the one or more magnetic fields is configured to cause the first mover to experience at least two first independently controllable forces in non-parallel directions generally parallel with the working surface, when the first mover's magnetic body interacts with the one or more magnetic fields; and
  wherein the first mover comprises a multi stable mechanism configured to be in one of at least two locally minimum energy states; and
  wherein the first mover further comprises an actuatable handle, and the relative movement between the actuatable handle and the magnetic body of the first mover is configured to change the multi stable mechanism from one of the at least two locally minimum energy states to another.
5uuu. The magnetic movement apparatus of clause of 5vvv wherein the handle is actuated by controllably moving the first mover towards a pushing feature to generate an actuating force on the handle thereby causing the relative movement between the handle and the magnetic body of the first mover.
5vvv. The magnetic movement apparatus of clause of 5www wherein the pushing feature is stationary.
5www. The magnetic movement apparatus of clause of 5www wherein the one or more movers further comprises a second mover and the pushing feature is attached to the second mover, so that:
  the actuatable handle is actuated by controllably moving one or both of the first and second movers toward each other to generate an actuating force on the actuatable handle thereby causing relative motion between the actuatable handle and the magnetic body of the first mover.
5xxx. A method for taking a workpiece out of a storage device, the method comprising:
  providing a work body comprising a plurality of electrically conductive elements and a work body working surface;
  providing a mover comprising a first magnetic body comprising a plurality of magnets;

providing a controller configured to generate at least one current reference signal;

providing a current generator configured to generate a plurality of electrical currents conducted by the at least one of the plurality of electrically conductive elements in response to receiving the at least one current reference command signal; and the plurality of electrical current causes the first magnetic body to experience a first at least two independent force and causes the second magnetic body to experience a second at least two independent force;

wherein the at least one current reference command signal is configured to cause the at least one current generator to generate current such that:

the first at least two independent forces comprises at least a first magnetic body's first force in a first work body direction parallel to the work body working surface and a first magnetic body's second force in a second work body direction parallel to the work body working surface; and wherein the first work body direction is not parallel with the second work body direction; and wherein the first and second work body directions are parallel with the work body working surface;

wherein the work body working surface separates the work body's electrically conductive elements from the magnetic body; and wherein the mover comprises an elastic gripper with deformable prongs, controlling the mover to controllably move the gripper in the first work body direction towards the workpiece in the storage device to thereby grab the workpiece;

after grabbing the workpiece, controlling the mover to controllably move the gripper in the second work body direction to thereby take the workpiece out of the storage device.

6a. A magnetic movement apparatus comprising:
at least one mover comprising:
a plurality of magnetic bodies comprising at least a first and a second magnetic body,
a work body comprising:
a plurality of electrically conductive elements; and
a working surface configured to support the at least one mover;
wherein at least one of the plurality of electrically conductive elements is configured to conduct electric current to produce one or more magnetic fields.
a mechanical link mechanically linking at least the first and second magnetic bodies;
wherein each magnetic body in the plurality of magnetic bodies comprising at least one magnet array comprising a plurality of magnetization elements configured to cause the at least one mover to experience one or more forces when at least one of the plurality of magnetization elements interacts with the one or more magnetic fields such that at least the first and second magnetic bodies move relative to each other; and
wherein the working surface separates the plurality of electrically conductive elements from the at least one mover; and
wherein the one or more magnetic fields is configured to cause the first magnetic body to experience at least two first independently controllable forces in non-parallel directions generally parallel with the working surface, when the first magnetic body interacts with the one or more magnetic fields.

6b. The magnetic movement apparatus of clause 6a,
wherein the mechanical link constrains relative movement between the first and second magnetic bodies in one or more linear or rotational directions.

6c. The magnetic movement apparatus of clause 6b, wherein the mechanical link constrains relative movement of the first and second magnetic bodies in at least one linear direction of the one or more linear or rotational directions.

6d. The magnetic movement apparatus of clause 6c, wherein the mechanical link constrains relative movement between the first and second magnetic bodies in at least two linear directions of the one or more linear or rotational directions.

6e. The magnetic movement apparatus of any one of clauses 6b to 6d, wherein the mechanical link constrains relative movement between the first and second magnetic bodies in at least one rotational direction of the one or more linear or rotational directions.

6f. The magnetic movement apparatus of clause 6e, wherein the mechanical link constrains relative movement between the first and second magnetic bodies in at least two rotational directions of the one or more linear or rotational directions.

6g. The magnetic movement apparatus of any one of clauses 6b to 6f, wherein the mechanical link constrains relative movement between the first and second magnetic bodies in at least five linear or rotational directions.

6h. The magnetic movement apparatus of any one of clauses 6b to 6g, wherein:
the mechanical link comprises at least a first slider and a first guide rail; and
the first guide rail is rigidly attached to one of the first and second magnetic bodies, and the first slider is rigidly attached to the other of the first and second magnetic bodies; and
the engagement between the first slider and the first guide rail constrains their relative motion in 5 degrees of freedom.

6i. The magnetic movement apparatus of any one of clauses 6b to 6h, wherein
the mechanical link comprises a hinge comprising a first axle and a first brace;
wherein the first axle is rigidly attached to one of the first and second magnetic bodies, and the first brace is rigidly attached the other of the first and second magnetic bodies.

6j. The magnetic movement apparatus of any one of clauses 6b to 6i, wherein the mechanical link further comprises at least one resiliently deformable component.

6k. The magnetic movement apparatus of any one of clauses 6a to 6j, wherein the at least one mover further comprises at least one actuator configured to actuate in response to the relative movement between the first and second magnetic bodies.

6l. The magnetic movement apparatus of clause 6k, wherein the at least one mover further comprises a vacuum-generating pump, and wherein the at least one actuator is configured to activate the vacuum generation pump.

6m. The magnetic movement apparatus of any one of clauses 6a to 6l, wherein the at least one mover further comprises an end effector configured to generate an end effect in response to the relative movement between the first and second magnetic bodies.

6n. The magnetic movement apparatus of clause 6m, wherein the end effector comprises at least two members configured to generate a gripping force between opposing gripping surfaces of the at least two members.

6o. The magnetic movement apparatus of any one of clauses 6a to 6n, wherein the working surface is a plane.

6p. The magnetic movement apparatus of any one of clauses 6a to 6o, further comprising:
at least one controller configured to generate at least one current reference command signal at least partially based on positions of the plurality of magnetic bodies relative to the work body; and
at least one current generator configured to generate the electrical current conducted by the at least one of the plurality of electrically conductive elements in response to receiving the at least one current reference command signal;
wherein the electrical current causes the first magnetic body to experience a first at least two independently controllable forces and causes the second magnetic body to experience a second at least one independently controllable force.

6q. The magnetic movement apparatus of clause 6p, wherein:
the at least one current reference command signal is configured to cause the at least one current generator to generate current such that:
the first at least two independently controllable forces comprise at least one force in a first direction parallel to the working surface, and at least one force in a second direction parallel to the working surface and not parallel with the first direction; and
the second at least one independently controllable force comprises at least one force in the first direction.

6r. The magnetic movement apparatus of clause 6q, wherein the first direction is orthogonal to the second direction.

6s. The magnetic movement apparatus of clause 6q or 6r, when ultimately dependent on clause 6b, wherein the mechanical link is configured to move in response to the forces imparted on the first and second magnetic bodies due to the electric current.

6t. The magnetic movement apparatus of any one of clauses 6a to 6s, wherein the mechanical link further comprises a linkage body, and wherein the second at least one independently controllable force comprises at least one force in the second direction.

6u. The magnetic movement apparatus of any one of clauses 6q to 6t, when ultimately dependent on clause 6b, wherein the mechanical link is configured to cause the linkage body to move in at least the first direction and a third direction normal to the working surface.

6v. A magnetic movement apparatus according clause 6u wherein the controller is configured to control movement of the linkage body in the first direction at least partially based on the controllable force experienced by the first magnetic body in the first direction, and the controllable force experienced by the second magnetic body in the first direction.

6w. The magnetic movement apparatus of clause 6u or 6v, wherein the mechanical link is configured to cause the linkage body to move in the third direction in response to relative movement between the at least two mechanically linked magnetic bodies in the first direction, wherein the linkage body has a range of movement in the third direction larger than the range of movement of the at least two mechanically linked magnetic bodies in the third direction.

6x. A magnetic movement apparatus according to any one of clauses 6u to 6w wherein the controller is configured to control the movement of the linkage body in the third direction at least partially based on the controllable force experienced by the first magnetic body in the first direction, and the controllable force experienced by the second magnetic body in the first direction.

6y. The magnetic movement apparatus of any one of clauses 6u to 6x, wherein the mechanical link is configured to cause the linkage body to be controllably moved in the first direction independently from the third direction.

6z. The magnetic movement apparatus of any one of clauses 6q to 6y, when ultimately dependent on clause 6b, wherein the mechanical link is further configured to cause the linkage body to be controllably moved in the second direction independently from movement in any other direction.

6aa. The magnetic movement apparatus of clause 6z, wherein the controller is configured to control movement of the linkage body in the second direction at least partially based on the positions of the first and second magnetic bodies in the second direction.

6bb. A magnetic movement apparatus according to clause 6z or 6aa, wherein the controller is configured to control movement of the linkage body in the second direction at least partially based on the controllable force experienced by the first magnetic body in the second direction, and the controllable force experienced by the second magnetic body in the second direction.

6cc. A magnetic movement apparatus according to any one of clauses 6z to 6bb wherein the controller is configured to control the movement of the linkage body in the second direction at least partially based on a weighted sum of the positions of the first and second magnetic bodies relative to the second direction.

6dd. A magnetic movement apparatus according to any one of clauses 6u to 6cc wherein the mechanical link is further configured to cause the linkage body to controllably move in at least a sixth rotational direction having an axis of rotation in the third direction, independently of movement of the mechanical link in the first, second, and third directions.

6ee. A magnetic movement apparatus according to clause 6dd wherein the controller is configured to control movement of the linkage body in the sixth rotational direction at least partially based on the positions of the first and second magnetic bodies in the second direction.

6ff. A magnetic movement apparatus according to clause 6dd or 6ee wherein the controller is configured to control movement of the linkage body in the sixth rotational direction at least partially based on the position of the first magnetic body's position in the sixth rotational direction.

6gg. A magnetic movement apparatus according to any one of clauses 6dd to 6ff wherein the controller is configured to control movement of the linkage body in the sixth rotational direction at least partially based on the controllable force experienced by the first magnetic body in the second direction, and the controllable force experienced by the second magnetic body in the second direction.

6hh. A magnetic movement apparatus according to any one of clauses 6dd to 6gg wherein the controller is configured to control movement of the linkage body in the sixth rotational direction at least partially based on a scaled difference between the positions of the first and second magnetic bodies in the second direction.

6ii. A magnetic movement apparatus according to any one of clauses 6u to 6hh wherein the mechanical link is further configured to cause the linkage body to controllably move in a fourth rotational direction having an axis of rotation in the first direction, independently of movement of the linkage body in the first, second, third, and sixth directions.

6jj. A magnetic movement apparatus according to clause 6ii wherein the controller is configured to control the movement of the linkage body in the fourth rotational direction at least partially based on the position of the first and second magnetic bodies in the fourth rotational direction.

6kk. A magnetic movement apparatus according to clause 6ii or 6jj wherein the controller is configured to control movement of the mechanical link in the fourth rotational direction at least partially based on a weighted sum of the positions of the first and second magnetic bodies in the fourth rotational direction.

6ll. A magnetic movement apparatus according to any one of clauses 6u to 6kk wherein the mechanical link is further configured to cause the linkage body to controllably move in a fifth rotational direction having an axis of rotation in the second direction, independently of movement of the mechanical link in the first, second, third, fourth, and sixth directions.

6mm. A magnetic movement apparatus according to clause 6ll wherein the controller is configured to control the movement of the linkage body in the fifth rotational direction at least partially based on the position of the first and second magnetic bodies in the third direction.

6nn. A mobile apparatus according to clause 6ll or 6mm wherein the controller is configured to control the movement of the linkage body in the fifth rotational direction at least partially based on the position of the first magnetic body in the fifth rotational direction.

6oo. The magnetic movement apparatus of any one of clauses 6a to 6nn, wherein:
the first magnetic body comprises a first magnet array comprising a first plurality of magnetization segments linearly elongated in a first elongation direction each having a magnetization direction, and a second magnet array comprising a second plurality of magnetization segments linearly elongated in a second elongation direction each having a magnetization direction; and
the second magnetic body comprises a third magnet array comprising a third plurality of magnetization segments linearly elongated in the first elongation direction each having a magnetization direction; and
wherein in each of the first, second, and third pluralities of magnetization segments, at least two magnetization segments have different magnetization directions; and
wherein the first elongation direction is different from the second elongation direction.

6pp. The magnetic movement apparatus of clause 6oo, wherein the first elongation direction is orthogonal to the second elongation direction.

6qq. The magnetic movement apparatus of clause 6oo or 6pp, wherein
the second magnetic body further comprises a fourth magnet array comprising a fourth plurality of magnetization segments linearly elongated in the second elongation direction each having a magnetization direction; and
wherein at least two of the fourth plurality of magnetization segments have different magnetization directions.

6rr. The magnetic movement apparatus of clause 6qq, wherein the second and fourth magnet arrays overlap with each other in the first elongation direction, the length of overlap is greater than 85% of each of the second and fourth magnet arrays' dimension in the second elongation direction.

6ss. The magnetic movement apparatus of any one of clauses 6oo to 6rr, when ultimately dependent on clause 6p, wherein:
the at least one current reference command signal is configured to cause the at least one current generator to generate current such that:
the first at least two independently controllable force comprises a first at least one force in the second elongation direction generated by the interaction between the first magnet array and the electrical current and a second at least one force in the first elongation direction generated by the interaction between the second magnet array and the electrical current; and
the second at least one independently controllable force comprises a third at least one force in the second elongation direction generated by the interaction between the third magnet array and the electrical current.

6tt. The magnetic movement apparatus of any one of clauses 6oo to 6ss, when ultimately dependent on clause 6b, wherein the controller is configured to controllably move the linkage body in at least one rotational direction having an axis normal to the working surface at least partially based on the difference between positions of the first and third magnet arrays in the second direction.

6uu. The magnetic movement apparatus of any one of clauses 6oo to 6tt, when ultimately dependent on clause 6b, wherein the controller is configured to controllably move the linkage body in the second direction at least partially based on a weighted sum of the positions of the first and third magnet arrays relative to the second direction.

6vv. The magnetic movement apparatus of any one of clauses 6oo to 6uu, wherein the at least one current reference command signal is configured to cause the at least one current generator to generate current such that the second at least one independent force further comprises a fourth at least one force in the first direction in response to interaction between the fourth magnet array and the electrical current.

6ww. The magnetic movement apparatus of clause 6vv, wherein the controller is configured to controllably move the linkage body at least partially based on the second at least one force and the fourth at least one force.

6xx. A magnetic movement apparatus according to any one of clauses 6b to 6nn, when ultimately dependent on clause 6b, wherein the mechanical link further comprises:
a first at least one connector connecting the first magnetic body to the linkage body; and
a second at least one connector connecting the second magnetic body to the linkage body;

6yy. The magnetic movement apparatus of clause 6xx, wherein:
the first at least one connector is coupled to the linkage body via a first at least one linkage hinge, and coupled to the first magnetic body via a first at least one body hinge; and
the second at least one connector is coupled to the linkage body via a second at least one linkage hinge, and coupled to the second magnetic body via a second at least one body hinge.

6zz. The magnetic movement apparatus of clause 6yy further comprising a first at least one resiliently deformable component connecting the first at least one connector and the linkage body.

6aaa. The magnetic movement apparatus of clause 6yy or 6zz, wherein:
the first at least one connector comprises a first gear with its axis of rotation concentric with the axis of rotation of the first at least one linkage hinge; and
the second at least one connector comprises a second gear with its axis of rotation concentric with the second at least one axis hinge;
wherein the first at least one connector and the second at least one connector are further linked by the engagement between the first gear and the second gear.

6bbb. A magnetic movement apparatus according to any one clauses 6yy to 6aaa wherein each of the first and second linkage hinges comprises:
a T-shaped axle attached to a respective one of the first and second at least one connectors; and
a hinge bracket attached to the linkage body.

6ccc. A magnetic movement apparatus according to any one of clauses 6yy to 6bbb wherein the axes of rotation of the first and second at least one body hinges are respectively parallel to the axes of rotation of the first and second at least one linkage hinges.

6ddd. A magnetic movement apparatus according to any one of clauses 6yy to 6ccc wherein the first at least one body hinge comprises a first two-axes hinge, and the second at least one body hinge comprises a second two-axes hinge.

6eee. A magnetic movement apparatus according to clause 6ddd wherein:
the first two-axes hinge comprises a first perpendicular hinge, a first hinge body, and a first parallel hinge; and
the second two-axes hinge comprises a second perpendicular hinge, a second hinge body, and a second parallel hinge; and
wherein the first magnetic body is linked to the first hinge body via the first perpendicular hinge, and wherein the first at least one connector is linked to the first hinge body via the first parallel hinge; and
wherein the second magnetic body is linked to the second hinge body by the second perpendicular hinge, and the second at least one connector is linked to the second hinge body by the second parallel hinge.

6fff. A magnetic movement apparatus according to clause 6eee wherein the axis of rotation of the first perpendicular hinge is perpendicular to the working surface.

6ggg. A magnetic movement apparatus according to any one of clauses 6eee or 6fff wherein the axis of rotation of the first parallel hinge is parallel to the working surface.

6hhh. A magnetic movement apparatus according to clause 6n, wherein the at least two members comprise at least one resiliently deformable prong operable to hold an object.

6iii. A magnetic movement apparatus comprising:
at least one mover each comprising a magnetic body, the at least one mover comprising a first mover,
a work body comprising:
a plurality of electrically conductive elements; and
a working surface configured to support the at least one mover;
a first rotatable body comprising a first engagement body, the first rotatable body attached to the magnetic body of the first mover, wherein the rotatable body and the magnetic body of the first mover are configured to rotate relative to each other around an axis of rotation; and
a second engagement body;
wherein at least one of the plurality of electrically conductive elements is configured to conduct electric current to produce one or more magnetic fields.
wherein the magnetic body of each of the at least one mover comprising at least one magnet array comprising a plurality of magnetization elements is configured to correspondingly cause each of the at least one mover to experience one or more forces when the at least one of the plurality of magnetization elements interacts with the one or more magnetic fields; and
wherein the working surface separates the plurality of electrically conductive elements from the at least one mover; and
wherein the first and second engagement bodies are configured to be detachably coupled at least partially based on movement of the first mover; and
wherein the one or more magnetic fields is configured to cause the first mover to experience at least two first independently controllable forces in non-parallel directions generally parallel with the working surface, when the first mover's magnetic body interacts with the one or more magnetic fields.

6jjj. The magnetic movement apparatus of clause 6iii, wherein the second engagement body is stationary.

6kkk. The magnetic movement apparatus of clause 6iii, wherein the at least one mover further comprises a second mover and the second engagement body is attached to the magnetic body of the second mover.

6lll. The magnetic movement apparatus of any one of clauses 6hhh to 6kkk, wherein the first and second engagement bodies are configured to be detachably coupled at least partially based on the relative movement between the first and second movers.

6mmm. The magnetic movement of any one of clauses 6iii to 6lll, wherein the first engagement body is an engagement fork, and the second engagement body is an engagement pin, wherein the engagement fork is configured to receive the engagement pin.

6nnn. The magnetic movement apparatus of any one of clauses 6iii to 6lll, wherein the first engagement body is an engagement gear, and the second engagement body is an engagement rack, wherein the engagement gear and the engagement rack are configured to mate with each other.

6ooo. The magnetic movement apparatus of any one of clauses 6iii to 6lll, wherein the first engagement body comprises an engagement cylinder comprising an outer surface and a plurality of first magnetic field generators on the outer surface configured to generate alternating magnetic fields, and the second engagement body comprises plurality of second magnetic field generators configured to generate alternating magnetic fields, such that the first and second engagement bodies are configured to be detachably magnetically coupled to each other.

6ppp. The magnetic movement apparatus of any one of clauses 6iii to 6ooo wherein when the engagement bodies arc detachably coupled, the relative movement between the first mover and second engagement body is configured to rotate the rotatable body.

6qqq. The magnetic movement apparatus of any one of clauses 6iii to 6ppp wherein the first mover further comprises a latching mechanism with at least two lockable positions configured to hold the rotatable body in one of at least two corresponding relative positions relative to its axis of rotation.

6rrr. The magnetic movement apparatus of any one of clauses 6iii to 6qqq, wherein the first mover further comprises:

a multi-stable mechanism configured to be in one of at least two locally minimum energy states; and an actuatable handle, wherein relative movement between the actuatable handle and the magnetic body of the first mover is configured to change the multi stable mechanism from one of the at least two locally minimum energy states to another.

6sss. The magnetic movement apparatus of clause of 6rrr wherein the actuatable handle is actuated by controllably moving the first mover toward a pushing feature to generate an actuating force on the actuatable handle thereby causing relative movement between the actuatable handle and the magnetic body of the first mover.

6ttt. The magnetic movement apparatus of clause 6rrr wherein the pushing feature is stationary.

6uuu. The magnetic movement apparatus of clause of 6rrr wherein the actuatable handle is actuated by controllably moving one or both of the first and second movers toward each other to generate an actuating force on the actuatable handle thereby causing relative movement between the actuatable handle and the magnetic body of the first mover.

6vvv. A method of controlling movement of a mobile apparatus comprising a plurality of magnetic bodies each comprising a plurality of magnets, the method comprising:
 causing a first one of the plurality of magnetic bodies mechanically linked to a second one of the plurality of magnetic bodies to move relative to the second magnetic body in response to modulating at least one magnetic field within a range of the first magnetic body.

6www. A linkage apparatus comprising:
 a first at least one gear associated with a first magnetic field; and
 a second at least one gear;
 wherein the first and second at least one gears are configured to be detachably coupled to one another in response to magnetic interaction between the first magnetic field and the second at least one gear.

6xxx. A linkage apparatus of clause 6www wherein
 the first at least one gear comprised a first left hand helical gear and a first right hand helical gear; and
 the first left and right hand helical gears share the same axis of rotation; and
 the second at least one gear comprised a second left hand helical gear and a second right hand helical gear; and
 the second left and right hand helical gears share the same axis of rotation.

6yyy. A linkage apparatus of clause 6xxx further comprises a magnet placed between the first left and right hand helical gear producing the first magnetic field;

6zzz. A linkage apparatus of any one of clauses 6xxx to 6yyy, wherein the first left hand gear are engaged with the second right hand helical gear, and the first right hand gear is engaged with the second left hand helical gear when the first and second at least one gear are detachably coupled.

6aaaa. A method of detachably coupling a first at least one gear to a second at least one gear, the method comprising:
 causing a first at least one gear associated with a first magnetic field to detachably couple to a second at least one gear in response to magnetic interaction between the first magnetic field and the second at least one gear.

6bbbb. An apparatus for moving at least one magnetically moveable device, the apparatus comprising:
 a plurality of work bodies, each comprising a work surface upon which the at least one magnetically moveable device is configured to move, wherein each work surface is associated with at least one magnetic field; and
 at least one transfer device comprising a transfer surface upon which the at least one magnetically movable device is configured to move;
 wherein the magnetically movable device is movable between the transfer surface and a work surface of a work body in response to modulating the at least one magnetic field.

6cccc. A method of moving at least one magnetically moveable device, the method comprising:
 in response to modulating a first at least one magnetic field associated with a first work surface of a first work body, causing the at least one magnetically movable device to move from the first work surface to a transfer surface of a transfer device positioned adjacent the first work body;
 after moving the at least one magnetically movable device onto the transfer surface, positioning the transfer device adjacent to a second work body having a second work surface associated with a second at least one work magnetic field; and
 after positioning the transfer device adjacent to the second work body, modulating the second at least one magnetic field to cause the at least one magnetically movable device to move from the transfer surface to the second work surface.

6dddd. An apparatus for controlling movement of at least one magnetically-movable device, the apparatus comprising:
 a work body having a work surface upon which the at least one magnetically-moveable device may move;
 at least one magnetic field modulator;
 at least one sensor configured to:
  detect a current position of the at least one magnetically-movable device relative to the work surface; and
  generate at least one position feedback signal representing the current position of the magnetically-movable device relative to the work surface; and
 at least one controller configured to:
  receive the at least one position feedback signal from the at least one sensor;
  generate at least one magnetic field command signal based on the at least one position feedback signal and a desired position of the magnetically-movable device; and
  transmit the at least one magnetic field command signal to the at least one magnetic field modulator to cause the at least one magnetic field modulator to modulate one or more magnetic fields to move the magnetically-movable device from the current position to the desired position.

6eeee. A method of controlling at least one magnetically-movable device to a desired position relative to a work surface, the method comprising:
 determining a current position of the at least one magnetically-movable device relative to the work surface;
 calculating a difference between the desired position and the current position; and
 based on the difference, modulating at least one magnetic field associated with the work surface to cause the magnetically-movable device to move toward the desired position.

7a. A magnetic movement apparatus comprising:
- at least one mover comprising:
  - a plurality of magnetic bodies comprising at least a first and a second magnetic body,
  - a work body comprising:
    - a plurality of electrically conductive elements; and
    - a working surface configured to support the at least one mover;
    - wherein at least one of the plurality of electrically conductive elements is configured to conduct electric current to produce one or more magnetic fields.
  - a mechanical link mechanically linking at least the first and second magnetic bodies;
  - wherein each magnetic body in the plurality of magnetic bodies comprising at least one magnet array comprising a plurality of magnetization elements configured to cause the at least one mover to experience one or more forces when at least one of the plurality of magnetization elements interacts with the one or more magnetic fields such that at least the first and second magnetic bodies move relative to each other; and
  - wherein the working surface separates the plurality of electrically conductive elements from the at least one mover; and
  - wherein the first magnetic body configured to cause the first magnetic body to experience at least two first independently controllable forces in non-parallel directions generally parallel with the working surface, when the first magnetic body interacts with the one or more magnetic fields.

7b. The magnetic movement apparatus of clause 7a,
- wherein the mechanical link constrains relative movement between the first and second magnetic bodies in one or more linear or rotational directions.

7c. The magnetic movement apparatus of clause 7b, wherein the mechanical link constrains relative movement of the first and second magnetic bodies in at least one linear direction of the one or more linear or rotational directions.

7d. The magnetic movement apparatus of clause 7c, wherein the mechanical link constrains relative movement between the first and second magnetic bodies in at least two linear directions of the one or more linear or rotational directions.

7e. The magnetic movement apparatus of any one of clauses 7b to 7d, wherein the mechanical link constrains relative movement between the first and second magnetic bodies in at least one rotational direction of the one or more linear or rotational directions.

7f. The magnetic movement apparatus of clause 7e, wherein the mechanical link constrains relative movement between the first and second magnetic bodies in at least two rotational directions of the one or more linear or rotational directions.

7g. The magnetic movement apparatus of any one of clauses 7b to 7f, wherein the mechanical link constrains relative movement between the first and second magnetic bodies in at least five of the one or more linear or rotation directions.

7h. The magnetic movement apparatus of any one of clauses 7b to 7g, wherein:
- the mechanical link comprises at least a first slider and a first guide rail; and
- the first guide rail is rigidly attached to one of the first and second magnetic bodies, and the first slider is rigidly attached to the other of the first and second magnetic bodies; and
- the engagement between the first slider and the first guide rail constrains their relative motion at 5 degrees of freedom.

7i. The magnetic movement apparatus of any one of clauses 7b to 7h, wherein
- the mechanical link comprises a hinge comprising a first axle and a first brace;
- wherein the first axle is rigidly attached to one of the first and second magnetic bodies, and the first brace is rigidly attached the other of the first and second magnetic bodies.

7j. The magnetic movement apparatus of any one of clauses 7b to 7i, wherein the mechanical link further comprises at least one resiliently deformable component.

7k. The magnetic movement apparatus of any one of clauses 7a to 7j, wherein the at least one mover further comprises at least one actuator configured to actuate in response to the relative movement between the first and second magnetic bodies.

7l. The magnetic movement apparatus of clause 7k, wherein the at least one mover further comprises a vacuum-generating pump, and wherein the at least one actuator is configured to activate the vacuum generation pump.

7m. The magnetic movement apparatus of any one of clauses 7a to 7l, wherein the at least one mover further comprises an end effector configured to generate an end effect in response to the relative movement between the first and second magnetic bodies.

7n. The magnetic movement apparatus of clause 7m, wherein the end effector comprises at least two members configured to generate a gripping force between opposing gripping surfaces of the at least two members.

7o. The magnetic movement apparatus of any one of clauses 7a to 7n, wherein the working surface is a plane.

7p. The magnetic movement apparatus of any one of clauses 7a to 7o, further comprising:
- at least one controller configured to generate at least one current reference command signal at least partially based on positions of the plurality of magnetic bodies relative to the work body; and
- at least one current generator configured to generate the electrical current conducted by the at least one of the plurality of electrically conductive elements in response to receiving the at least one current reference command signal;
- wherein the electrical current causes the first magnetic body to experience a first at least two independently controllable forces, and causes the second magnetic body to experience a second at least one independently controllable force.

7q. The magnetic movement apparatus of clause 7p, wherein:
- the at least one current reference command signal is configured to cause the at least one current generator to generate current such that:
  - the first at least two independently controllable forces comprise at least one force in a first direction parallel to the working surface, and at least one force in a second direction parallel to the working surface and not parallel with the first direction; and
  - the second at least one independent force comprises at least one force in the first direction and at least one force in the second direction.

7r. The magnetic movement apparatus of clause 7q, wherein the first direction is orthogonal to the second direction.

7s. The magnetic movement apparatus of clause 7q or 7r, when ultimately dependent on clause 7b, wherein the mechanical link is configured to move in response to the forces imparted on the first and second magnetic bodies due to the electric current.

7t. The magnetic movement apparatus of any one of clauses 7a to 7s, wherein the mechanical link further comprises a linkage body.

7u. The magnetic movement apparatus of any one of clauses 7q to 7s, when ultimately dependent on clause 7b, wherein the mechanical link is configured to cause the linkage body to move in at least the first direction and a third direction normal to the working surface.

7v. A magnetic movement apparatus according clause 7t wherein the controller is configured to control movement of the linkage body in the first direction at least partially based on the at least one force experienced by the first body in the first direction, and the at least one force experienced by the second body in the first direction.

7w. The magnetic movement apparatus of clause 7t or 7v, wherein the mechanical link is configured to cause the linkage body to move in the third direction in response to relative movement between the at least two mechanically linked magnetic bodies in the first direction, wherein the linkage body has a range of motion in the third direction larger than the range of motion of the at least two mechanically linked magnetic bodies in the third direction.

7x. A magnetic movement apparatus according to any one of clauses 7t to 7w wherein the controller is configured to control movement of the linkage body in the third direction at least partially based on the at least one force experienced by the first body in the first direction, and the at least one force experienced by the second body in the first direction.

7y. The magnetic movement apparatus of any one of clauses 7t to 7x, wherein the mechanical link is configured to cause the linkage body to be controllably moved in the first direction independently from the third direction.

7z. The magnetic movement apparatus of any one of clauses 7q to 7y, when ultimately dependent on clause 7b, wherein the mechanical link is further configured to cause the linkage body to be controllably moved in the second direction independently from movement in any other direction.

7aa. The magnetic movement apparatus of clause 7z, wherein the controller is configured to control movement of the linkage body in the second direction at least partially based on the positions of the first and second magnetic bodies in the second direction.

7bb. A magnetic movement apparatus according to clause 7z or 7aa, wherein the controller is configured to control movement of the linkage body in the second direction at least partially based on the at least one force experienced by the first body in the second direction, and the at least one force experienced by the second body in the second direction.

7cc. A magnetic movement apparatus according to any one of clauses 7z to 7bb wherein the controller is configured to control the movement of the linkage body in the second direction at least partially based on a weighted sum of the positions of the first and second magnetic bodies relative to the second direction.

7dd. A magnetic movement apparatus according to any one of clauses 7t to 7cc wherein the mechanical link is further configured to cause the linkage body to controllably move in at least a sixth rotational direction having an axis of rotation in the third direction, independently of movement of the mechanical link in the first, second, and third directions.

7ee. A magnetic movement apparatus according to clause 7dd wherein the controller is configured to control movement of the linkage body in the sixth rotational direction at least partially based on the positions of the first and second magnetic bodies in the second direction.

7ff. A magnetic movement apparatus according to clause 7dd or 7ee wherein the controller is configured to control movement of the linkage body in the sixth rotational direction at least partially based on the position of the first magnetic body's position in the sixth rotational direction.

7gg. A magnetic movement apparatus according to any one of clauses 7dd to 7ff wherein the controller is configured to control movement of the linkage body in the sixth rotational direction at least partially based on the at least one force experienced by the first body in the second direction, and the at least one force experienced by the second body in the second direction.

7hh. A magnetic movement apparatus according to any one of clauses 7dd to 7gg wherein the controller is configured to control movement of the linkage body in the sixth rotational direction at least partially based on a scaled difference between the positions of the first and second magnetic bodies in the second direction.

7ii. A magnetic movement apparatus according to any one of clauses 7t to 7hh wherein the mechanical link is further configured to cause the linkage body to controllably move in a fourth rotational direction having an axis of rotation in the first direction, independently of movement of the linkage body in the first, second, third, and sixth directions.

7jj. A magnetic movement apparatus according to clause 7ii wherein the controller is configured to control the movement of the linkage body in the fourth rotational direction at least partially based on the position of the first and second magnetic bodies in the fourth rotational direction.

7kk. A magnetic movement apparatus according to clause 7ii or 7jj wherein the controller is configured to control movement of the mechanical link in the fourth rotational direction at least partially based on a weighted sum of the positions of the first and second magnetic bodies in the fourth rotational direction.

7ll. A magnetic movement apparatus according to any one of clauses 7t to 7kk wherein the mechanical link is further configured to cause the linkage body to controllably move in a fifth rotational direction having an axis of rotation in the second direction, independently of movement of the mechanical link in the first, second, and third directions.

7mm. A magnetic movement apparatus according to clause 7ll wherein the controller is configured to control the movement of the linkage body in the fifth rotational direction at least partially based on the position of the first and second magnetic bodies in the third direction.

7nn. A magnetic movement apparatus according to clause 7ll or 7mm wherein the controller is configured to control the movement of the linkage body in the fifth rotational direction at least partially based on the position of the first magnetic body in the fifth rotational direction.

7oo. The magnetic movement apparatus of any one of clauses 7a to 7nn, wherein:
the first magnetic body comprises a first magnet array comprising a first plurality of magnetization segments linearly elongated in a first elongation direction each having a magnetization direction, and a second magnet array comprising a second plurality of magnetization segments linearly elongated in a second elongation direction each having a magnetization direction; and the second magnetic body comprises a third magnet array comprising a third plurality of magnetization segments linearly elongated in the first elongation direction each having a magnetization direction;

wherein in each of the first, second, and third pluralities of magnetization segments, at least two magnetization segments have different magnetization directions; and wherein the first elongation direction is different from the second elongation direction.

7pp. The magnetic movement apparatus of clause 7oo, wherein the first elongation direction is orthogonal to the second elongation direction.

7qq. The magnetic movement apparatus of clause 7oo or 7pp, wherein
the second magnetic body further comprises a fourth magnet array comprising a fourth plurality of magnetization segments linearly elongated in the second elongation direction each having a magnetization direction;
wherein at least two of the fourth plurality of magnetization segments have different magnetization directions.

7rr. The magnetic movement apparatus of clause 7qq, wherein the second and fourth magnet arrays overlap with each other in the first elongation direction, the length of overlap is greater than 85% of each of the second and fourth magnet arrays' dimension in the second elongation direction.

7ss. The magnetic movement apparatus of clause 7qq, wherein the second and fourth magnet arrays overlap with each other in the first elongation direction, and the first and third magnet arrays overlap with each other in the second elongation direction.

7tt. The magnetic movement apparatus of any one of clauses 7oo to 7ss, when ultimately dependent on clause 7p, wherein:
the at least one current reference command signal is configured to cause the at least one current generator to generate current such that:
the first at least one independent force comprises a first at least one force in the second elongation direction generated by the interaction between the first magnet array and the electrical current and a second at least one force in the first elongation direction generated by the interaction between the second magnet array and the electrical current; and
the second at least one independent force comprises a third at least one force in the second elongation direction generated by the interaction between the third magnet array and the electrical current.

7uu. The magnetic movement apparatus of any one of clauses 7oo to 7tt, when ultimately dependent on clause 7b, wherein the controller is configured to controllably move the linkage body in at least one rotational direction having an axis normal to the working surface at least partially based on the difference between positions of the first and third magnet arrays in the second direction.

7vv. The magnetic movement apparatus of any one of clauses 7oo to 7uu, when ultimately dependent on clause 7b, wherein the controller is configured to controllably move the linkage body in the second direction at least partially based on a weighted sum of the positions of the first and third magnet arrays relative to the second direction.

7ww. The magnetic movement apparatus of any one of clauses 7oo to 7vv, wherein the at least one current reference command signal is configured to cause the at least one current generator to generate current such that the second at least one independent force further comprises a fourth at least one force in the first direction in response to interaction between the fourth magnet array and the electrical current.

7xx. The magnetic movement apparatus of clause 7ww, wherein the controller is configured to controllably move the linkage body at least partially based on the second at least one force and the fourth at least one force.

7yy. A magnetic movement apparatus according to any one of clauses 7b to 7xx, when ultimately dependent on clause 7b, wherein the mechanical link further comprises:
a first at least one connector connecting the first magnetic body to the linkage body; and
a second at least one connector connecting the second magnetic body to the linkage body;

7zz. The magnetic movement apparatus of clause 7yy, wherein:
the first at least one connector is coupled to the linkage body via a first at least one linkage hinge, and coupled to the first magnetic body via a first at least one body hinge; and
the second at least one connector is coupled to the linkage body via a second at least one linkage hinge, and coupled to the second magnetic body via a second at least one body hinge.

7aaa. The magnetic movement apparatus of clause 7zz further comprising a first at least one resiliently deformable component connecting the first at least one connector and the linkage body.

7bbb. The magnetic movement apparatus of clause 7zz or 7aaa, wherein:
the first at least one connector comprises a first gear with its axis of rotation concentric with the axis of rotation of the first at least one linkage hinge; and
the second at least one connector comprises a second gear with its axis of rotation concentric with the second at least one axis hinge;
wherein the first at least one connector and the second at least one connector are further linked by the engagement between the first gear and the second gear.

7ccc. A magnetic movement apparatus according to any one clauses 7zz to 7bbb wherein each of the first and second linkage hinges comprises:
a T-shaped axle attached to a respective one of the first and second at least one connectors; and
a hinge bracket attached to the linkage body.

7ddd. A magnetic movement apparatus according to any one of clauses 7zz to 7ccc wherein the axes of rotation of the first and second at least one body hinges are respectively parallel to the axes of rotation of the first and second at least one linkage hinges.

7eee. A magnetic movement apparatus according to any one of clauses 7zz to 7ddd wherein the first at least one body hinge comprises a first two-axes hinge, and the second at least one body hinge comprises a second two-axes hinge.

7fff. A magnetic movement apparatus according to clause 7eee wherein:
the first two-axes hinge comprises a first perpendicular hinge, a first hinge body, and a first parallel hinge; and
the second two-axes hinge comprises a second perpendicular hinge, a second hinge body, and a second parallel hinge; and
wherein the first magnetic body is linked to the first hinge body via the first perpendicular hinge, and wherein the first at least one connector is linked to the first hinge body via the first parallel hinge; and
wherein the second magnetic body is linked to the second hinge body by the second perpendicular hinge, and the second at least one connector is linked to the second hinge body by the second parallel hinge.

7ggg. A magnetic movement apparatus according to clause 7fff wherein the axis of rotation of the first perpendicular hinge is perpendicular to the working surface.

7hhh. A magnetic movement apparatus according to any one of clauses 7fff or 7ggg wherein the axis of rotation of the first parallel hinge is parallel to the working surface.

7iii. A magnetic movement apparatus according to clause 7n, wherein the at least two members comprise at least one resiliently deformable prong operable to hold an object.

7jjj. A magnetic movement apparatus comprising:
at least one mover each comprising a magnetic body, the at least one mover comprising a first mover,
a work body comprising:
a plurality of electrically conductive elements; and
a working surface configured to support the at least one mover;
a first rotatable body comprising a first engagement body, the first rotatable body attached to the magnetic body of the first mover, wherein the rotatable body and the magnetic body of the first mover are configured to rotate relative to each other around an axis of rotation; and
a second engagement body;
wherein at least one of the plurality of electrically conductive elements is configured to conduct electric current to produce one or more magnetic fields.
wherein the magnetic body of each of the at least one mover comprising at least one magnet array comprising a plurality of magnetization elements is configured to correspondingly cause each of the at least one mover to experience one or more forces when the at least one of the plurality of magnetization elements interacts with the one or more magnetic fields; and
wherein the working surface separates the plurality of electrically conductive elements from the at least one mover; and
wherein the first and second engagement bodies are configured to be detachably coupled at least partially based on movement of the first mover.

7kkk. The magnetic movement apparatus of clause 7jjj, wherein the second engagement body is stationary.

7lll. The magnetic movement apparatus of clause 7jjj, wherein the at least one mover further comprises a second mover and the second engagement body is attached to the magnetic body of the second mover.

7mmm. The magnetic movement apparatus of any one of clauses 7iii to 7lll, wherein the first and second engagement bodies are configured to be detachably coupled at least partially based on the relative movement between the first and second movers.

7nnn. The magnetic movement of any one of clauses 7jjj to 7mmm, wherein the first engagement body is an engagement fork, and the second engagement body is an engagement pin, wherein the engagement fork is configured to receive the engagement pin.

7ooo. The magnetic movement apparatus of any one of clauses 7jjj to 7mmm, wherein the first engagement body is an engagement gear, and the second engagement body is an engagement rack, wherein the engagement gear and the engagement rack are configured to mate with each other.

7ppp. The magnetic movement apparatus of any one of clauses of 7jjj to 7mmm, wherein the first engagement body comprises an engagement cylinder comprising an outer surface and a plurality of first magnetic field generators on the outer surface configured to generate alternating magnetic fields, and the second engagement body comprises plurality of second magnetic field generators configured to generate alternating magnetic fields, such that the first and second engagement bodies are configured to be detachably magnetically coupled to each other.

7qqq. The magnetic movement apparatus of any one of clauses 7jjj to 7ppp wherein when the engagement bodies are detachably coupled, the relative movement between the first mover and the second engagement body is configured to rotate the rotatable body.

7rrr. The magnetic movement apparatus of any one of clauses 7jjj to 7qqq wherein the first mover further comprises a latching mechanism with at least two lockable positions configured to hold the rotatable body in one of at least two corresponding relative positions relative to its axis of rotation.

7sss. The magnetic movement apparatus of any one of clauses 7jjj to 7rrr, wherein the first mover further comprises:
a multi-stable mechanism configured to be in one of at least two locally minimum energy states; and
an actuatable handle, wherein relative motion between the actuatable handle and the magnetic body of the first mover is configured to change the multi stable mechanism from one of the at least two locally minimum energy states to another.

7ttt. The magnetic movement apparatus of clause of 7sss wherein the actuatable handle is actuated by controllably moving the first mover toward a pushing feature to generate an actuating force on the actuatable handle thereby causing relative motion between the actuatable handle and the magnetic body of the first mover.

7uuu. The magnetic movement apparatus of clause 7sss wherein the pushing feature is stationary.

7vvv. The magnetic movement apparatus of clause of 7sss wherein the actuatable handle is actuated by controllably moving one or both of the first and second movers toward each other to generate an actuating force on the actuatable handle thereby causing relative motion between the actuatable handle and the magnetic body of the first mover.

7www. A method of controlling movement of a magnetic movement apparatus comprising a plurality of magnetic bodies each comprising a plurality of magnets, the method comprising:
causing a first one of the plurality of magnetic bodies mechanically linked to a second one of the plurality of magnetic bodies to move relative to the second magnetic body in response to modulating at least one magnetic field within a range of the first magnetic body.

7xxx. A linkage apparatus comprising:
a first at least one gear associated with a first magnetic field; and
a second at least one gear;
wherein the first and second at least one gears are configured to be detachably coupled to one another in response to magnetic interaction between the first magnetic field and the second at least one gear.

7yyy. A linkage apparatus of clause 7xxx wherein
the first at least one gear comprised a first left hand helical gear and a first right hand helical gear; and
the first left and right hand helical gears share the same axis of rotation; and the second at least one gear comprised a second left hand helical gear and a second right hand helical gear; and the second left and right hand helical gears share the same axis of rotation.

7zzz. A linkage apparatus of clause 7yyy further comprises a magnet placed between the first left and right hand helical gear producing the first magnetic field;

7aaaa. A linkage apparatus of any one of clauses 7yyy to 7zzz, wherein the first left hand gear are engaged with the second right hand helical gear, and the first right hand gear is engaged with the second left hand helical gear when the first and second at least one gear are detachably coupled.

7bbbb. A method of detachably coupling a first at least one gear to a second at least one gear, the method comprising:
causing a first at least one gear associated with a first magnetic field to detachably couple to a second at least one gear in response to magnetic interaction between the first magnetic field and the second at least one gear.

7cccc. An apparatus for moving at least one magnetically moveable device, the apparatus comprising:
a plurality of work bodies, each comprising a work surface upon which the at least one magnetically moveable device is configured to move, wherein each work surface is associated with at least one magnetic field; and
at least one transfer device comprising a transfer surface upon which the at least one magnetically movable device is configured to move;
wherein the magnetically movable device is movable between the transfer surface and a work surface of a work body in response to modulating the at least one magnetic field.

7dddd. A method of moving at least one magnetically moveable device, the method comprising:
in response to modulating a first at least one magnetic field associated with a first work surface of a first work body, causing the at least one magnetically movable device to move from the first work surface to a transfer surface of a transfer device positioned adjacent the first work body;
after moving the at least one magnetically movable device onto the transfer surface, positioning the transfer device adjacent to a second work body having a second work surface associated with a second at least one work magnetic field; and
after positioning the transfer device adjacent to the second work body, modulating the second at least one magnetic field to cause the at least one magnetically movable device to move from the transfer surface to the second work surface.

7eeee. An apparatus for controlling movement of at least one magnetically-movable device, the apparatus comprising:
a work body having a work surface upon which the at least one magnetically-moveable device may move;
at least one magnetic field modulator;
at least one sensor configured to:
detect a current position of the at least one magnetically-movable device relative to the work surface; and
generate at least one position feedback signal representing the current position of the magnetically-movable device relative to the work surface; and
at least one controller configured to:
receive the at least one position feedback signal from the at least one sensor;
generate at least one magnetic field command signal based on the at least one position feedback signal and a desired position of the magnetically-movable device; and
transmit the at least one magnetic field command signal to the at least one magnetic field modulator to cause the at least one magnetic field modulator to modulate one or more magnetic fields to move the magnetically-movable device from the current position to the desired position.

7ffff. A method of controlling at least one magnetically-movable device to a desired position relative to a work surface, the method comprising:
determining a current position of the at least one magnetically-movable device relative to the work surface;
calculating a difference between the desired position and the current position; and
based on the difference, modulating at least one magnetic field associated with the work surface to cause the magnetically-movable device to move toward the desired position.

Notes on Generality of Language

Throughout this description and accompanying claims, it should be understood that one or more movers may carry one or more objects, such as but not limited to part(s), biological sample(s), device(s), drugs possibly in suitable container(s), product(s) being assembled, raw part(s) or material(s), component(s), to meet the needs of a desired manufacturing purpose. Suitable tooling and/or material feeding mechanisms may be installed or distributed along the sides of work bodies, such as work bodies, or over the work bodies from above, although these may not be shown to avoid obscuring the various embodiments.

While a number of exemplary aspects and embodiments are discussed herein, those of skill in the art will recognize certain modifications, permutations, additions and sub-combinations thereof. For example:

In this description and the accompanying claims, elements (such as, by way of non-limiting example, work bodies, work body layers, electrically conductive element traces, movers, moveable stages, magnetic bodies, magnet arrays, transfer stages, conveyors, and/or transfer devices, for example) may be said to overlap one another in or along a direction. For example, electrically conductive element traces 132, 134 from different work body layers 140, 142 may overlap one another in or along the work body-direction. When it is described that two or more objects overlap in or along the Z-direction, this usage should be understood to mean that a Z-direction-oriented line could be drawn to intersect the two or more objects.

In this description and the accompanying claims, bodies are used to refer to rigid bodies unless otherwise indicated. For example, a first magnetic body, a linkage body, a work body, a second magnetic body are all rigid bodies.

In this description and the accompanying claims, current generators are interchangeably used with (power or current) amplifiers or magnetic field modulators.

In this description and the accompanying claims, when a first body is said to be rigidly attached to a second body, it means that the first body and the second body are connected rigidly to form on integral rigid body.

In many of the drawings and much of the description provided herein, movers are shown as being static with their mover-x, mover-y and mover-z axes being the same as the work body-x, work body-y and work body-z axes of the corresponding work body. This custom is adopted in this disclosure for the sake of brevity and ease of explanation. It will of course be appreciated from this disclosure that a mover may (and may be designed to) move with respect to its work body, in which case the mover-x, mover-y, mover-z axes of the moveable stage may no longer be the same as (or aligned with) the work body-x, work body-y and work body-z axes of its work body. Directions, locations and planes defined in relation to the work body axes may generally be referred to as work body directions, work body locations and work body planes and directions, locations and planes defined in relation to the stage axes may be referred to as mover directions, mover locations and mover planes.

In this description and the accompanying claims, references are made to controlling, controlling the motion of and/or controlling the position of moveable stages, magnetic bodies, or movers in multiple directions or with multiple (e.g. 6) degrees of freedom. Unless the context or the description specifically indicates otherwise, controlling, controlling the motion of and/or controlling the position of movers, magnetic bodies, or moveable stages in multiple directions or with multiple degrees of freedom may be understood to mean applying feedback position control in the multiple degrees of freedom, but does not expressly require that there be motion of such a mover in any such degree of freedom. It should be understood that the number of directions of movement at one time is not limited in any given embodiment beyond what is physically possible; i.e. beyond 6 directions/degrees of freedom of each individual moving body in the X, Y, Z, Rx, Ry, and Rz directions, in addition to any relative movement between any individual moving bodies.

In this description, moveable motion stages, moveable stages, motion stages, and movers may be interchangeably used.

In this description, a "floating" mechanical link means that the whole mechanical link can move relative to the work body during operation of one or more movers so mechanically linked. For example, a floating flexural bearing means the whole flexural bearing is mounted on a moving frame; a floating linear guide bearing means that both the guide rail and the slider on the guide rail are not fixed with the work body frame and can move relative to the work body during operation.

In this description, a controllable force on a magnet array assembly means that by driving properly commutated current through a set of properly selected electrically conductive elements, such as electrically conductive elements, in a work body, such as a work body, a magnetic field force can be generated with amplitude following a desired value in a direction through a plane. A plurality of independently controllable forces means that each of the plurality forces can be generated to follow a command signal independent of the rest of forces, and any two forces of the plurality of forces may not be not collinear in space.

In this description, motion in two in-plane directions/DOF means independent translation motions in two non-parallel directions such as X and Y, for example, both directions being orthogonal to a third direction, such as the Z direction, which is generally the normal direction of the work body top plane.

In this description, motion in three in-plane directions/DOF means independent translation motions in two non-parallel directions (e.g. X and Y), plus rotational motion around Z, where Z is the normal direction of the work body top plane, and both X and Y are orthogonal to the Z direction.

In this description, motion in 6 directions/DOF motions means independent translation/rotational motions in the six X, Y, Z, Rx, Ry, and Rz directions, where X and Y are non-parallel, X, Y, and Z are not coplanar, and Rx, Ry and Rz represent rotation directions around axes of rotation in the X, Y, and Z directions, respectively.

In this description, when saying that a mechanical link linking a plurality of movers doesn't constrain the relative motion among the plurality of movers, this means that the number of directions/DOF of any of the plurality of movers controllable motion does not change whether the mechanical link is installed or not. For example, when it is described that a mechanical link linking three movers (10A, 10B, 10C) together doesn't constrain the relative motion among the three movers, this means the motion directions/DOF of mover 10A is not affected by relative motion of mover 10B and/or 10C, whether the mechanical link is installed or not.

The meaning of that the mechanical link constrains the relative motion between the two magnetic bodies of a mover in a first set of one or more degrees of freedom should be interpreted as:

when the mechanical link is removed from the mover, the two magnetic bodies can move relative to each other in the first set of one or more directions/DOF;

when the mechanical link is installed, the two magnetic bodies cannot move relative to each other in the first set of one or more directions/DOF.

In this description, although one moveable robotic device is shown in many figures, it should be understood that multiple similar or different moveable robotic devices can work together and share a common work body or work body.

In this description, a mover (or a magnetic body) being capable of controllable motion in N-directions/DOF (where N is an integer number) means that by driving suitable currents into suitable electrically conductive elements in the work body to interact with the mover (or the magnetic body) and thereby generating force on the mover (or the magnetic body), the mover's motion in the N-directions/DOF motion (or the magnetic body) can be controlled by controllers in a closed loop, with the aid of suitable position feedback.

In this description, hinge joints, revolute joints, cylindrical joints are interchangeably used, and may each be referred to as hinges throughout.

In this description, although in many places one or more parts are not shown on movers, it will be appreciated by those skilled in the art that each mover may carry one or more parts, components, containers, or the like.

In this description and the accompanying claims, working region of a work body means the planar region where the work body or work body can controllably move a mover by commanding current flowing into the work body electrically conductive elements in one or more degrees of freedom. Working region of a mechanical carrier means the locations where the mechanical carrier can support or guide a mover in one or more degrees of freedom. The overlapping region between a work body working region and a carrier working region means locations where the work body can controllably move a mover in one or more directions/DOF and a carrier can support a mover (or a mover can be supported by the carrier) in one or more DOF. In such region, the mover may be controlled by the work body without the support by the carrier, or the mover may be supported by the carrier without the control by the work body, or the mover is controllably moved in some degrees of freedom and supported by the carrier in some degree of freedom. For example, a mover in the overlapping region may be levitated by work body with 6 directions/DOF motion control without contact to the work body or the mechanical support, and at another time at the same location the mover may land onto the mechanical carrier by turning off current in the work body electrically conductive elements inside the overlapping regions; alternatively, the mover may be supported and guided by a transfer device (X oriented linear guide rail) in five directions/DOF (Y, Z, Rx, Ry, Rz) and the work body may controllably move the mover in one direction/DOF (X direction linear motion).

In this description and the accompanying claims, a mover may be said to be inside a region (working region or overlapping region). When it is described that one or more movers are inside a working region, this usage should be understood to mean that the mover magnet array footprint (projection onto the work body working plane extending in X and Y direction) is inside a working region.

In this description and the accompanying claims, references are made to configurable 2D paths or trajectories. Unless the context or the description specifically indicates otherwise, a configurable 2D path may be understood as a line (straight or curved) inside work body working region with software configurable (modifiable) shape and length. Software configurable means modifiable by a software or a program or a set of parameters using computer hardware. In other words, a configurable 2D path may be configured by software or is generated by software in real-time instead of being defined by mechanical hardware guiding means such as guide rails.

In this description and the accompanying claims, references are made to a mover following a path or trajectory. Unless the context or the description specifically indicates otherwise, a mover following a path may be understood as that the mover reference point's trajectory component on the work body working surface follows the path, where the mover reference point is a point of interest of the mover, such as but not limited to a mover's center of gravity, a mover's geometric center, etc. Trajectory component on the work body working surface is trajectory's projection on the work body working surface.

In this description, controllable motion in N directions or degrees freedom means that there are N independently controllable motion components, where N is any positive number.

In this description and the associated claims, the path and trajectory are interchangeably used.

In this description and the associated claims, motion and movement are interchangeably used.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A magnetic movement apparatus comprising:
at least one mover comprising:
a plurality of magnetic bodies comprising at least a first and a second magnetic body,
a work body comprising:
a plurality of electrically conductive elements; and
a working surface configured to support the at least one mover;
wherein at least one of the plurality of electrically conductive elements is configured to conduct electric current to produce one or more magnetic fields,
a mechanical link mechanically linking at least the first and second magnetic bodies;
wherein each magnetic body in the plurality of magnetic bodies comprising at least one magnet array comprising a plurality of magnetization elements configured to cause the at least one mover to experience one or more forces when at least one of the plurality of magnetization elements interacts with the one or more magnetic fields such that at least the first and second magnetic bodies move relative to each other; and
wherein the working surface separates the plurality of electrically conductive elements from the at least one mover; and
wherein the first magnetic body configured to cause the first magnetic body to experience at least two first independently controllable forces in non-parallel directions generally parallel with the working surface, when the first magnetic body interacts with the one or more magnetic fields.

2. The magnetic movement apparatus of claim 1, wherein the mechanical link constrains relative movement between the first and second magnetic bodies in one or more linear or rotational directions.

3. The magnetic movement apparatus of claim 1, further comprising:
at least one controller configured to generate at least one current reference command signal at least partially based on positions of the plurality of magnetic bodies relative to the work body; and
at least one current generator configured to generate the electrical current conducted by the at least one of the plurality of electrically conductive elements in response to receiving the at least one current reference command signal;
wherein the electrical current causes the first magnetic body to experience a first at least two independently controllable forces, and causes the second magnetic body to experience a second at least one independently controllable force.

4. The magnetic movement apparatus of claim 3, wherein:
the at least one current reference command signal is configured to cause the at least one current generator to generate current such that:
the first at least two independently controllable forces comprise at least one force in a first direction parallel to the working surface, and at least one force in a second direction parallel to the working surface and not parallel with the first direction; and
the second at least one independent force comprises at least one force in the first direction and at least one force in the second direction.

5. The magnetic movement apparatus of claim 4, wherein the mechanical link is configured to move in response to the forces imparted on the first and second magnetic bodies due to the electric current.

6. The magnetic movement apparatus of claim 1, wherein:
the first magnetic body comprises a first magnet array comprising a first plurality of magnetization segments linearly elongated in a first elongation direction each having a magnetization direction, and a second magnet array comprising a second plurality of magnetization segments linearly elongated in a second elongation direction each having a magnetization direction; and
the second magnetic body comprises a third magnet array comprising a third plurality of magnetization segments linearly elongated in the first elongation direction each having a magnetization direction;
wherein in each of the first, second, and third pluralities of magnetization segments, at least two magnetization segments have different magnetization directions; and
wherein the first elongation direction is different from the second elongation direction.

7. The magnetic movement apparatus of claim 6, wherein the second magnetic body further comprises a fourth magnet array comprising a fourth plurality of magnetization segments linearly elongated in the second elongation direction each having a magnetization direction;
wherein at least two of the fourth plurality of magnetization segments have different magnetization directions.

8. The magnetic movement apparatus of claim 4, wherein:
the first magnetic body comprises a first magnet array comprising a first plurality of magnetization segments linearly elongated in a first elongation direction each having a magnetization direction, and a second magnet array comprising a second plurality of magnetization segments linearly elongated in a second elongation direction each having a magnetization direction;
the second magnetic body comprises a third magnet array comprising a third plurality of magnetization segments linearly elongated in the first elongation direction each having a magnetization direction;
in each of the first, second, and third pluralities of magnetization segments, at least two magnetization segments have different magnetization directions;
the first elongation direction is different from the second elongation direction; and
the at least one current reference command signal is configured to cause the at least one current generator to generate current such that:
the first at least one independent force comprises a first at least one force in the second elongation direction generated by the interaction between the first magnet array and the electrical current and a second at least one force in the first elongation direction generated by the interaction between the second magnet array and the electrical current; and
the second at least one independent force comprises a third at least one force in the second elongation direction generated by the interaction between the third magnet array and the electrical current.

9. The magnetic movement apparatus of claim 1, wherein the mechanical link further comprises:
a first at least one connector connecting the first magnetic body to the linkage body; and
a second at least one connector connecting the second magnetic body to the linkage body.

10. The magnetic movement apparatus of claim 9, wherein:
the first at least one connector is coupled to the linkage body via a first at least one linkage hinge, and coupled to the first magnetic body via a first at least one body hinge; and
the second at least one connector is coupled to the linkage body via a second at least one linkage hinge, and coupled to the second magnetic body via a second at least one body hinge.

11. The magnetic movement apparatus of claim 9, wherein:
the first at least one connector comprises a first gear with its axis of rotation concentric with the axis of rotation of the first at least one linkage hinge; and
the second at least one connector comprises a second gear with its axis of rotation concentric with the second at least one axis hinge;
wherein the first at least one connector and the second at least one connector are further linked by the engagement between the first gear and the second gear.

12. The magnetic movement apparatus of claim 10, wherein:
the first at least one body hinge comprises a first perpendicular hinge, a first hinge body, and a first parallel hinge; and
the second at least one body hinge comprises a second perpendicular hinge, a second hinge body, and a second parallel hinge; and
wherein the first magnetic body is linked to the first hinge body via the first perpendicular hinge, and wherein the first at least one connector is linked to the first hinge body via the first parallel hinge; and
wherein the second magnetic body is linked to the second hinge body by the second perpendicular hinge, and the second at least one connector is linked to the second hinge body by the second parallel hinge.

13. A magnetic movement apparatus comprising:
at least one mover each comprising a magnetic body, the at least one mover comprising a first mover;
a work body comprising:
a plurality of electrically conductive elements; and
a working surface configured to support the at least one mover;
a first rotatable body comprising a first engagement body, the first rotatable body attached to the magnetic body of the first mover, wherein the rotatable body and the magnetic body of the first mover are configured to rotate relative to each other around an axis of rotation; and
a second engagement body,
wherein at least one of the plurality of electrically conductive elements is configured to conduct electric current to produce one or more magnetic fields;
wherein the magnetic body of each of the at least one mover comprising at least one magnet array comprising a plurality of magnetization elements is configured to correspondingly cause each of the at least one mover to experience one or more forces when the at least one of the plurality of magnetization elements interacts with the one or more magnetic fields;
wherein the working surface separates the plurality of electrically conductive elements from the at least one mover; and
wherein the first and second engagement bodies are configured to be detachably coupled at least partially based on movement of the first mover.

14. The magnetic movement apparatus of claim 13, wherein the first and second engagement bodies are configured to be detachably coupled at least partially based on the relative movement between the first and second movers.

15. The magnetic movement apparatus of claim 13, wherein the second engagement body is stationary.

16. The magnetic movement apparatus of claim 13, wherein the at least one mover further comprises a second mover and the second engagement body is attached to the magnetic body of the second mover.

17. The magnetic movement apparatus of claim 13, wherein the first engagement body is an engagement fork, and the second engagement body is an engagement pin, wherein the engagement fork is configured to receive the engagement pin.

18. The magnetic movement apparatus of claim 13, wherein the first engagement body is an engagement gear, and the second engagement body is an engagement rack, wherein the engagement gear and the engagement rack are configured to mate with each other.

19. The magnetic movement apparatus of claim 13, wherein the first engagement body comprises an engagement cylinder comprising an outer surface and a plurality of first magnetic field generators on the outer surface configured to generate alternating magnetic fields, and the second engagement body comprises plurality of second magnetic field generators configured to generate alternating magnetic fields, such that the first and second engagement bodies are configured to be detachably magnetically coupled to each other.

20. The magnetic movement apparatus of claim 13 wherein when the engagement bodies are detachably coupled, the relative movement between the first mover and the second engagement body is configured to rotate the rotatable body.

21. The magnetic movement apparatus of claim 13 wherein the first mover further comprises a latching mechanism with at least two lockable positions configured to hold the rotatable body in one of at least two corresponding relative positions relative to its axis of rotation.

22. The magnetic movement apparatus of claim 13, wherein the first mover comprises:
   a multi-stable mechanism configured to be in one of at least two locally minimum energy states; and
   an actuatable handle, wherein relative motion between the actuatable handle and the magnetic body of the first mover is configured to change the multi stable mechanism from one of the at least two locally minimum energy states to another.

23. The magnetic movement apparatus of claim 13 wherein the first mover comprises:
   an actuatable handle, wherein relative motion between the actuatable handle and the magnetic body of the first mover is configured to be actuated by controllably moving the first mover toward a pushing feature to generate an actuating force on the actuatable handle thereby causing relative motion between the actuatable handle and the magnetic body of the first mover.

24. The magnetic movement apparatus of claim 23 wherein the pushing feature is stationary.

25. The magnetic movement apparatus of claim 23 wherein the actuatable handle is actuated by controllably moving one or both of the first and second movers toward each other to generate an actuating force on the actuatable handle thereby causing relative motion between the actuatable handle and the magnetic body of the first mover.

26. A magnetic movement apparatus comprising:
   a work body comprising:
      a plurality of electrically conductive elements; and
      a working surface configured to support the at least one mover,
      wherein at least one of the plurality of electrically conductive elements is configured to conduct electric current to produce one or more magnetic fields;
   a first robotic device and a second robotic device, each comprising a first mover and a second mover respectively, wherein
      each mover comprises at least one magnetic body comprising at least one magnet array comprising a plurality of magnetization elements configured to cause the mover to experience one or more forces when at least one of the plurality of magnetization elements interacts with the one or more magnetic fields elements to create one or more magnetic fields which cause corresponding magnetic forces on the one or more magnet array assemblies of a mover, thereby controllably moving the mover relative to the work body in at least two in-plane directions;
      the first robotic device further comprises a first actuator assembly comprising one or more actuators; and
      wherein the first and second robotic devices are configured to come into contact with and thereby actuate at least one of the one or more actuators.

27. The magnetic movement apparatus of claim 26, wherein the first actuator assembly further comprises a multi-stable mechanism.

28. The magnetic movement apparatus of claim 26, further comprising:
   at least one controller configured to generate at least one current reference command signal at least partially based on positions of the first and second robotic devices relative to the work body; and
   at least one current generator configured to generate the electrical current conducted by the at least one of the plurality of electrically conductive elements in response to receiving the at least one current reference command signal;
   wherein the electrical current causes the first mover to experience a first at least two independently controllable forces, and causes the second mover to experience a second at least one independently controllable force.

29. The magnetic movement apparatus of claim 28, wherein:
   the at least one current reference command signal is configured to cause the at least one current generator to generate current such that:
      the first at least two independently controllable forces comprise at least one force in a first direction parallel to the working surface, and at least one force in a second direction parallel to the working surface and not parallel with the first direction; and
      the second at least one independent force comprises at least one force in the first direction and at least one force in the second direction.

30. The magnetic movement apparatus of claim 26, wherein:
   the first mover comprises a first magnet array comprising a first plurality of magnetization segments linearly elongated in a first elongation direction each having a magnetization direction, and a second magnet array comprising a second plurality of magnetization segments linearly elongated in a second elongation direction each having a magnetization direction; and the second mover comprises a third magnet array comprising a third plurality of magnetization segments linearly elongated in the first elongation direction each having a magnetization direction;

wherein, in each of the first, second, and third pluralities of magnetization segments, at least two magnetization segments have different magnetization directions; and wherein the first elongation direction is different from the second elongation direction.

31. The magnetic movement apparatus of claim 30, wherein the second mover further comprises a fourth magnet array comprising a fourth plurality of magnetization segments linearly elongated in the second elongation direction each having a magnetization direction;

wherein at least two of the fourth plurality of magnetization segments have different magnetization directions.

* * * * *